US011502984B2

(12) United States Patent
Dascola et al.

(10) Patent No.: US 11,502,984 B2
(45) Date of Patent: Nov. 15, 2022

(54) DEVICES, METHODS, AND GRAPHICAL USER INTERFACES FOR PROACTIVE MANAGEMENT OF NOTIFICATIONS

(71) Applicant: Apple Inc., Cupertino, CA (US)

(72) Inventors: Jonathan R. Dascola, San Francisco, CA (US); Alan C. Dye, San Francisco, CA (US); Christopher P. Foss, San Francisco, CA (US); Heena Ko, San Francisco, CA (US); Corey K. Wang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/145,074

(22) Filed: Sep. 27, 2018

(65) Prior Publication Data

US 2019/0342252 A1 Nov. 7, 2019

Related U.S. Application Data

(60) Provisional application No. 62/668,183, filed on May 7, 2018.

(51) Int. Cl.
*G06F 15/16* (2006.01)
*H04L 51/224* (2022.01)
(Continued)

(52) U.S. Cl.
CPC .......... *H04L 51/224* (2022.05); *H04L 51/212* (2022.05); *H04M 1/72484* (2021.01)

(58) Field of Classification Search
CPC .... H04L 51/24; H04L 51/12; H04M 1/72597; H04M 1/72522; G06F 3/0482; G06Q 10/10
See application file for complete search history.

(56) References Cited

U.S. PATENT DOCUMENTS 8,218,403 B2   7/2012   Scott et al.
8,477,566 B2   7/2013   Lazaridis et al.
(Continued)

FOREIGN PATENT DOCUMENTS

AU    2019100493 A4    6/2019
CN    102841755 A     12/2012
(Continued)

OTHER PUBLICATIONS

Amadeo, "Twitter Post [online]", https://twitter.com/ronamadeo/status/972152445848694789, Mar. 9, 2018, 8 pages.
(Continued)

*Primary Examiner* — Suraj M Joshi
*Assistant Examiner* — Jaren Means
(74) *Attorney, Agent, or Firm* — Morgan, Lewis & Bockius LLP

(57) ABSTRACT

A computer system has a plurality of notifications in a notification history, including a first notification of a first event of a first event type and a second notification of a second event of the first event type. The first notification and the second notification are coalesced in the notification history. In response to detecting an additional event of the first event type, a third notification is created for the additional event. After creating the third notification, in response to a request to display a wake screen, the wake screen is displayed with the third notification. The third notification is displayed without information about the first notification and the second notification. After the third notification has been displayed, in response to a request to display the notification history, the notification history is displayed with a coalesced representation of the first notification and the second notification.

36 Claims, 110 Drawing Sheets

(51) Int. Cl.
*H04M 1/72484* (2021.01)
*H04L 51/212* (2022.01)

(56) References Cited

U.S. PATENT DOCUMENTS

| | | | |
|---|---|---|---|
| 8,553,502 B2 | 10/2013 | Lazaridis et al. | |
| 8,768,648 B2 | 7/2014 | Panther et al. | |
| 9,406,103 B1* | 8/2016 | Gray | G06F 3/0484 |
| 9,461,833 B1 | 10/2016 | Marra et al. | |
| 9,541,986 B2 | 1/2017 | Rohrweck | |
| 9,590,942 B1* | 3/2017 | Yeskel | H04L 67/306 |
| 9,693,311 B2 | 6/2017 | Cardozo et al. | |
| 9,808,185 B2 | 11/2017 | Arnold et al. | |
| 10,114,534 B2 | 10/2018 | Kasterstein et al. | |
| 10,261,475 B1 | 4/2019 | Kahn et al. | |
| 10,296,128 B1 | 5/2019 | Nold et al. | |
| 10,311,745 B2 | 6/2019 | Arnold et al. | |
| 10,338,773 B2 | 7/2019 | Murarka et al. | |
| 2002/0078393 A1 | 6/2002 | Parker | |
| 2003/0236935 A1 | 12/2003 | Amemiya et al. | |
| 2005/0120306 A1 | 6/2005 | Klassen et al. | |
| 2005/0154935 A1 | 7/2005 | Jin | |
| 2005/0249023 A1 | 11/2005 | Bodlaender | |
| 2006/0116178 A1 | 6/2006 | Vuong et al. | |
| 2007/0150842 A1 | 6/2007 | Chaudhri et al. | |
| 2007/0211877 A1 | 9/2007 | Martin et al. | |
| 2007/0268784 A1 | 11/2007 | Xu | |
| 2009/0143062 A1 | 6/2009 | Skinner et al. | |
| 2009/0143114 A1 | 6/2009 | Vargas et al. | |
| 2009/0284389 A1 | 11/2009 | Klassen et al. | |
| 2009/0284482 A1 | 11/2009 | Chin | |
| 2010/0295789 A1 | 11/2010 | Shin et al. | |
| 2011/0119630 A1 | 5/2011 | Stroupe et al. | |
| 2011/0231499 A1 | 9/2011 | Stovecek et al. | |
| 2011/0283241 A1 | 11/2011 | Miller et al. | |
| 2012/0112908 A1 | 5/2012 | Prykari et al. | |
| 2012/0233563 A1 | 9/2012 | Chakra et al. | |
| 2013/0024799 A1 | 1/2013 | Fadell et al. | |
| 2013/0029729 A1 | 1/2013 | Logan et al. | |
| 2013/0100044 A1 | 4/2013 | Zhao et al. | |
| 2013/0190032 A1 | 7/2013 | Li | |
| 2013/0290757 A1 | 10/2013 | Barlow et al. | |
| 2013/0332721 A1 | 12/2013 | Chaudhri et al. | |
| 2013/0346408 A1* | 12/2013 | Duarte | H04M 19/04 707/737 |
| 2014/0055388 A1 | 2/2014 | Yook et al. | |
| 2014/0068755 A1 | 3/2014 | King et al. | |
| 2014/0106821 A1 | 4/2014 | Nakahara | |
| 2014/0172996 A1 | 6/2014 | Deeter et al. | |
| 2014/0232671 A1 | 8/2014 | Chaudhri | |
| 2014/0245202 A1 | 8/2014 | Yoon et al. | |
| 2014/0282174 A1 | 9/2014 | Dempski | |
| 2014/0283142 A1 | 9/2014 | Shepherd et al. | |
| 2014/0365919 A1 | 12/2014 | Shaw et al. | |
| 2015/0067365 A1 | 3/2015 | Nakazima et al. | |
| 2015/0094120 A1 | 4/2015 | Suh et al. | |
| 2015/0186517 A1 | 7/2015 | Gilad et al. | |
| 2015/0195789 A1 | 7/2015 | Yoon et al. | |
| 2015/0253894 A1 | 9/2015 | McKenzie et al. | |
| 2015/0261423 A1 | 9/2015 | Beaumont et al. | |
| 2016/0005290 A1 | 1/2016 | Takahashi | |
| 2016/0022202 A1 | 1/2016 | Peterson et al. | |
| 2016/0034695 A1* | 2/2016 | Won | H04W 4/02 726/28 |
| 2016/0065708 A1 | 3/2016 | Yang et al. | |
| 2016/0077724 A1 | 3/2016 | Lee et al. | |
| 2016/0124579 A1 | 5/2016 | Tokutake | |
| 2016/0154549 A1 | 6/2016 | Chaudhri et al. | |
| 2016/0235359 A1 | 8/2016 | Cho et al. | |
| 2016/0248865 A1 | 8/2016 | Dotan-Cohen et al. | |
| 2016/0255188 A1 | 9/2016 | Chaudhri et al. | |
| 2016/0292994 A1 | 10/2016 | Grimme et al. | |
| 2016/0337299 A1* | 11/2016 | Lane | H04L 67/10 |
| 2016/0357394 A1 | 12/2016 | Tae et al. | |
| 2017/0011210 A1 | 1/2017 | Cheong et al. | |
| 2017/0099602 A1 | 4/2017 | Joo et al. | |
| 2017/0118162 A1 | 4/2017 | Ratiu et al. | |
| 2017/0126609 A1 | 5/2017 | Sharifi et al. | |
| 2017/0127009 A1 | 5/2017 | Friedrich | |
| 2017/0127967 A1 | 5/2017 | Garcia Molina et al. | |
| 2017/0185275 A1* | 6/2017 | Ziegler | G06F 3/04817 |
| 2017/0189641 A1 | 7/2017 | Moturu et al. | |
| 2017/0228114 A1 | 8/2017 | Brett et al. | |
| 2017/0302609 A1 | 10/2017 | Vardhan et al. | |
| 2017/0347946 A1 | 12/2017 | Arnold et al. | |
| 2017/0347949 A1 | 12/2017 | Arnold et al. | |
| 2017/0352287 A1 | 12/2017 | Arnold et al. | |
| 2017/0357217 A1 | 12/2017 | Raymann et al. | |
| 2017/0357419 A1 | 12/2017 | Raymann et al. | |
| 2017/0357439 A1 | 12/2017 | Lemay et al. | |
| 2018/0074693 A1 | 3/2018 | Jones et al. | |
| 2018/0088787 A1 | 3/2018 | Bereza et al. | |
| 2018/0088797 A1 | 3/2018 | Mcatee et al. | |
| 2018/0101297 A1 | 4/2018 | Yang et al. | |
| 2018/0164973 A1 | 6/2018 | Kim et al. | |
| 2018/0188925 A1 | 7/2018 | Na et al. | |
| 2018/0188935 A1* | 7/2018 | Singh | G06F 3/04842 |
| 2018/0225945 A1 | 8/2018 | Moravek et al. | |
| 2018/0226055 A1 | 8/2018 | Raymann et al. | |
| 2018/0227377 A1 | 8/2018 | Trivedi et al. | |
| 2018/0267593 A1 | 9/2018 | Ramasamy et al. | |
| 2018/0336530 A1 | 11/2018 | Johnson et al. | |
| 2019/0097957 A1 | 3/2019 | Phanshikar et al. | |
| 2019/0150854 A1 | 5/2019 | Chung et al. | |
| 2019/0179493 A1 | 6/2019 | Goenka et al. | |
| 2019/0213060 A1 | 7/2019 | Raymann et al. | |
| 2019/0278901 A1 | 9/2019 | Lewis | |
| 2019/0318608 A1 | 10/2019 | Rao et al. | |
| 2019/0342251 A1 | 11/2019 | Dascola et al. | |
| 2019/0342252 A1 | 11/2019 | Dascola et al. | |
| 2019/0342447 A1 | 11/2019 | Ko et al. | |
| 2019/0361714 A1 | 11/2019 | Rothkopf | |
| 2020/0012423 A1 | 1/2020 | Cinek et al. | |
| 2020/0098300 A1 | 3/2020 | Verma et al. | |
| 2020/0120201 A1 | 4/2020 | Siritzky | |
| 2020/0228616 A1 | 7/2020 | Nishikawa et al. | |
| 2021/0051226 A1 | 2/2021 | Ko et al. | |
| 2021/0122469 A1 | 4/2021 | Wu | |
| 2021/0173664 A1 | 6/2021 | Bai et al. | |
| 2021/0349617 A1 | 11/2021 | Crowley et al. | |
| 2021/0349618 A1 | 11/2021 | Crowley et al. | |
| 2021/0349619 A1 | 11/2021 | Crowley et al. | |

FOREIGN PATENT DOCUMENTS

| | | |
|---|---|---|
| CN | 103514416 A | 1/2014 |
| CN | 106022062 A | 10/2016 |
| CN | 107491257 A | 12/2017 |
| CN | 107968885 A | 4/2018 |
| EP | 3 312 713 A1 | 4/2018 |
| JP | H10-106344 A | 4/1998 |
| JP | 2011-509541 A | 3/2011 |
| JP | 2015-045902 A | 3/2015 |
| JP | 2015-188275 A | 10/2015 |
| JP | 2016-105630 A | 6/2016 |
| JP | 2017-126067 A | 7/2017 |
| JP | 2017-208112 A | 11/2017 |
| JP | 2018-185830 A | 11/2018 |
| JP | 2019-111181 A | 7/2019 |
| WO | WO 2013/184530 A1 | 12/2013 |
| WO | WO 2016/200584 A1 | 12/2016 |
| WO | WO 2017/027526 A1 | 2/2017 |
| WO | WO 2017/052043 A1 | 3/2017 |
| WO | WO 2018/191972 A1 | 10/2018 |
| WO | WO 2019/217020 A1 | 11/2019 |

OTHER PUBLICATIONS

Bohn, "Why Android Notifications Are Better Than The iPhone's", https://www.youtube.com/watch?v=bHtkjHSB5Nw, Apr. 18, 2018, 10 pages.

CNET, "Android Lollipop Lock-Screen Notification Tips", https://www.youtube.com/watch?v=LZTxHBOwzIU, Nov. 13, 2014, 3 pages.

(56) References Cited

OTHER PUBLICATIONS

Hill, "How to turn Off Notifications in Andoid", http://web.archive.org/web/20180203023547/https://www.digitaltrends.com/android/how-to-turn-off-notifications-in-android, Dec. 28, 2017, 16 pages.
IPhoneHacksTV, How to Group Notifications by App in iOS 9 Notification Center—iPhone Hacks, https://www.youtube.com/watch?v=j9kEN1_1yh8, Sep. 16, 2015, 2 pages.
Klein, "How Manage, Customize, and Block Notifications in Android Lollipop and Marshmellow", http://web.archive.org/web/20171229125502/https:www.howtogeek.com/202404/how-to-tame-notifications-in-android-5.0, Sep. 29, 2016, 11 pages.
Raphael, "Oh, Oreo! 8 Things to Try When You Get Andoid 8.0", https://web.archive.org/web/20171224100520/https://www.computerworld.com/article/32191126/android/oreo-android-8, Aug. 24, 2017, 10 pages.
VikuBalupura, "[Android] Hands-On With Android P—Is This the Beginning of a New Design Language?", http://en.miui.com/thread-1995365-1-1.html, Mar. 10, 2018, 11 pages.
Wallen, "How to Customize Androlid Oreo Notifications With Categories", http://web.archive.org/web/20171017232141/https://www.techrepublic.com/article/how-to-customize-android-oreo-notifications-with-categories, Oct. 17, 2017, 14 pages.
Whitwam, "Android P Feature Spotlight: Android Will Offer to Hide Notifications From Apps You Frequently Dismiss", https://www.androidpolice.com/2018/03/12/android-P-feature-spotlight-android-will-offer-hide-notifications-apps-frequently-dismiss, Mar. 12, 2018, 5 pages.
Office Action, dated Aug. 29, 2018, received in Danish Patent Application No. 201870334, which corresponds with U.S. Appl. No. 16/145,068, 9 pages.
Office Action, dated Mar. 5, 2019, received in Danish Patent Application No. 201870334, which corresponds with U.S. Appl. No. 16/145,068, 6 pages.
Office Action, dated Aug. 31, 2018, received in Danish Patent Application No. 201870335, which corresponds with U.S. Appl. No. 16/145,074, 9 pages.
Office Action, dated Dec. 20, 2018, received in Danish Patent Application No. 201870335, which corresponds with U.S. Appl. No. 16/145,074, 4 pages.
Isom, "How to Change iPhone Notification Settings", https://www.youtube.com/watch?v=P2Z4dvieB5k, Mar. 16, 2017, 3 pages.
Jason, "New iOS 8 Features that Apple Didn't Have Time to Tell Us About Today", https://web.archive.org/web/20171018064601-features-hidden.html, Jun. 2, 2014, 7 pages.
International Search Report and Written Opinion, dated May 28, 2019, received in International Patent Application No. PCT/US2019/026349, which corresponds with U.S. Appl. No. 16/145,068, 16 pages.
Office Action, dated Sep. 6, 2019, received in Danish Patent Application No. 201870334, which corresponds with U.S. Appl. No. 16/145,068, 4 pages.
Office Action, dated Aug. 28, 2019, received in Danish Patent Application No. 201870335, which corresponds with U.S. Appl. No. 16/145,074, 5 pages.
Office Action, dated Apr. 3, 2020, received in U.S. Appl. No. 16/145,068, 35 pages.
Office Action, dated Apr. 22, 2020, received in Danish Patent Application No. 201870334, which corresponds with U.S. Appl. No. 16/145,068, 2 pages.
Office Action, dated Apr. 20, 2020 received in Danish Patent Application No. 201870335, which corresponds with U.S. Appl. No. 16/145,074, 4 pages.
Final Office Action, dated Nov. 30, 2020, received in U.S. Appl. No. 16/145,068, 44 pages.
Office Action, dated Apr. 16, 2021, received in Australian Patent Application No. 2019265367, U.S. Appl. No. 16/145,074, 3 pages.
Anonymous, "Create a Group of Notifications / Android Developers", https://web.archive.org/20181028202552/https://devloper.android.com/training/notif-user/group, Oct. 27, 2018, 5 pages.

Apple, "iPhone User Guide for iOS 7.1 Software", https://manuals.info.apple.com/en_US/iphone_ios7_user_guide.pdf, Mar. 10, 2014, 162 pages.
Apple, "Stay Focused While Driving with iPhone", https://support.apple.com/guide/iphone/turn-on-do-not-disturb-while-driving-iphae754533b/ios#:~:text=Send%20an%20auto%2Dreply%20text%20message%20t hat%20you're%20driving&text=Go%20to%20Settings%20%3E%20Do%20Not%20Di sturb%20%3E%20Auto%2DReply%20To,re%20not%20in%20your%20Contacts, 2022, 2 pages.
Black, "Samsung Galaxy S7 Silent Alarm Fix", https://www.youtube.com/watch?v=35LQtw7ucaw, Jan. 20, 2017, 4 pages.
Droid Life, "Android 5.0 Feature: Notification Access and Do Not Disturb", https://www.youtube.com/watch?v=SY2kAqCqOko, Oct. 17, 2014, 2 pages.
Frick, "Automatically Turn On Theater Mode on Android Wear Watch When Sleep Tracking", https://forum.urbandroid.org/t/automatically-turn-on-theater-mode-on-android-wear-watch-when-sleep-tracking/398, Mar. 6, 2018, 2 pages.
Google, "Limit Interruptions with Do Not Disturb on Android", https://support.google.com/android/answer/9069335?hl=en#zippy=%2Cset-what-to-block, 2022, 2 pages.
Hill, "From Oreo to Jelly Bean, Here's How to Turn Off Notifications in Android", https://web.archive.org/web/20180503062117/https://www.ditaltrends.com/android/how-to-turn-off-notifications-in-android, May 3, 2018, 10 pages.
Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.
iPhonetricks.org, "How to Snooze or Stop an iPhone Alarm Without Looking At The Display?", https://www.iphonetricks.org/how-to-snooze-or-stop-an-iphone-alarm-without-looking-at-the-display, Nov. 29, 2016, 5 pages.
Lew, "Correctly Handling Bundled Android Notifications", https://web.archive.org/web/20171210085025/https://blog.danlew.net/20171018064601/http://, Feb. 7, 2017, 5 pages.
MacRumors, "iOS 11: How to Use the Lock Screen and Notification Center", https://www.youtube.com/watch?v=BQDyGNO9oGc, Sep. 19, 2017, 4 pages.
Mcfasa09, "Toggle Theater Mode on Wear 2.0", https://www.reddit.com/r/AndroidWear/comments/64qitr/toggle_theater_mode_on_wear_20, Mar. 18, 2014, 3 pages.
Mediati, "Master Notifications in Android Lollipop with Notification Priority and Downtime", https://web.archive.org/web/20180503062117/https://www.digitaltrends.com/android/how-to-turn-off-notifications-in-android, Dec. 3, 2014, 7 pages.
Phandroid, "Do Not Disturb" mode will save you from notification hell, https://www.youtube.com/watch?v=R6A2As4VJpl, Jan. 16, 2017, 3 pages.
Rosenbaun, "How to Keep your Apple Watch Quiet", https://www.theverge.com/2019/10/24/20930506/how-to-apple-watch-do-not-disturb-iphone-quiet-mute-theater-mode, Oct. 24, 2019, 8 pages.
Samsung, "Samsung Goodnight Mode", https://www.samsung.com/us/support/answer/ANS00080310, 1995-2021,2 pages.
Sony Xperia Z, "How to turn off alarm when it sounds", https://www.youtube.com/watch?v=eerWJMN7e5s, May 14, 2015, 3 pages.
Summerson, 'Android's Confusing "Do Not Disturb" Settings, Explained', https://www.howtogeek.com/260225/androids-confusing-do-not-disturb-settings-explained, Jul. 3, 2017, 8 pages.
Tantsissa Holdings, "Autosleep Seep Rings", http://autosleep.tantsissa.com/sleeprings, 2016-2010, 6 pages.
Tropical Tech, How to Set Up Do Not Disturb Mode Rules / Schedule in Android / 2018, http://www.youtube.com/watch?v=DLnGcpKHVyM, Sep. 4, 2017, 3 pages.
Wayback Machine, "Nights Keeper", http://nightskeeper.com/?page_id=15, 2013, 9 pages.
Whitwam, Android N Feature Spotlight: Do Not Disturb Automatic Rules Get Option ToEnd DND On Next Alarm, https://www.androidpolice.com/2016/03/11/android-n-feature-spotlight-do-not-disturb-gets-option-to-end-automatically-on-next-alarm/, Mar. 11, 2016, 5 pages.
Woodpress, "Features—Lighting Launcher", https://www.lightninglauncher.com/wordpress/features, 2021, 3 pages.

(56) References Cited

OTHER PUBLICATIONS

XDA Spotlight, "Lock Me Out", https://www.xda-developers.com/curb-android-smartphone-addiction-lock-me-out, Apr. 16, 2018, 7 pages.
YouTube, "Notification Digest", https://support.google.com/youtube/answer/9012820_at_00:38, Dec. 29, 2018, 1 page.
Office Action, dated Jan. 16, 2020, received in U.S. Appl. No. 16/142,599, 13 pages.
Notice of Allowance, dated Jul. 16, 2020, received in U.S. Appl. No. 16/142,599, 7 pages.
Notice of Allowance, dated Sep. 18, 2020, received in U.S. Appl. No. 16/142,599, 7 pages.
Office Action, dated Nov. 6, 2020, received in Chinese U.S. Appl. No. 16/142,599.8, which corresponds with U.S. Appl. No. 16/142,599, 11 pages.
Office Action, dated Jul. 7, 2021, received in Chinese U.S. Appl. No. 16/142,599.8, which corresponds with U.S. Appl. No. 16/142,599, 1 page.
Notice of Allowance, dated Aug. 9, 2021, received in Chinese U.S. Appl. No. 16/142,599.8, which corresponds with U.S. Appl. No. 16/142,599, 2 pages.
Patent, dated Oct. 29, 2021, received in Chinese U.S. Appl. No. 16/142,599.8, which corresponds with U.S. Appl. No. 16/142,599, 5 pages.
Office Action, dated Aug. 27, 2018, received in Danish Patent Application No. 201870333, 9 pages.
Office Action, dated Nov. 12, 2018, received in Danish Patent Application No. 201870333, 3 pages.
Office Action, dated May 14, 2019, received in Danish Patent Application No. 201870333, 6 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Notice of Allowance, dated Apr. 2, 2020, received in Danish Patent Application No. 201870333, 4 pages.
Patent, dated May 15, 2020, received in Danish Patent Application No. 201870333, 5 pages.
Office Action, dated Jul. 12, 2021, received in U.S. Appl. No. 16/145,068, 82 pages.
Notice of Allowance, dated Feb. 28, 2022, received in U.S. Appl. No. 16/145,068, 25 pages.
Notice of Allowance, dated Jan. 18, 2022, received in Australian U.S. Appl. No. 16/145,074, U.S. Appl. No. 16/145,074, 3 pages.
Office Action, dated Jan. 24, 2022, received in Chinese U.S. Appl. No. 16/145,074.8, which corresponds with U.S. Appl. No. 16/145,074, 1 page.
Office Action, dated Apr. 14, 2022, received in European U.S. Appl. No. 16/145,074, which corresponds with U.S. Appl. No. 16/145,074, 10 pages.
Office Action, dated Dec. 10, 2021, received in Japanese Patent Application No. 2020-557940, which corresponds with U.S. Appl. No. 16/145,074, 2 pages.
Office Action, dated Nov. 30, 2021, received in Korean Patent Application No. 2020-7037439, which corresponds with U.S. Appl. No. 16/145,074, 3 pages.
Office Action, dated Aug. 12, 2021, received in U.S. Appl. No. 16/948,370, 35 pages.
Office Action, dated Apr. 5, 2022, received in U.S. Appl. No. 16/948,370, 44 pages.
Office Action, dated Jun. 25, 2021, received in Australian U.S. Appl. No. 16/948,370, which corresponds with U.S. Appl. No. 16/948,370, 8 pages.
Notice of Allowance, dated Feb. 22, 2022, received in Australian U.S. Appl. No. 16/948,370, which corresponds with U.S. Appl. No. 16/948,370, 3 pages.
Office Action, dated Dec. 18, 2020, received in Danish Patent Application No. 2020-70595, which corresponds with U.S. Patent No. U.S. Appl. No. 16/948,370, 9 pages.

Office Action, dated Sep. 30, 2021, received in Danish Patent Application No. 2020-70595, which corresponds with U.S. Patent No. U.S. Appl. No. 16/948,370, 5 pages.
Office Action, dated Dec. 2, 2021, received in Indian U.S. Appl. No. 16/948,370, which corresponds with U.S. Appl. No. 16/948,370, 8 pages.
Office Action, dated Mar. 4, 2022, received in Japanese Patent Application No. 2020-160012, which corresponds with U.S. Appl. No. 16/948,370, 2 pages.
Office Action, dated Feb. 1, 2021, received in U.S. Appl. No. 16/948,374, 27 pages.
Final Office Action, dated Jun. 11, 2021, received in U.S. Appl. No. 16/948,374, 29 pages.
Office Action, dated Dec. 29, 2021, received in U.S. Appl. No. 16/948,374, 29 pages.
Office Action, dated May 11, 2021, received in Australian U.S. Appl. No. 16/948,374, which corresponds with U.S. Appl. No. 16/948,374, 4 pages.
Notice of Allowance, dated Oct. 7, 2021, received in Australian U.S. Appl. No. 16/948,374, which corresponds with U.S. Appl. No. 16/948,374, 3 pages.
Patent, dated Feb. 10, 2022, received in Australian U.S. Appl. No. 16/948,374, which corresponds with U.S. Appl. No. 16/948,374, 3 pages.
Innovation Patent, dated Jun. 9, 2021, received in Australian U.S. Appl. No. 16/948,374, which corresponds with U.S. Appl. No. 16/948,374, 5 pages.
Office Action, dated Jul. 30, 2021, received in Australian U.S. Appl. No. 16/948,374, which corresponds with U.S. Appl. No. 16/948,374, 4 pages.
Innovation Patent, dated Jan. 31, 2022, received in Australian U.S. Appl. No. 16/948,374, which corresponds with U.S. Appl. No. 16/948,374, 3 pages.
Office Action, dated Dec. 21, 2020, received in Danish Patent Application No. 2020-70599, which corresponds with U.S. Appl. No. 16/948,374, 8 pages.
Office Action, dated Oct. 4, 2021, received in Danish Patent Application No. 2020-70599, which corresponds with U.S. Appl. No. 16/948,374, 2 pages.
Office Action, dated Dec. 1, 2021, received in Indian U.S. Appl. No. 16/948,374, which corresponds with U.S. Appl. No. 16/948,374, 9 pages.
Office Action, dated Nov. 30, 2021, received in Japanese Patent Application No. 2020-160013, which corresponds with U.S. Appl. No. 16/948,374, 2 pages.
Office Action, dated Jan. 8, 2021, received in U.S. Appl. No. 16/948,375, 19 pages.
Final Office Action, dated Mar. 9, 2021, received in U.S. Appl. No. 16/948,375, 19 pages.
Notice of Allowance, dated Jun. 24, 2021, received in U.S. Appl. No. 16/948,375, 6 pages.
Notice of Allowance, dated Oct. 26, 2021, received in U.S. Appl. No. 16/948,375, 5 pages.
Office Action, dated Apr. 13, 2021, received in Australian U.S. Appl. No. 16/948,375, which corresponds with U.S. Appl. No. 16/948,375, 8 pages.
Notice of Allowance, dated Oct. 5, 2021, received in Australian U.S. Appl. No. 16/948,375, which corresponds with U.S. Appl. No. 16/948,375, 3 pages.
Patent, dated Feb. 10, 2022, received in Australian U.S. Appl. No. 16/948,375, which corresponds with U.S. Appl. No. 16/948,375, 3 pages.
Office Action, dated Jan. 11, 2021, received in Danish Patent Application No. 2020-70629, which corresponds with U.S. Appl. No. 16/948,375, 10 pages.
Office Action, dated Dec. 1, 2021, received in Indian U.S. Appl. No. 16/948,375, which corresponds with U.S. Appl. No. 16/948,375, 10 pages.
Office Action, dated Dec. 6, 2021, received in Japanese Patent Application No. 2020-160014, which corresponds with U.S. Appl. No. 16/948,375, 2 pages.
Office Action, dated Arpil 22, 2022, received in U.S. Appl. No. 17/084,579, 10 pages.

(56) References Cited

OTHER PUBLICATIONS

Notice of Allowance, dated Feb. 2, 2022, received in U.S. Appl. No. 17/483,757, 35 pages.
Notice of Allowance, dated Mar. 30, 2022, received in U.S. Appl. No. 17/483,757, 5 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
Invitation to Pay Additional Fees, dated Aug. 6, 2021, received in International Patent Application No. PCT/US2021/031131, which corresponds with U.S. Appl. No. 16/948,370, 5 pages.
Notice of Allowance, dated Jul. 12, 2022, received in U.S. Appl. No. 16/145,068, 9 pages.
Certificate of Grant, dated May 19, 2022, received in Australian U.S. Appl. No. 16/145,074, U.S. Appl. No. 16/145,074, 3 pages.
Office Action, dated May 19, 2022, received in Danish Patent Application No. 2020-70595, which corresponds with U.S. Appl. No. 16/948,370, 2 pages.
Final Office Action, dated May 6, 2022, received in U.S. Appl. No. 16/948,374, 27 pages.
Office Action, dated Jun. 2, 2022, received in Danish Patent Application No. 2020-70599, which corresponds with U.S. Appl. No. 16/948,374, 2 pages.
Office Action, dated May 29, 2022, received in Korean Patent Application No. 2020-0123967, which corresponds with U.S. Appl. No. 16/948,374, 5 pages.
Office Action, dated May 5, 2022, received in U.S. Appl. No. 17/084,579, 11 pages.
Notice of Allowance, dated Aug. 8, 2022, received in Japanese Patent Application No. 2020-557940, which corresponds with U.S. Appl. No. 16/145,074, 1 page.
Notice of Allowance, dated Jul. 28, 2022, received in Korean Patent Application No. 2020-7037439, which corresponds with U.S. Appl. No. 16/145,074, 3 pages.
Notice of Allowance, dated Jul. 29, 2022, received in Japanese Patent Application No. 2020-160014, which corresponds with U.S. Appl. No. 16/948,375, 2 pages.
Office Action, dated Jul. 27, 2022, received in U.S. Appl. No. 17/483,751, 30 pages.

\* cited by examiner

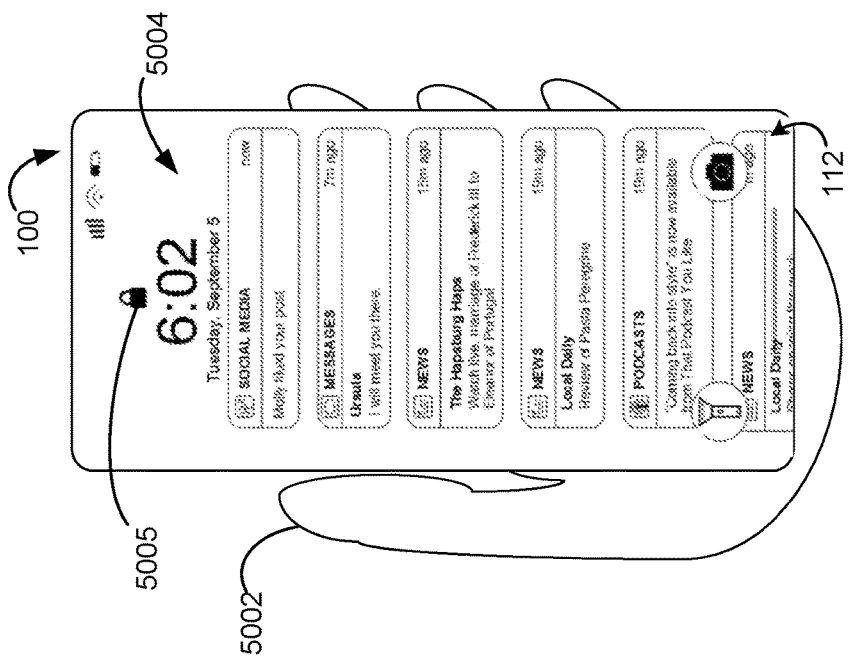
Figure 5A4
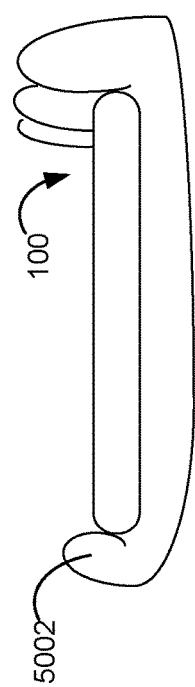
Figure 5A1
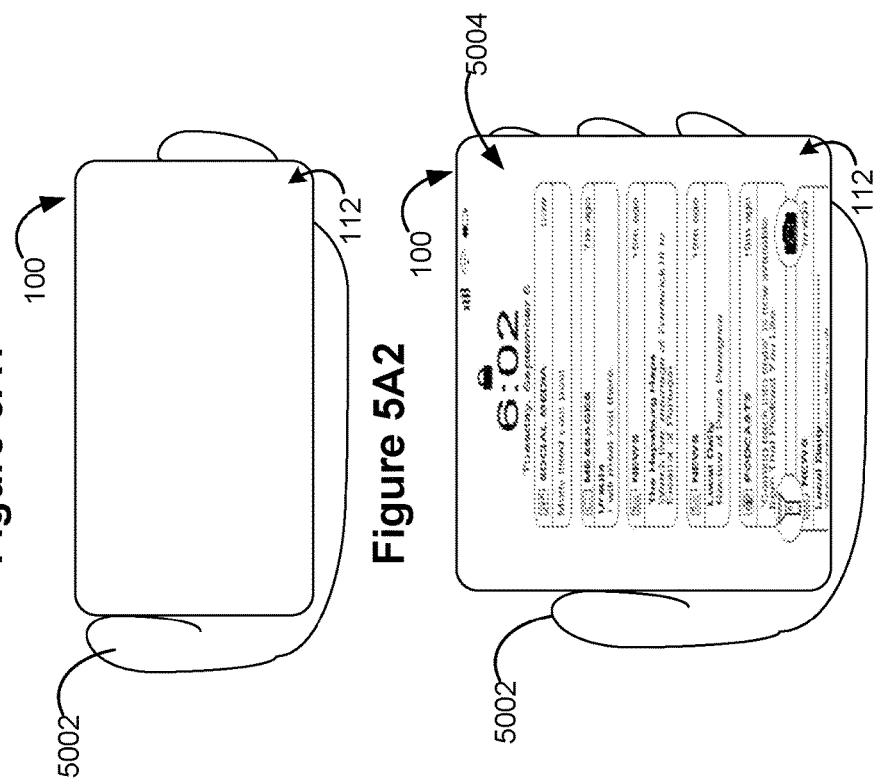
Figure 5A2
Figure 5A3

716
In response to detecting the occurrence of the second event of the first event type: in accordance with a determination that the second delivery mode corresponds to a quiet-delivery mode, adding a second notification that corresponds to the second event to a notification history without first displaying the second notification in the respective user interface; and in accordance with a determination that the second delivery mode corresponds to turning off notifications for the first event type, forgo displaying the second notification in the respective user interface and forgo adding the second notification to the notification history

718
In response to detecting the occurrence of the second event of the first event type, in accordance with a determination that the second delivery mode corresponds to a prominent-delivery mode, display the second notification of the first event type over a wake screen user interface that is distinct from the respective user interface

720
The respective user interface includes the notification history

┌──────────────────────────────────────────────────────────────────────┐
│ 732                                                                  │
│ While a notification settings user interface that corresponds to the first event type is │
│ displayed, detect an input directed to a delivery mode control that corresponds to a │
│ respective delivery mode of a plurality of delivery modes            │
└──────────────────────────────────────────────────────────────────────┘
                                    ↓
┌──────────────────────────────────────────────────────────────────────┐
│ 734                                                                  │
│ In response to detecting the input directed to the delivery mode control: │
│     change the delivery mode preference for future notifications of events of the │
│ first event type from a currently selected delivery mode to the respective delivery │
│ mode; and                                                            │
│     display a respective animation that illustrates notification delivery under the │
│ respective delivery mode                                             │
└──────────────────────────────────────────────────────────────────────┘

┌──────────────────────────────────────────────────────────────────────┐
│ 736                                                                  │
│ While a respective notification is displayed, detect a fourth input to invoke a │
│ corresponding expanded version of the respective notification        │
└──────────────────────────────────────────────────────────────────────┘
                                    ↓
┌──────────────────────────────────────────────────────────────────────┐
│ 738                                                                  │
│ In response to detecting the fourth input, display the expanded version of the │
│ respective notification, wherein the expanded version of the respective notification │
│ includes a control for triggering display of at least one of the notification delivery │
│ preference controls                                                  │
└──────────────────────────────────────────────────────────────────────┘
                                    ↓
┌──────────────────────────────────────────────────────────────────────┐
│ 740                                                                  │
│ Detect a fifth input directed to the control for triggering display of the at least one of │
│ the notification delivery preference controls                        │
└──────────────────────────────────────────────────────────────────────┘
                                    ↓
┌──────────────────────────────────────────────────────────────────────┐
│ 742                                                                  │
│ In response to the fifth input, display the at least one of one or more the notification │
│ delivery preference controls                                         │
└──────────────────────────────────────────────────────────────────────┘

---
828
Display a respective coalesced representation of notifications includes displaying at least a portion of content that corresponds to a most recently created notification of the respective coalesced representation of notifications ---
830
A respective coalesced representation of notifications includes summary information that includes a count of notifications represented by the respective coalesced representation ---
832
A respective coalesced representation of notifications includes a plurality of summary information indicators, wherein a respective summary information indicator of the plurality of summary information indicators corresponds to a respective category of counted items that correspond to content of the notifications represented by the respective coalesced representation

DEVICES, METHODS, AND GRAPHICAL USER INTERFACES FOR PROACTIVE MANAGEMENT OF NOTIFICATIONS

RELATED APPLICATIONS

This application claims priority to U.S. Provisional Application Ser. No. 62/668,183, filed May 7, 2018, which is incorporated by reference herein in its entirety.

TECHNICAL FIELD

This relates generally to electronic devices that display event notifications, including but not limited to electronic devices that provide interfaces for efficient display and management of notifications.

BACKGROUND

The use of portable electronic devices has increased significantly in recent years, with many applications typically residing in the memory of such devices. Exemplary applications include communications applications (e.g., messaging and telephone), calendar applications, news applications, media playback applications (e.g., podcast, music, and video), payment applications, reminder applications, social media applications, and service delivery applications. These applications generate events, which contain information of varying degrees of importance to users. Notifications that correspond to the generated events may be displayed. Exemplary notifications may include digital images, video, text, icons, control elements (such as buttons) and/or other graphics to notify users of events. Exemplary applications that generate notifications include messaging applications (e.g., iMessage or Messages from Apple Inc. of Cupertino, Calif.), calendar applications (e.g., iCal or Calendar from Apple Inc. of Cupertino, Calif.), news applications (e.g., Apple News from Apple Inc. of Cupertino, Calif.), media playback applications (e.g., Podcasts, Apple Music and iTunes from Apple Inc. of Cupertino, Calif.), payment applications (e.g., Apple Pay from Apple Inc. of Cupertino, Calif.), reminder applications (e.g., Reminders from Apple Inc. of Cupertino, Calif.), social media applications, and service delivery applications.

But user interfaces for controlling delivery of notifications, and methods of navigating to and from such interfaces, are cumbersome and inefficient. For example, the notifications may be displayed in a confusing or excessively numerous manner, and navigation to and from interfaces that contain notifications may also be confusing. These methods take longer than necessary, thereby wasting energy. This latter consideration is particularly important in battery-operated devices.

SUMMARY

Accordingly, there is a need for computer systems with improved methods and interfaces for controlling frequency, prominence, and types of notifications that are displayed. For example, methods and interfaces described in accordance with some embodiments provide prompts to raise user awareness of options for controlling delivery of notifications. In some cases, a received amount of a type of notification may exceed a desired amount of notifications of that type. As a result, a large amount of time or numerous inputs may be required to bypass notifications of limited importance to view the notifications that a user finds to be more important and useful.

The above deficiencies and other problems associated with interfaces that display notifications are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a display generation component and one or more input devices. In some embodiments, the computer system has (and/or is in communication with) a touchpad. In some embodiments, the computer system has (and/or is in communication with) a touch-sensitive display (also known as a "touch screen" or "touch screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having a display generation component and one or more input devices. The method includes detecting occurrence of a first event of a first event type. The method also includes displaying, via the display generation component, a first notification corresponding to the first event type on a respective user interface of the device. The method also includes, while the first notification is displayed on the respective user interface, detecting, via the input device, a first input directed to the first notification. The method also includes, in response to detecting the first input, displaying, via the display generation component, one or more notification delivery preference controls. The method also includes, while displaying the one or more notification delivery preference controls, detecting, via the input device, a second input directed to the set of one or more notification delivery preference controls. The method also includes, in response to detecting the second input, changing a delivery preference for future notifications of events of the first event type from a first delivery mode to a second delivery mode that is distinct from the first delivery mode. The method also includes, after changing the delivery preference for future notifications of events of the first event type in accordance with the second input, detecting an occurrence of a second event of the first event type. The method also includes, in response to detecting the occurrence of the second event of the first event type: in accordance with a determination that the second delivery mode corresponds to a quiet-delivery mode, adding a second notification that corresponds to the second event to a notification history without first displaying the second notification in the respective user interface; and in accordance with a determination that the second delivery mode corresponds to turning off notifications for the first event type, forgoing displaying the second notification in the respective user interface and forgoing adding the second notification to the notification history.

In accordance with some embodiments, a method is performed at a computer system having a display generation component and one or more input devices. The method includes, while the device has a plurality of notifications in a notification history, the plurality of notifications including a first notification of a first event of a first event type and a second notification of a second event of the first event type, wherein the first notification and the second notification are coalesced in the notification history, detecting occurrence of one or more additional events of the first event type. The method also includes, in response to detecting the occurrence of a first additional event of the first event type, creating a third notification for the first additional event of the first event type. The method also includes, after creating the third notification for the first additional event of the first event type, receiving, via the input device, a request to display a wake screen user interface of the device. The method also includes, in response to the request to display the wake screen user interface of the device, displaying, via the display generation component, the wake screen user interface with the third notification, wherein the third notification is displayed on the wake screen user interface without information about the first notification and the second notification. The method also includes, after the third notification has been displayed on the wake screen user interface, receiving, via the input device, a request to display the notification history. The method also includes, in response to receiving the request to display the notification history, displaying the notification history with a coalesced representation of the first notification and the second notification.

In accordance with some embodiments, a method is performed at a computer system having a display generation component and one or more input devices. The method includes displaying, via the display generation component, in a notification-display user interface, a plurality of notifications for a plurality of different applications including notifications for a first application and notifications for a second application. The method also includes detecting user interaction, via the input device, with the plurality of notifications, that includes requests to perform requested operations with respect to the notifications. The method also includes responding to the user interaction with the plurality of notifications by performing the requested operations with respect to the one or more of the notifications. The method also includes, displaying, via the display generation component, a prompt for the user to adjust notification settings for one or more of the plurality of applications, including: in accordance with a determination, based on the user interaction with the plurality of notifications, that engagement of the user with the notifications of the first application is below a threshold level of engagement and engagement of the user with the notifications of the second application is above the threshold level of engagement, displaying a suggestion to reduce a prominence of future notifications of the first application without reducing a prominence of future notifications of the second application; and in accordance with a determination, based on the user interaction with the plurality of notifications, that the engagement of the user with the notifications of the second application is below the threshold level of engagement and the engagement of the user with the notifications of the first application is above the threshold level of engagement, displaying a suggestion to reduce the prominence of future notifications of the second application without reducing the prominence of future notifications of the first application.

In accordance with some embodiments, an electronic device includes a display generation component and one or more input devices, optionally one or more sensors to detect intensities of contacts with the touch-sensitive surface, optionally one or more tactile output generators, optionally one or more device orientation sensors, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, one or more input devices, optionally one or more sensors to detect intensities of contacts with the touch-sensitive surface, optionally one or more tactile output generators, and optionally one or more device orientation sensors cause the device to perform or cause performance of the operations of any of the methods described herein. In accordance with some embodiments, a graphical user interface on an electronic device with a display generation component, one or more input devices, optionally one or more sensors to detect intensities of contacts with the touch-sensitive surface, optionally one or more tactile output generators, optionally one or more device orientation sensors, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component, one or more input devices, optionally one or more sensors to detect intensities of contacts with the touch-sensitive surface, optionally one or more tactile output generators, and optionally one or more device orientation sensors; and means for performing or causing performance of the operations of any of the methods described herein. In accordance with some embodiments, an information processing apparatus, for use in an electronic device with a display generation component, one or more input devices, optionally one or more sensors to detect intensities of contacts with the touch-sensitive surface, optionally one or more tactile output generators, and optionally one or more device orientation sensors includes means for performing or causing performance of the operations of any of the methods described herein.

Thus, electronic devices with display generation components, one or more input devices, optionally one or more sensors to detect intensities of contacts with the touch-sensitive surface, optionally one or more tactile output generators, and optionally one or more device orientation sensors, are provided with improved methods and interfaces for managing how notifications are displayed, thereby increasing the effectiveness, efficiency, and user satisfaction with such devices. Such methods and interfaces may complement or replace conventional methods for managing how notifications are displayed.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A4 and 5B-5AY illustrate example user interfaces for changing a delivery preference for future notifications of events of an event type, in accordance with some embodiments.

FIGS. 5AZ-5BU illustrate example user interfaces for displaying coalesced notifications, in accordance with some embodiments.

FIGS. 7A-7G are flow diagrams of a process for changing a delivery preference for future notifications of events of an event type, in accordance with some embodiments.

FIGS. 8A-8E are flow diagrams of a process for displaying coalesced notifications, in accordance with some embodiments.

DESCRIPTION OF EMBODIMENTS

Figure 1A:
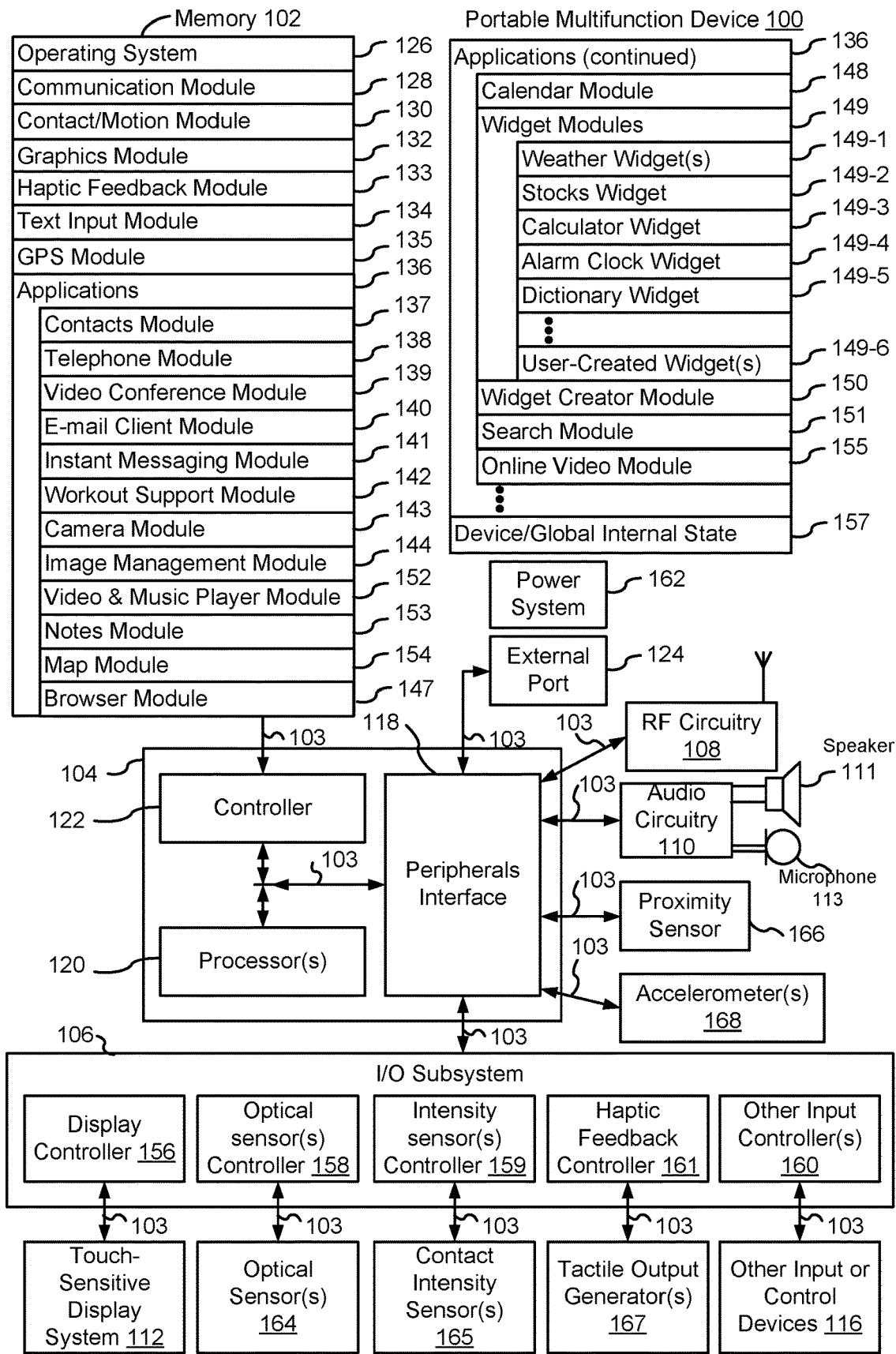
FIG. 1A is a block diagram illustrating a portable multifunction device with a touch-sensitive display in accordance with some embodiments.

A notification provides a user with information about an event generated by an application without requiring the user to interact with the application. Conventional methods of interacting with notifications often require multiple separate inputs (e.g., a sequence of gestures and button presses, etc.) to achieve an intended outcome (e.g., adjusting the manner of delivery of various types of notifications via a system settings user interface). The embodiments herein provide an intuitive way for a user to manage and interact with notifications (e.g., by allowing a user to provide input while a notification is displayed in order to access controls for managing notifications (e.g., managing a delivery mode for future notifications of a corresponding type of the currently displayed notification), by coalescing notifications that correspond to events of an event type, and by automatically displaying prompts that guide a user to adjust notification settings based on monitored interaction with notifications).

The systems, methods, and GUIs described herein improve management of notifications in multiple ways. For example, they make it easier to: adjust delivery preferences for notifications and navigate through multiple notifications that corresponds to event of the same event type.

Below, FIGS. 1A-1C, 2, and 3 provide a description of example devices. FIGS. 4A-4B, 5A-5BU, and 6A-6D illustrate example user interfaces for managing notifications. FIGS. 7A-7G illustrate a flow diagram of a method for changing a delivery preference for future notifications of events of an event type, in accordance with some embodiments. FIGS. 8A-8E illustrate a flow diagram of a method for displaying coalesced notifications, in accordance with some embodiments. FIGS. 9A-9E illustrate a flow diagram of a method for displaying prompts to adjust notification settings, in accordance with some embodiments. The user interfaces in FIGS. 5A-5BU and 6A-6D are used to illustrate the processes in FIGS. 7A-7G, 8A-8E, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
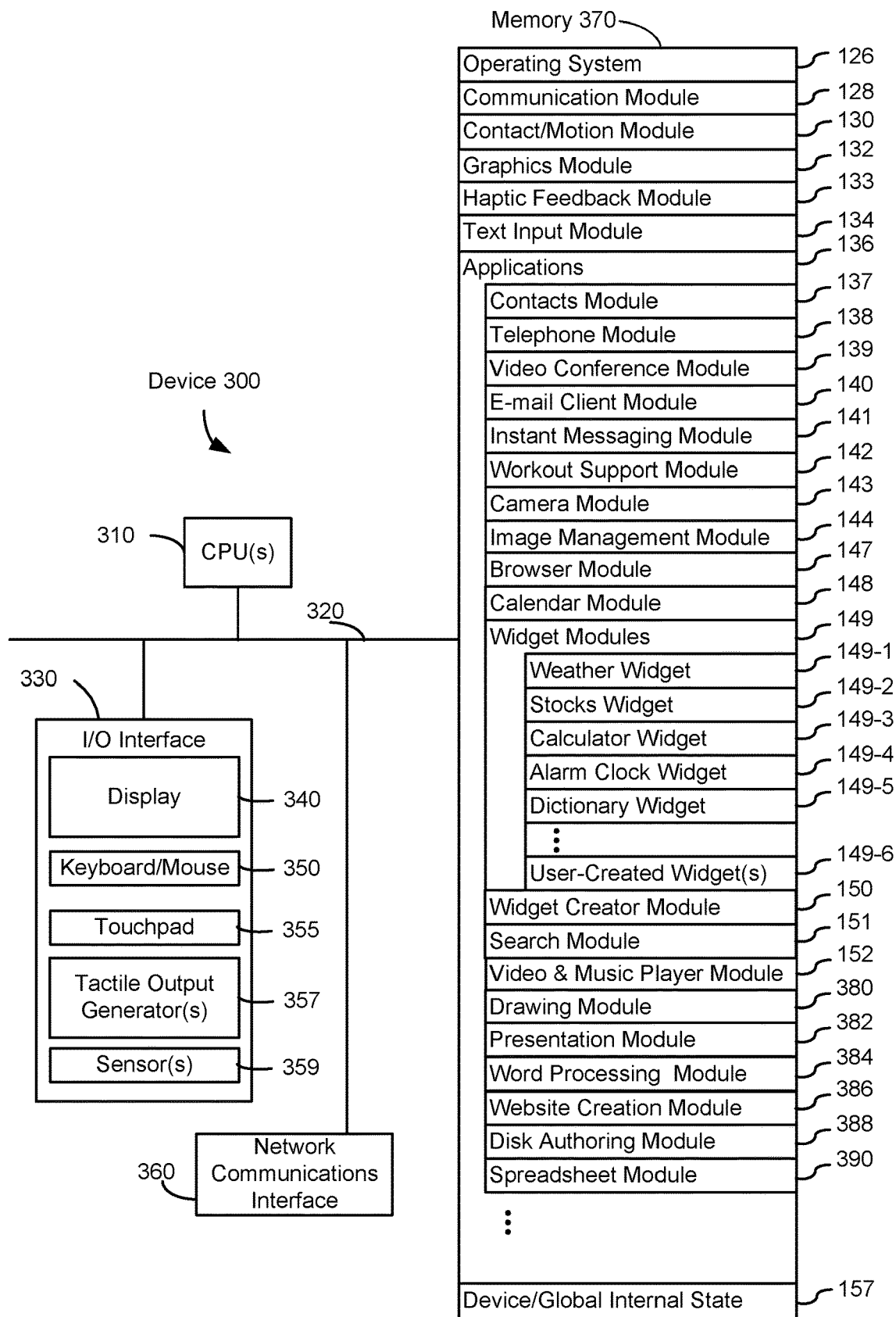
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
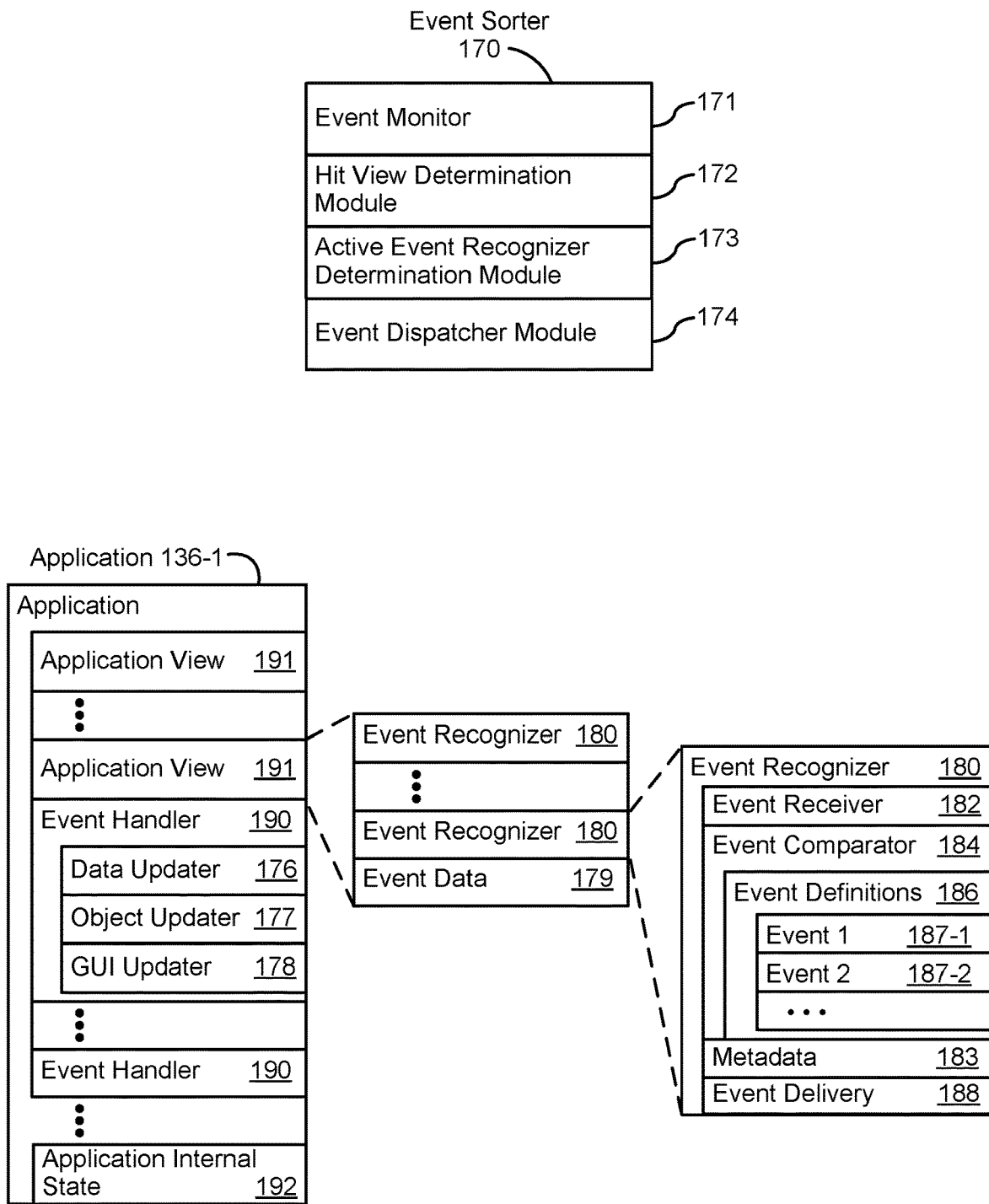
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
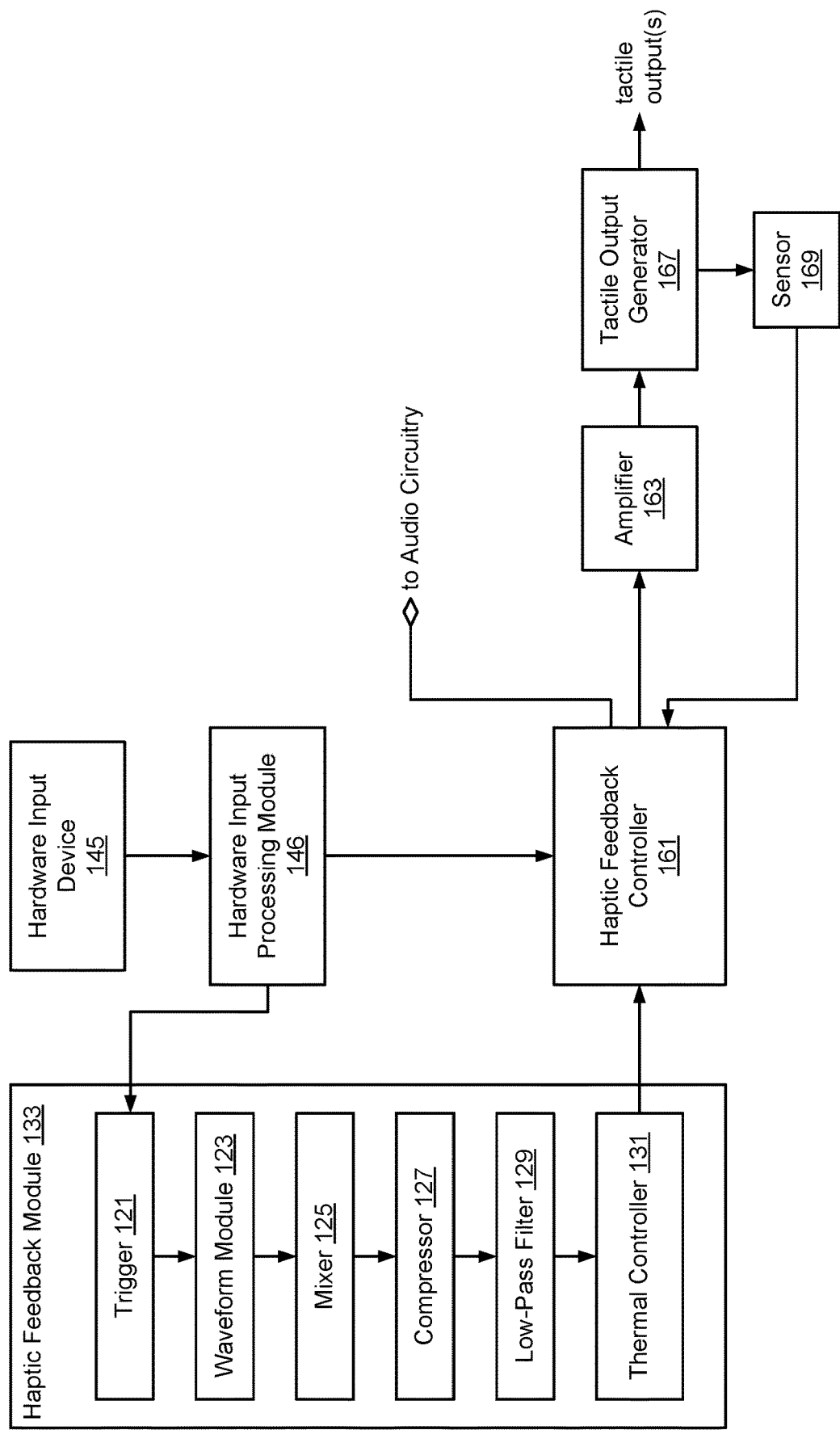
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
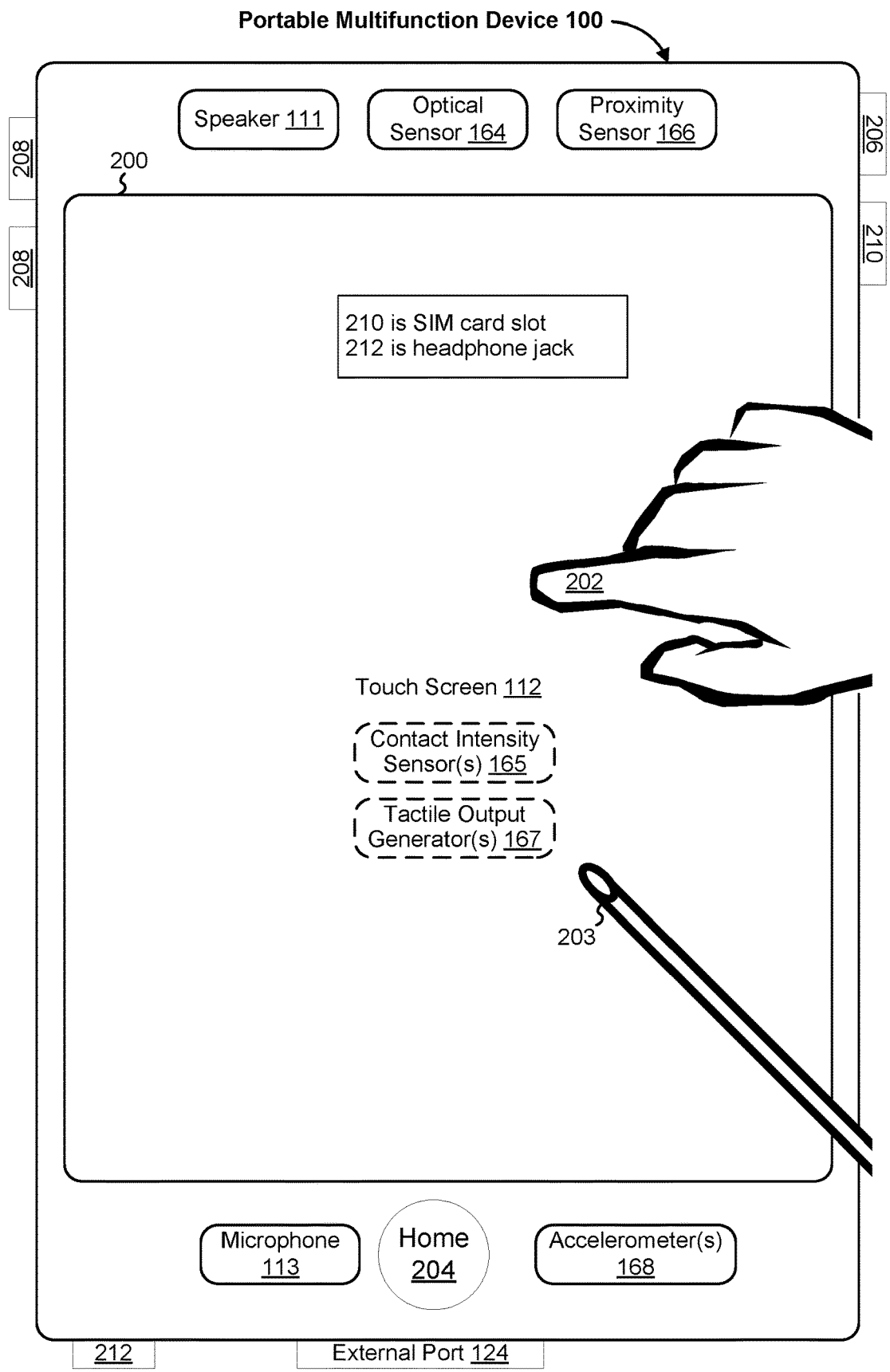
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
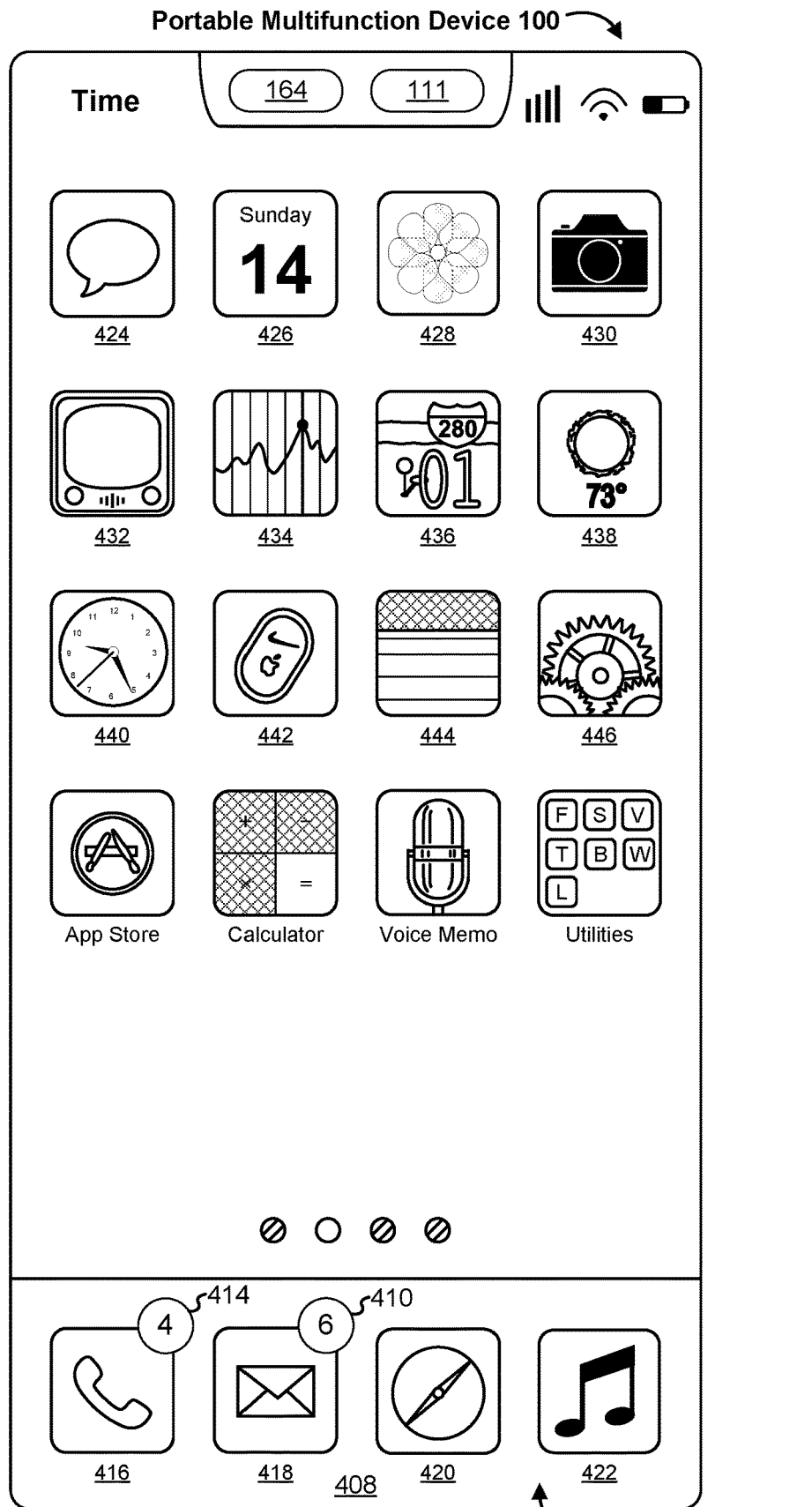
FIG. 4A illustrates an example user interface for a menu of applications on a portable multifunction device in accordance with some embodiments.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"

Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
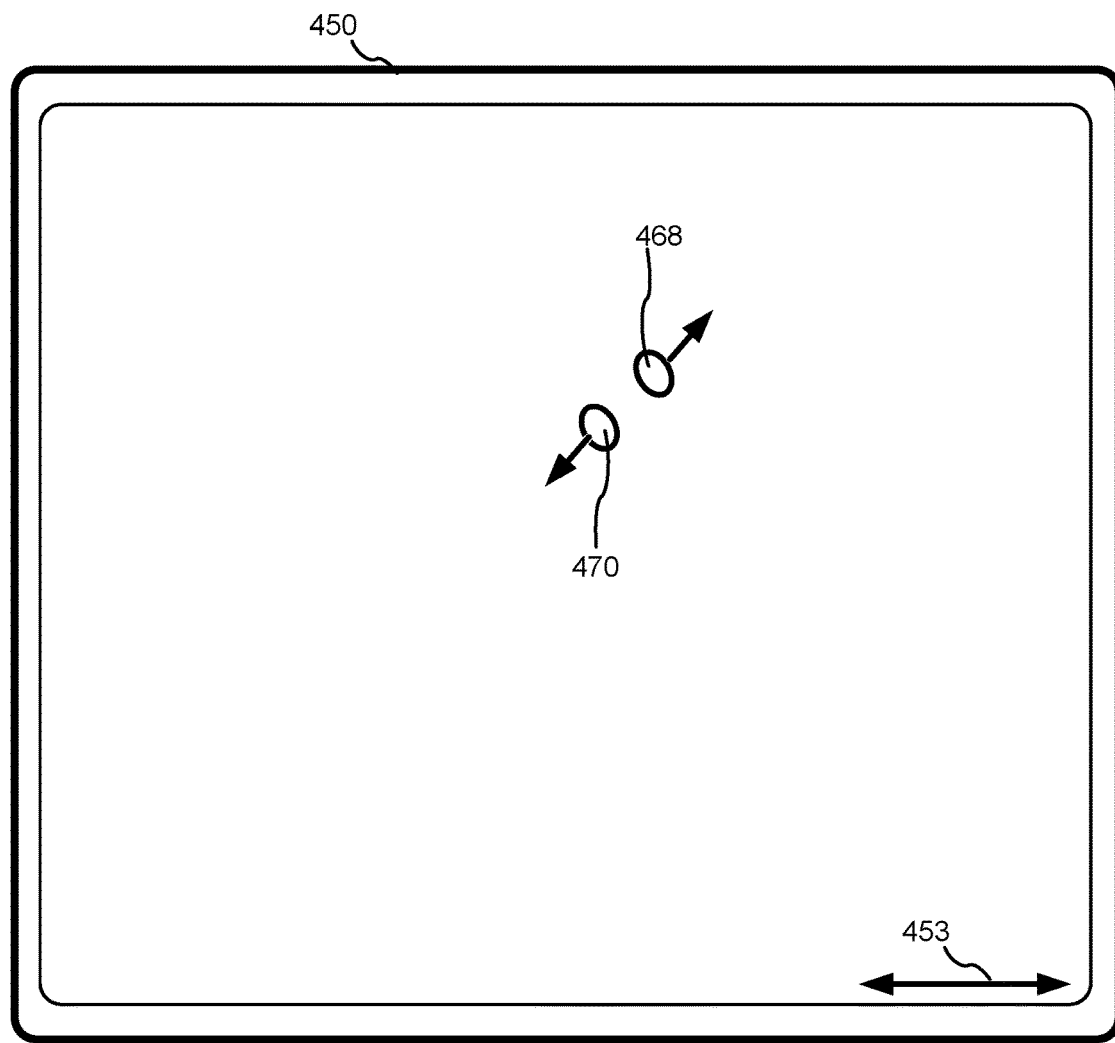
FIG. 4B illustrates an example user interface for a multifunction device with a touch-sensitive surface that is separate from the display in accordance with some embodiments.
Figure 4B:
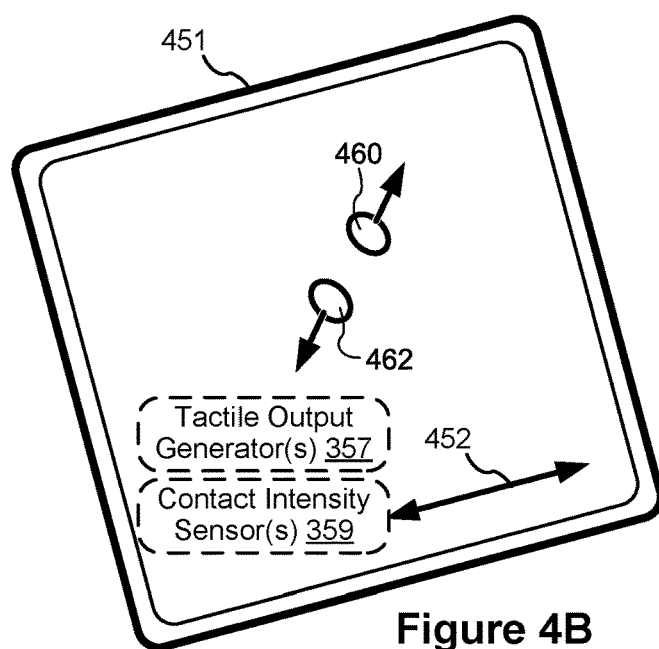

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
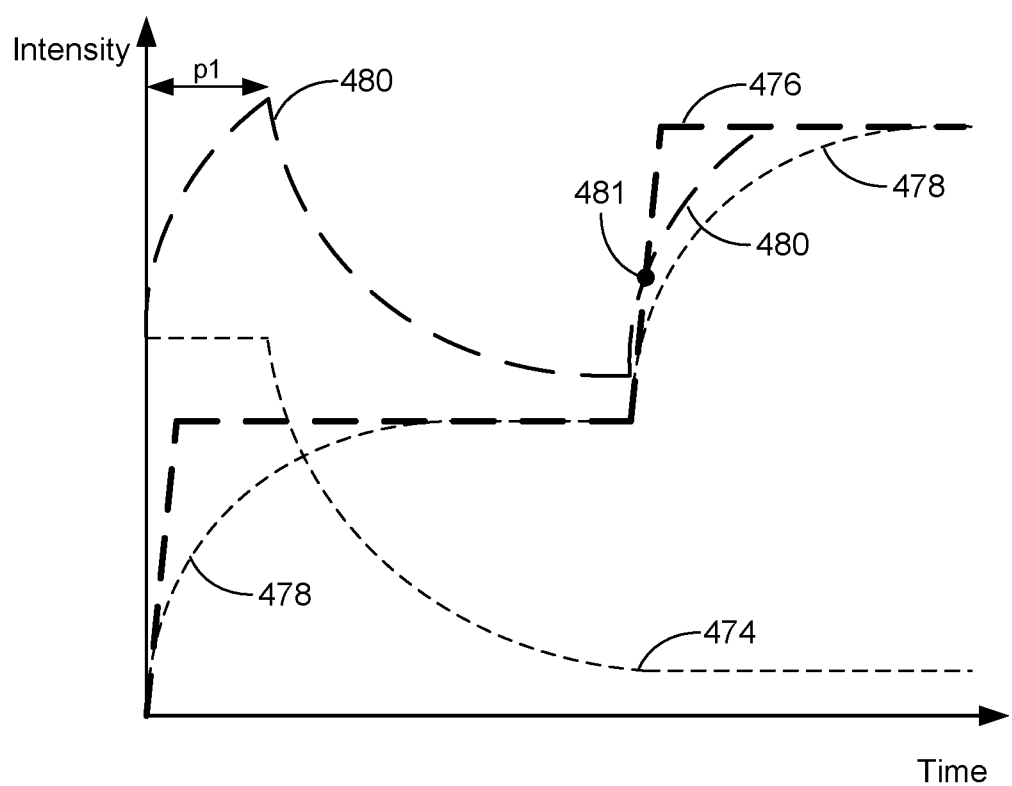
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
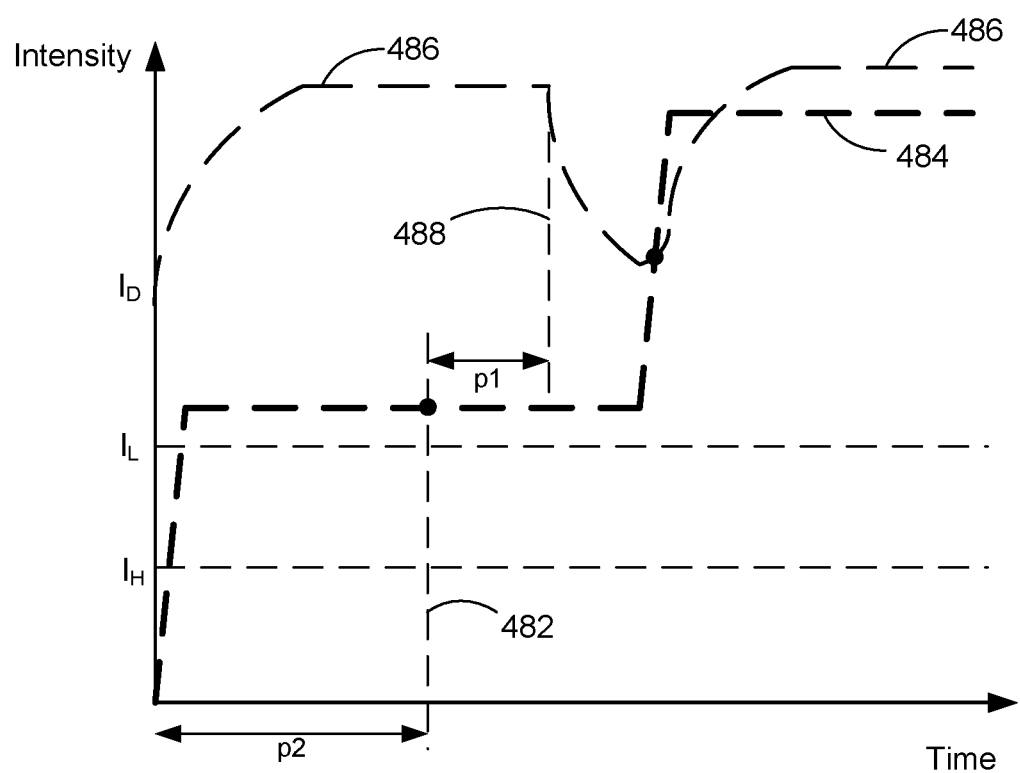

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
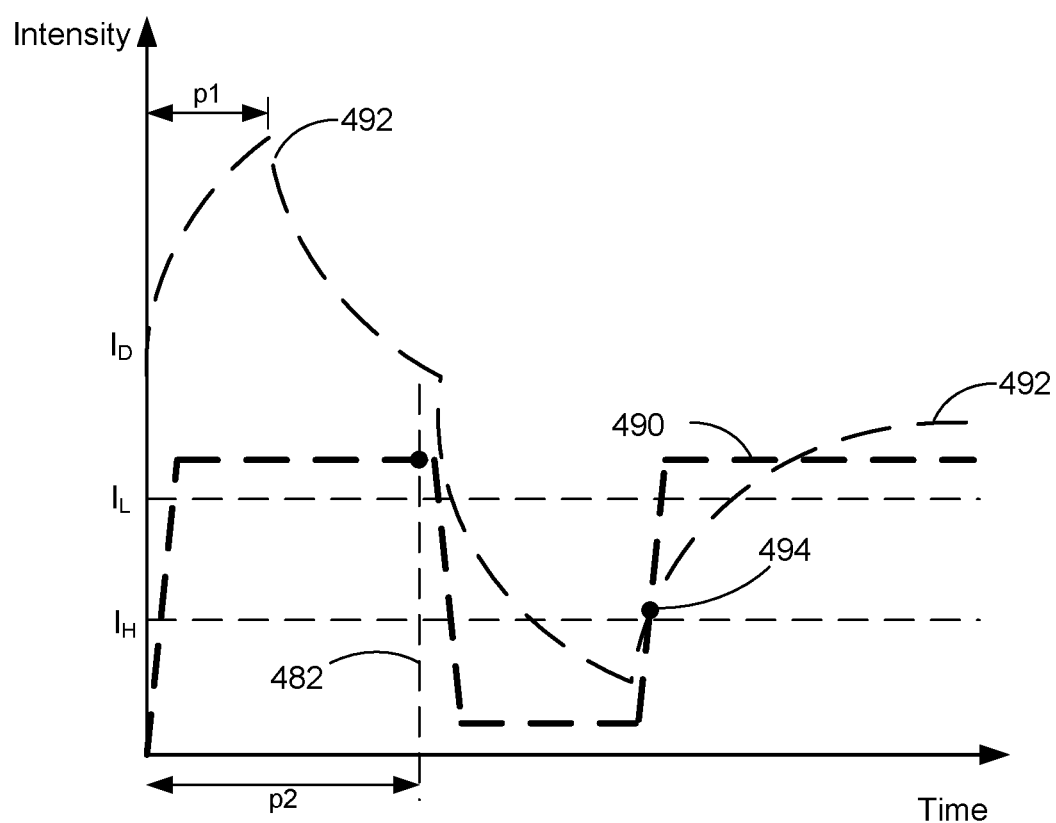

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold ITS is sometimes referred to as a "light press" input. An increase of characteristic intensity of the contact from an intensity below the deep press intensity threshold ITS to an intensity above the deep press intensity threshold ITS is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4F:
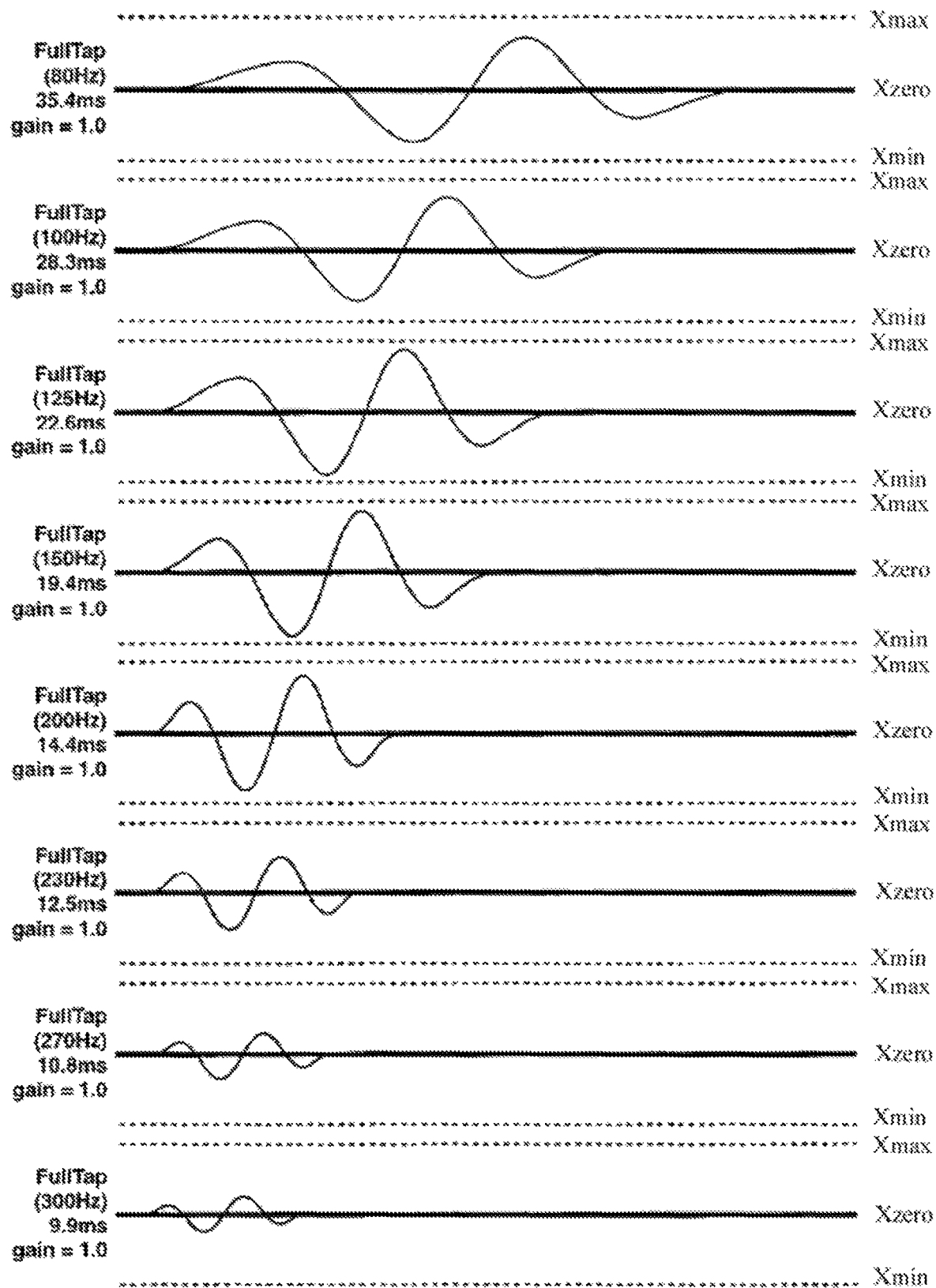
FIGS. 4F-4K illustrate a set of sample tactile output patterns in accordance with some embodiments.
Figure 4G:
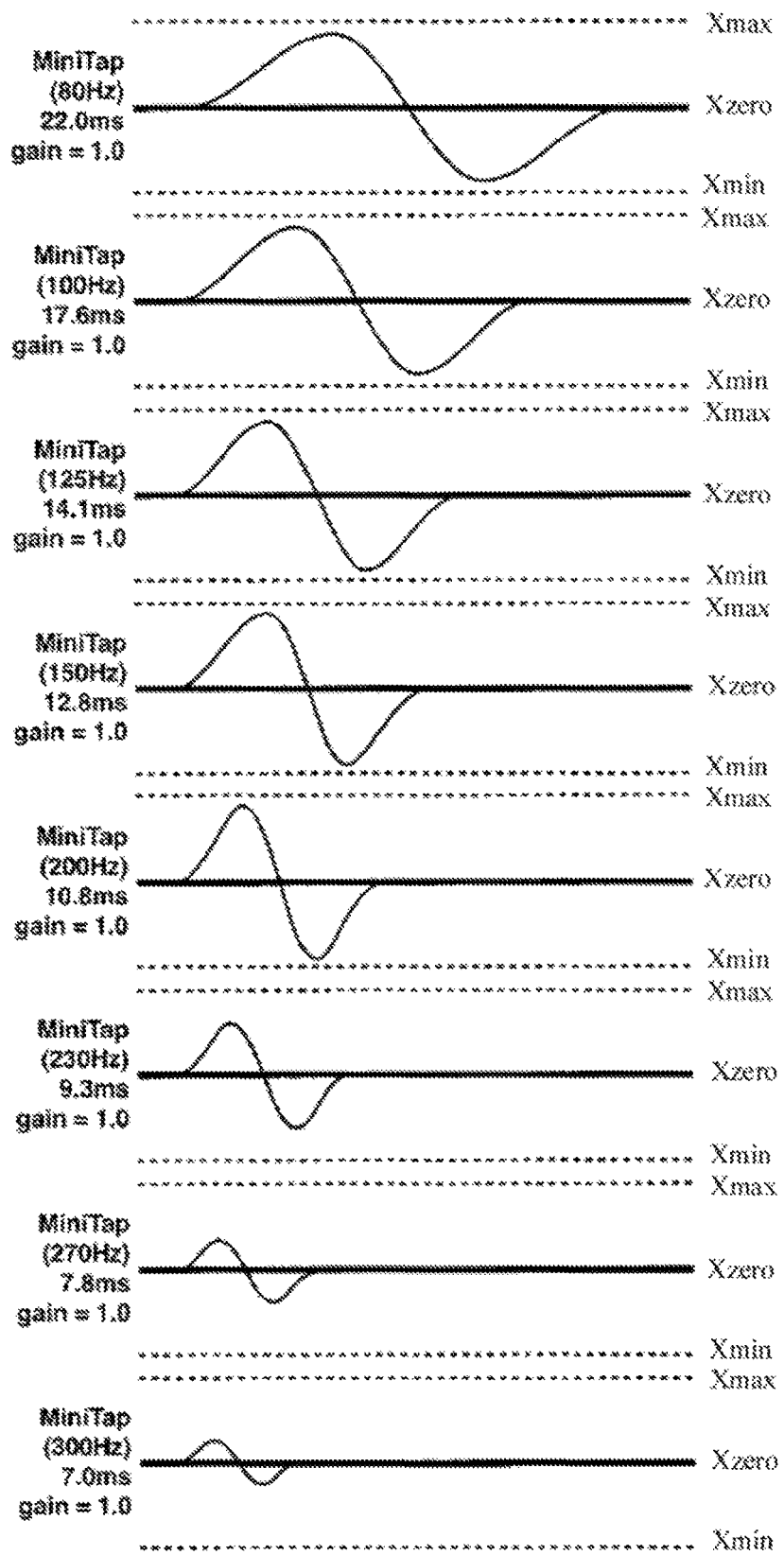
Figure 4H:
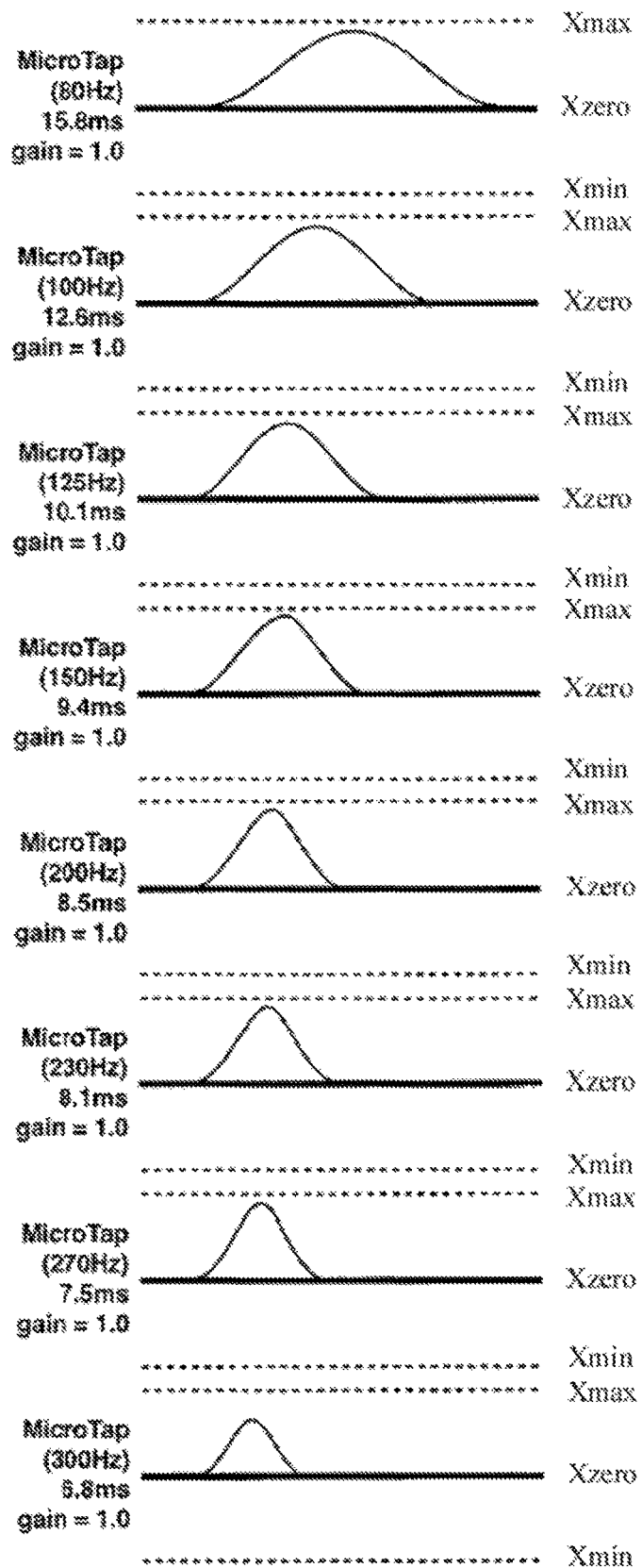
Figure 4I:
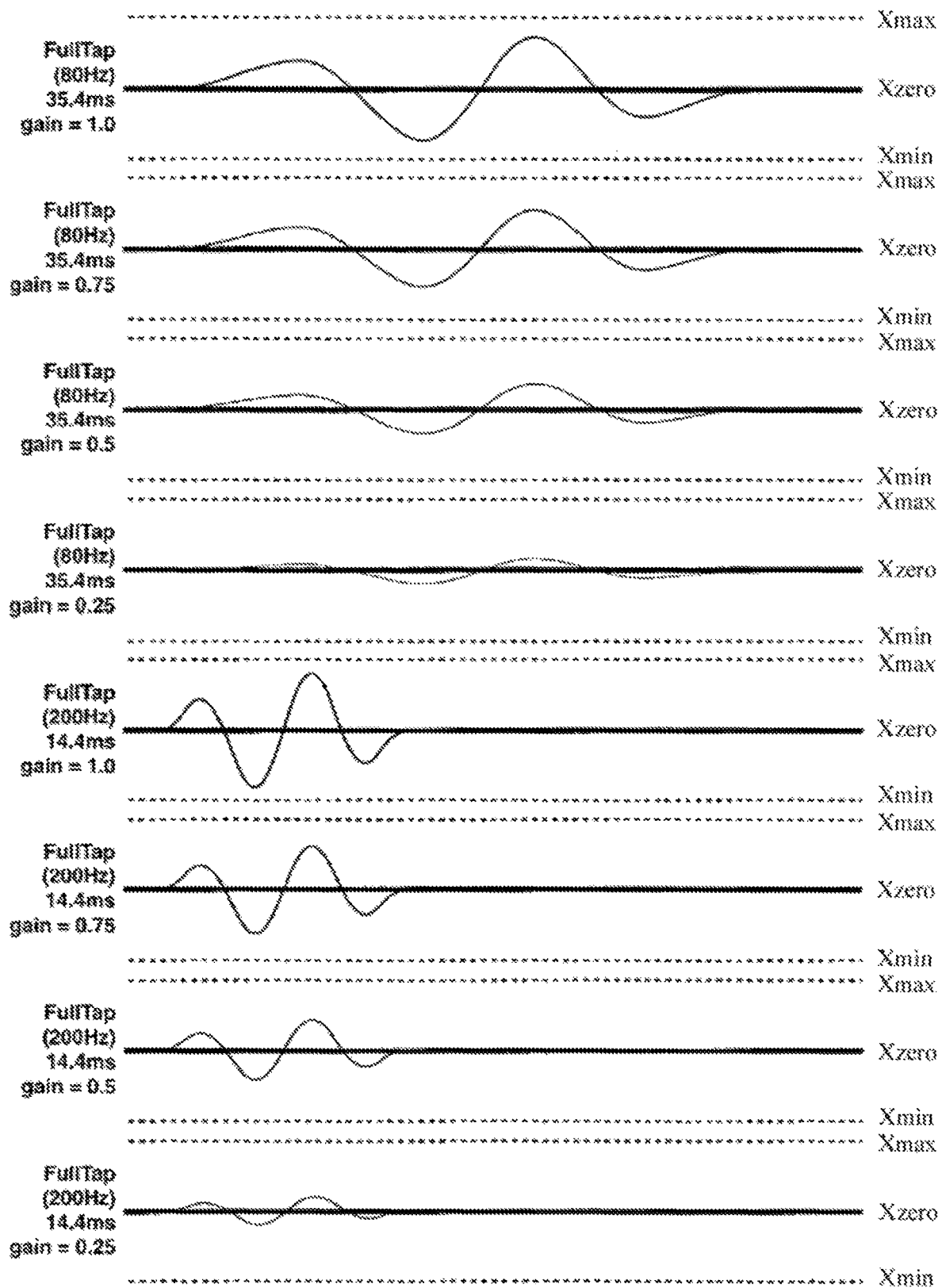
Figure 4J:
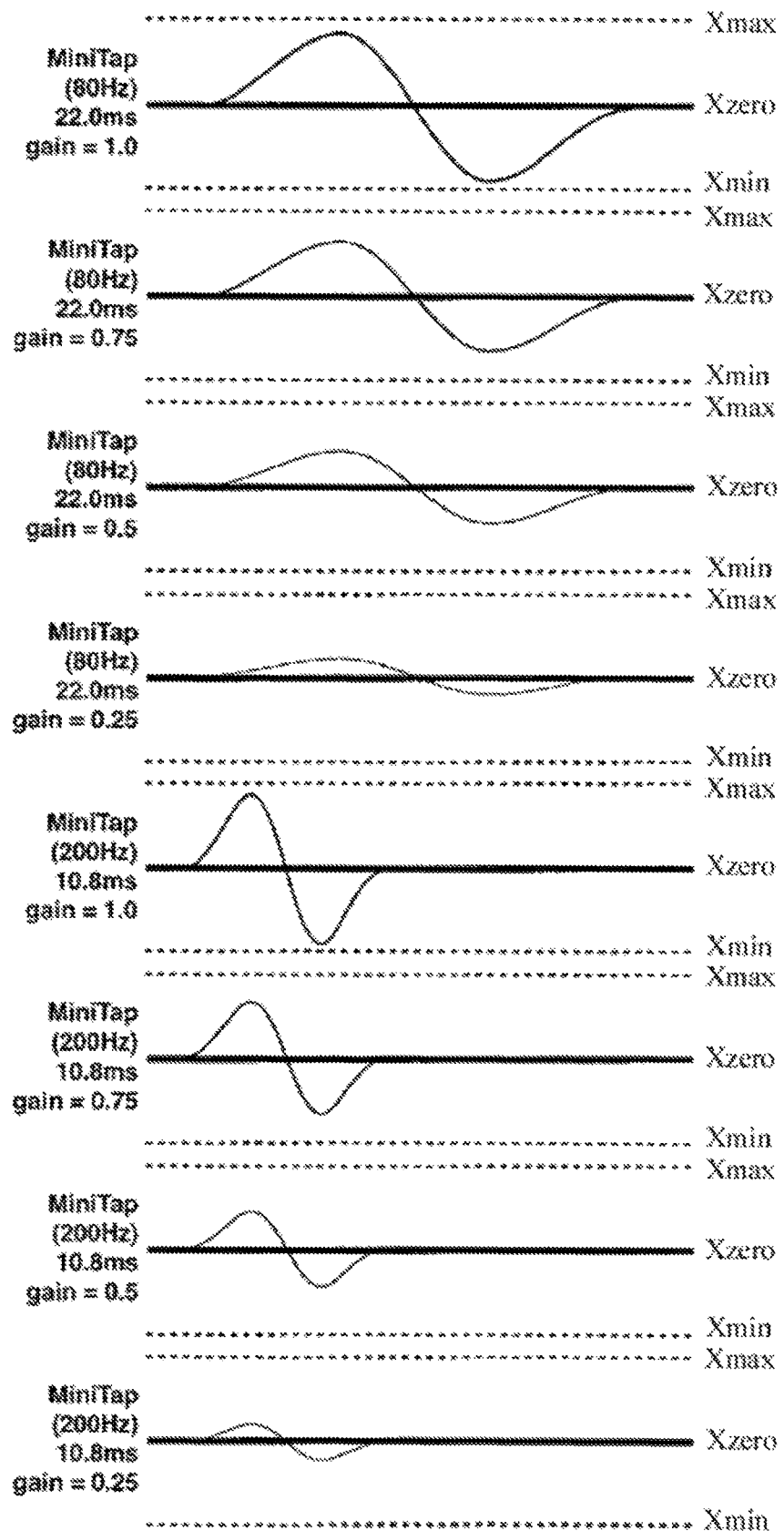
Figure 4K:
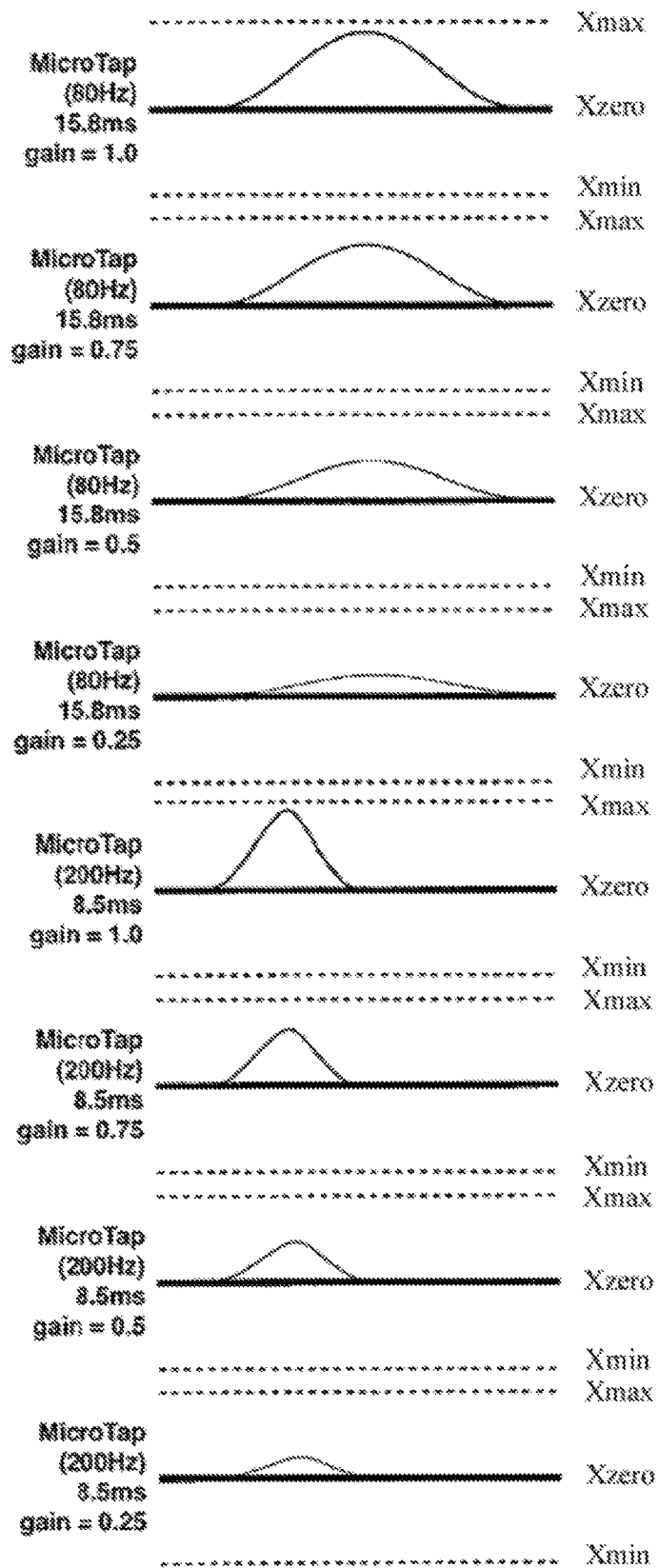

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., xzero) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include xmin and xmax values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in 1 dimension, however similar principles would also apply to movement of a moveable mass in two or three dimensions.

As shown in FIGS. 4F-4K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A1-5A4 and 5B-5AY illustrate example user interfaces for changing a delivery preference for future notifications of events of an event type, in accordance with some embodiments. The user interfaces in these figures are used to illustrate the processes described below, including the processes in FIGS. 7A-7G, 8A-8E, and 9A-9E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5B:
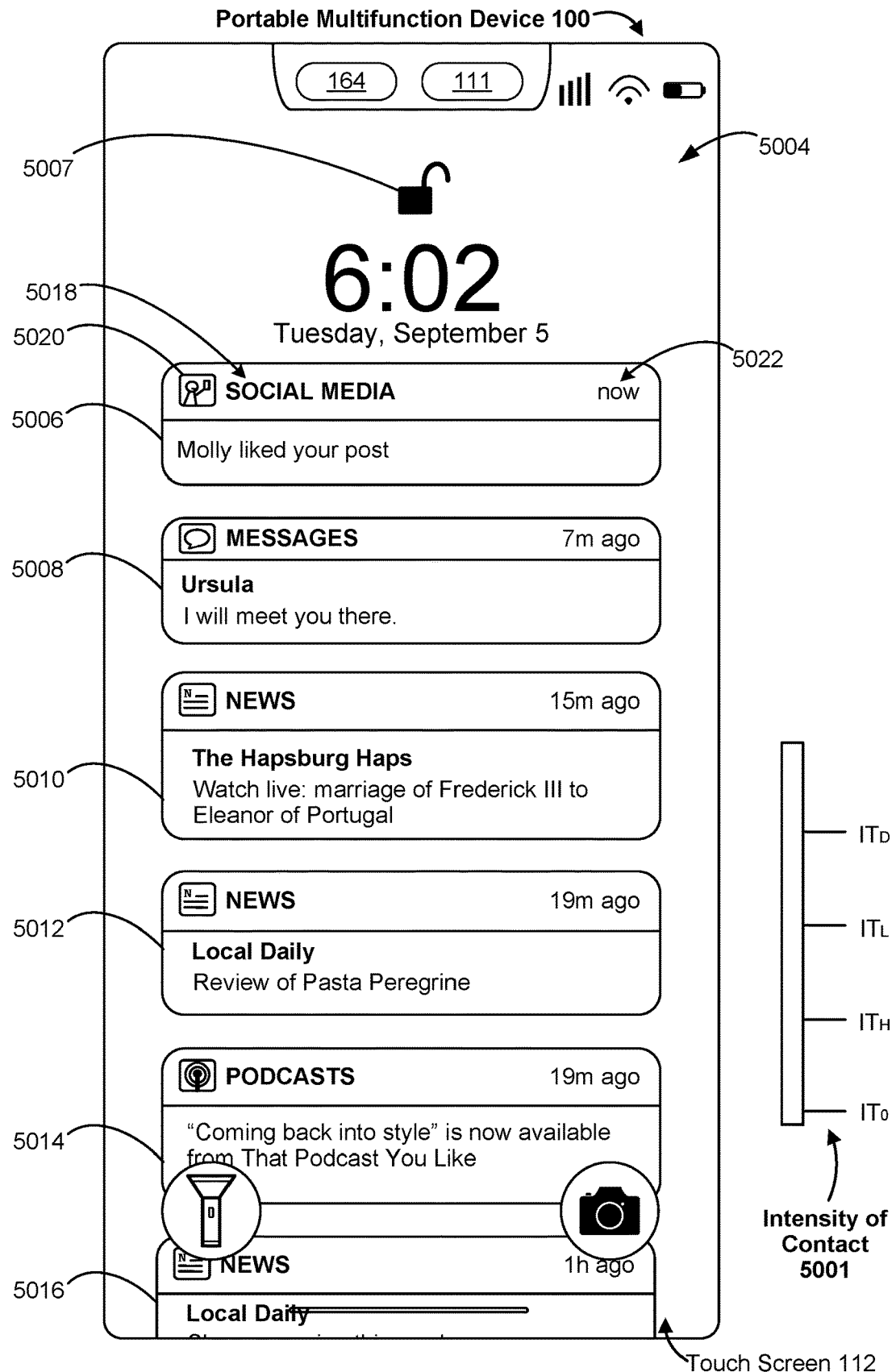
Figure 5C:
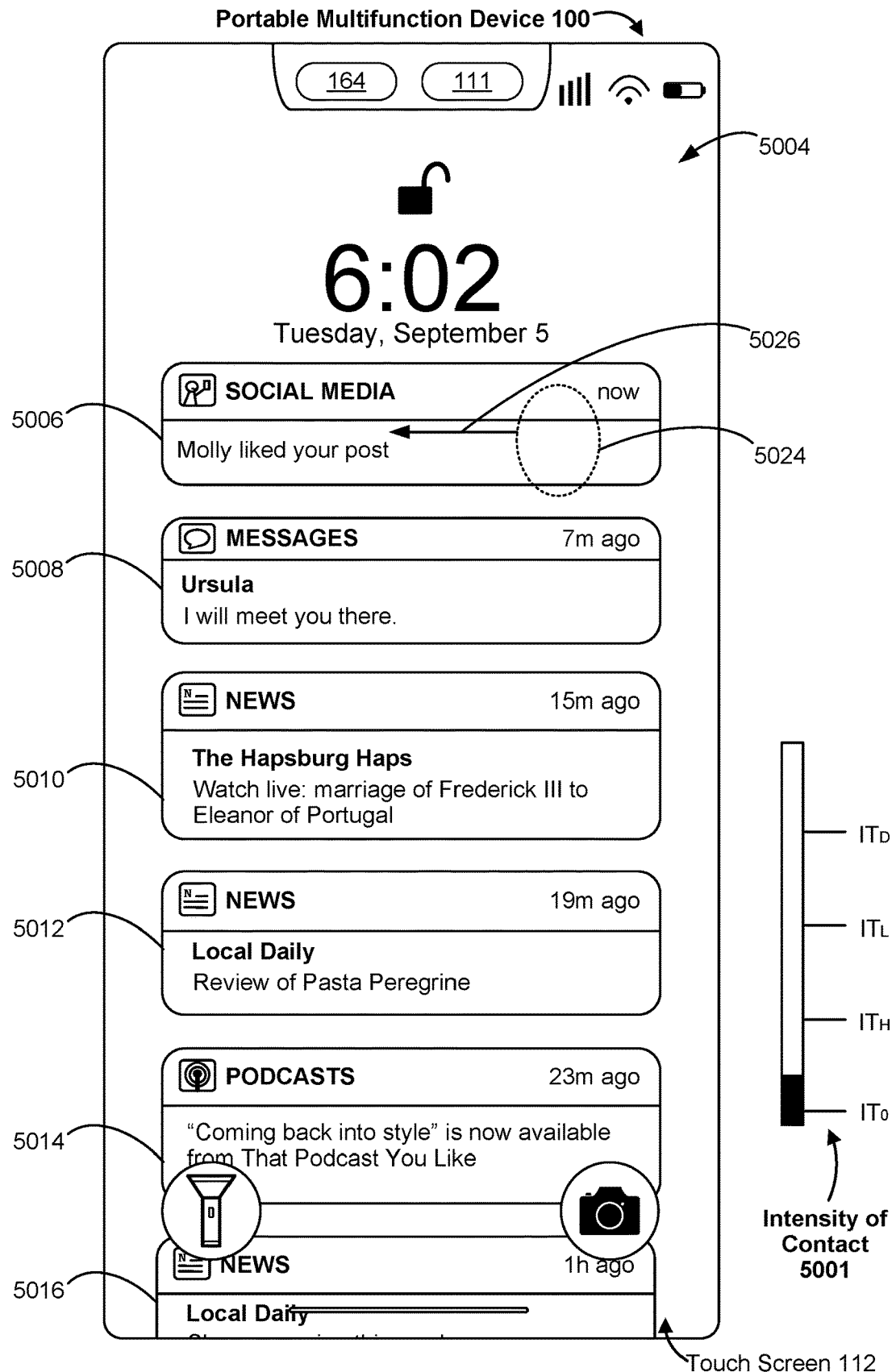
Figure 5D:
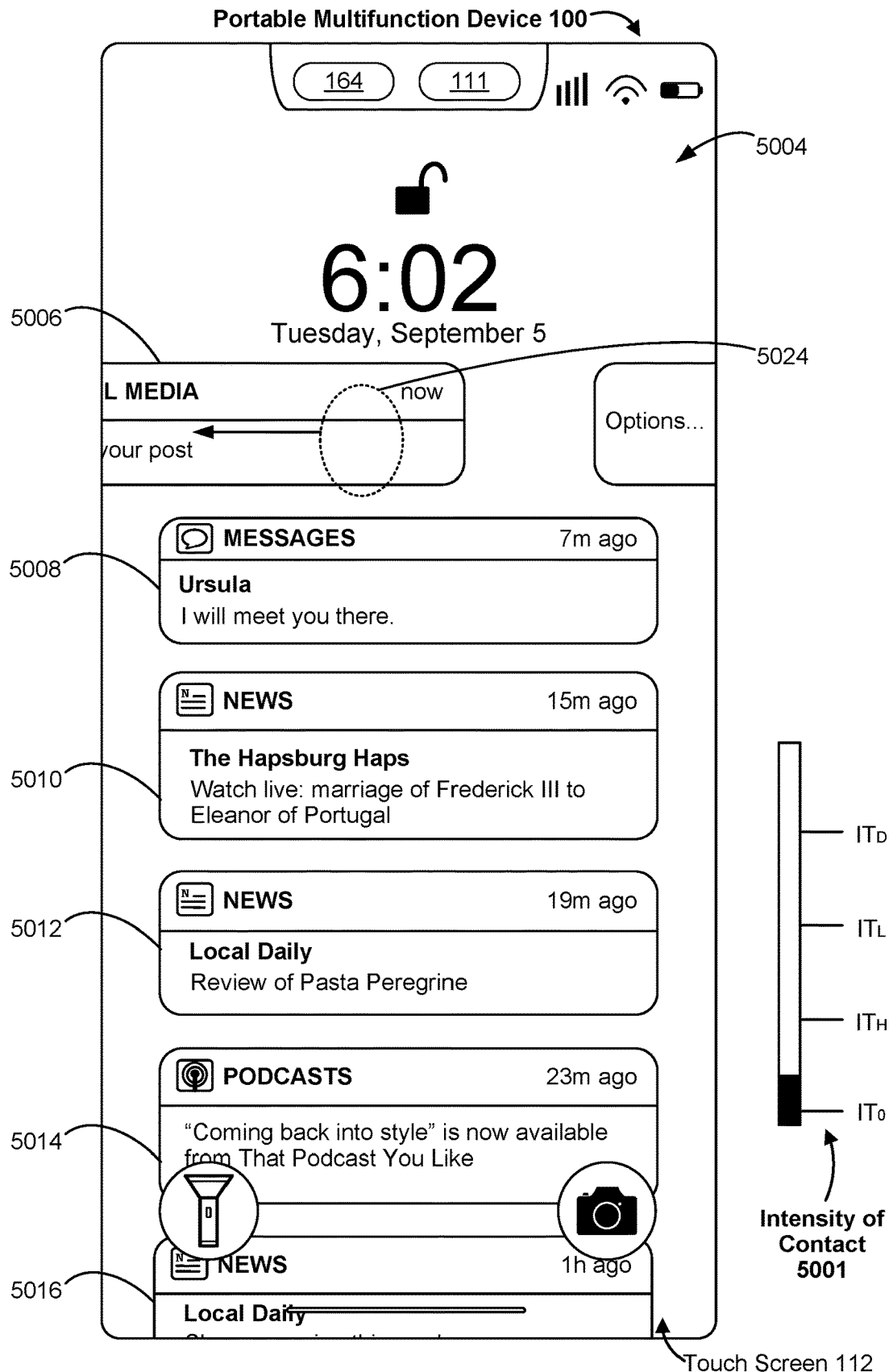
Figure 5E:
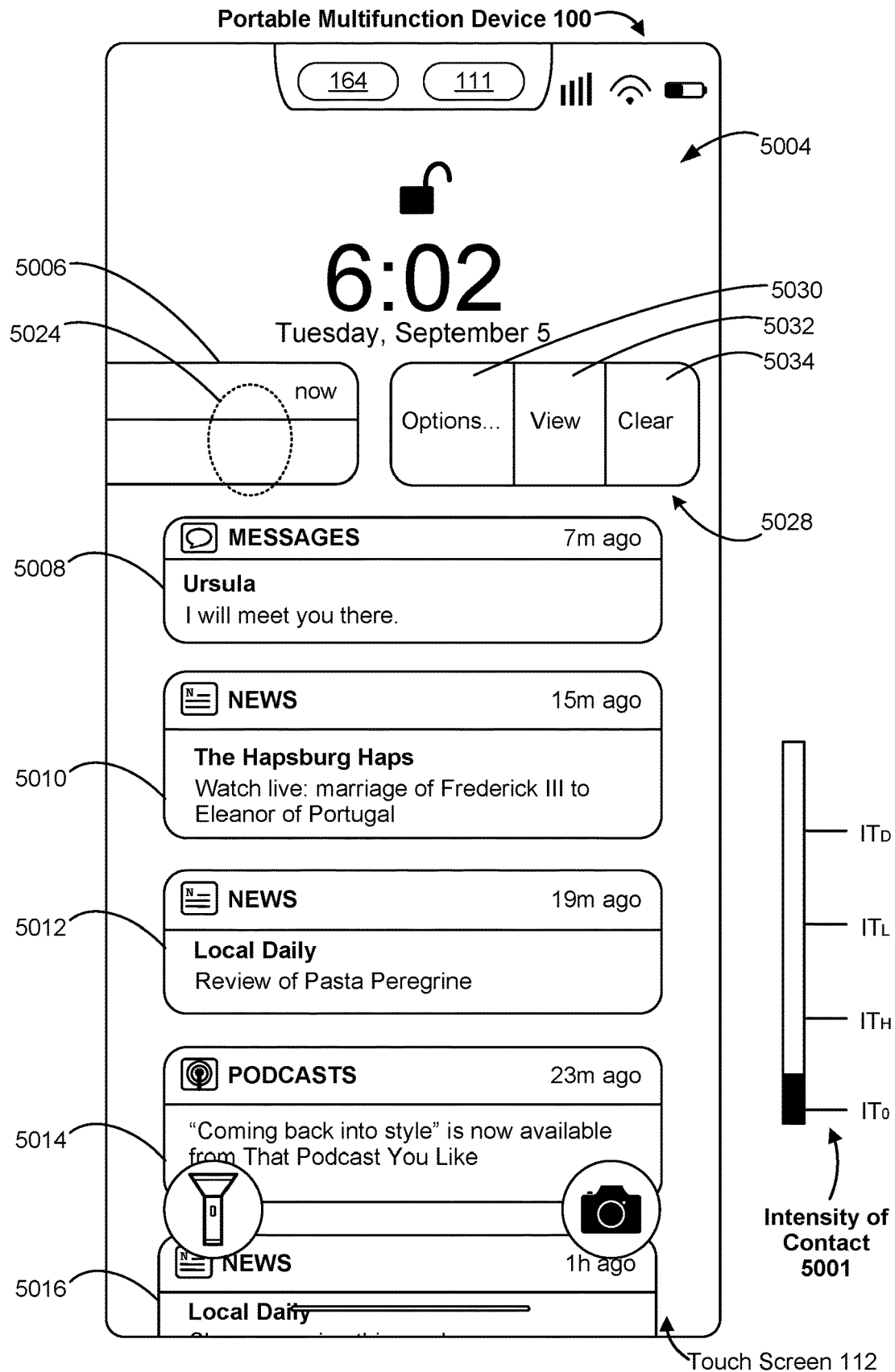
Figure 5F:
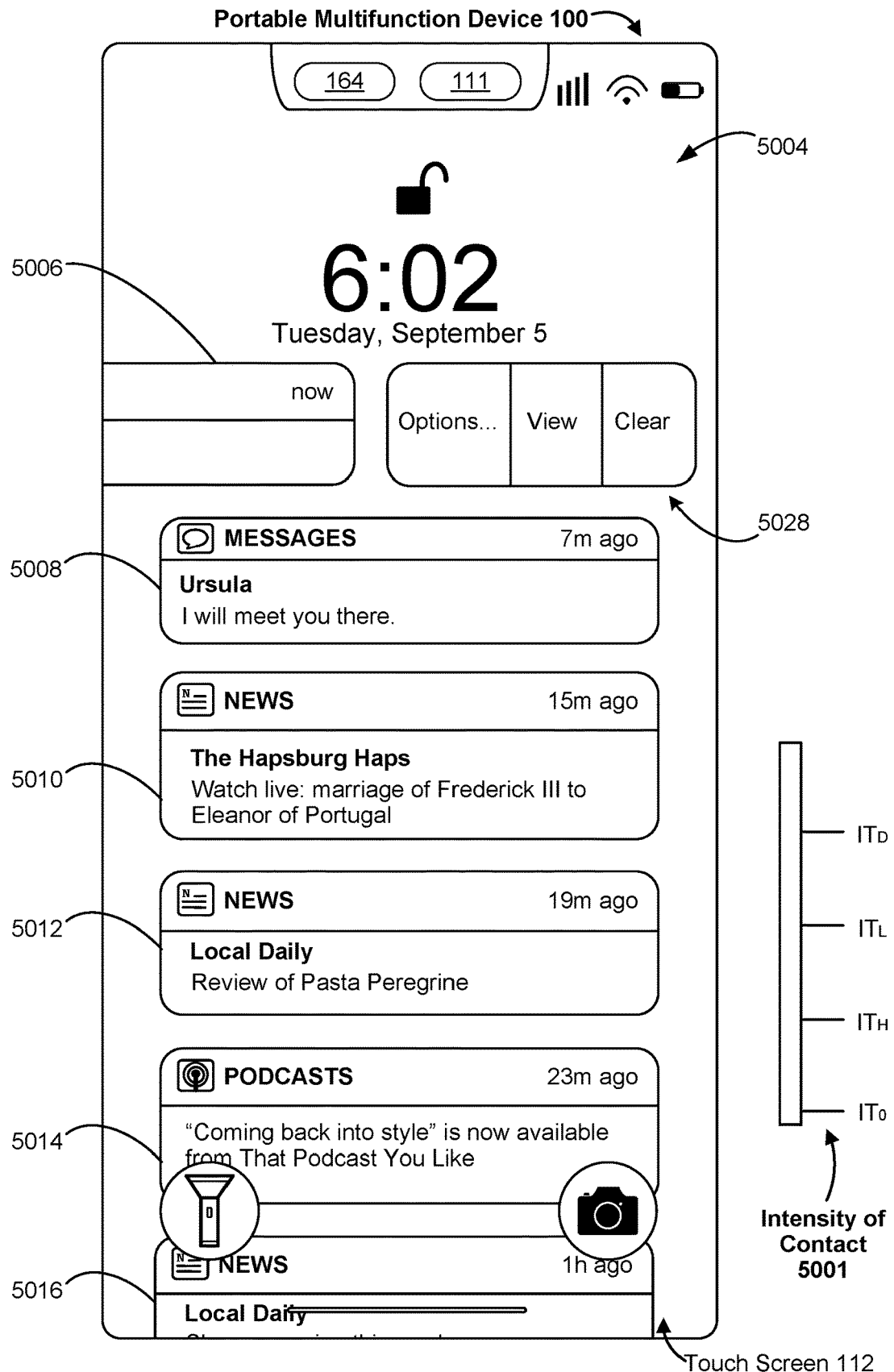
Figure 5G:
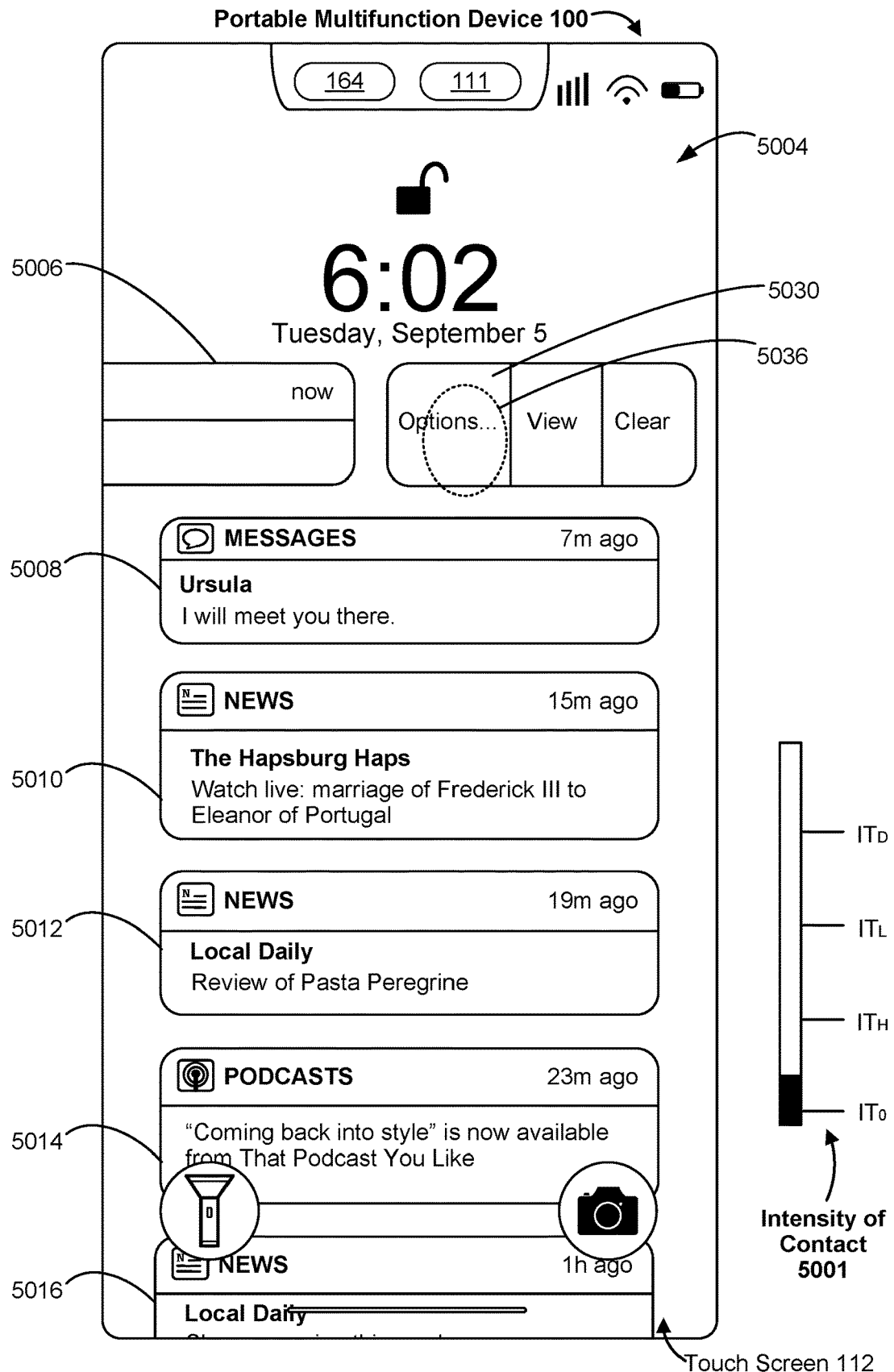
Figure 5H:
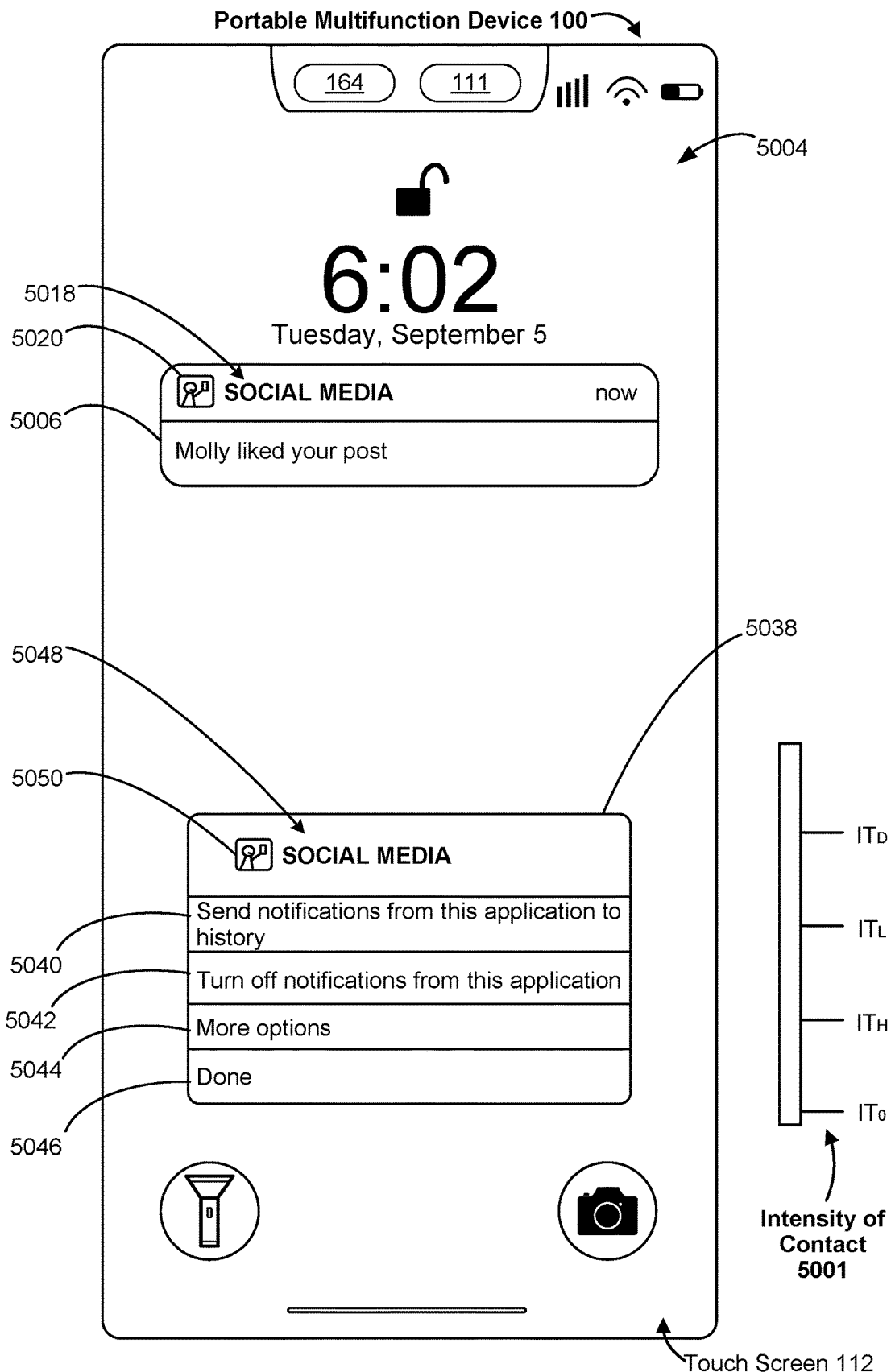
Figure 5I:
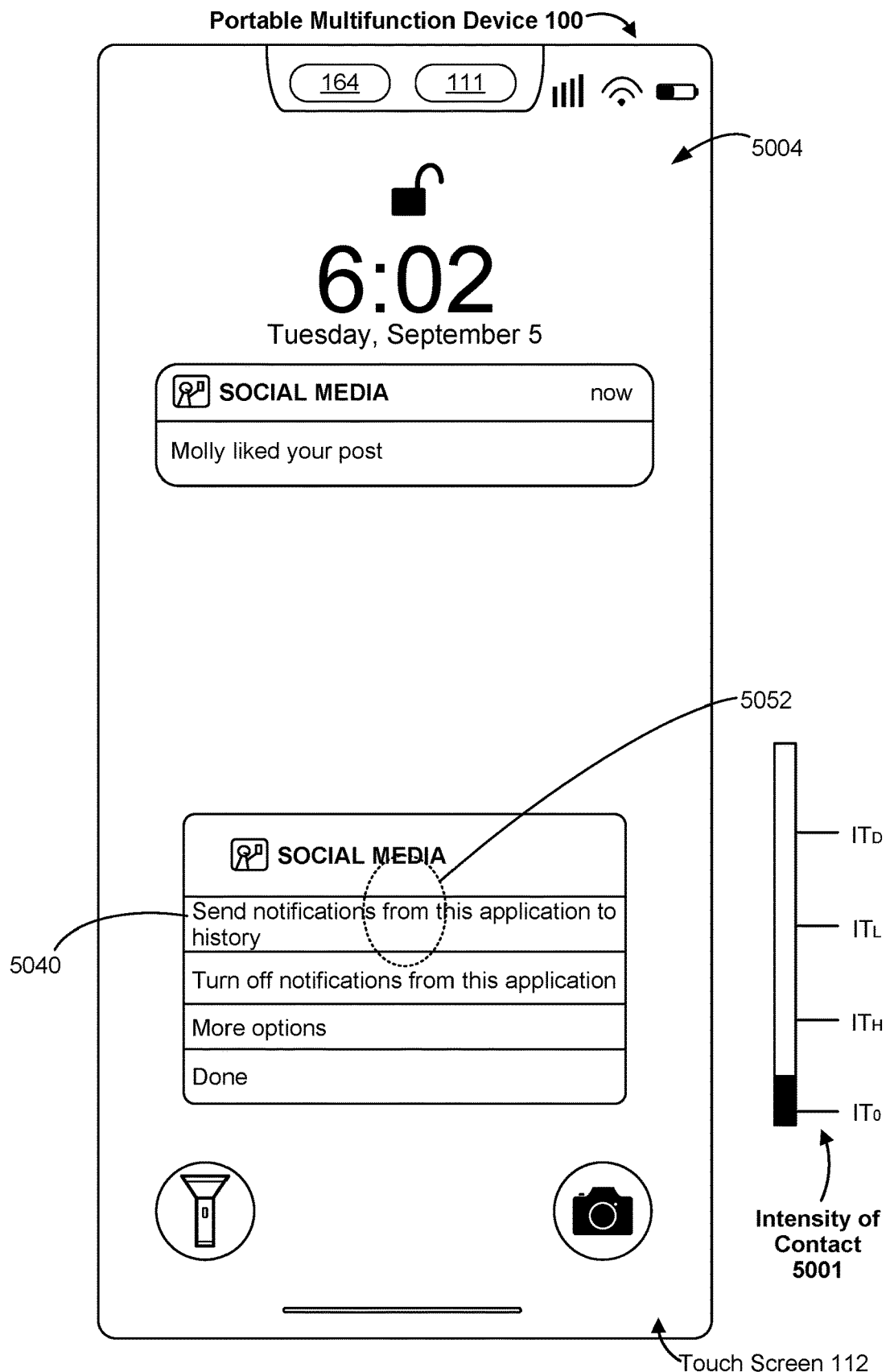
Figure 5J:
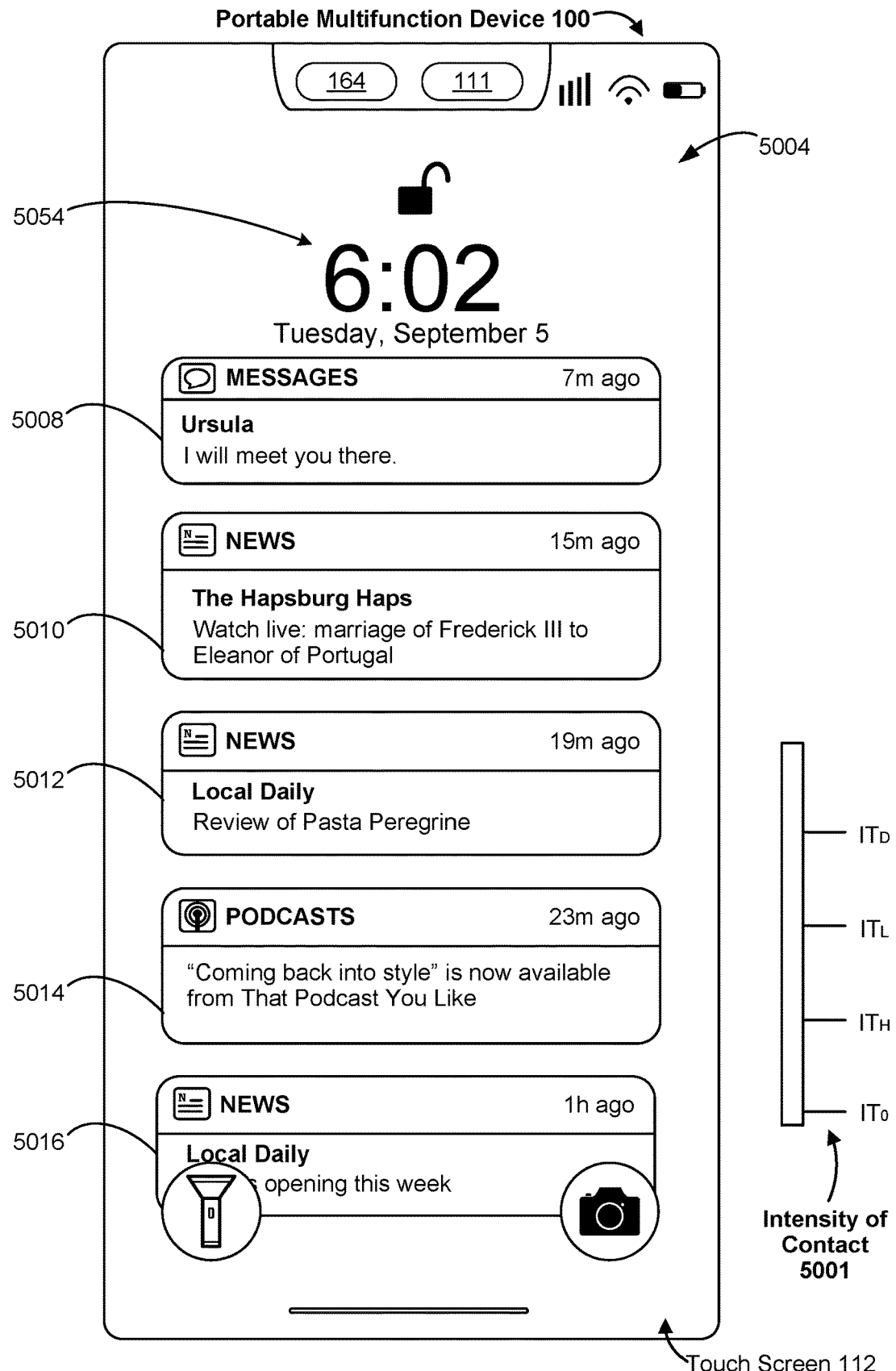
Figure 5K:
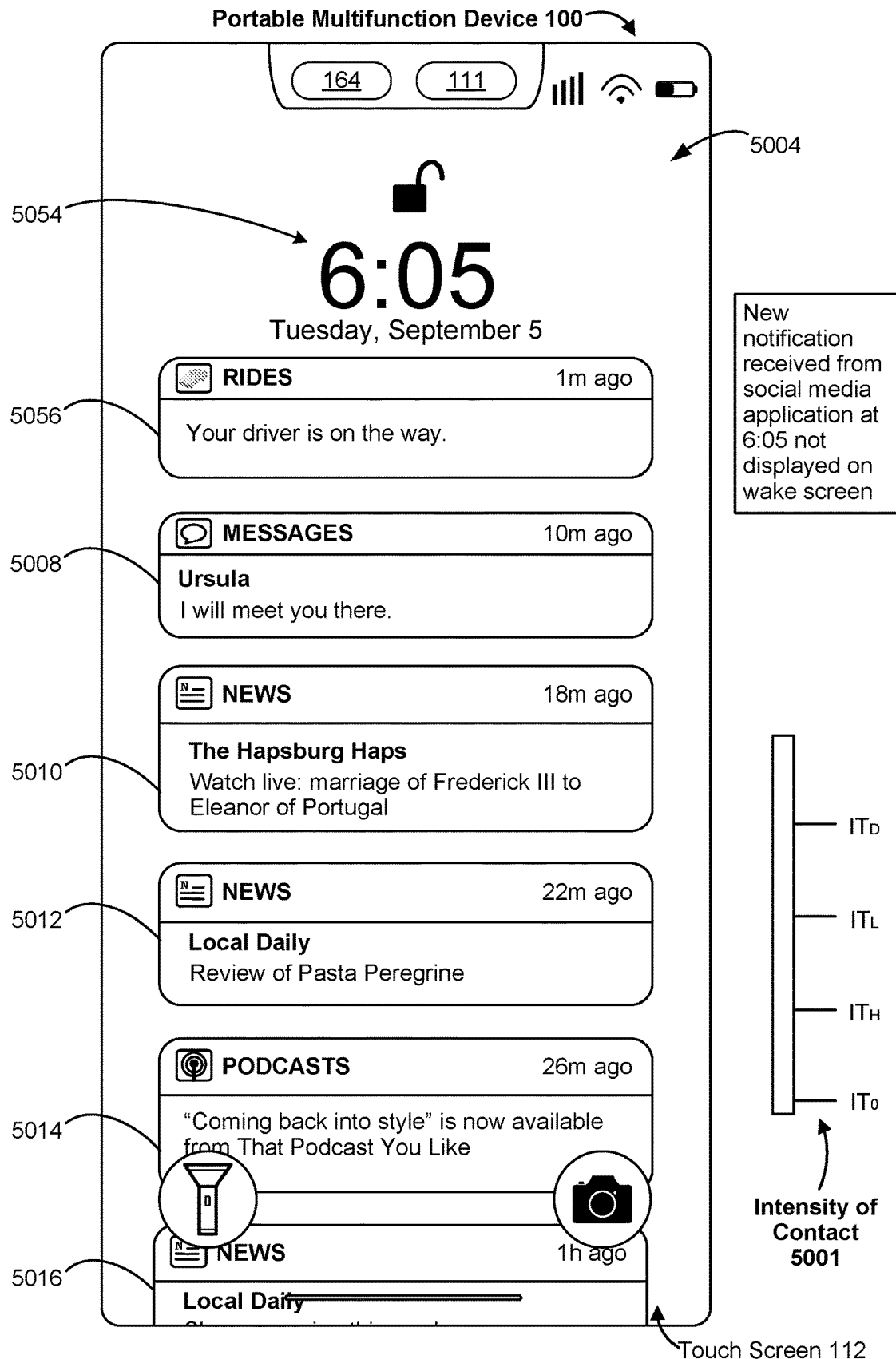
Figure 5L:
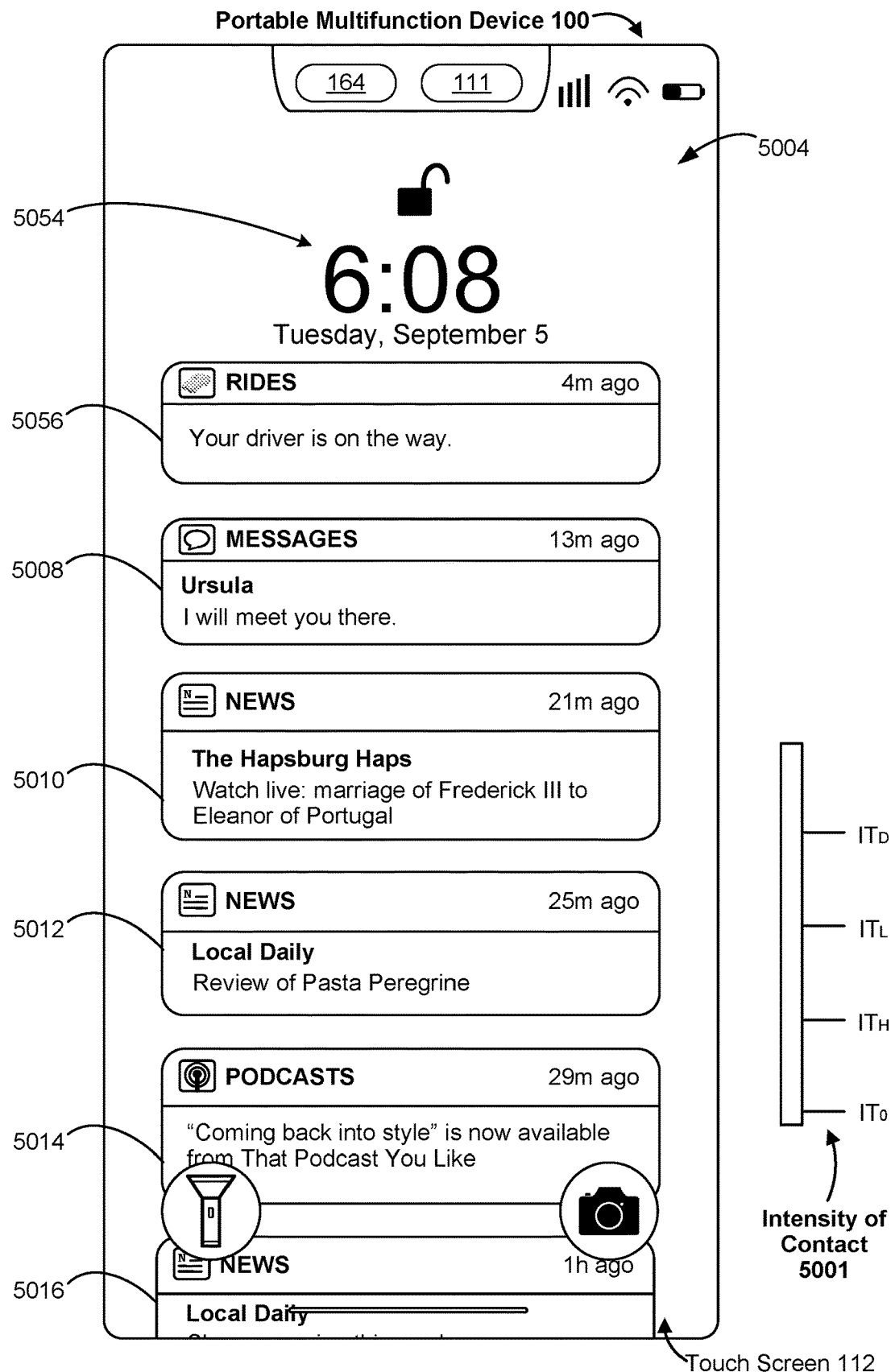
Figure 5M:
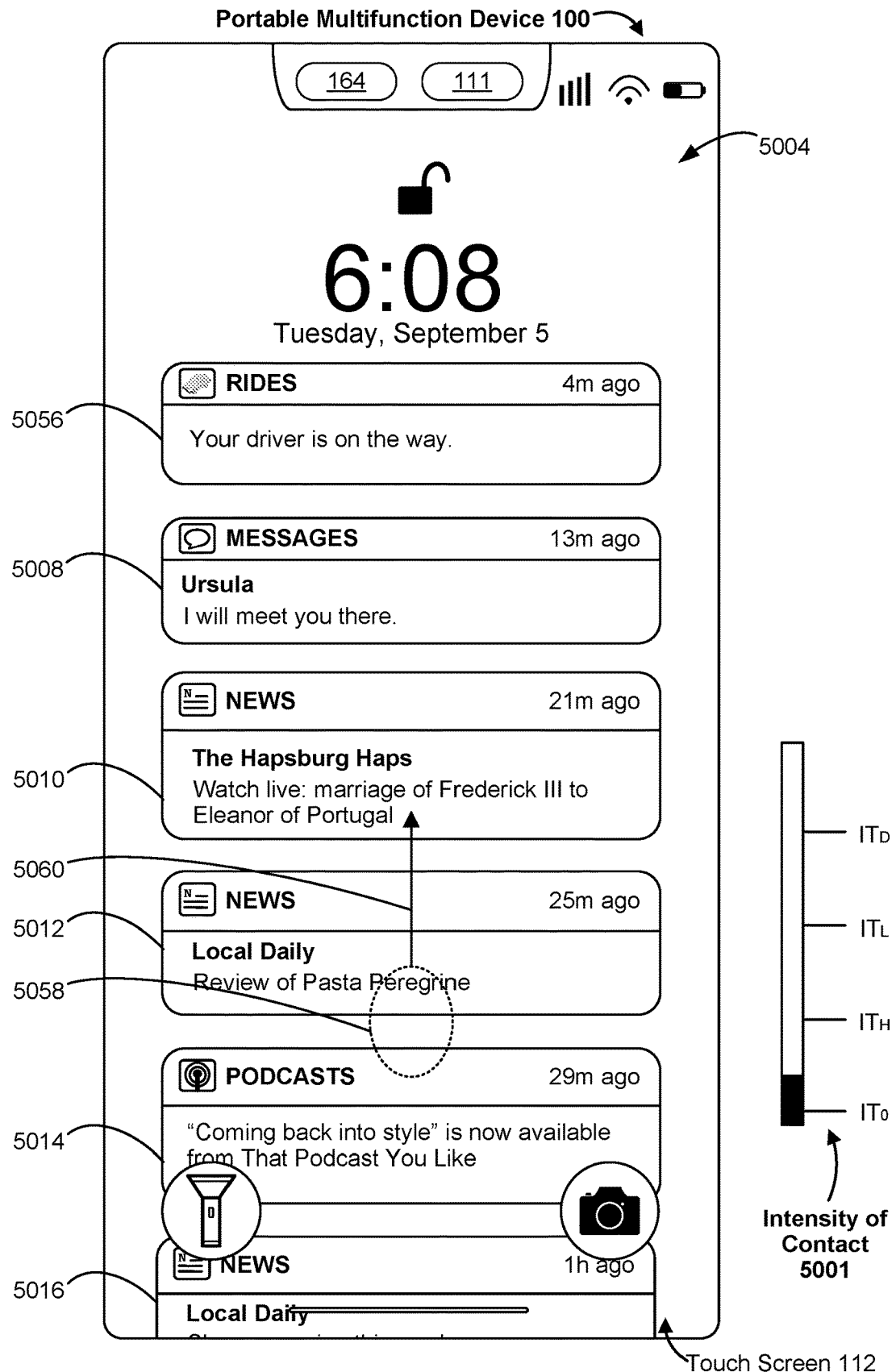
Figure 5N:
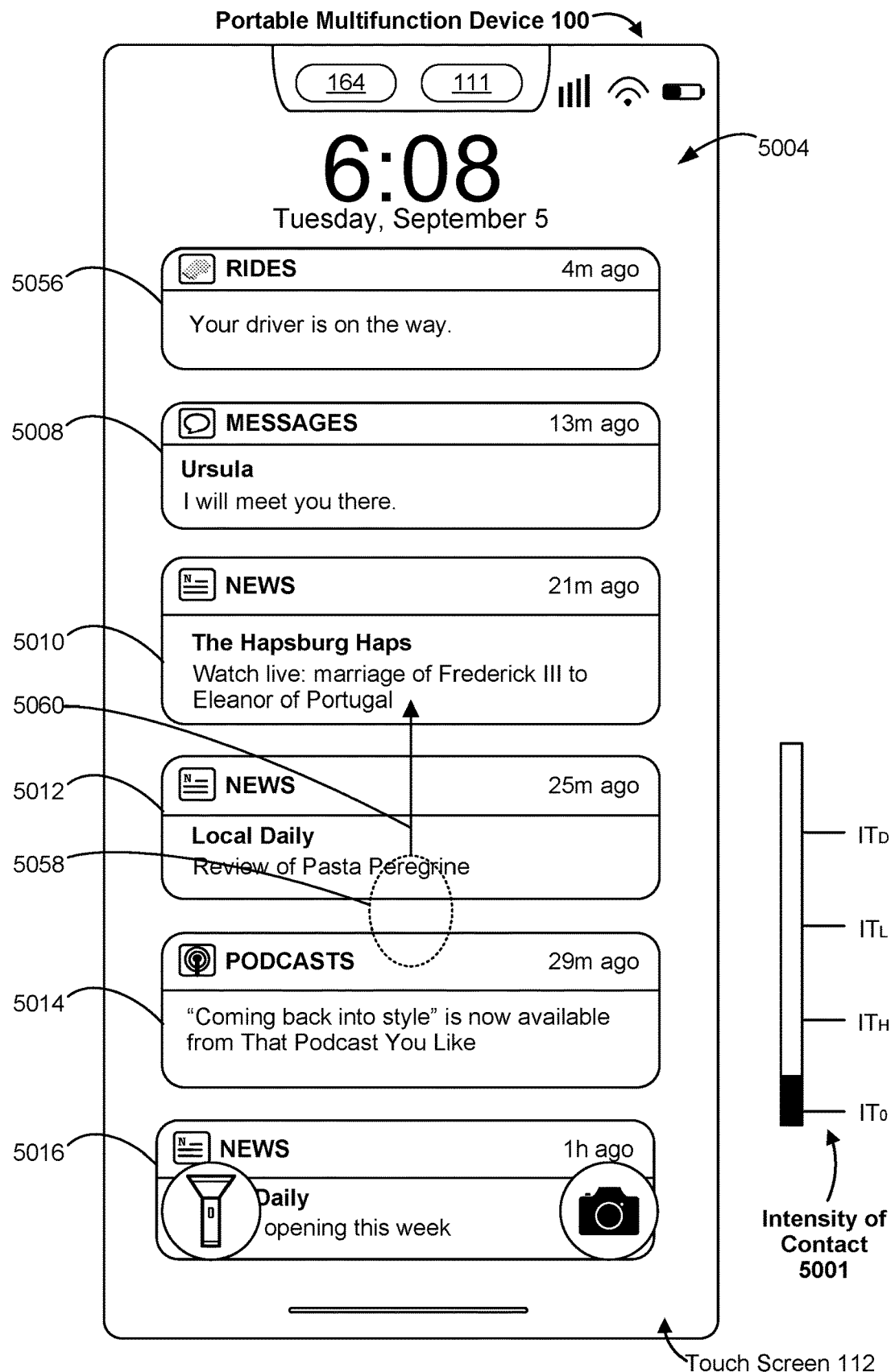
Figure 5O:
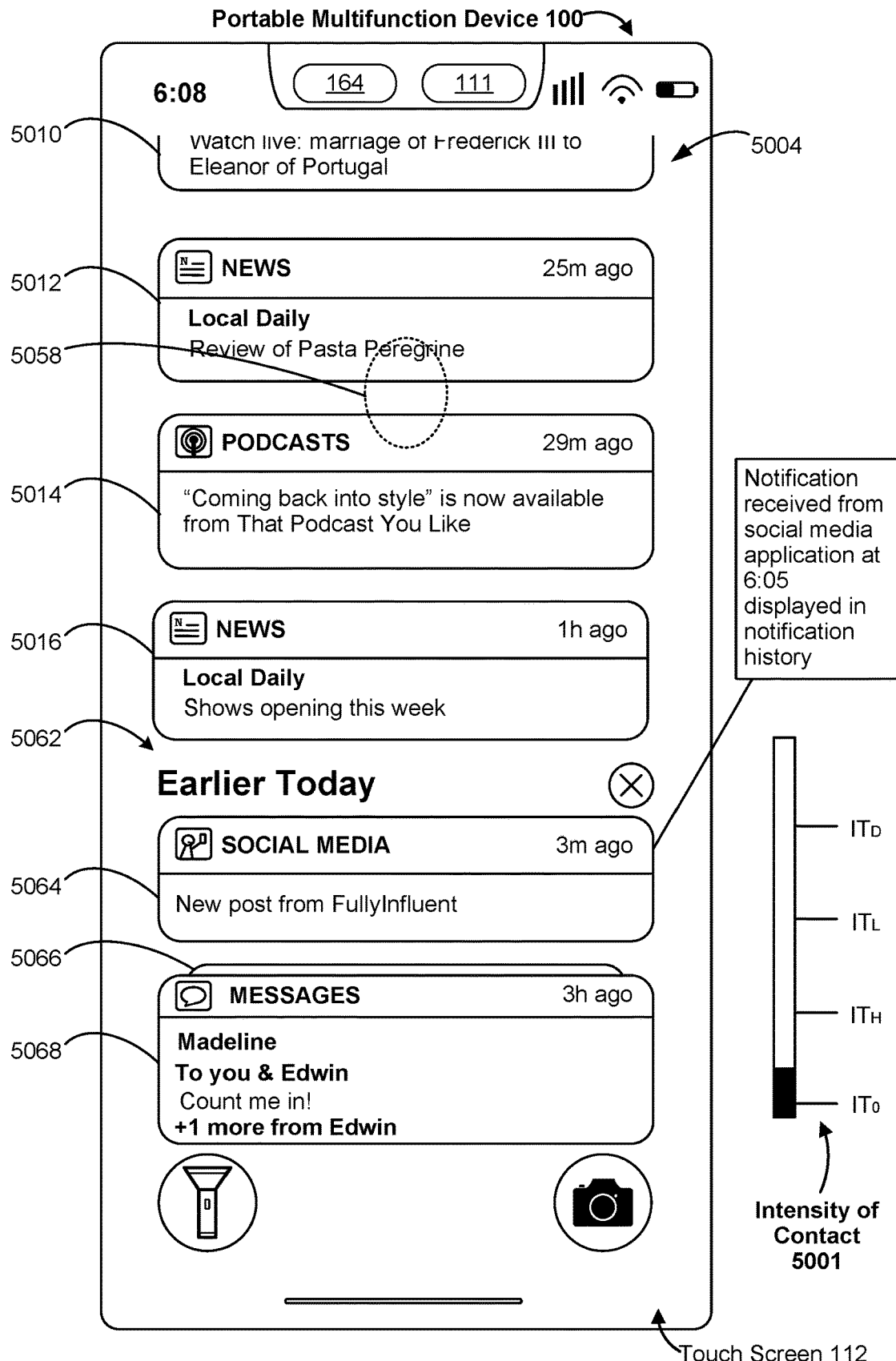
Figure 5P:
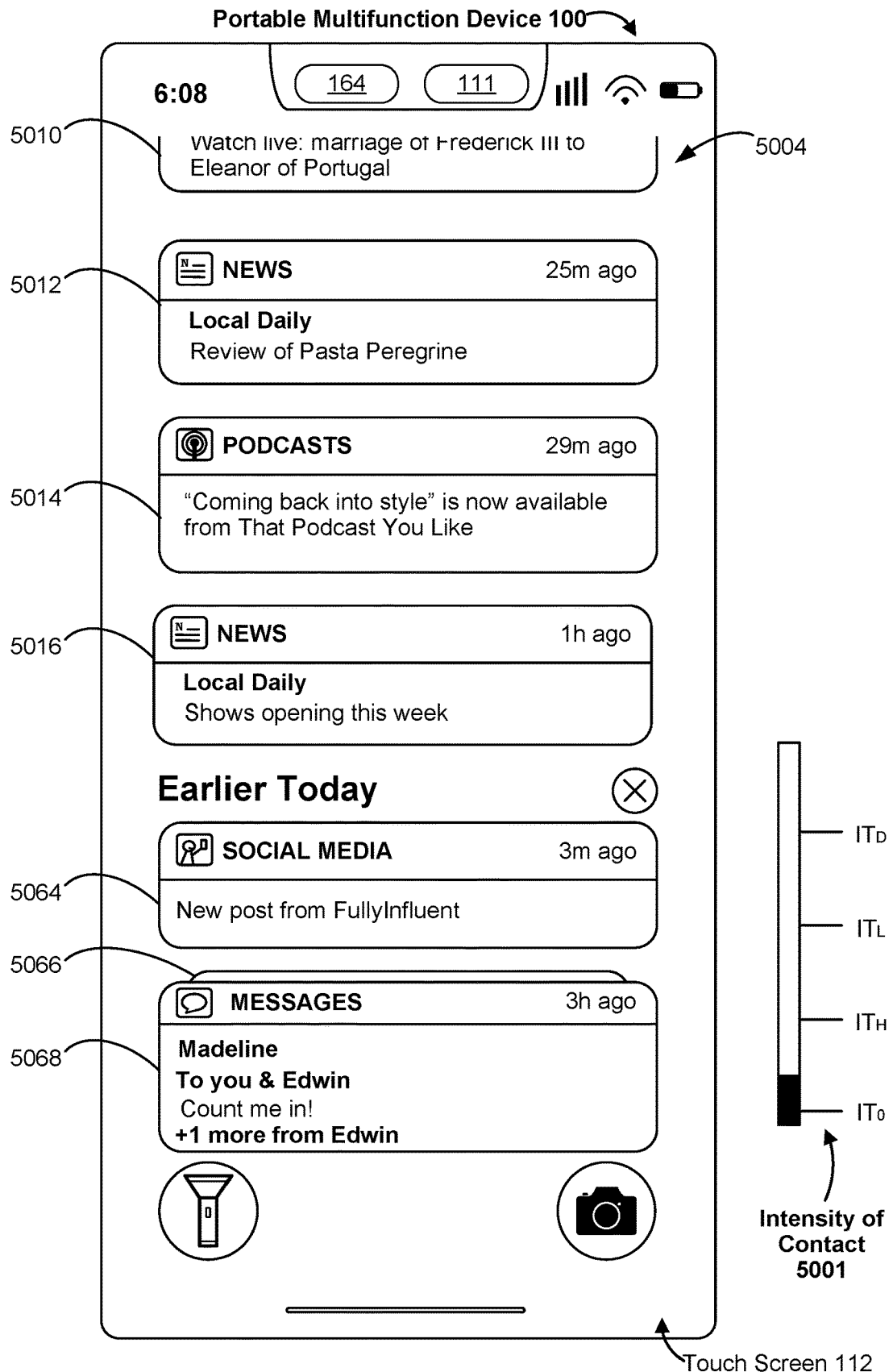
Figure 5Q:
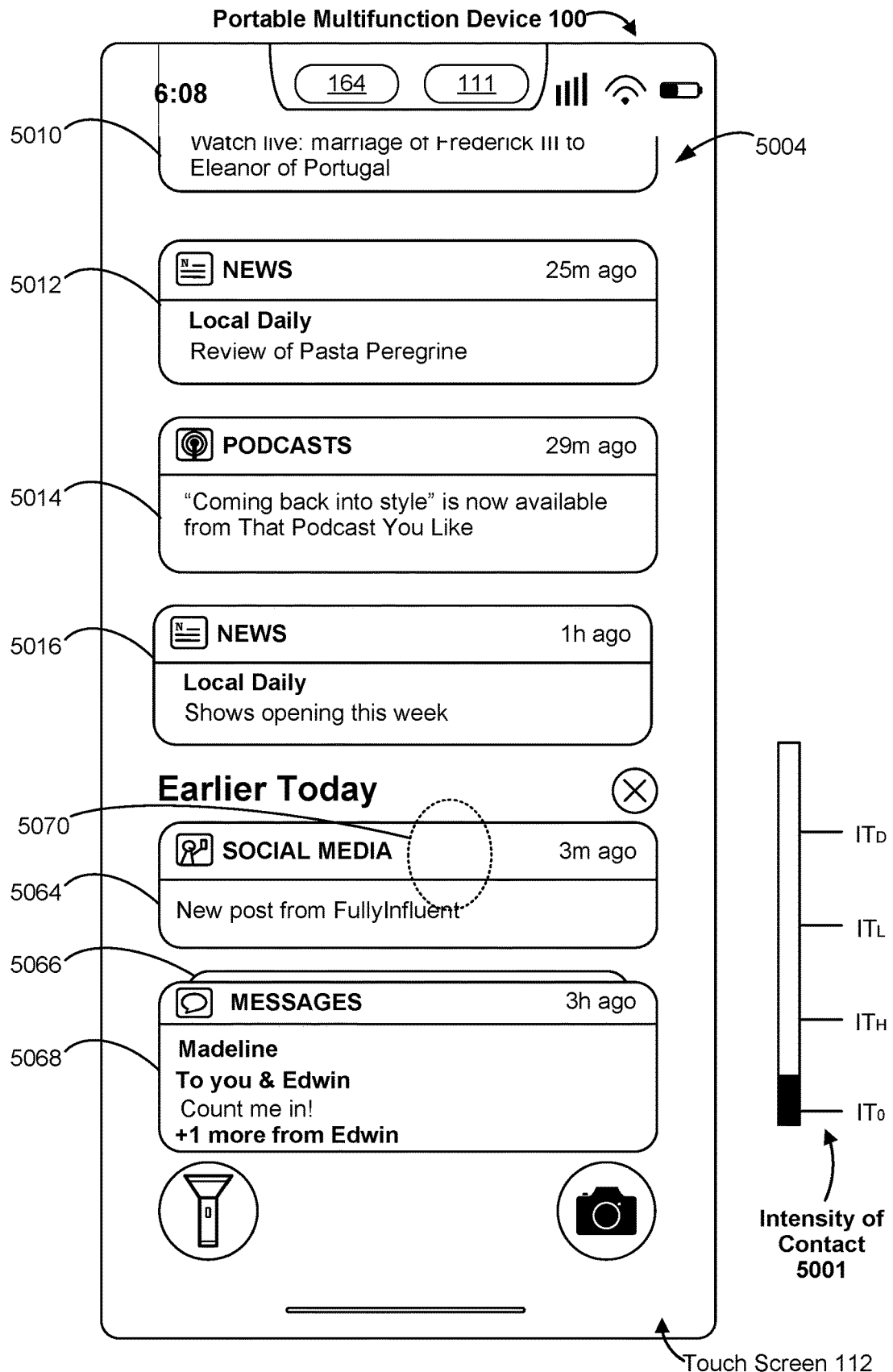
Figure 5R:
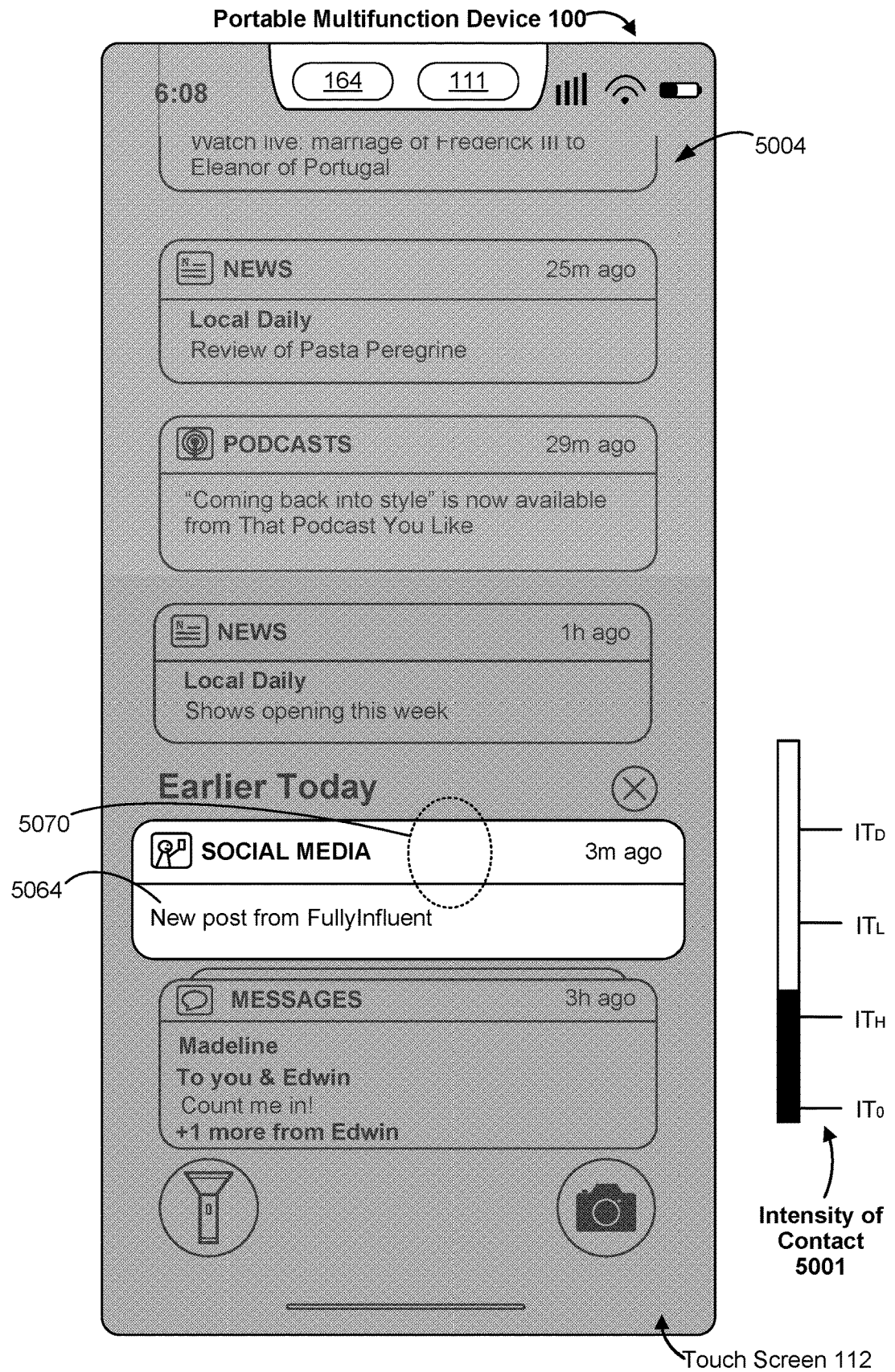
Figure 5S:
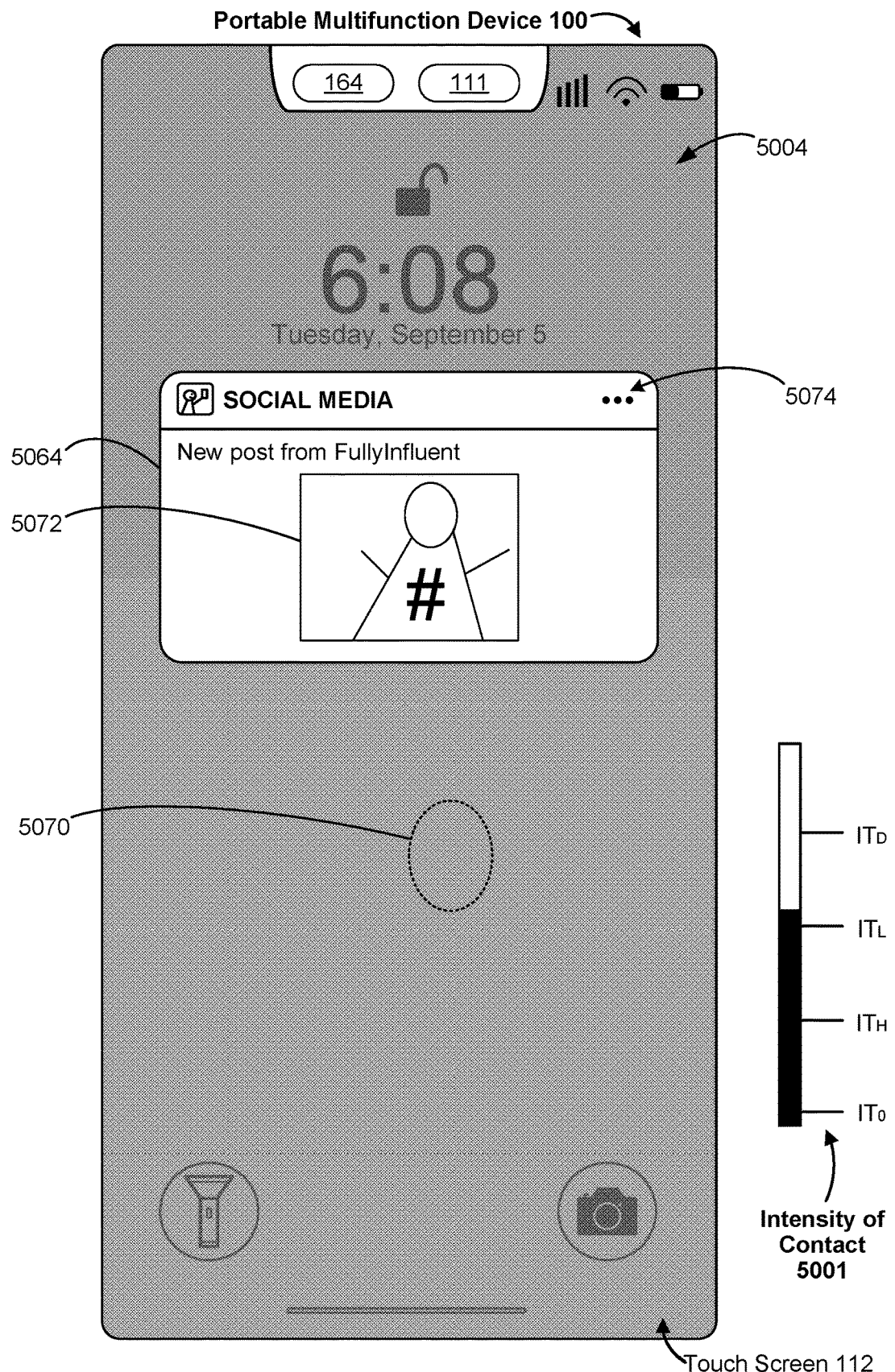
Figure 5T:
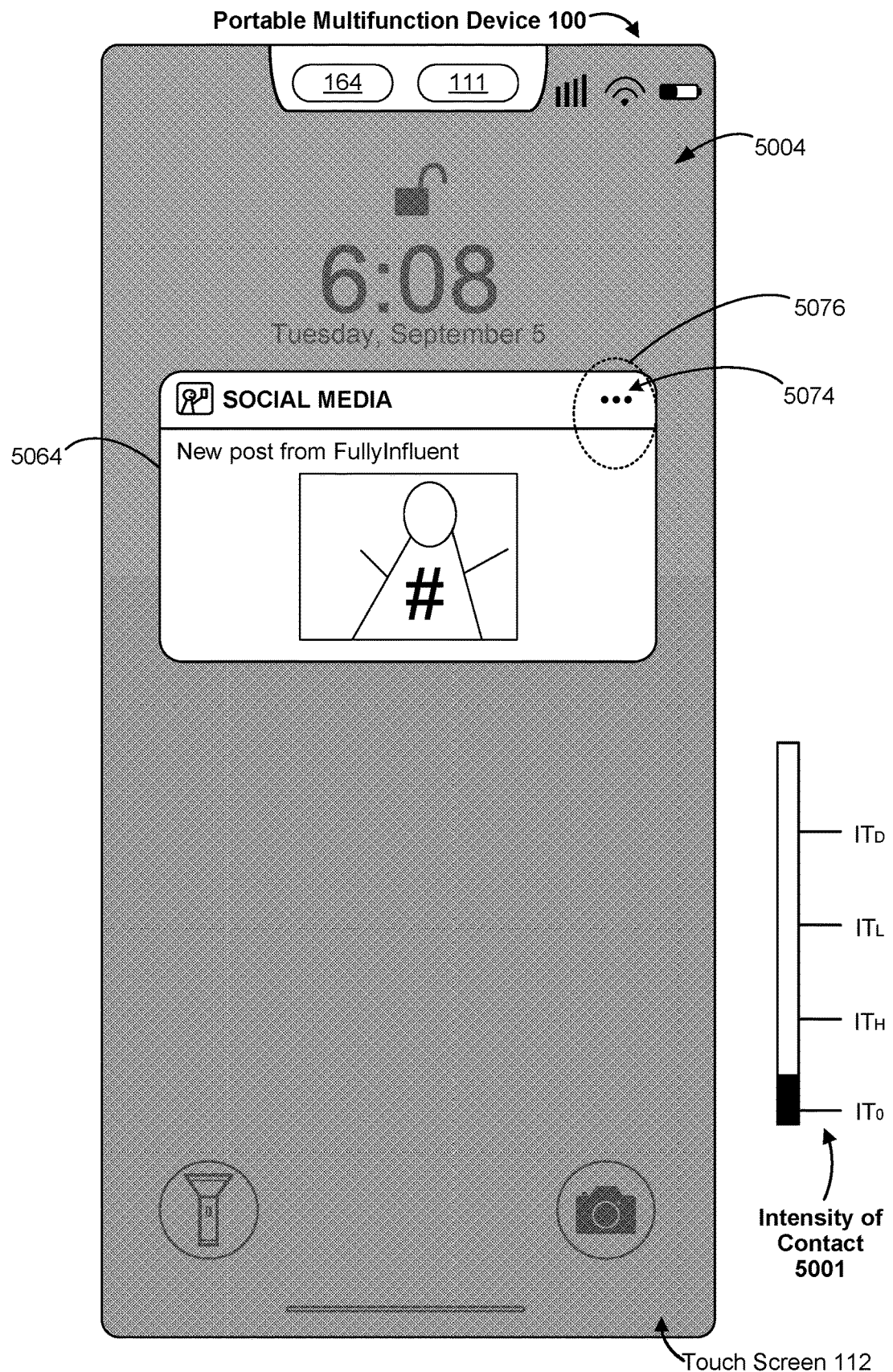
Figure 5U:
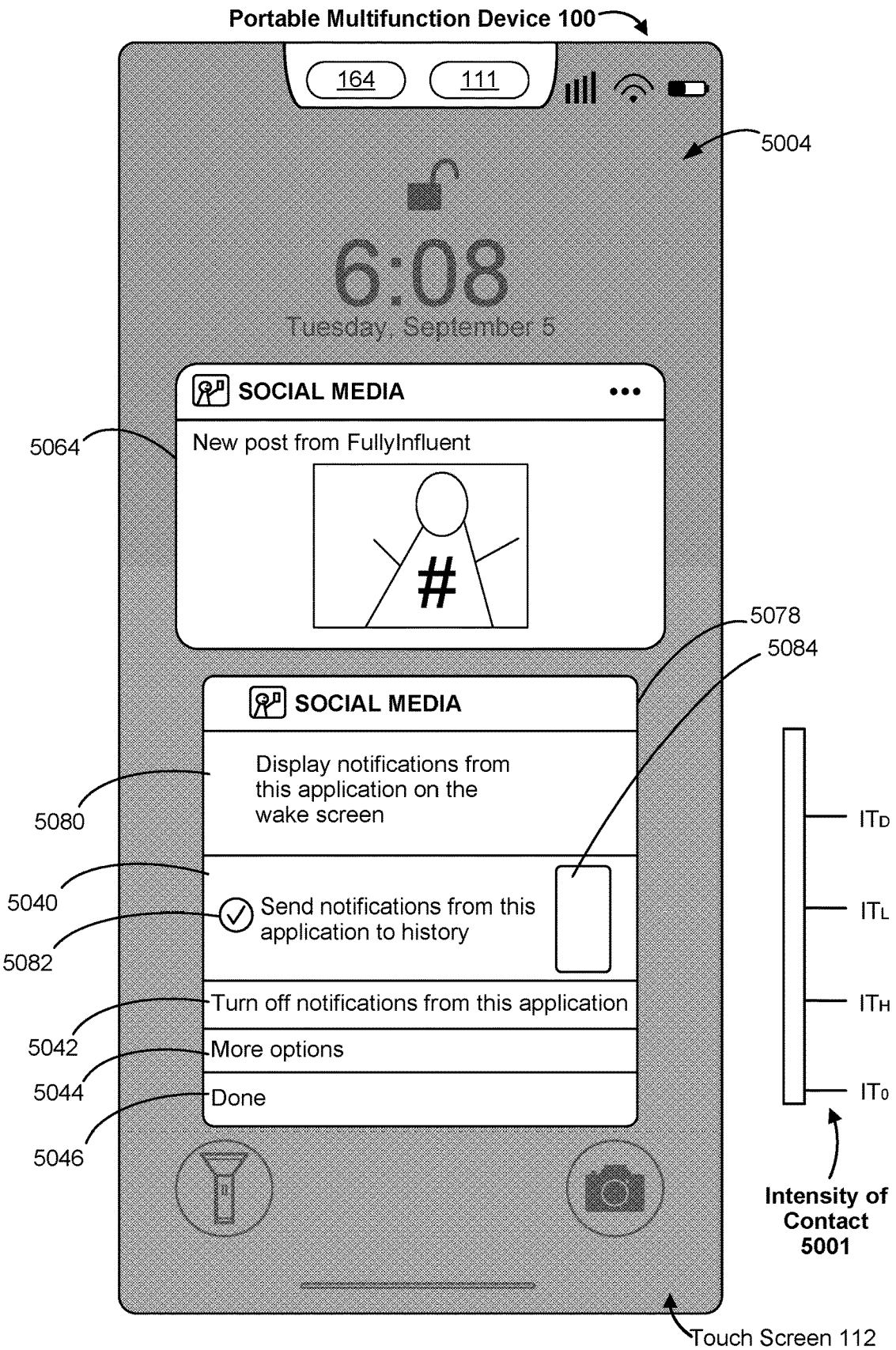
Figure 5V:
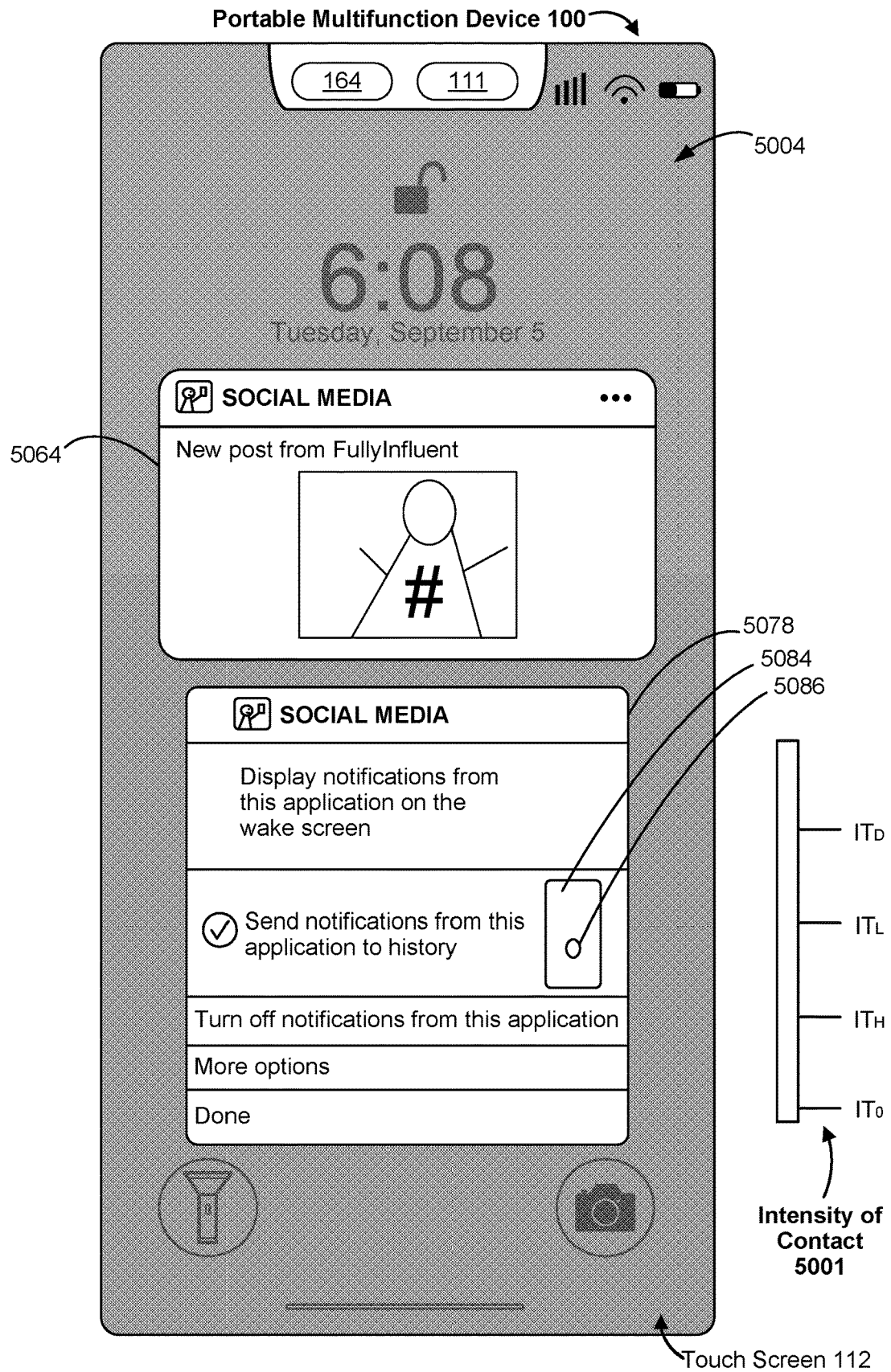
Figure 5W:
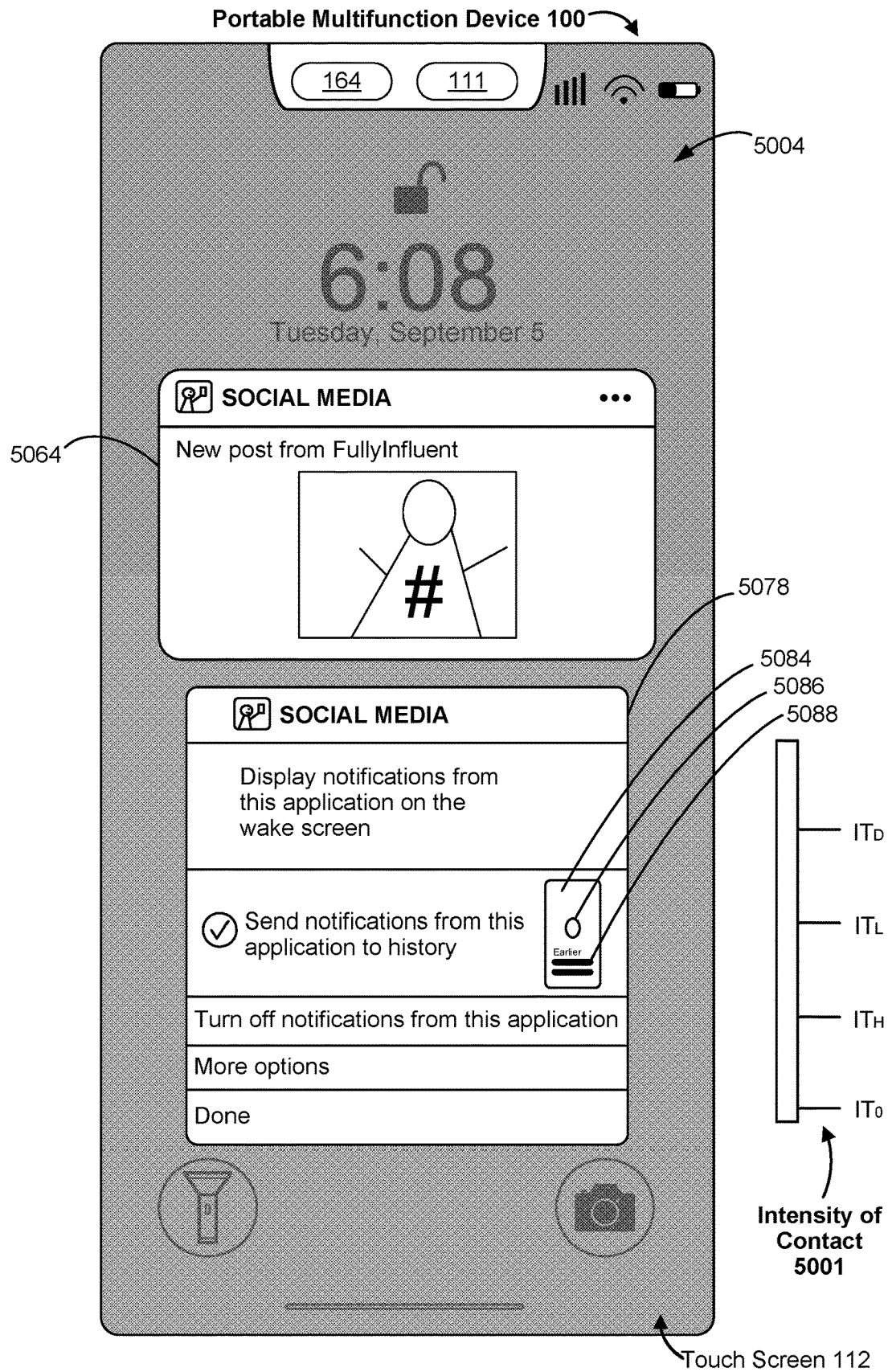
Figure 5X:
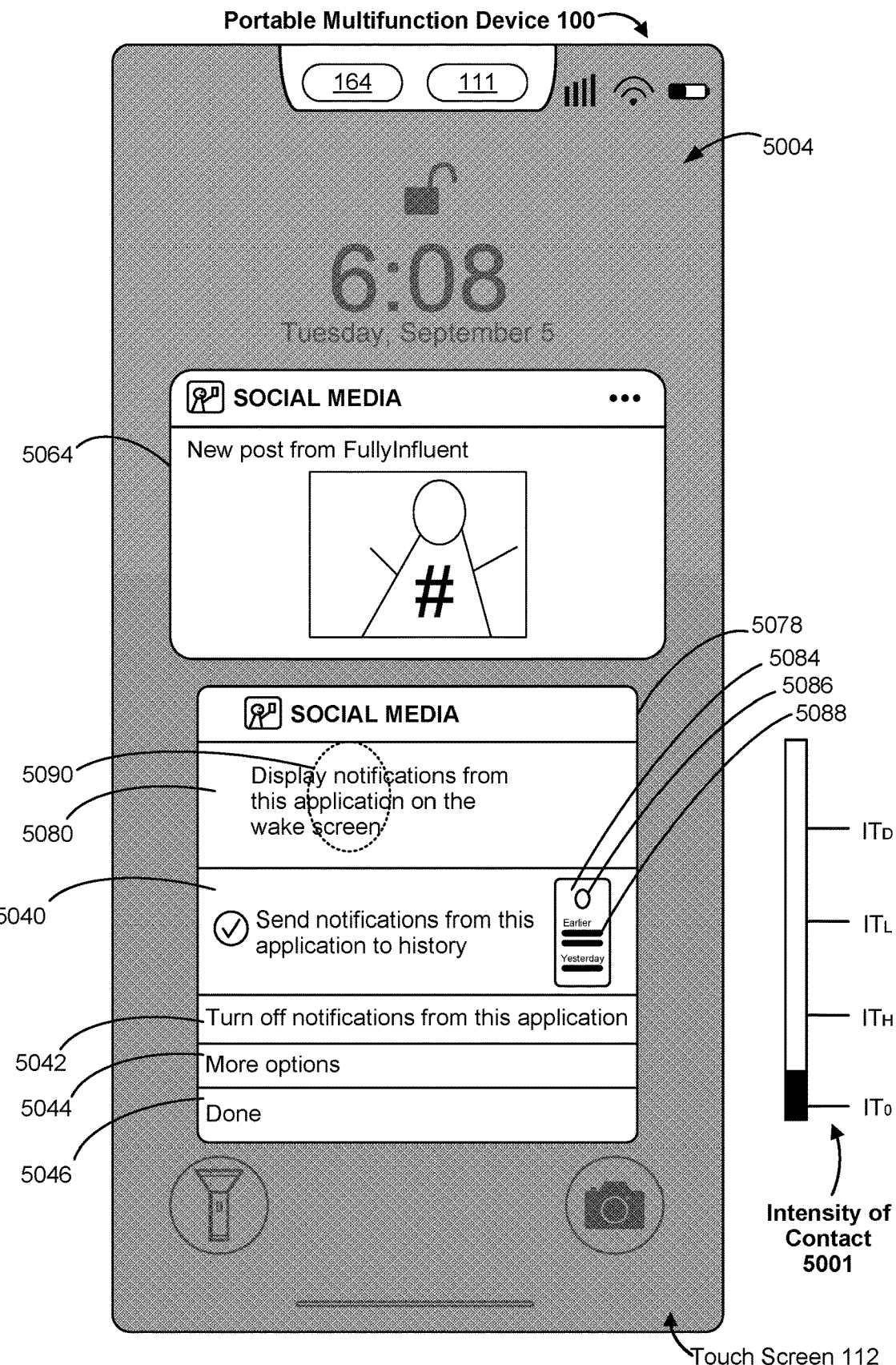
Figure 5Y:
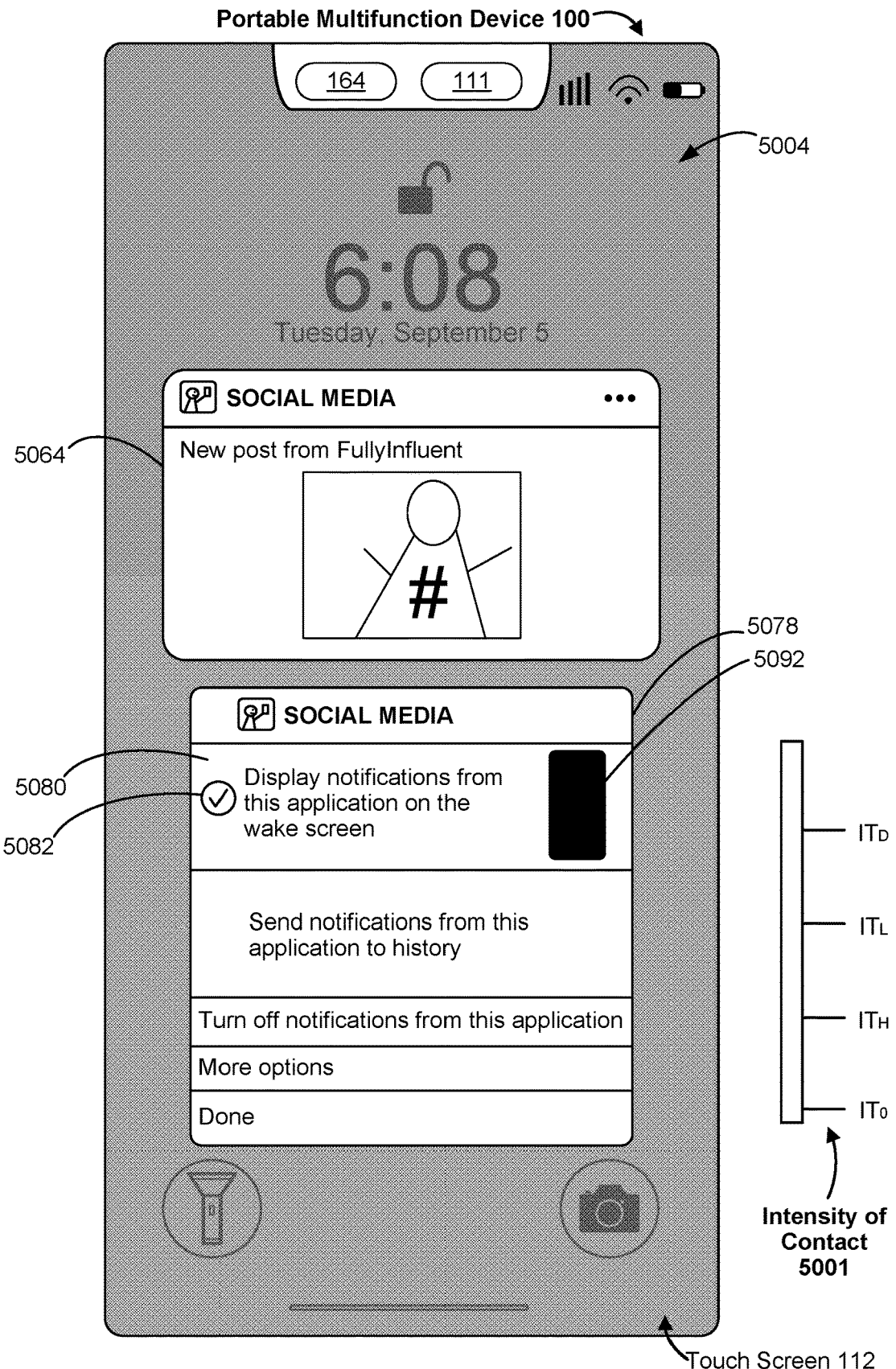
Figure 5Z:
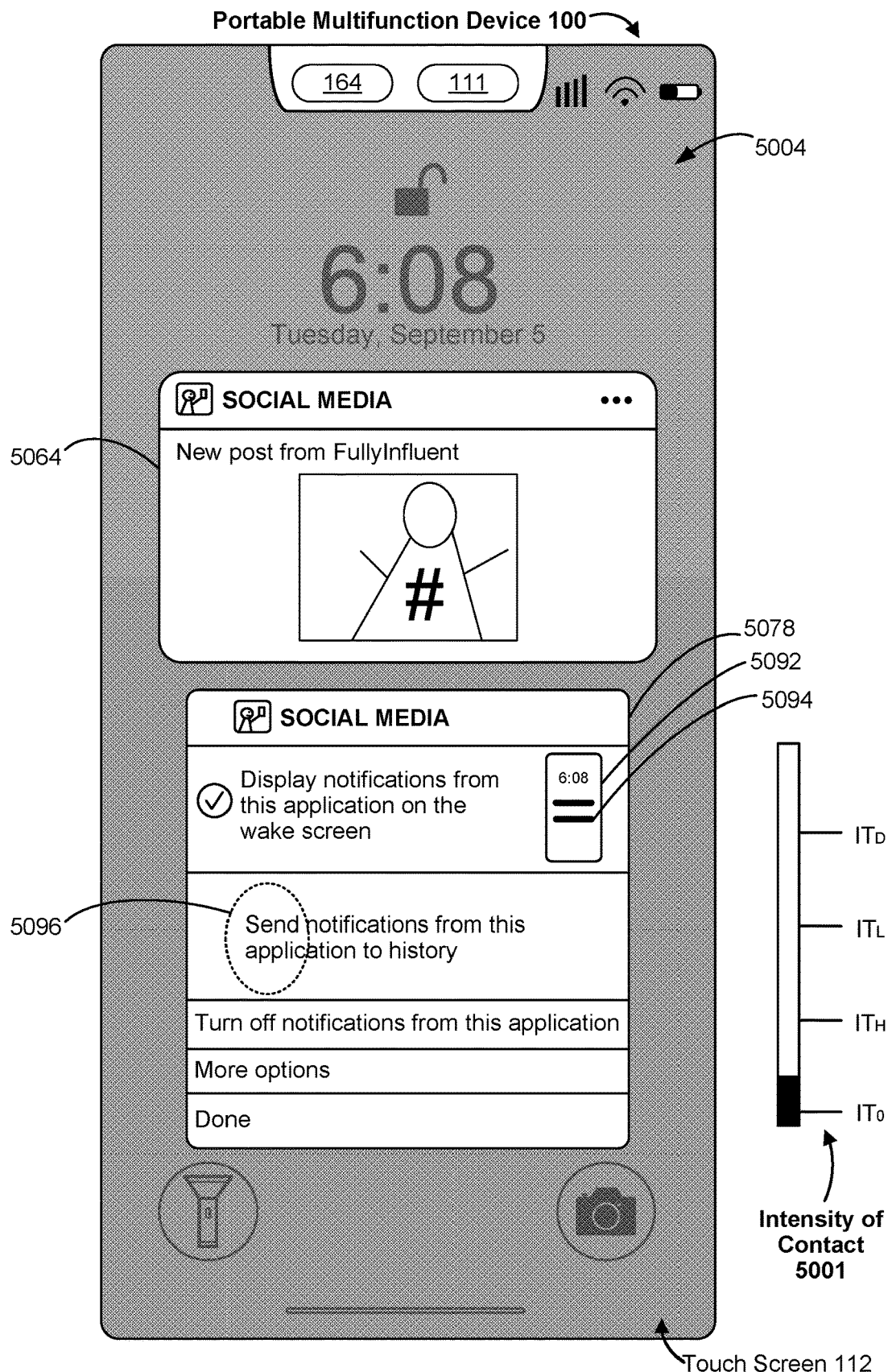
Figure 5A:
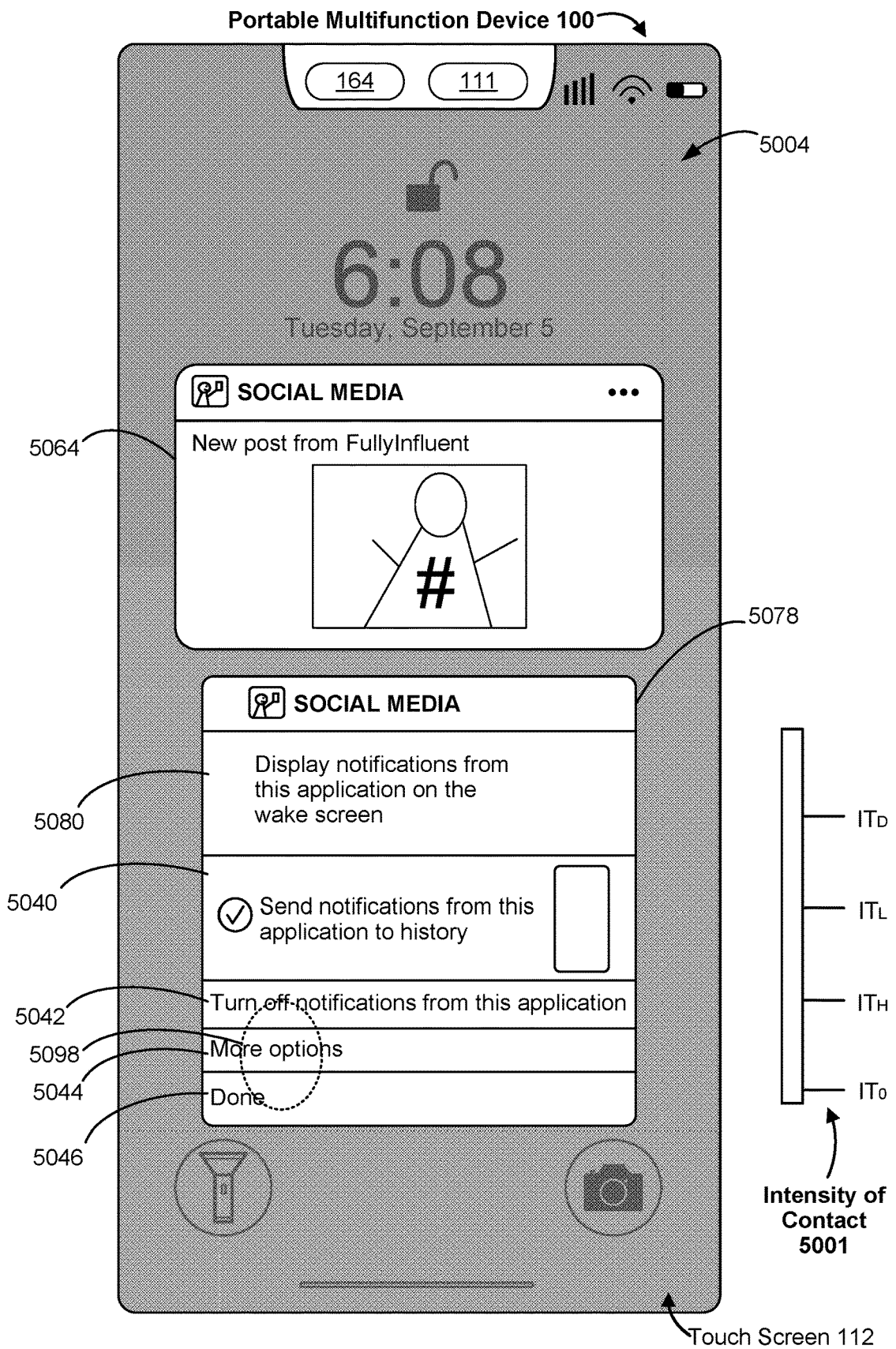
Figure 5A:
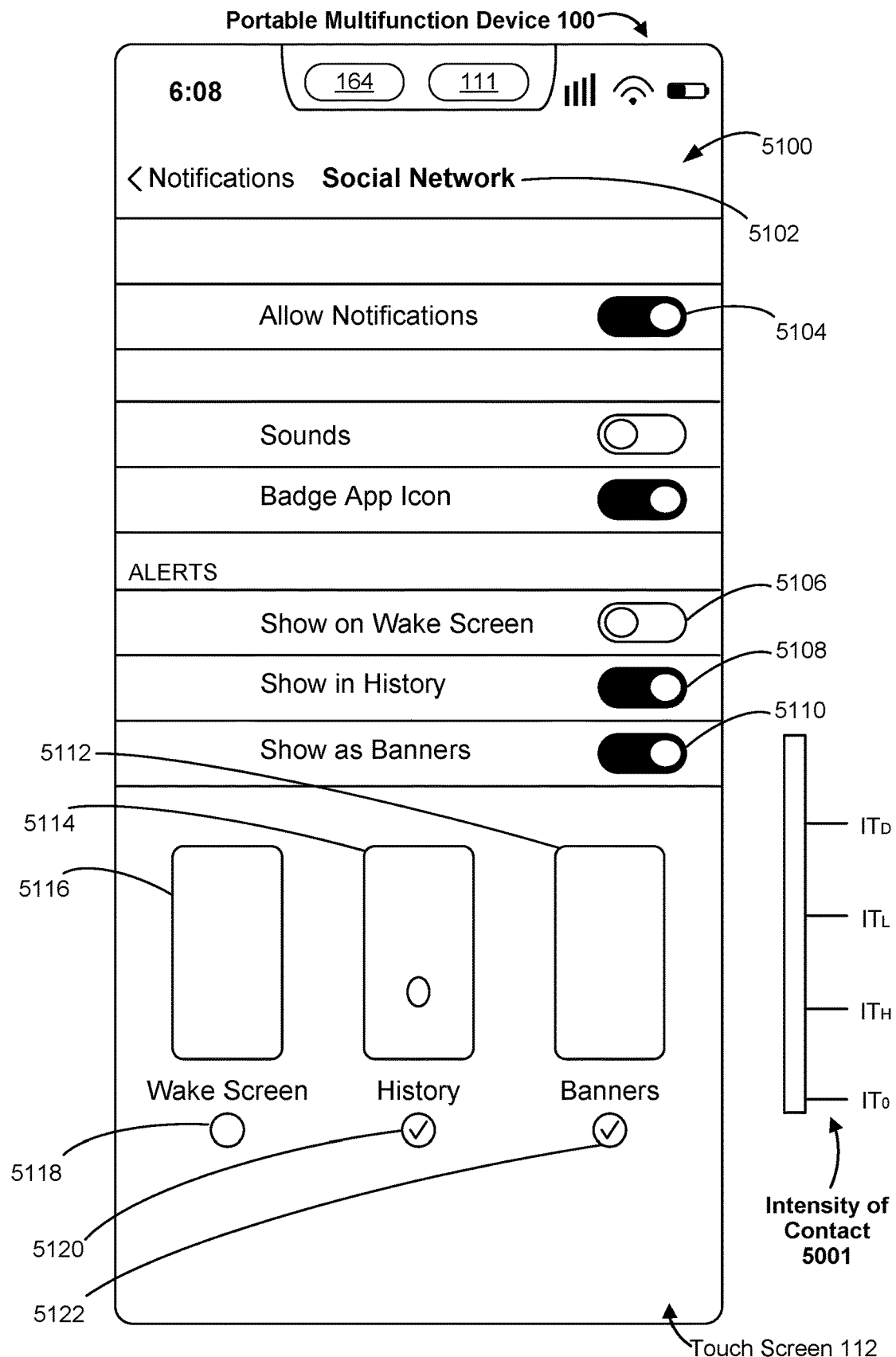
Figure 5A:
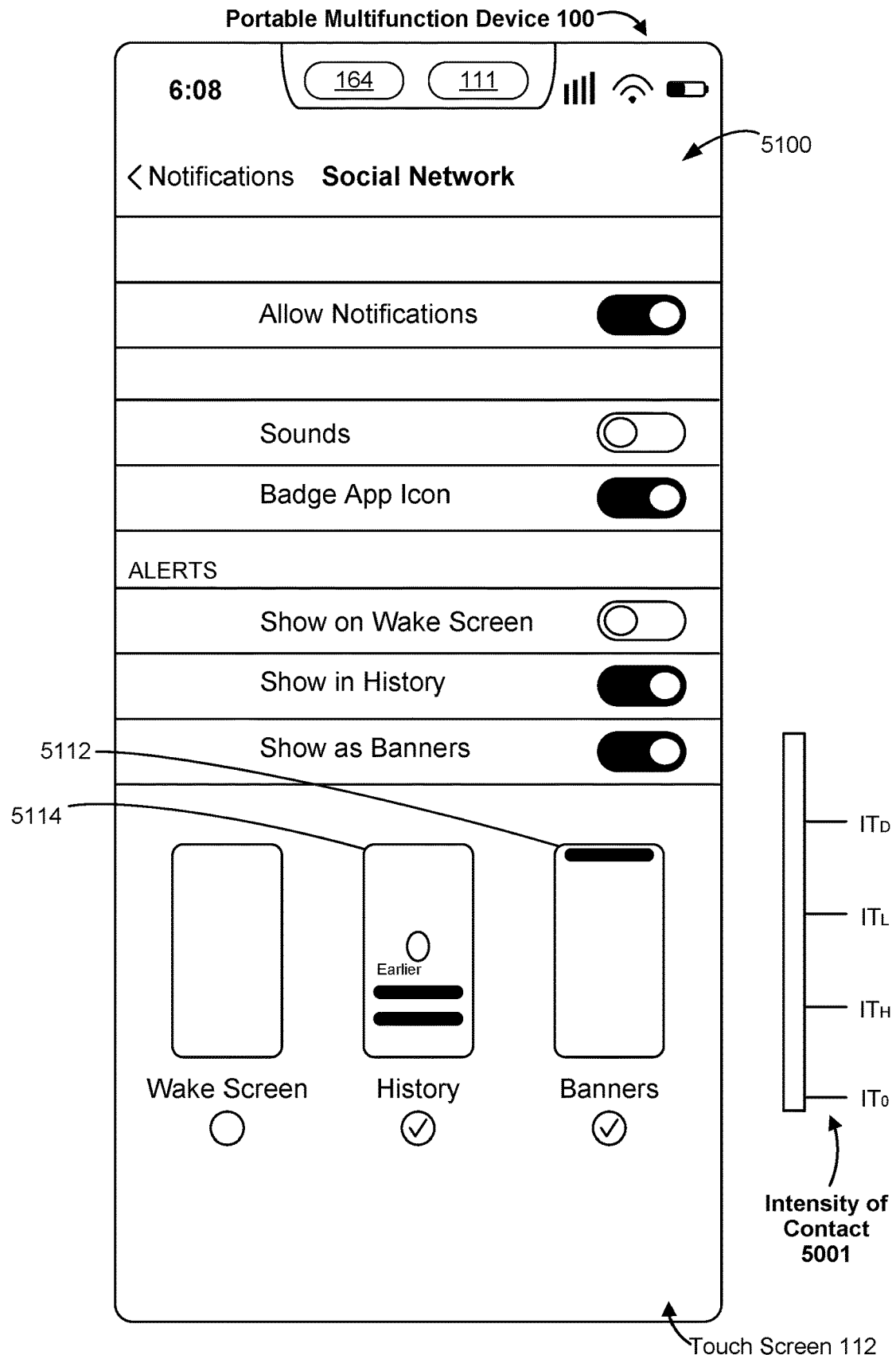
Figure 5A:
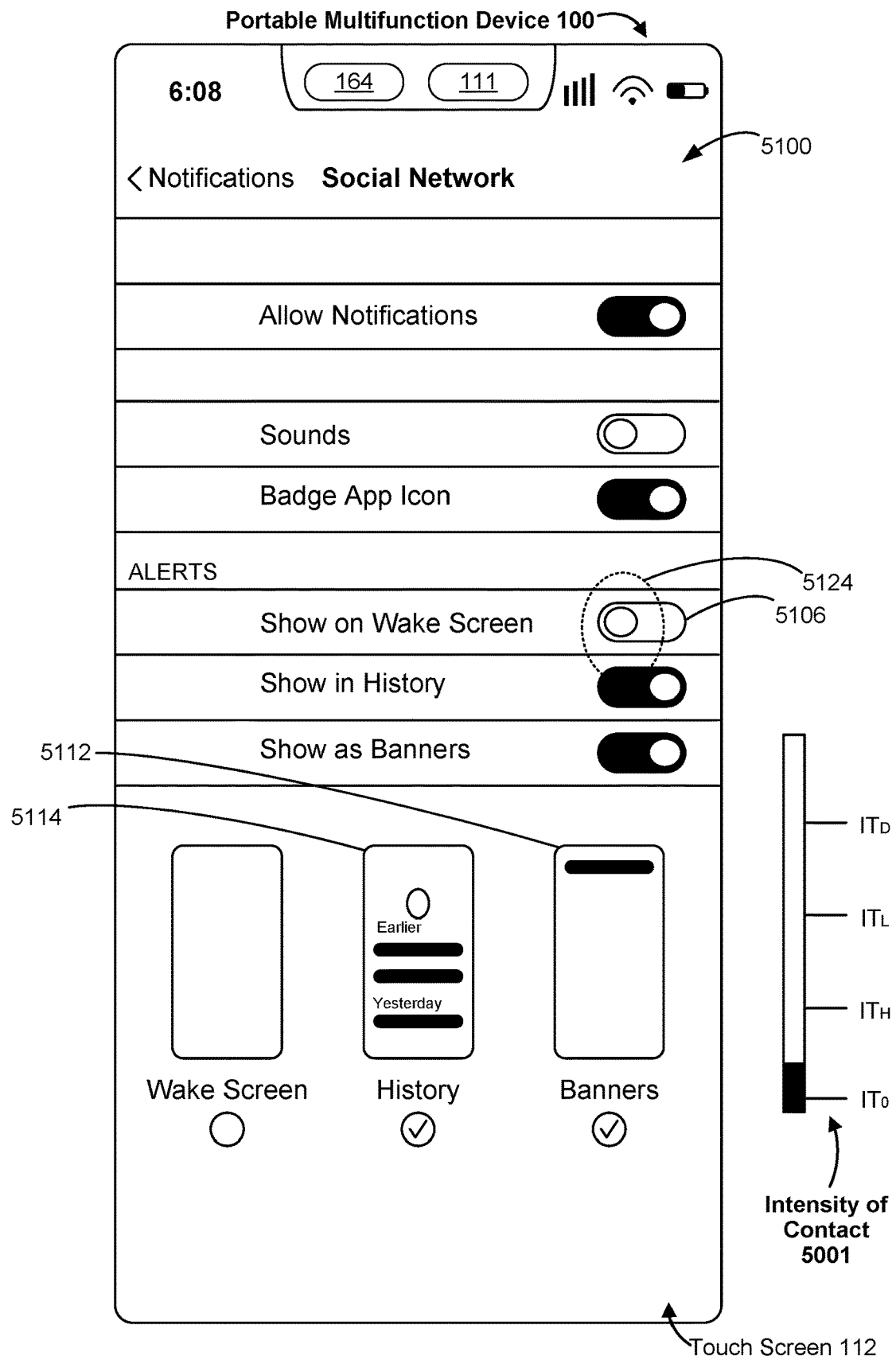
Figure 5A:
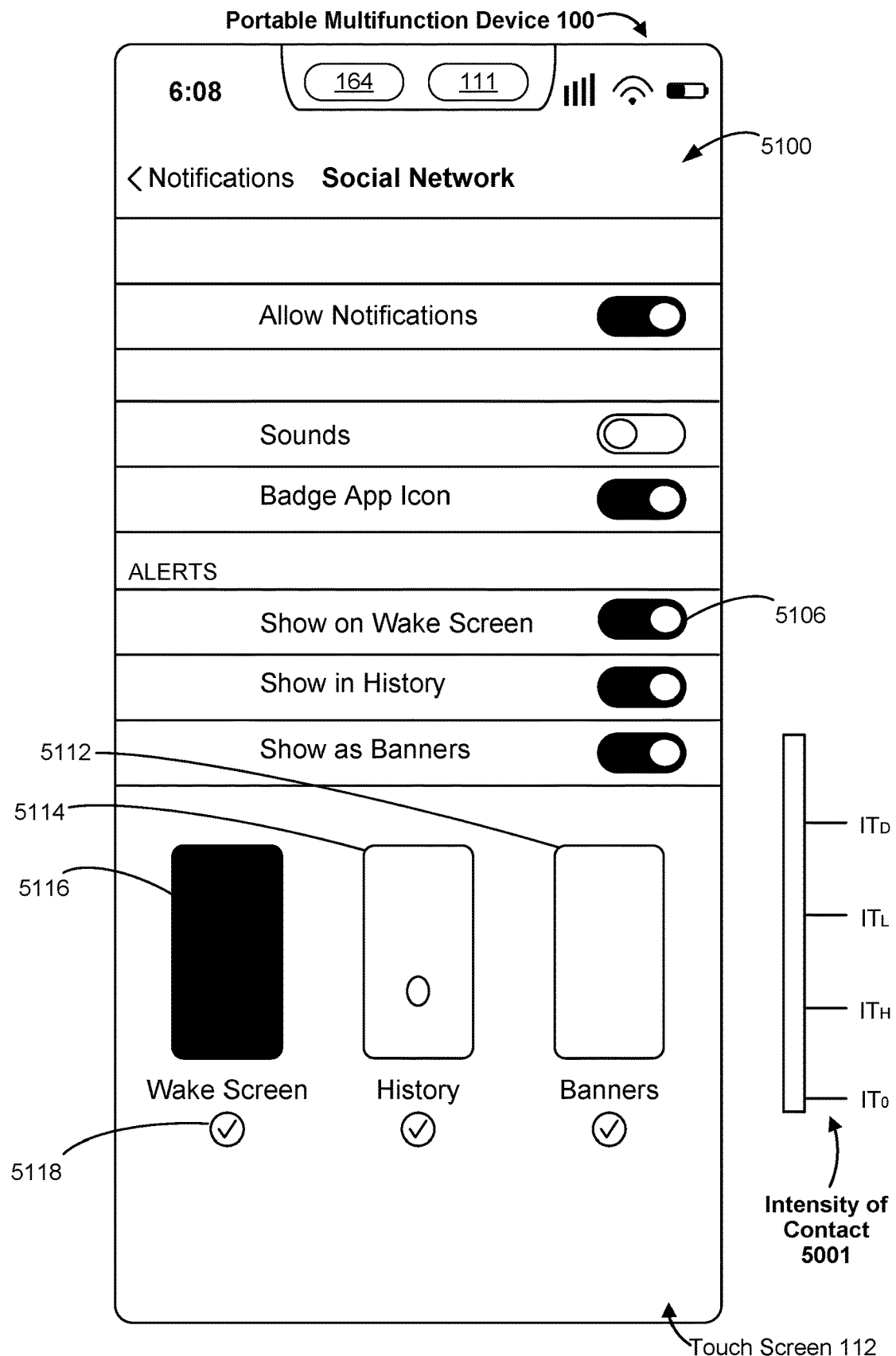
Figure 5A:
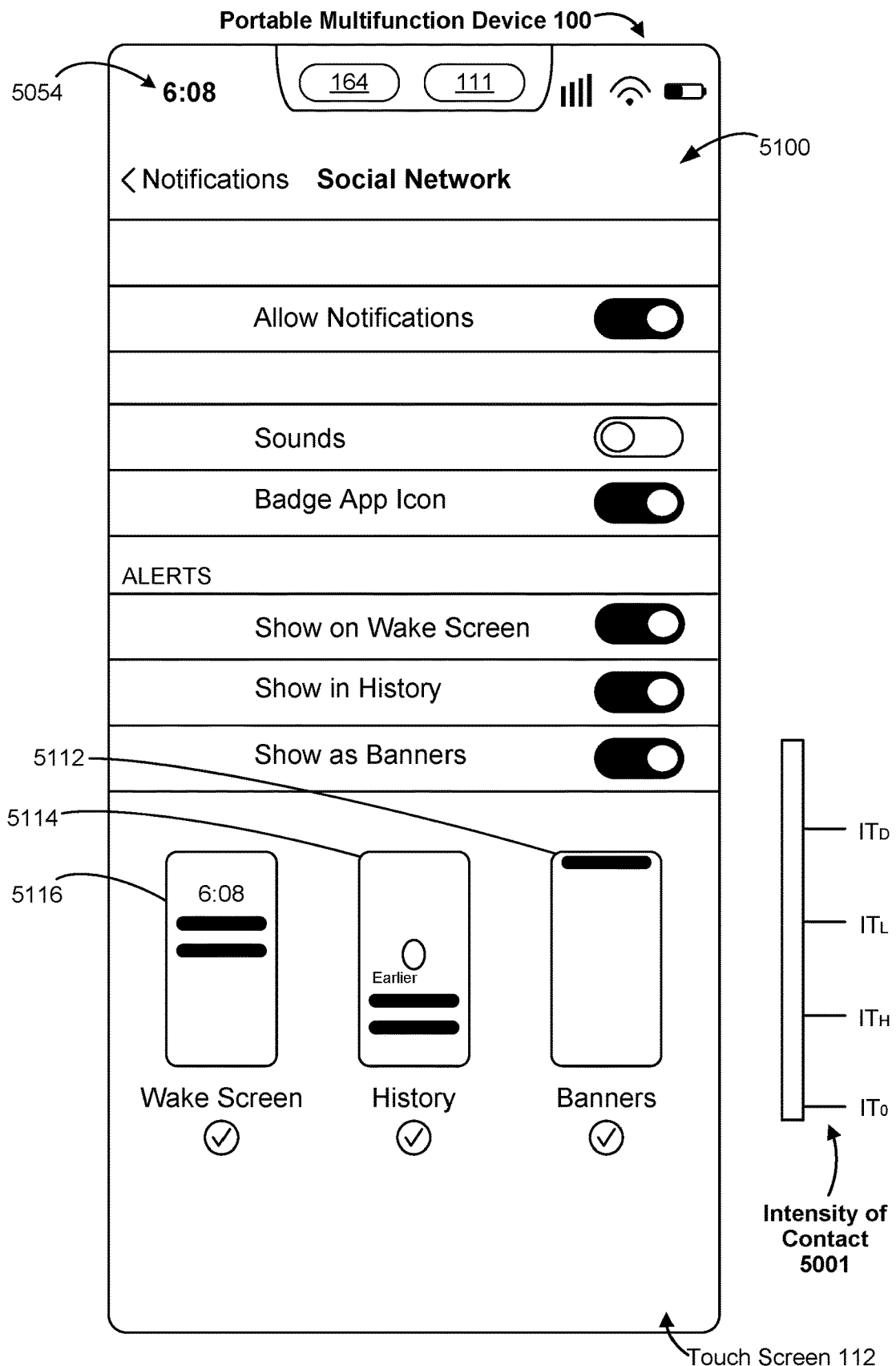
Figure 5A:
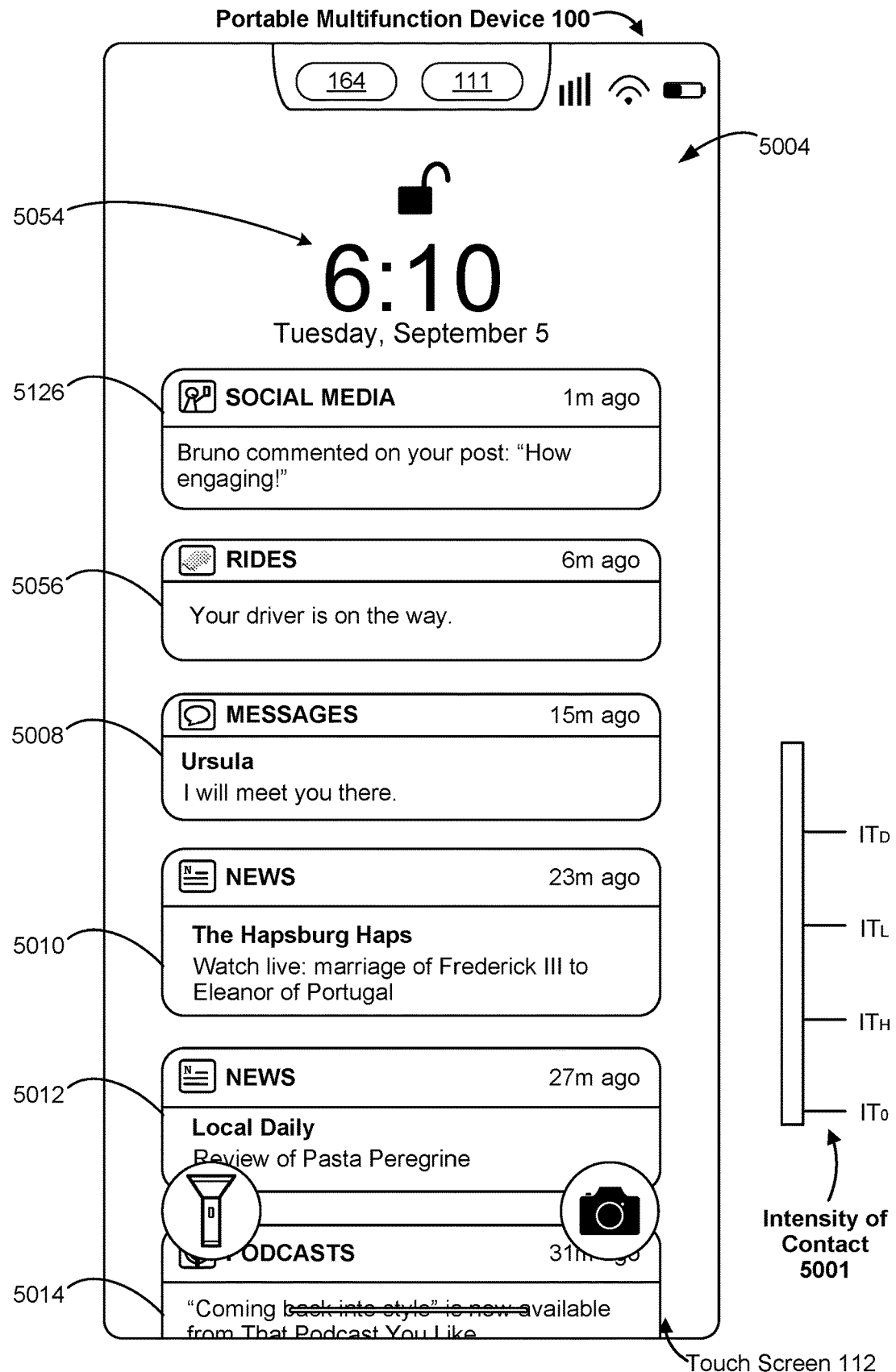
Figure 5A:
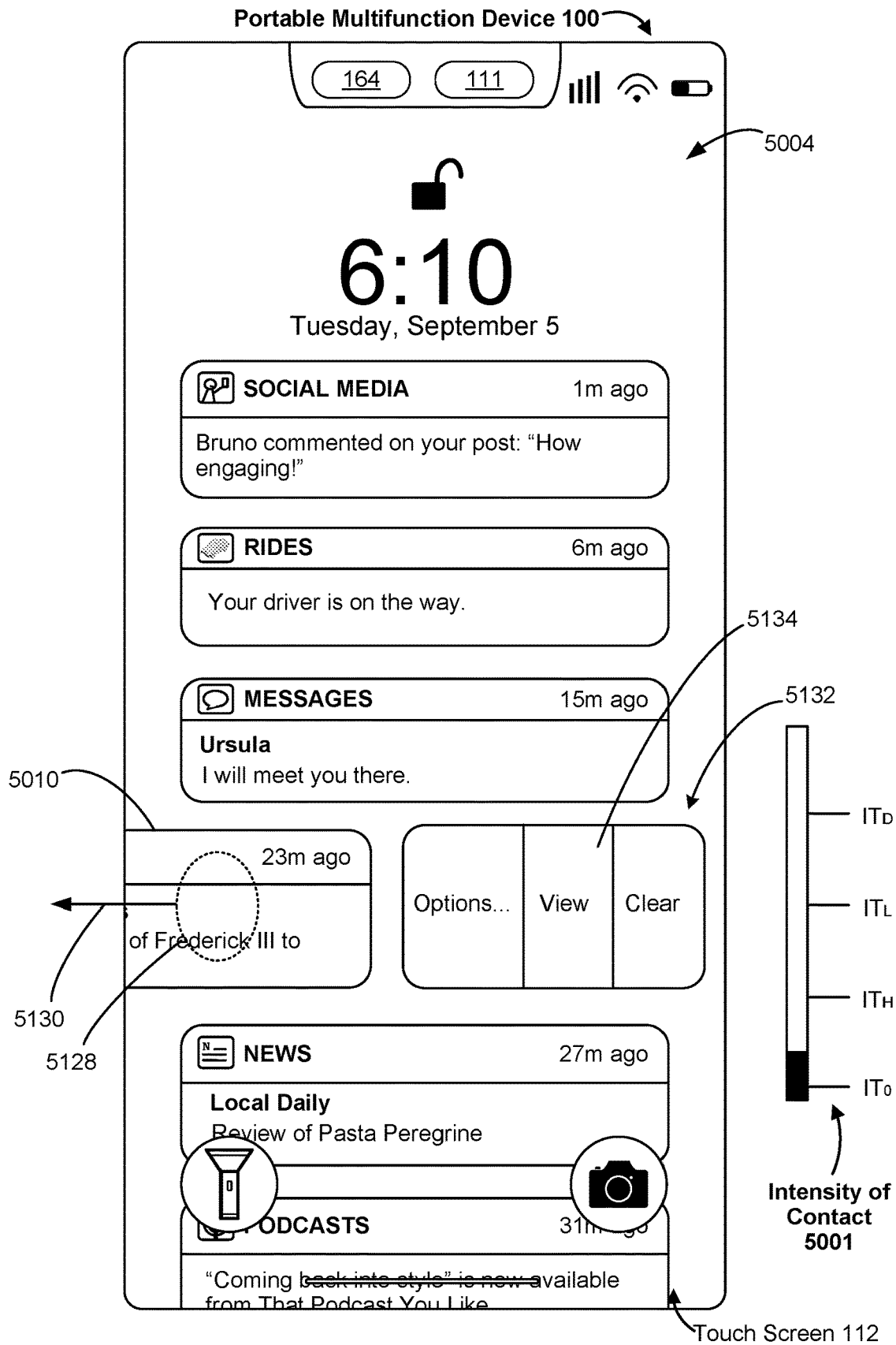
Figure 5A:
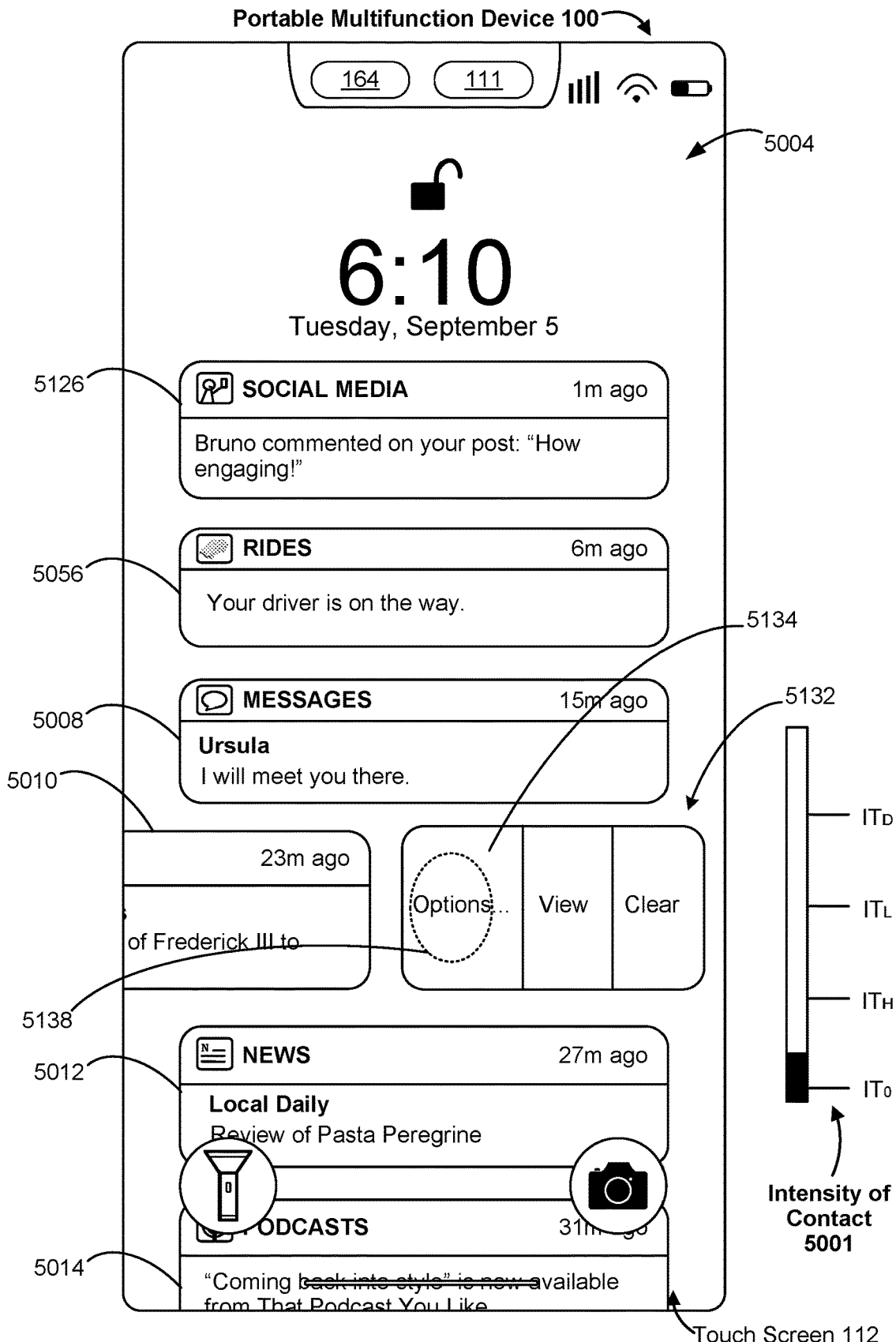
Figure 5A:
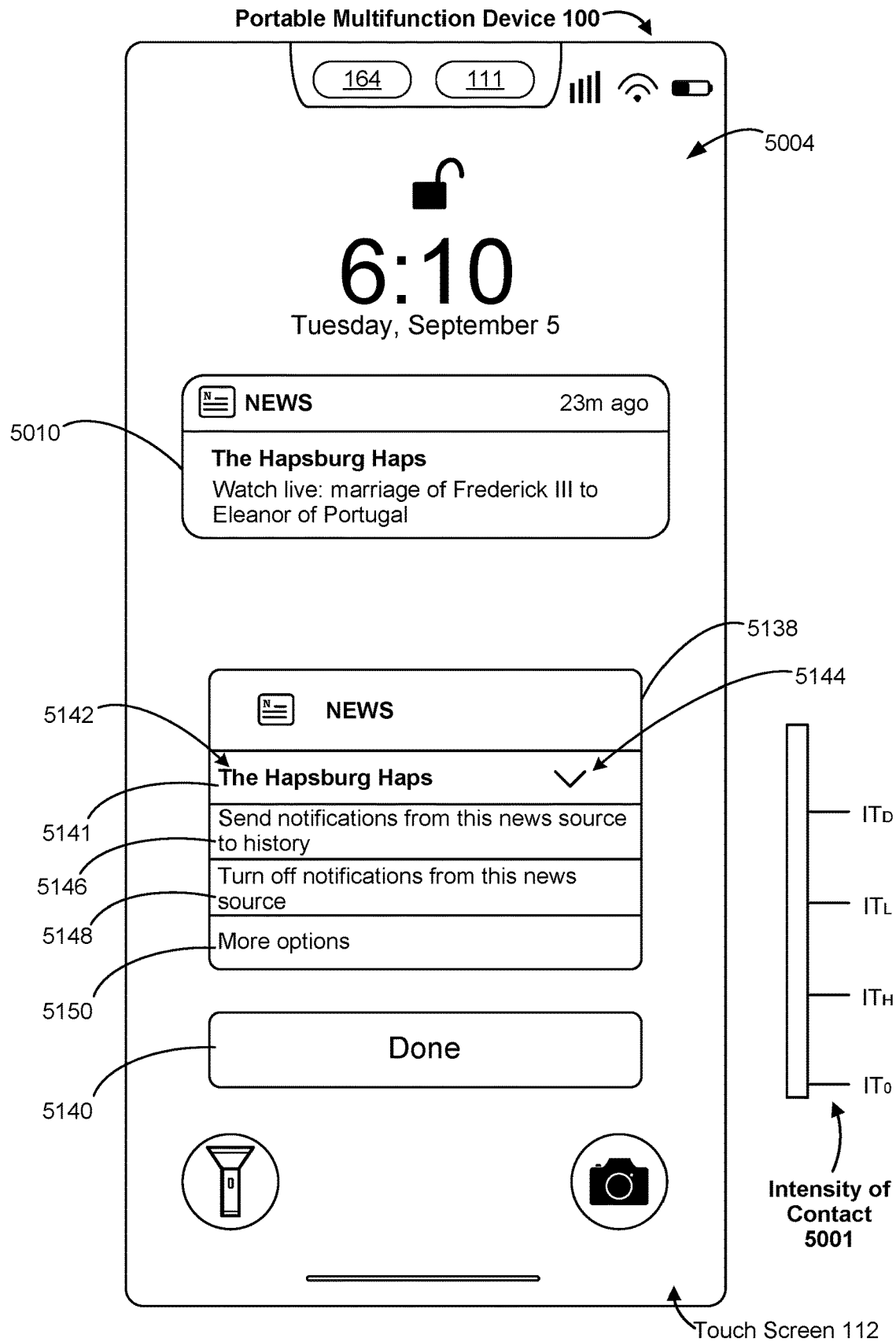
Figure 5A:
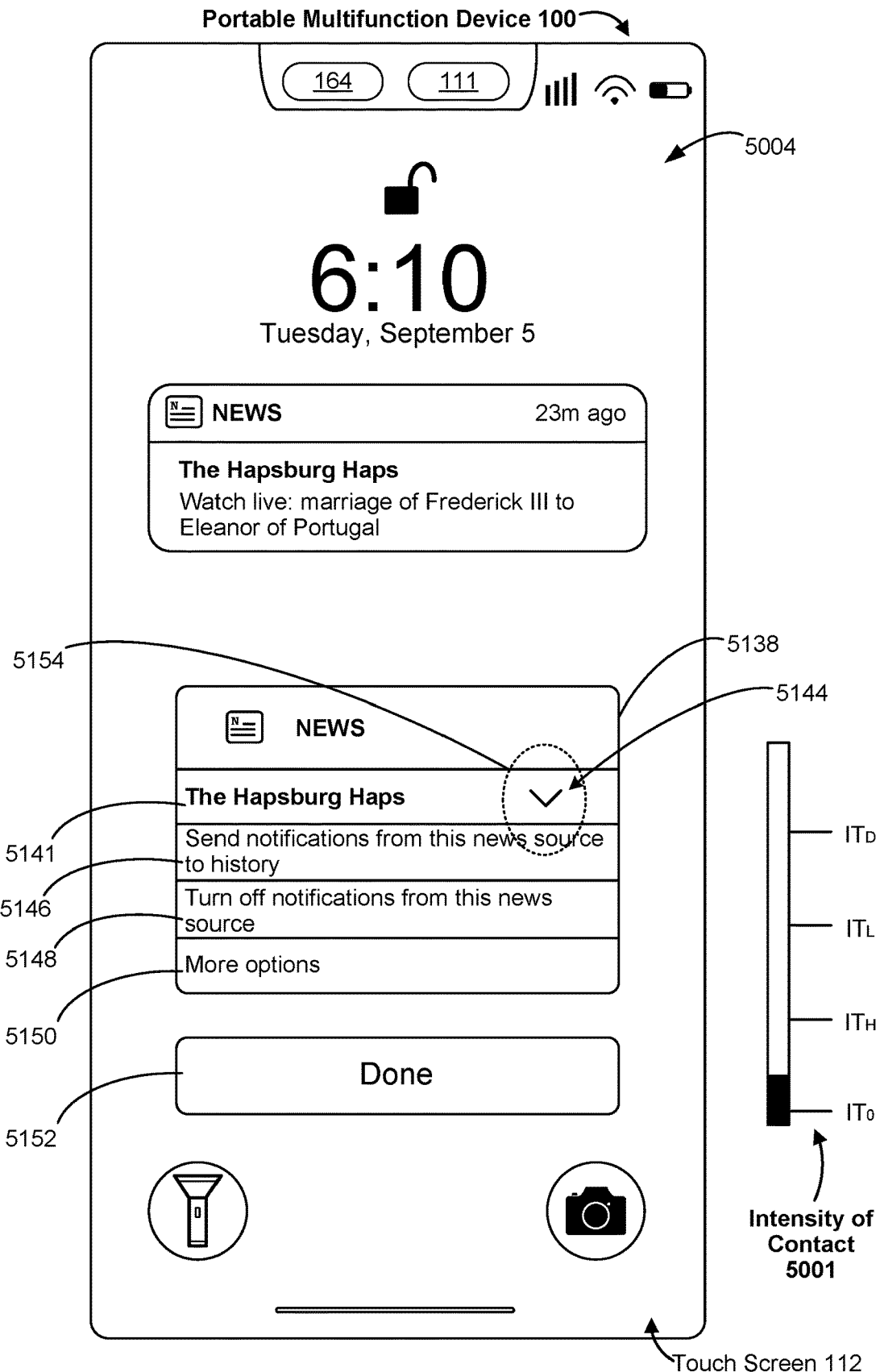
Figure 5A:
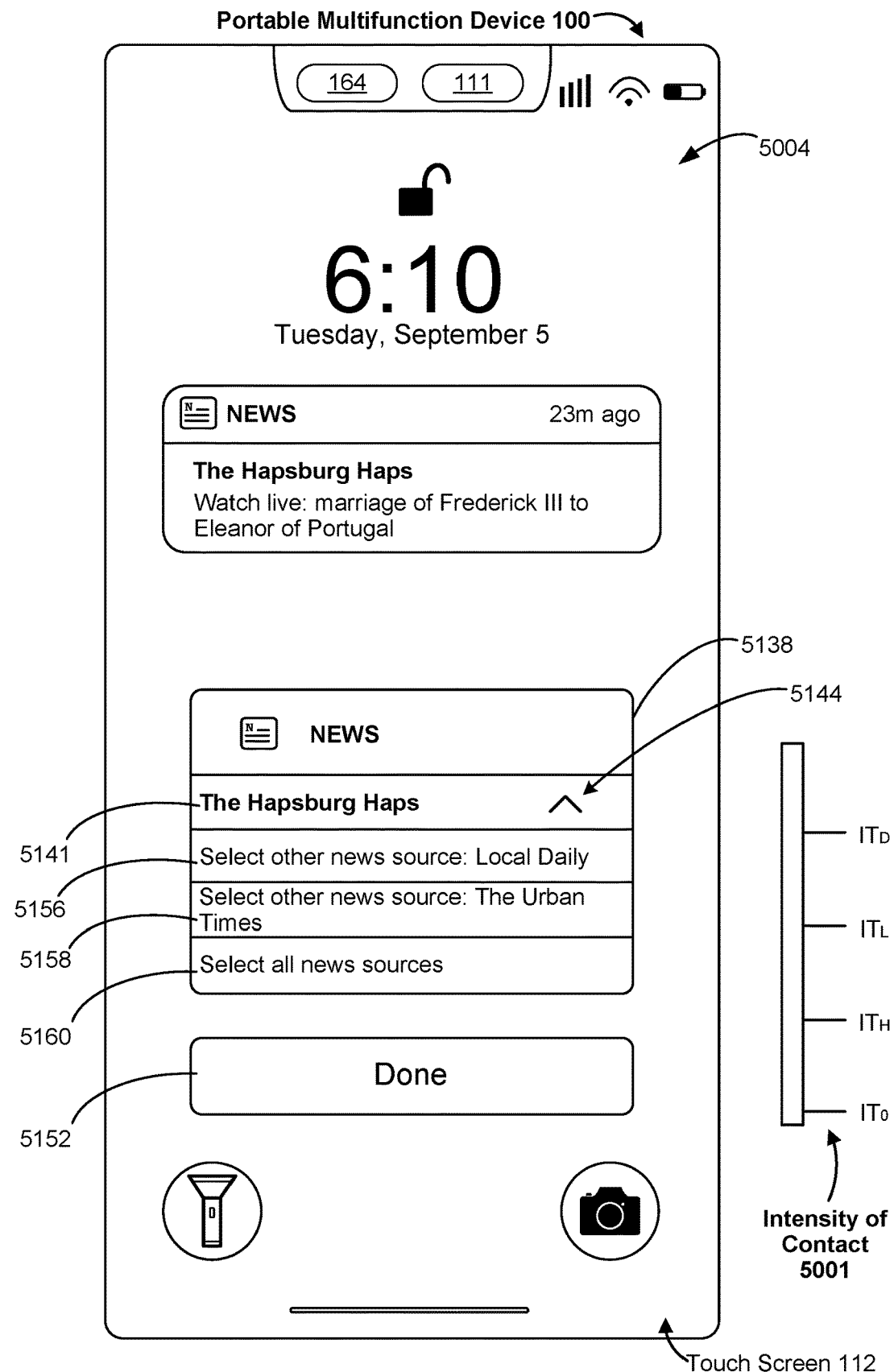
Figure 5A:
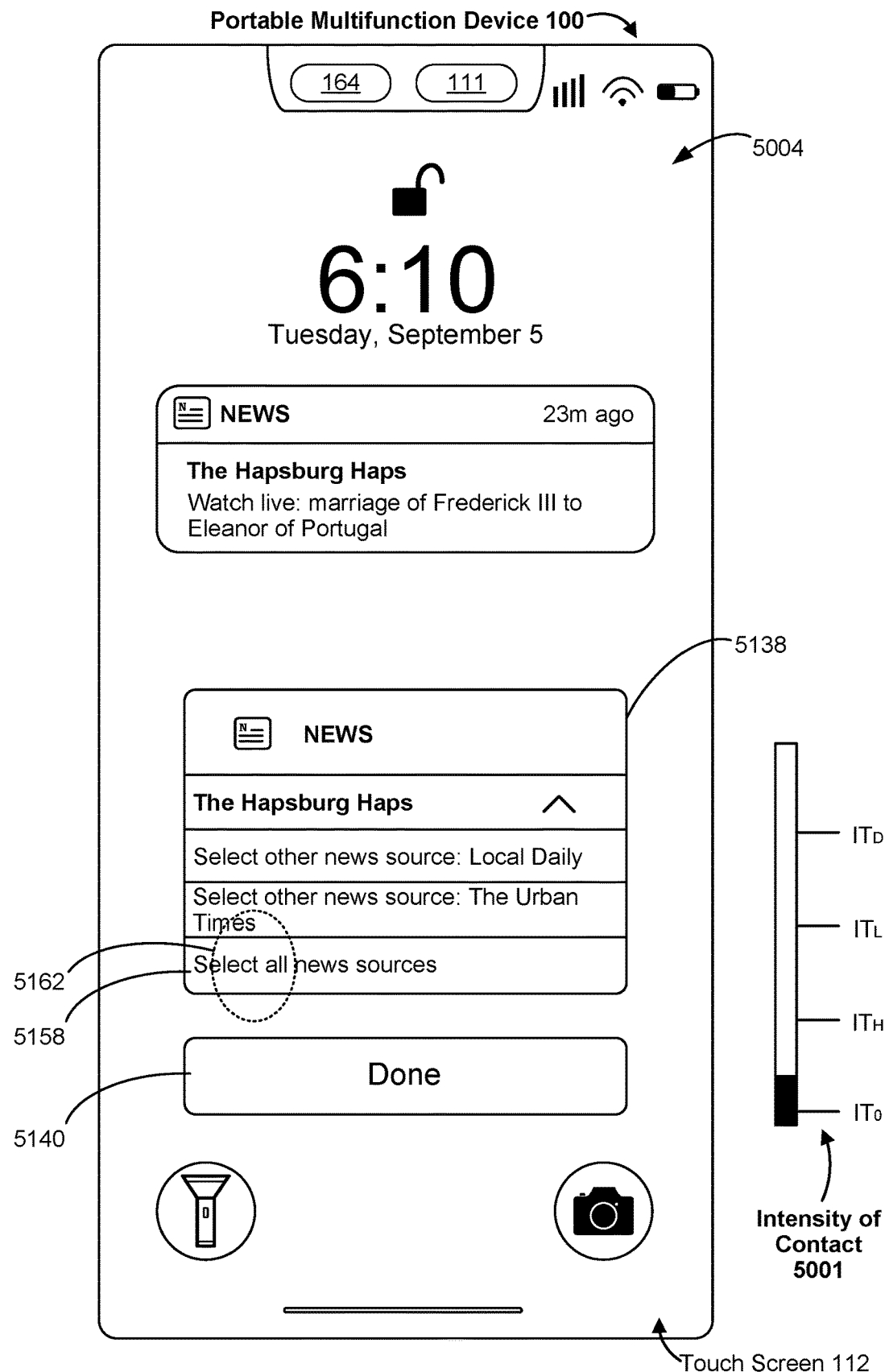
Figure 5A:
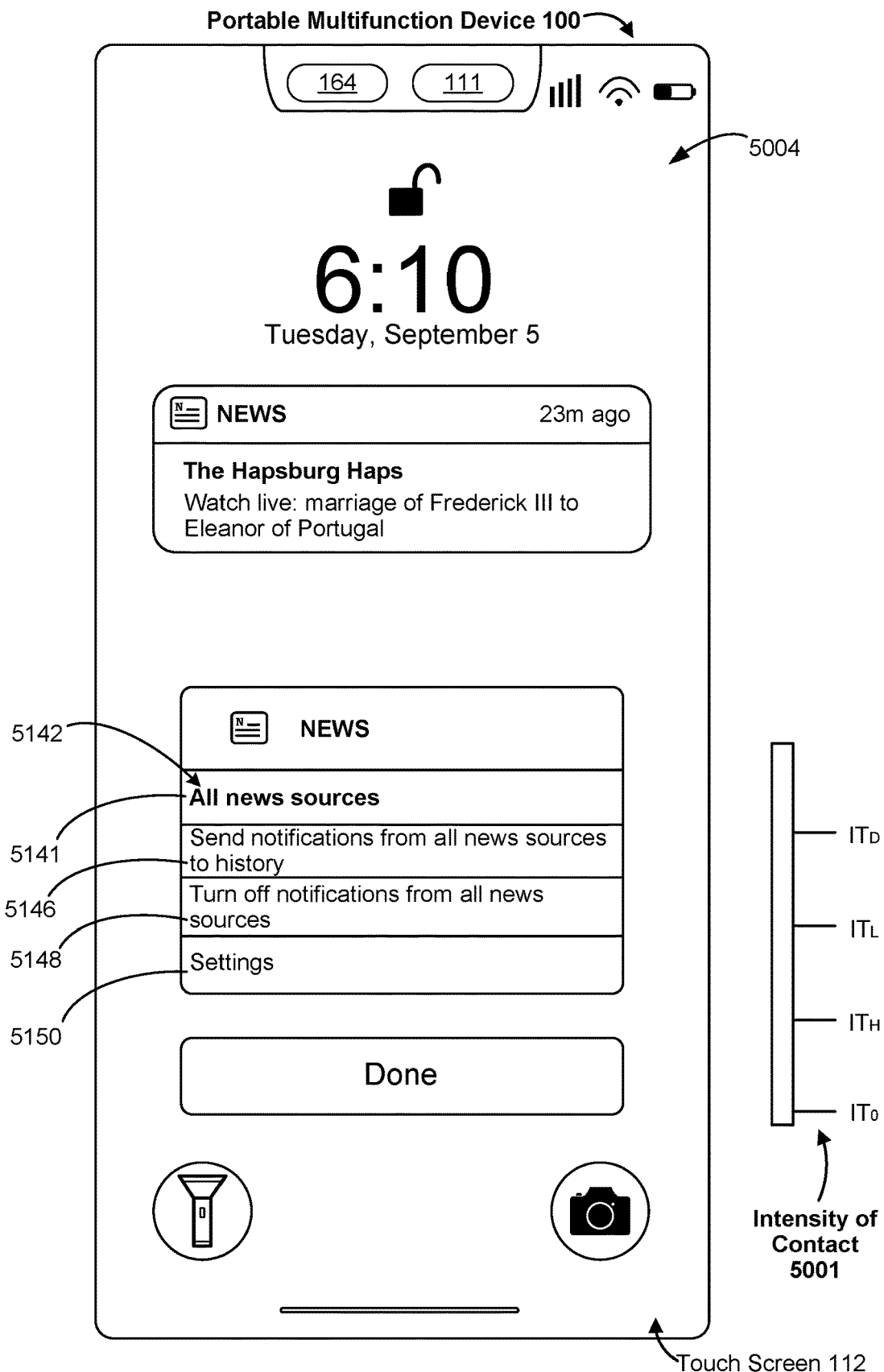
Figure 5A:
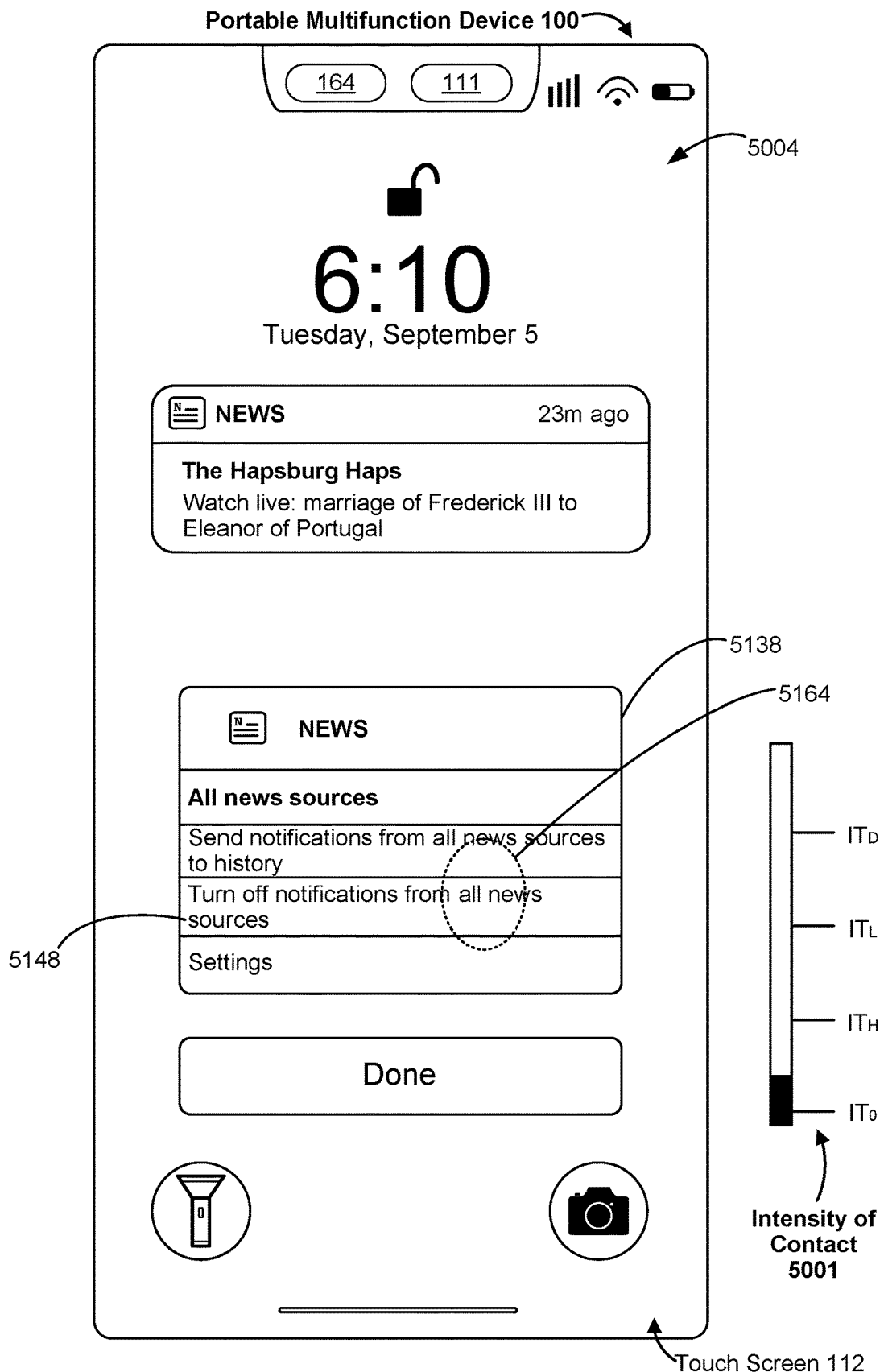
Figure 5A:
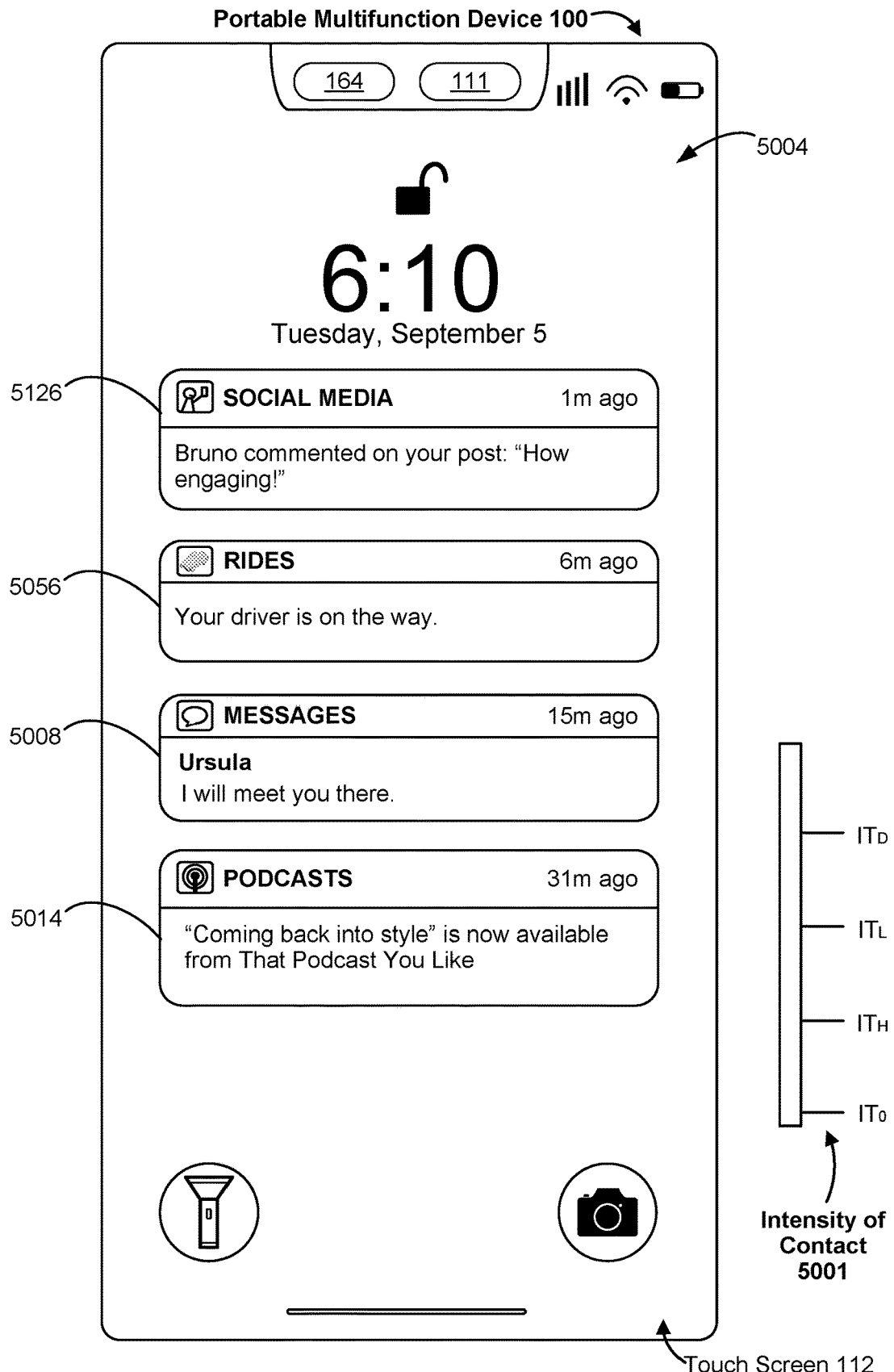
Figure 5A:
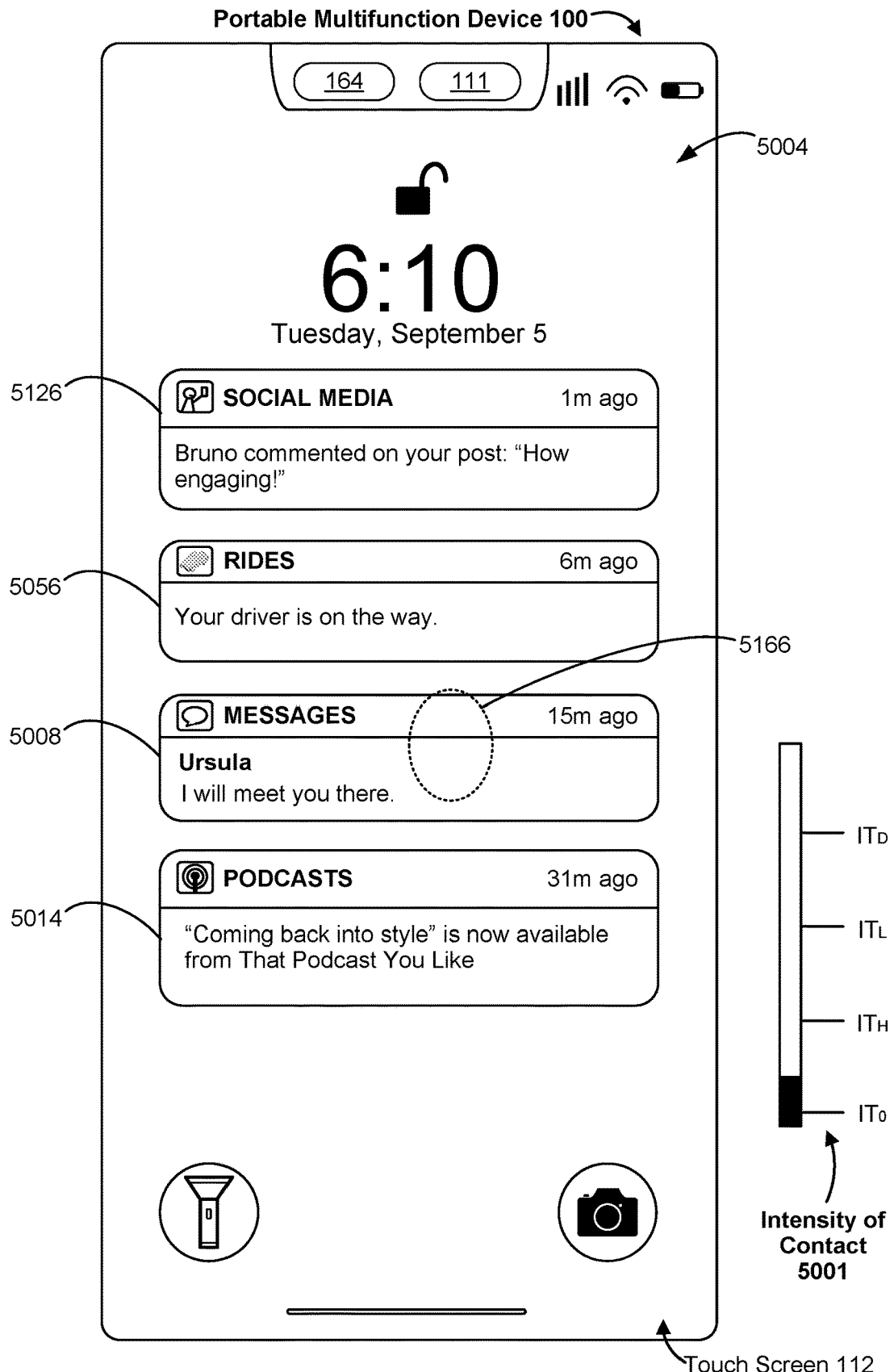
Figure 5A:
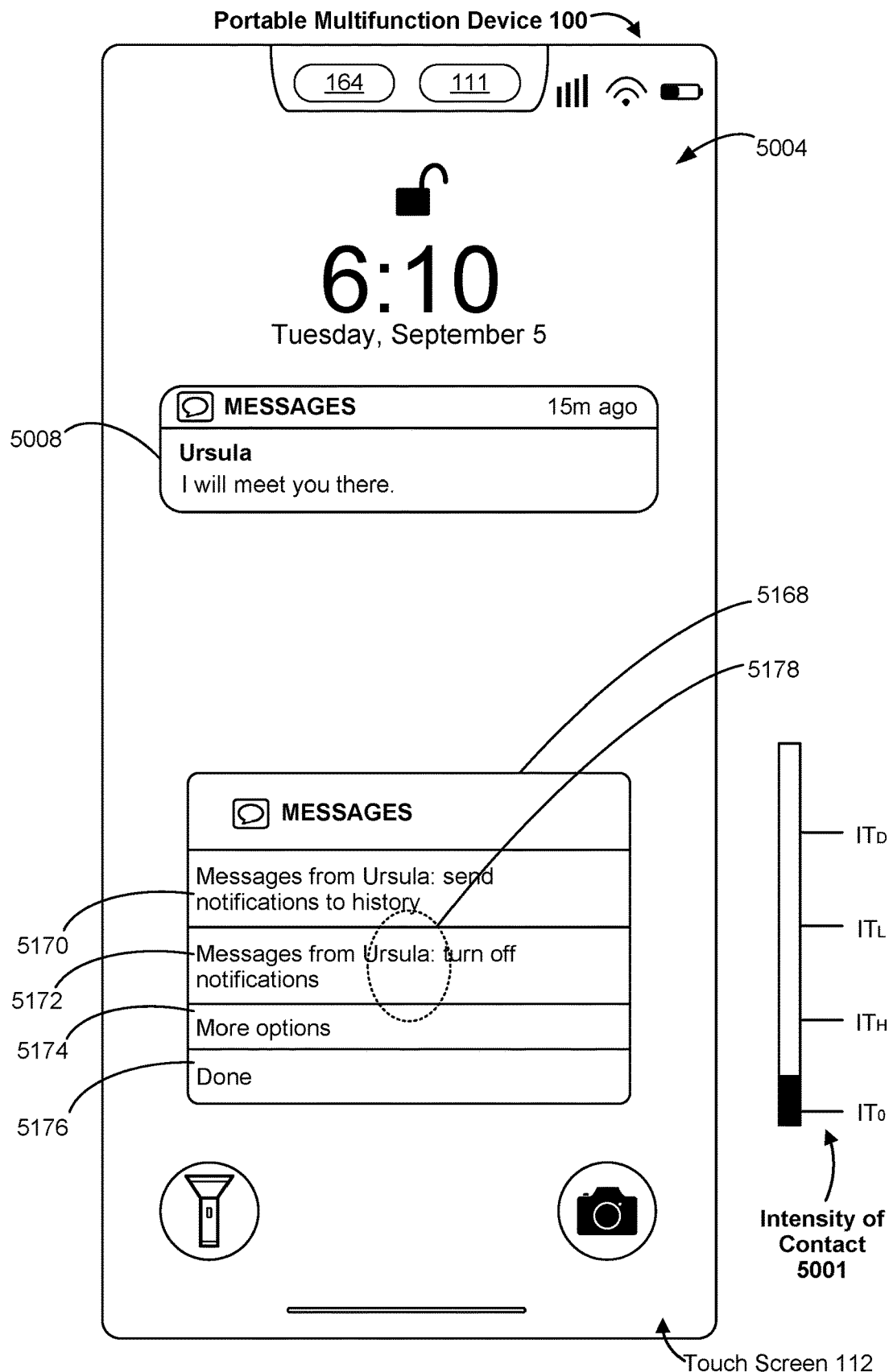
Figure 5A:
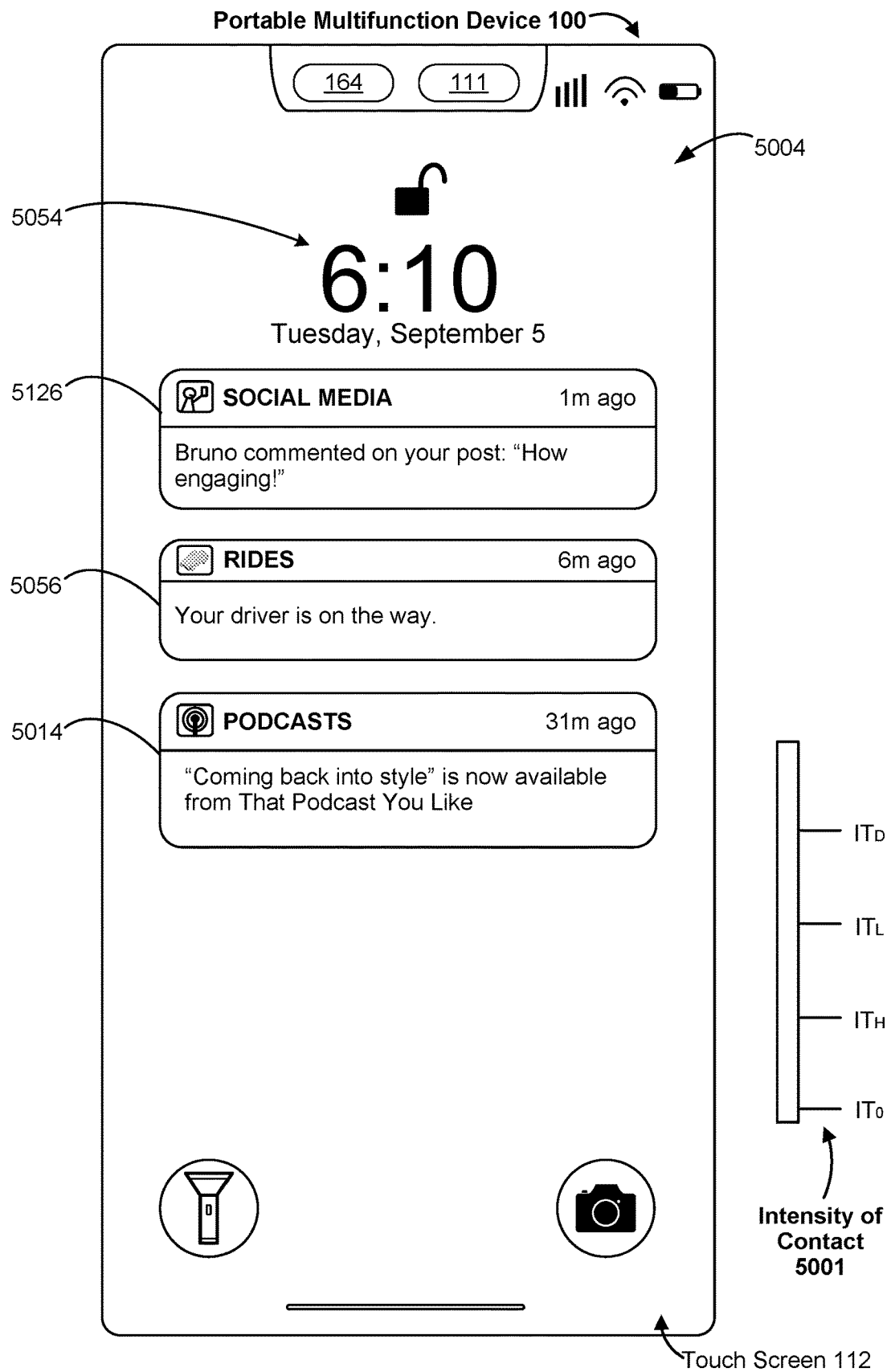
Figure 5A:
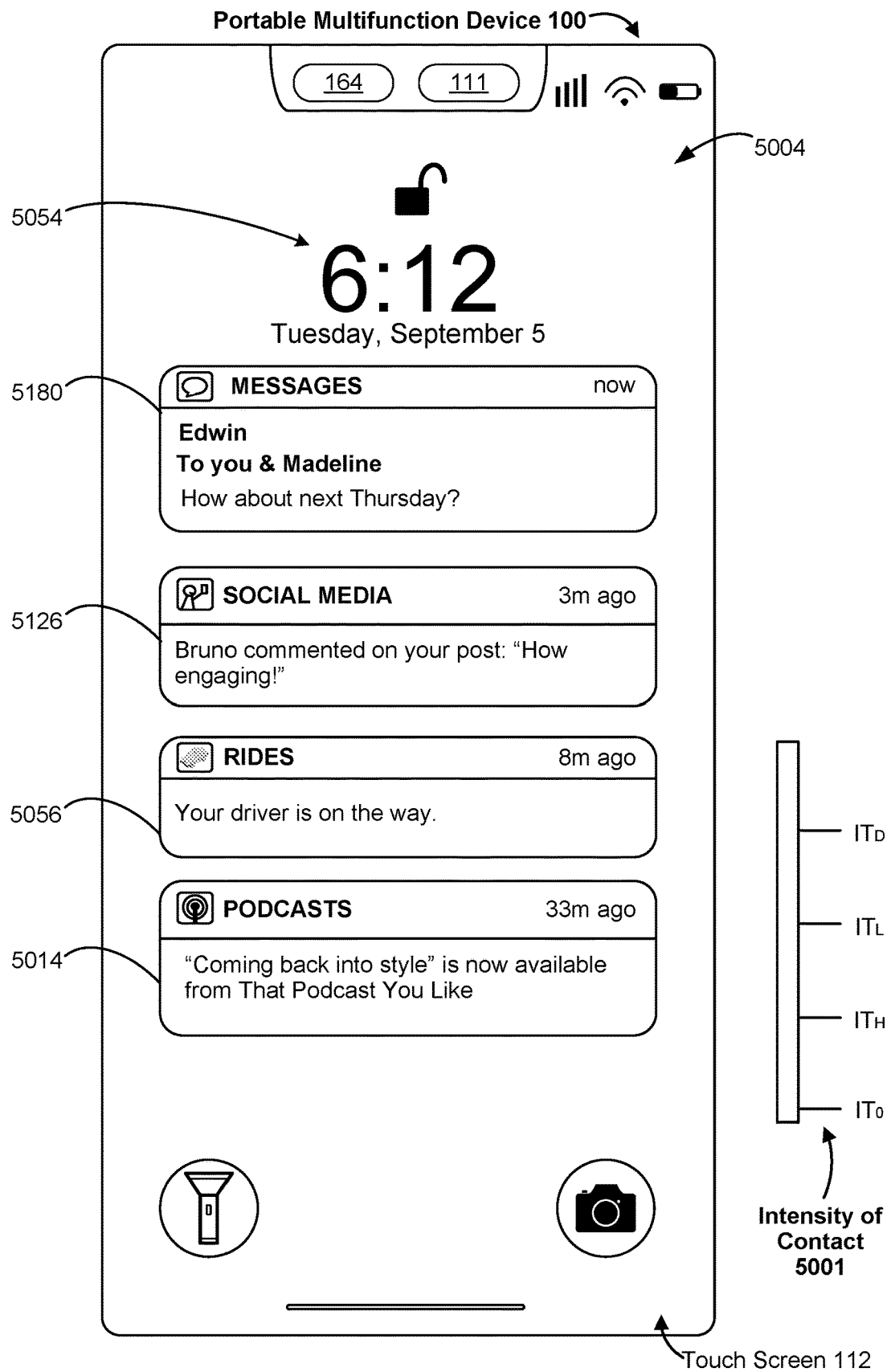
Figure 5A:
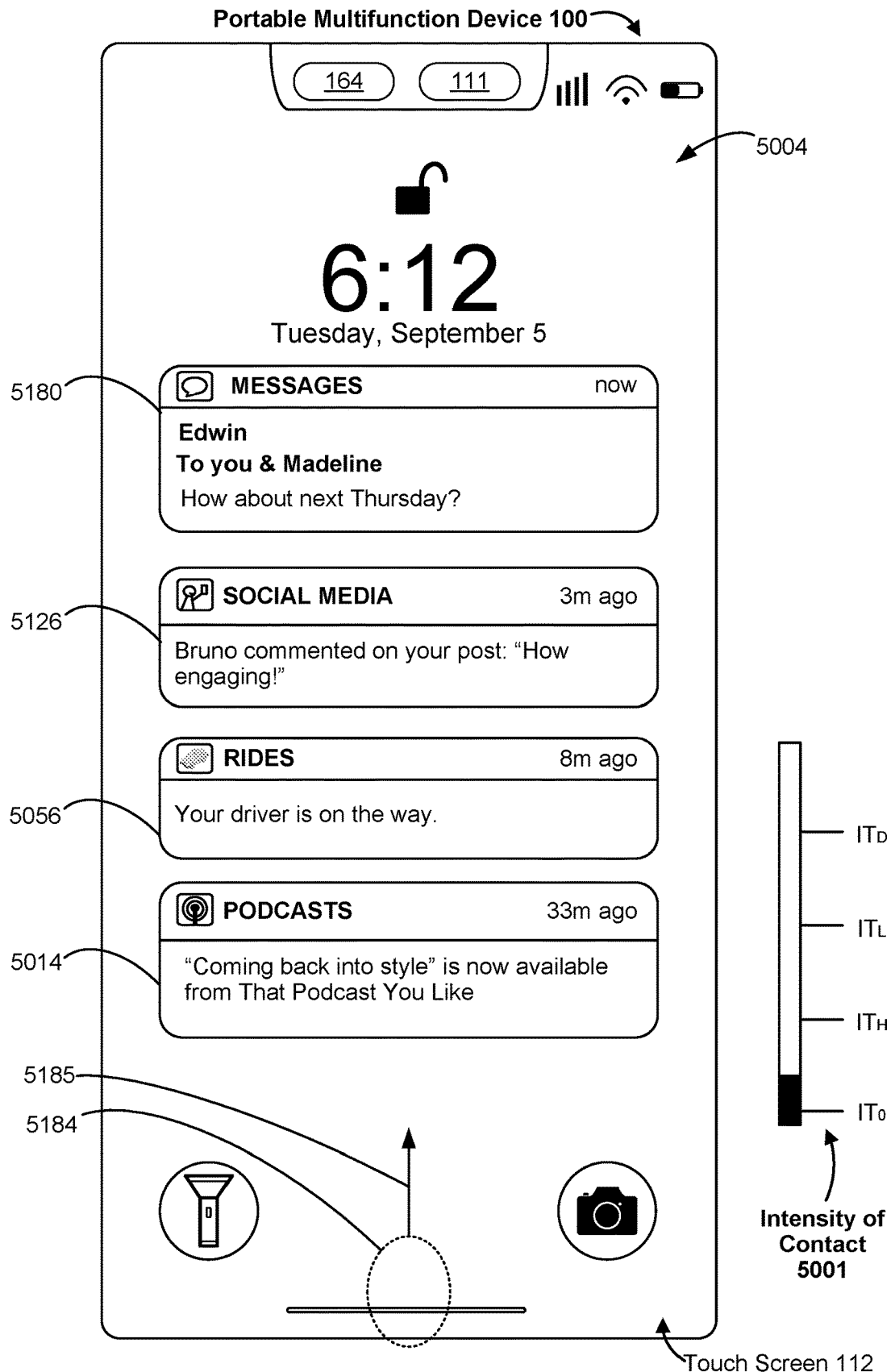
Figure 5A:
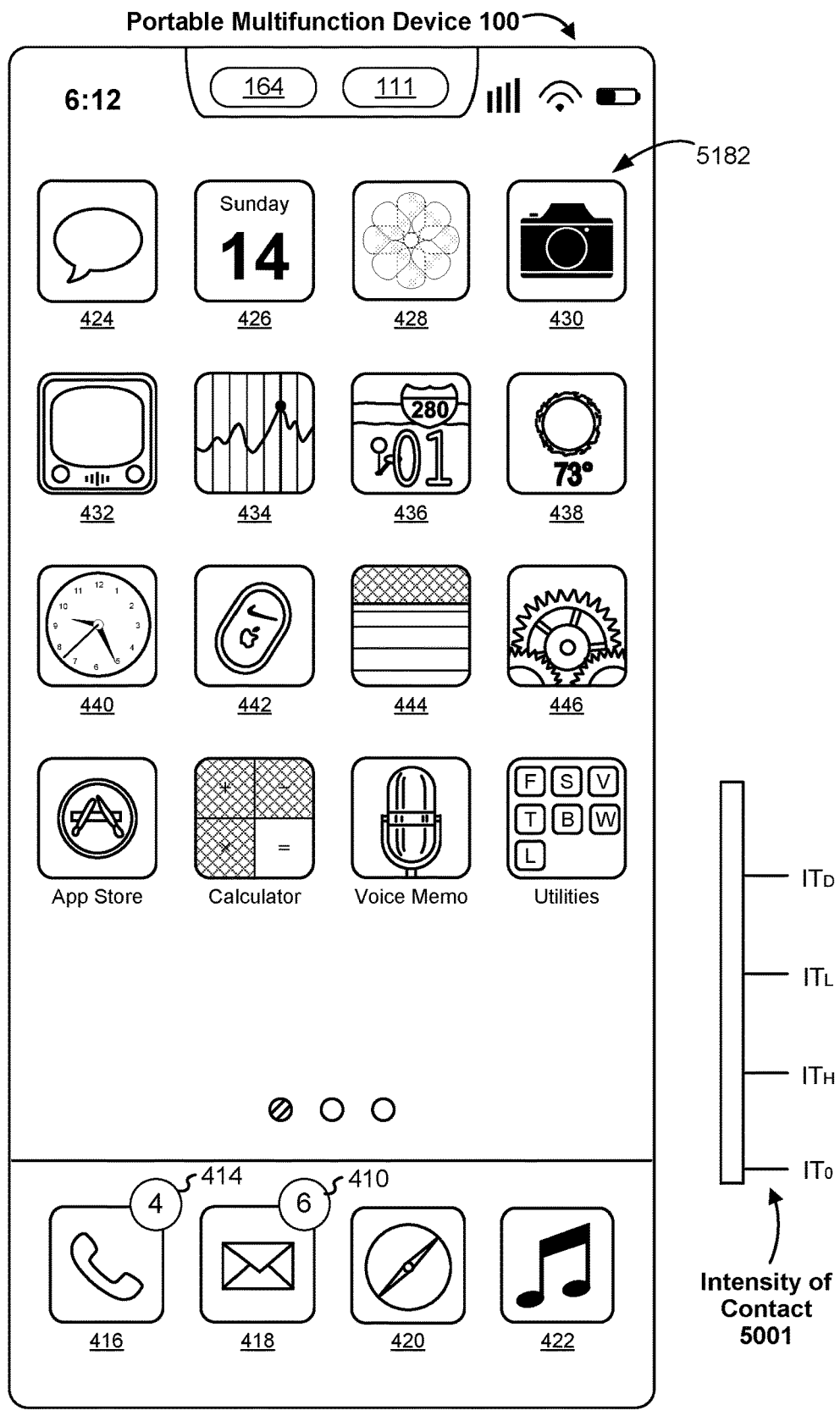
Figure 5A:
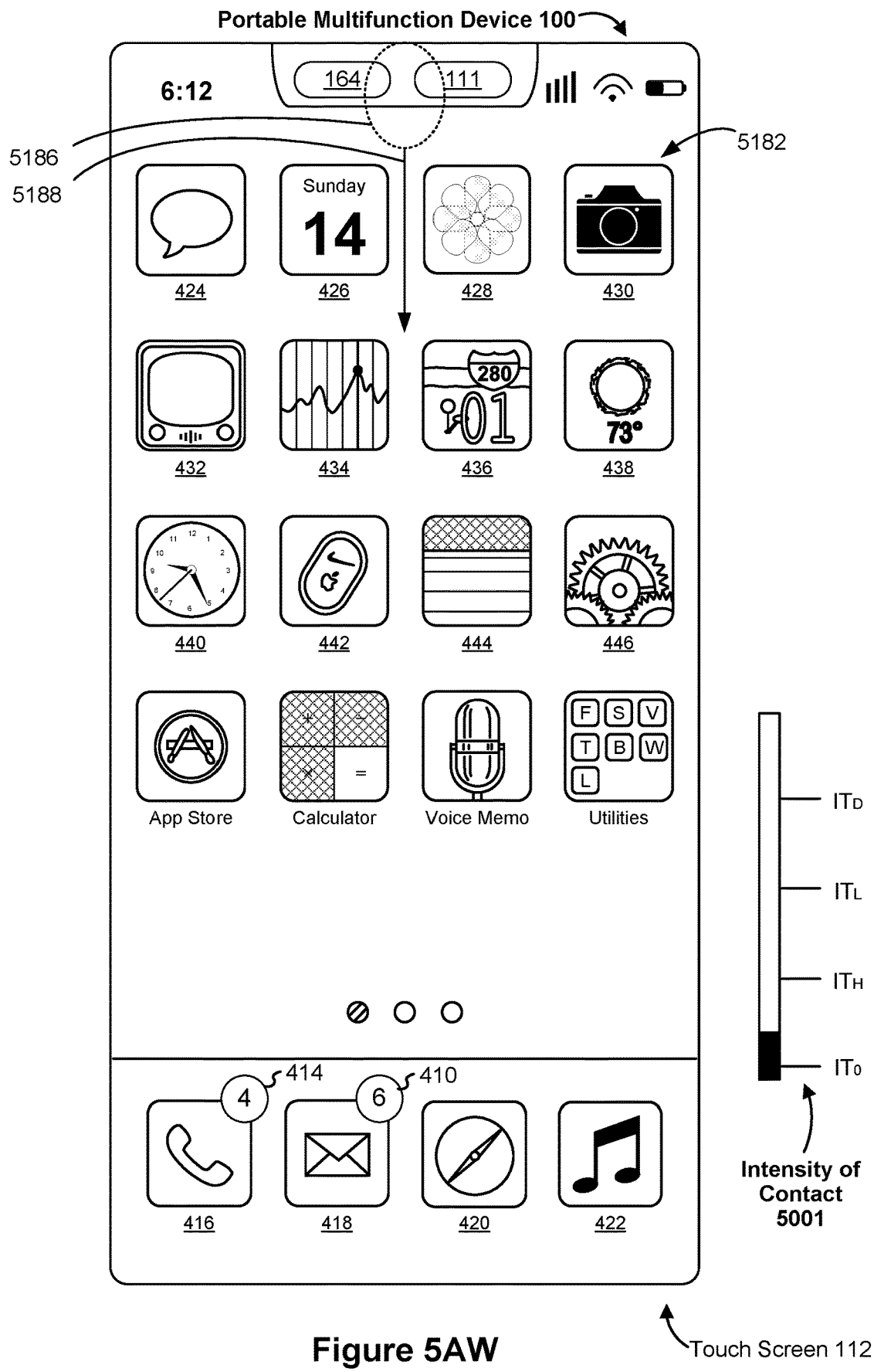
Figure 5A:
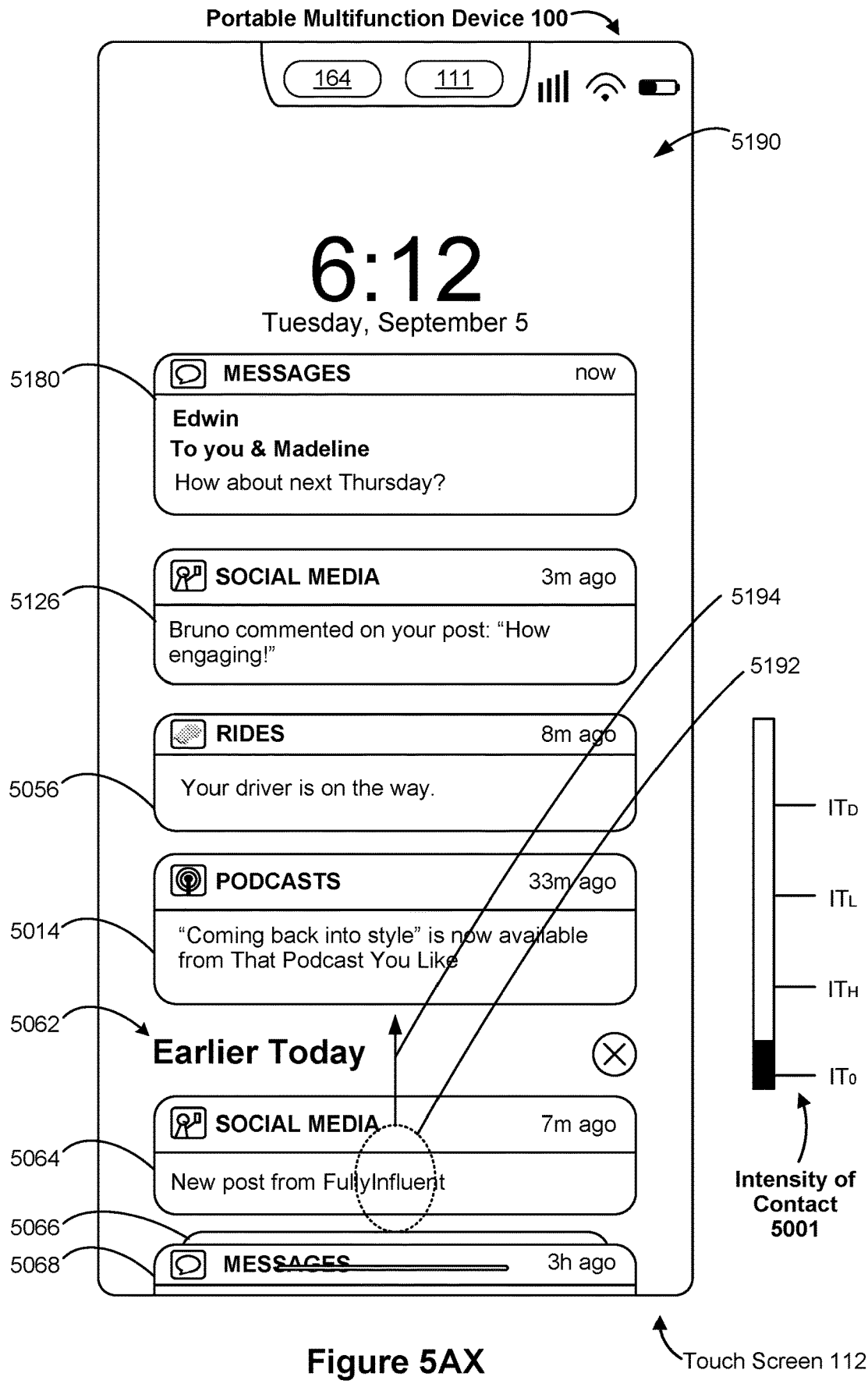
Figure 5A:
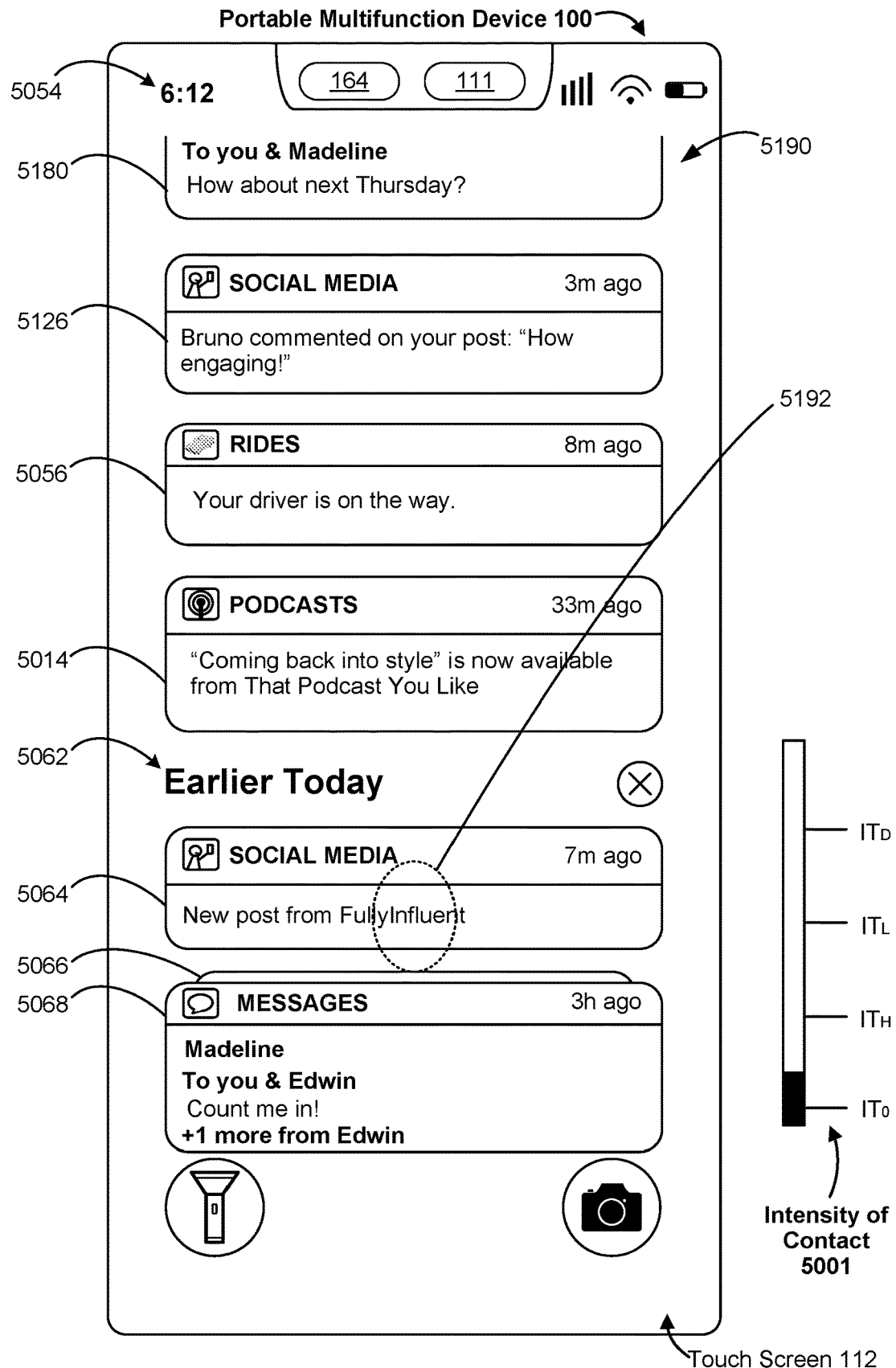
Figure 5A:
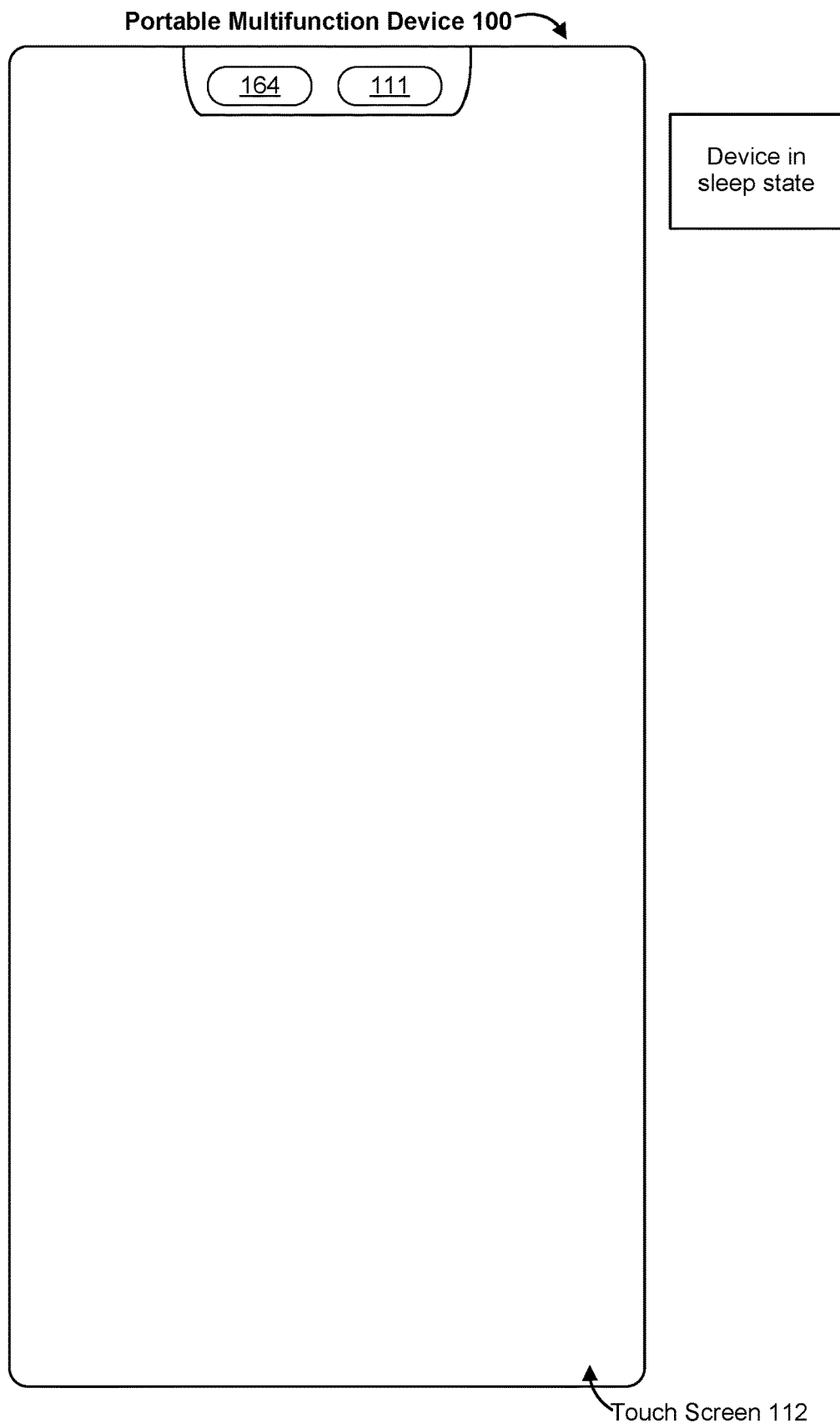
Figure 5B:
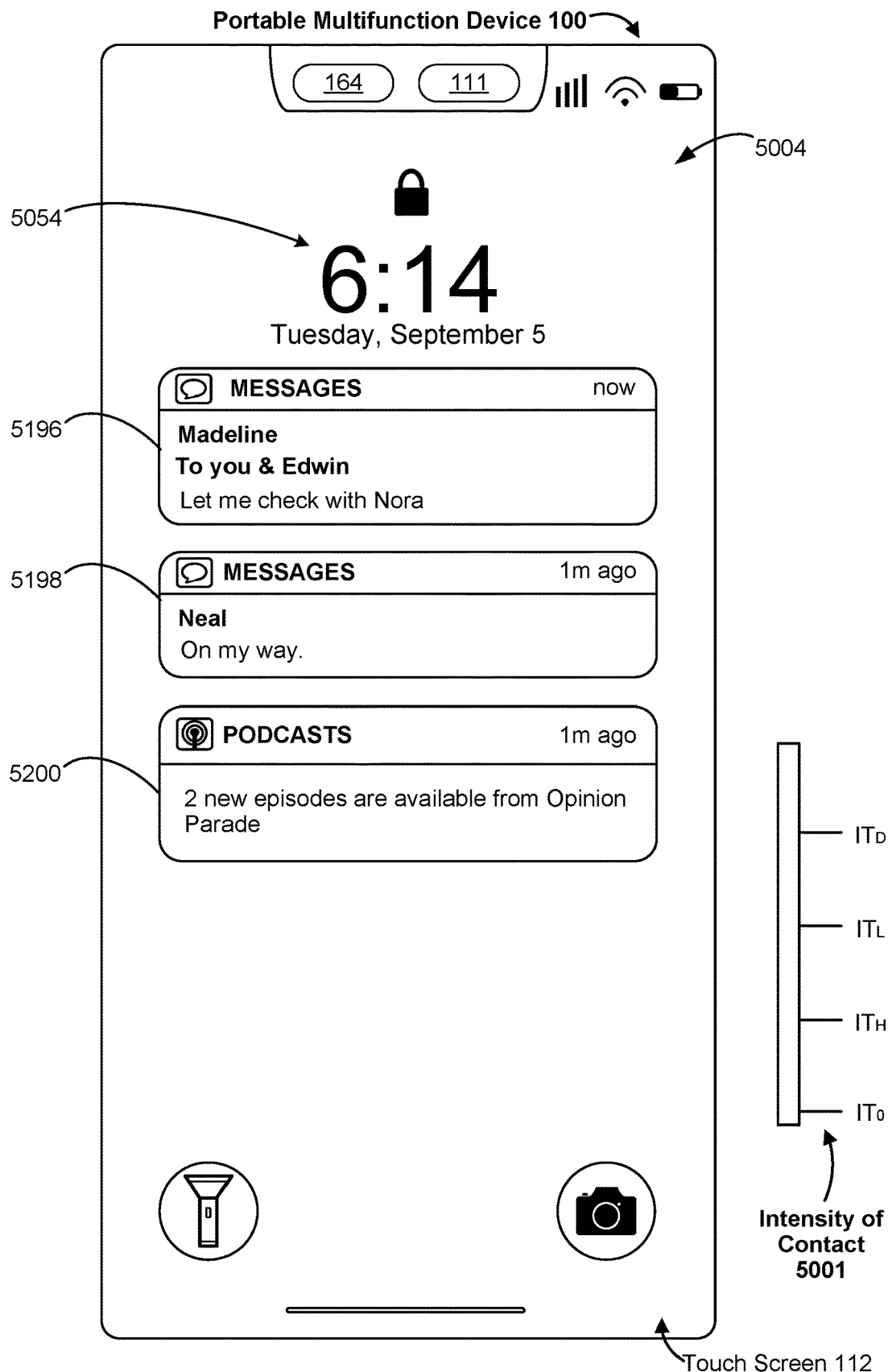
Figure 5B:
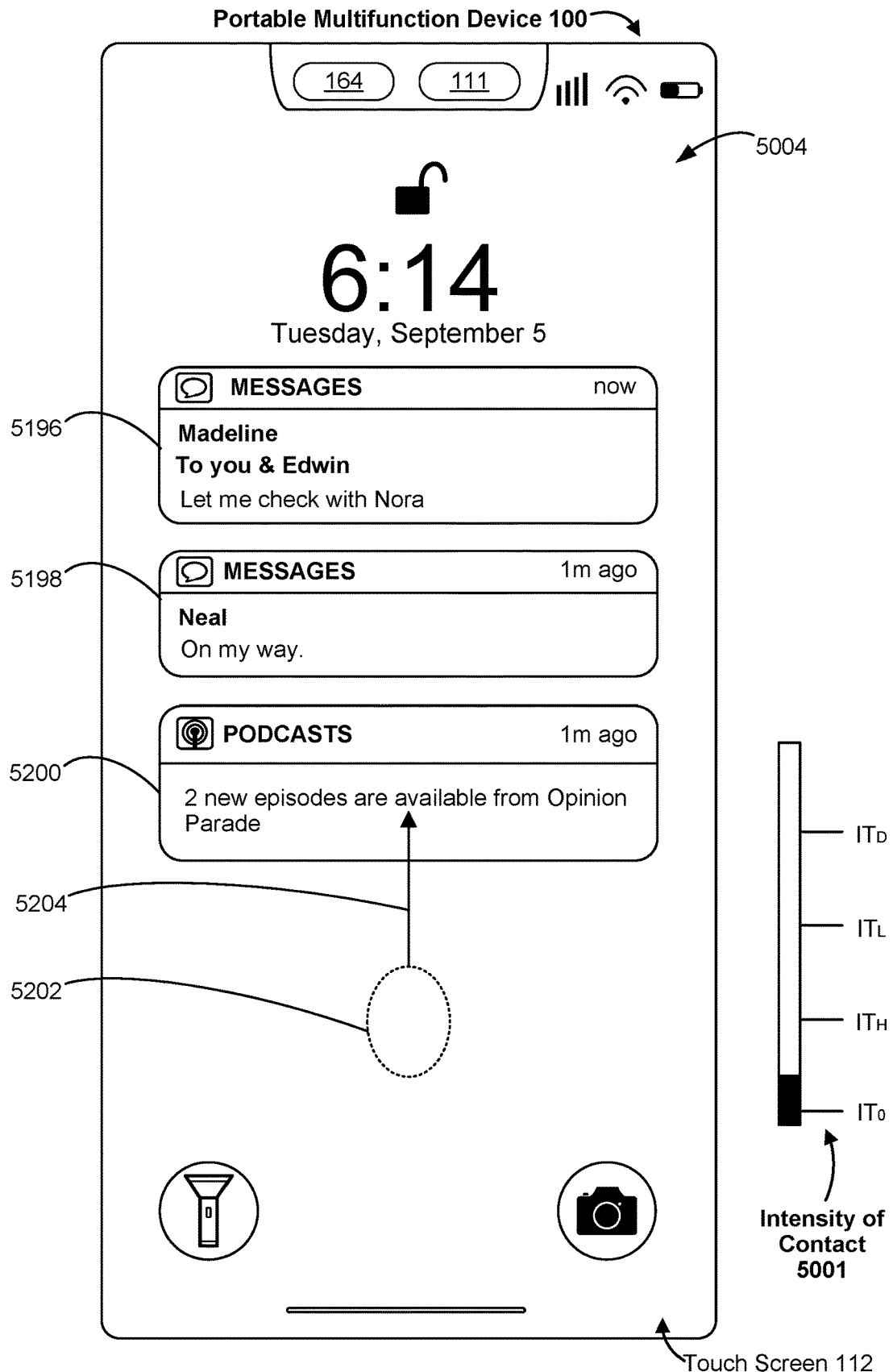
Figure 5B:
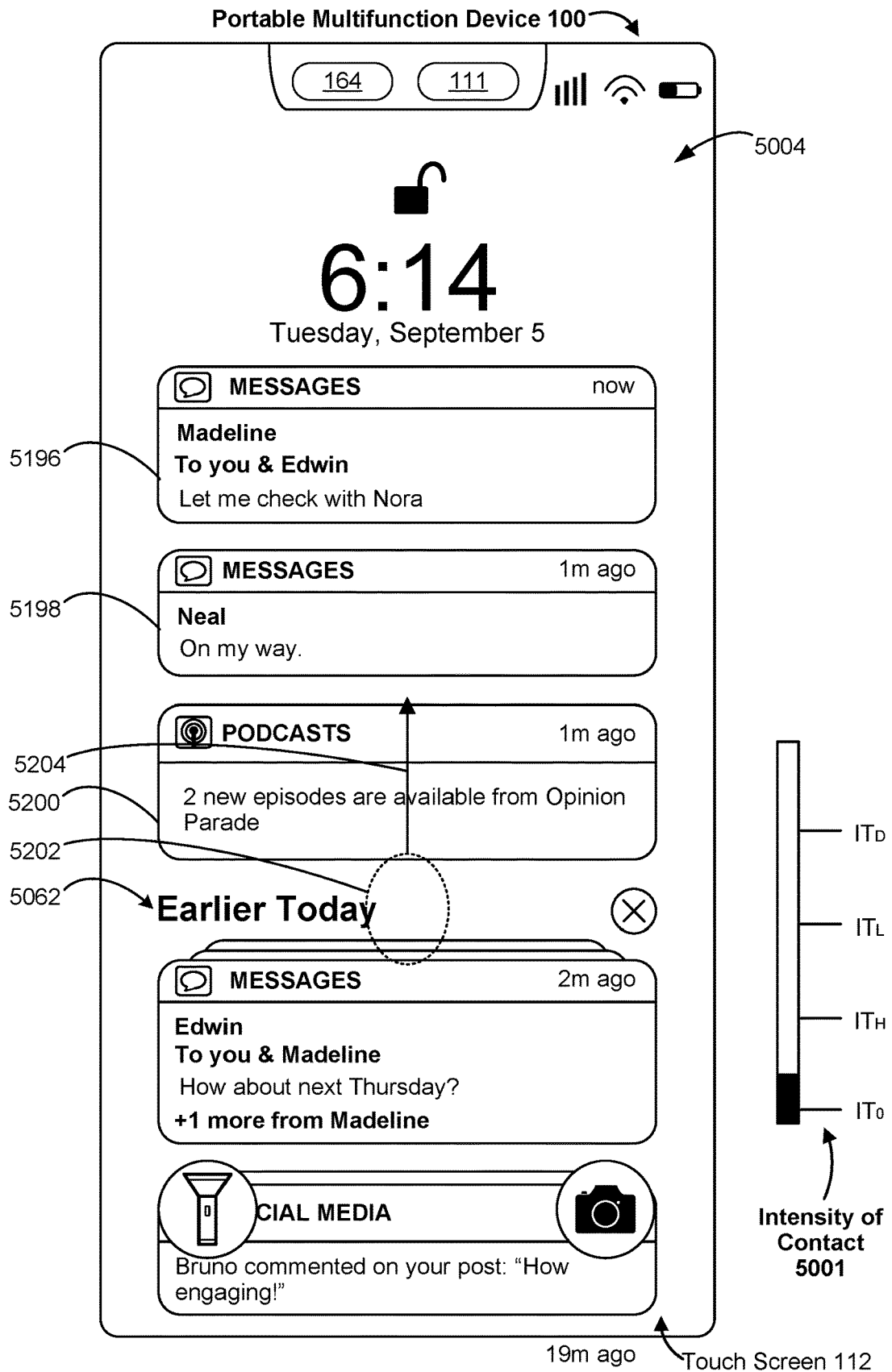
Figure 5B:
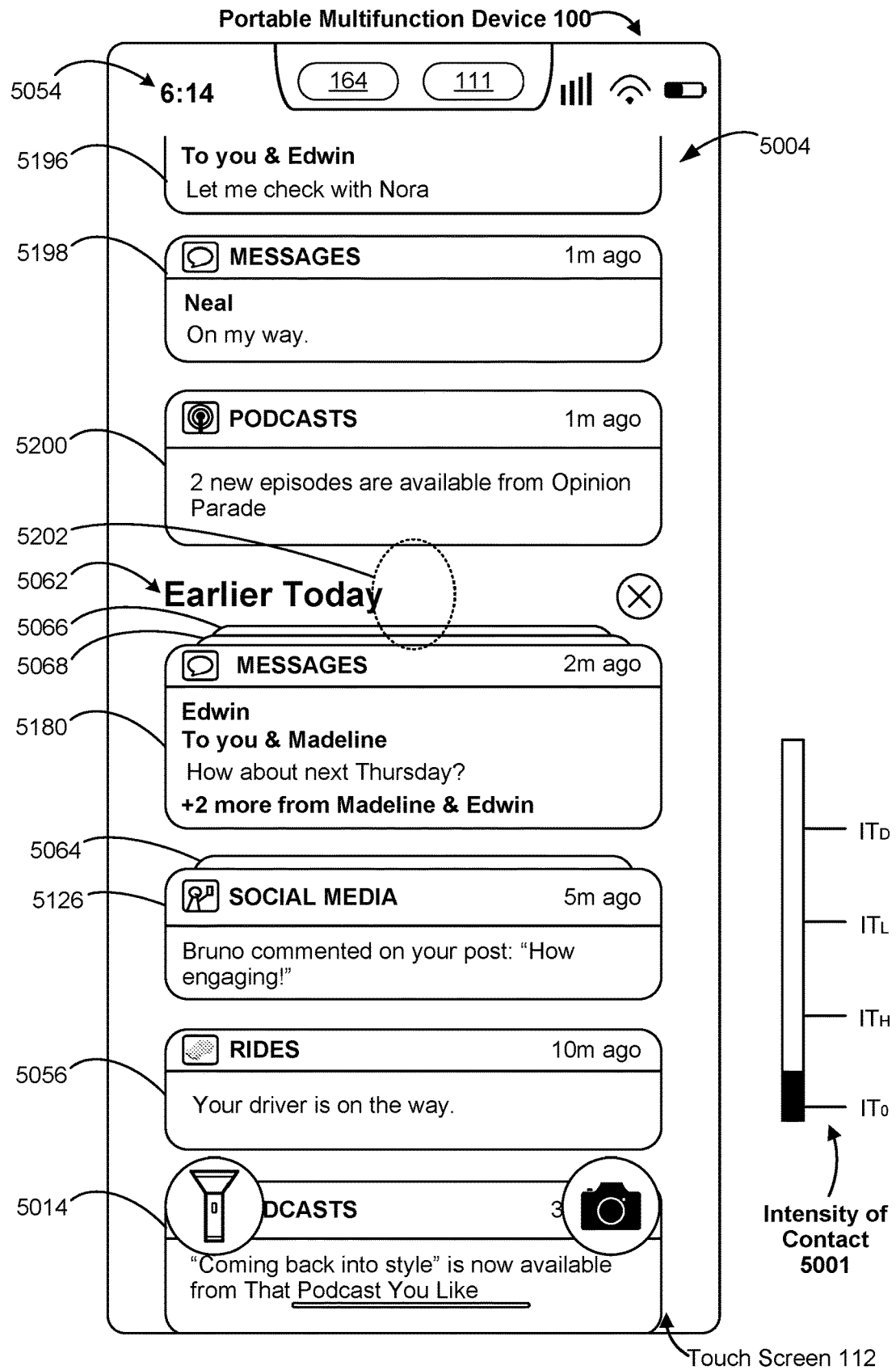
Figure 5B:
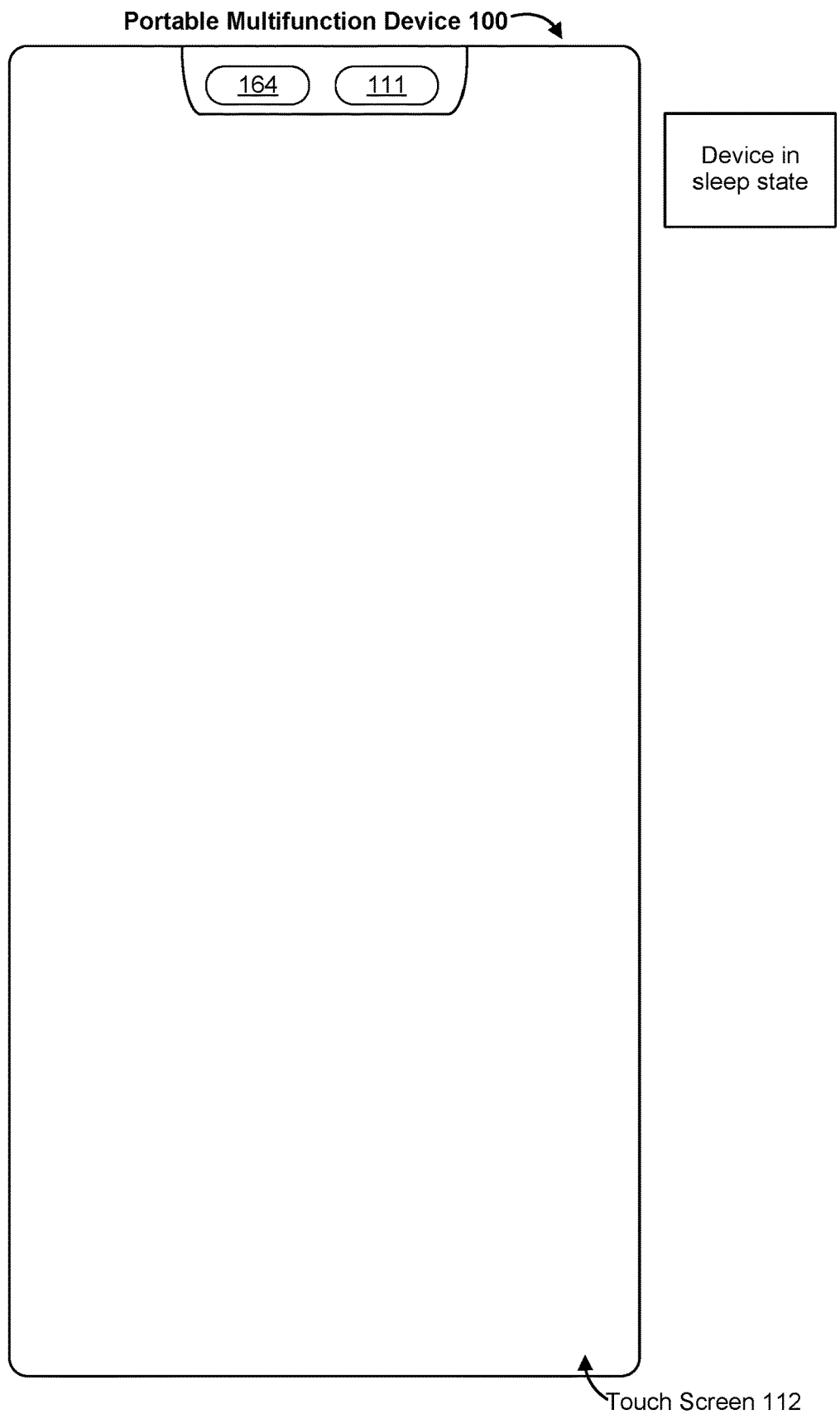
Figure 5B:
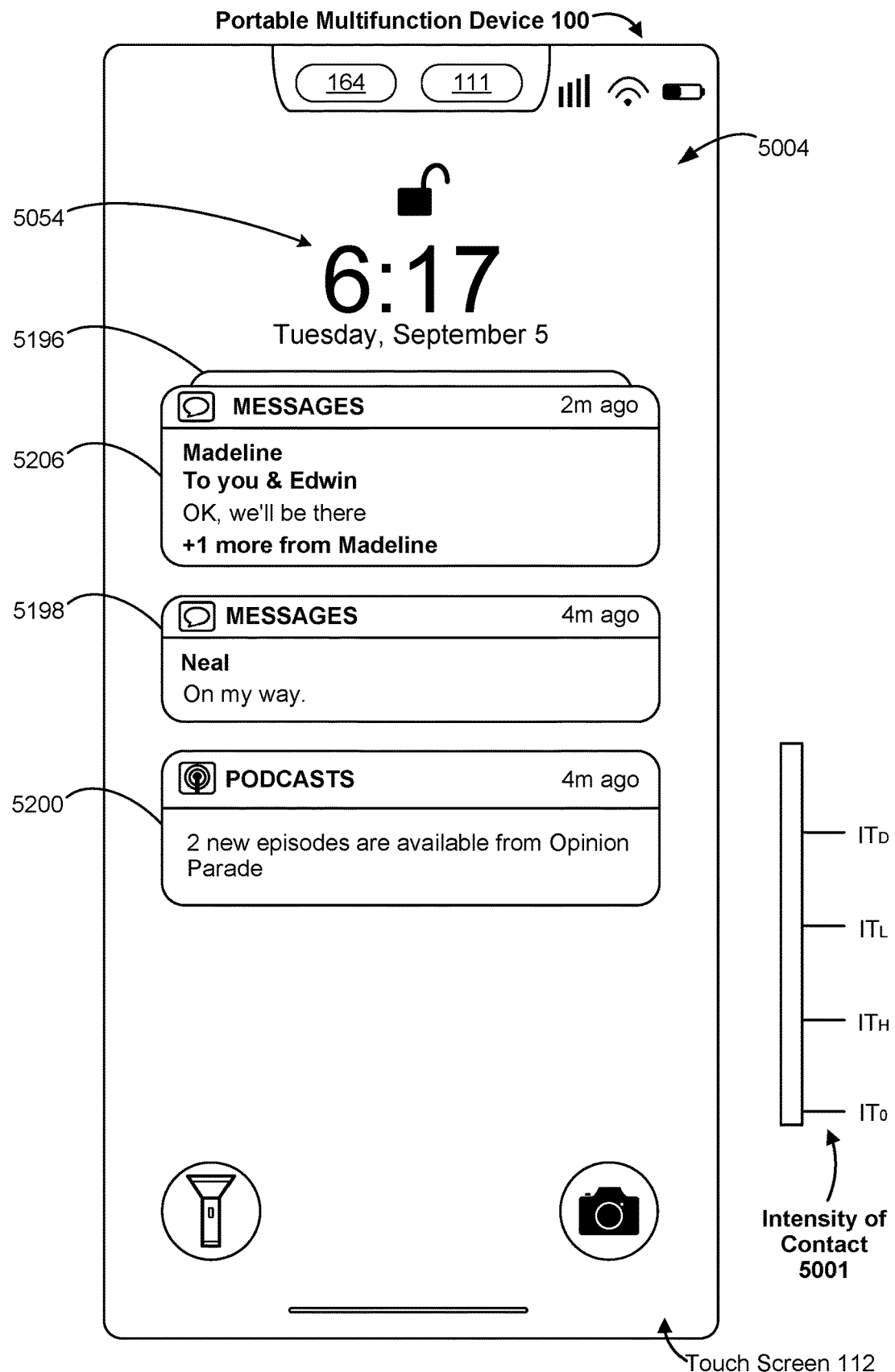
Figure 5B:
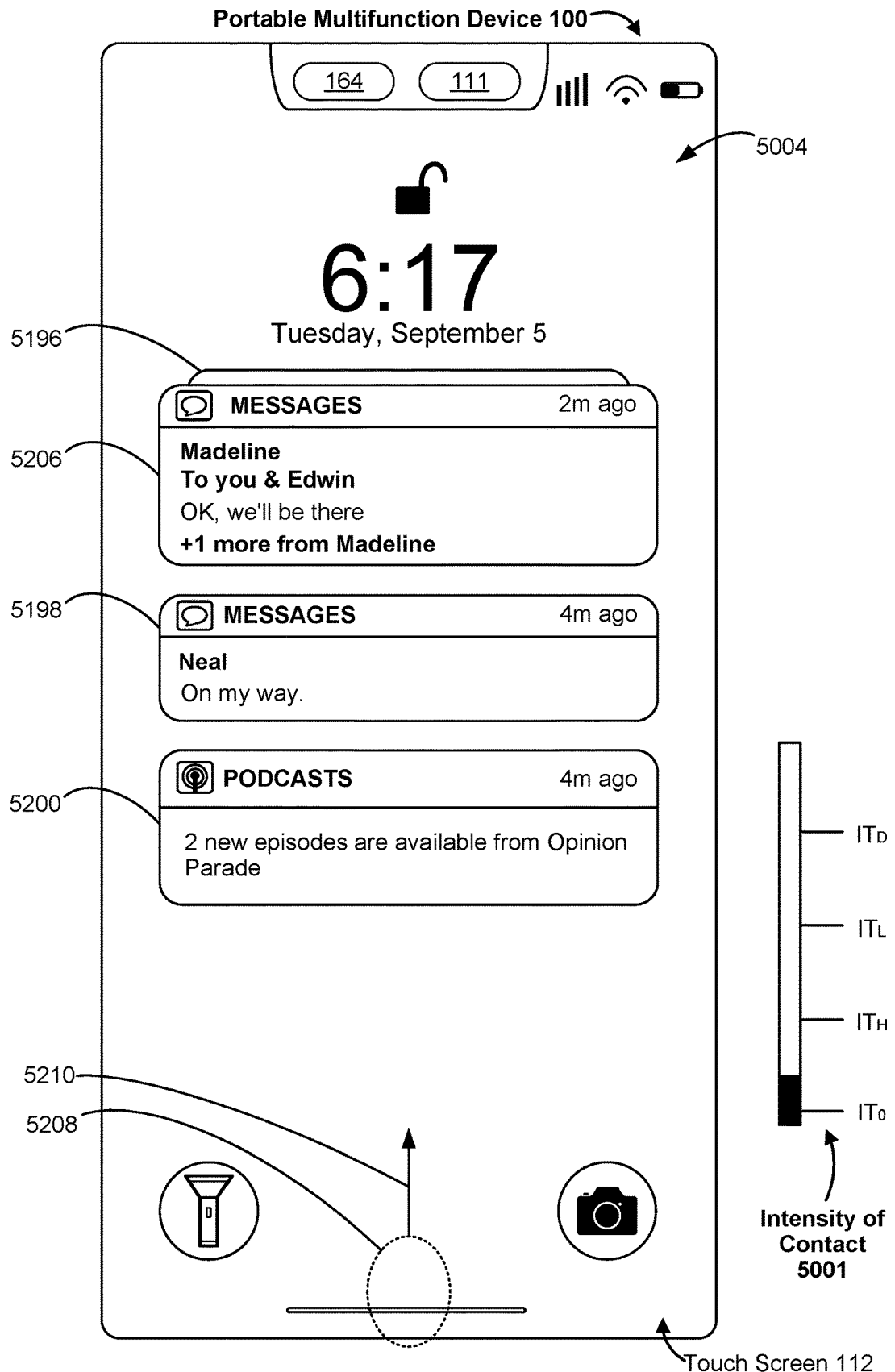
Figure 5B:
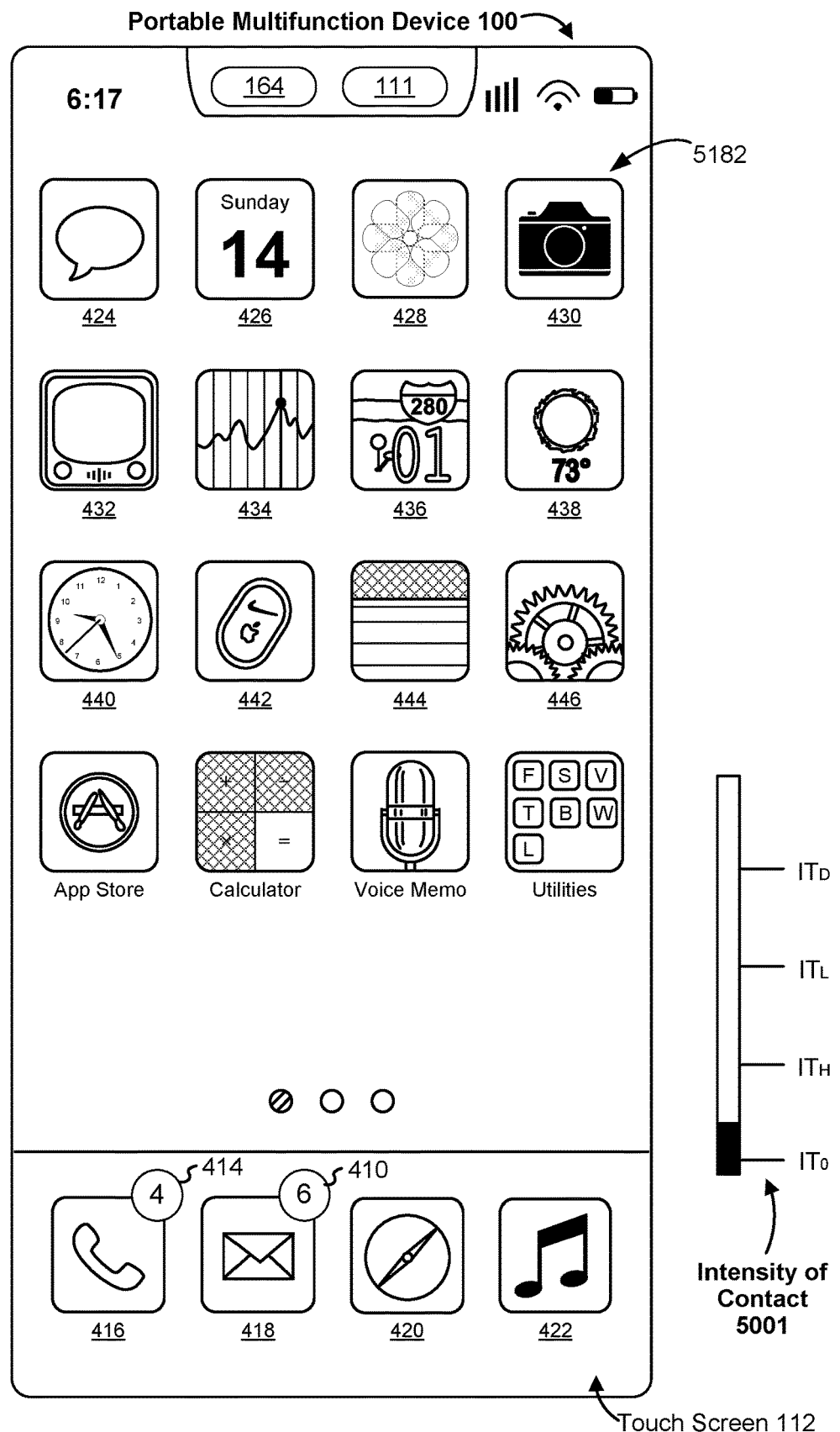
Figure 5B:
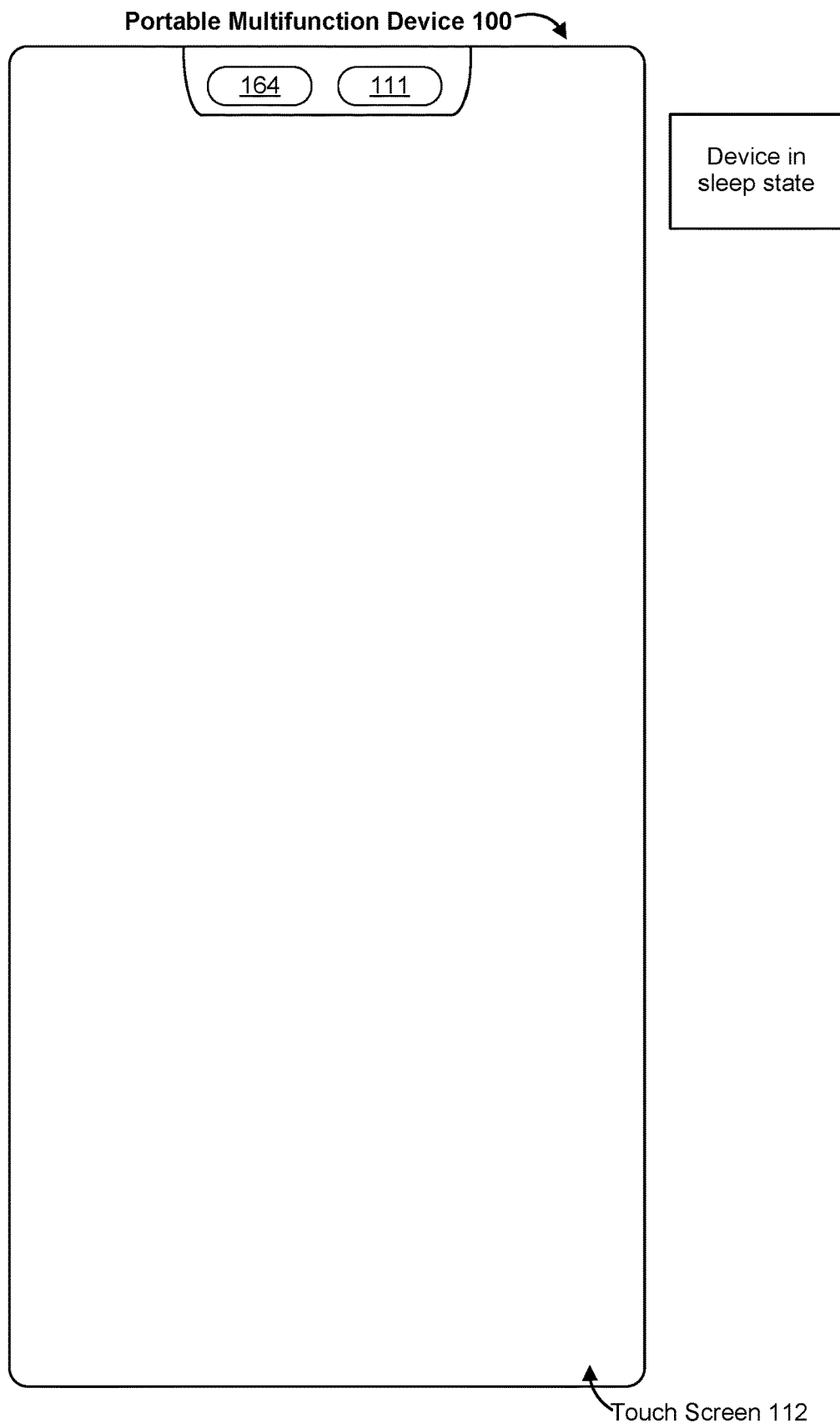
Figure 5B:
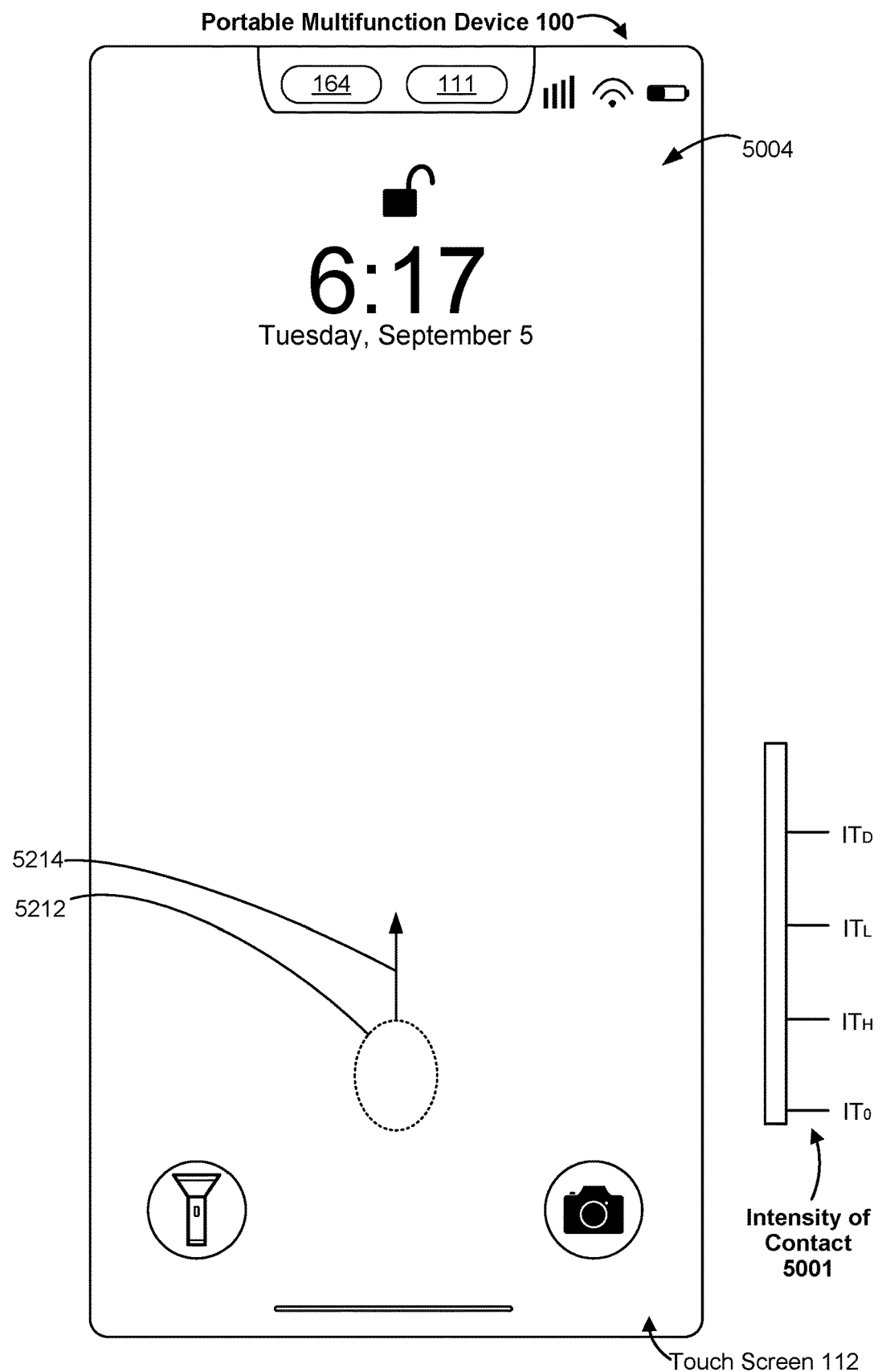
Figure 5B:
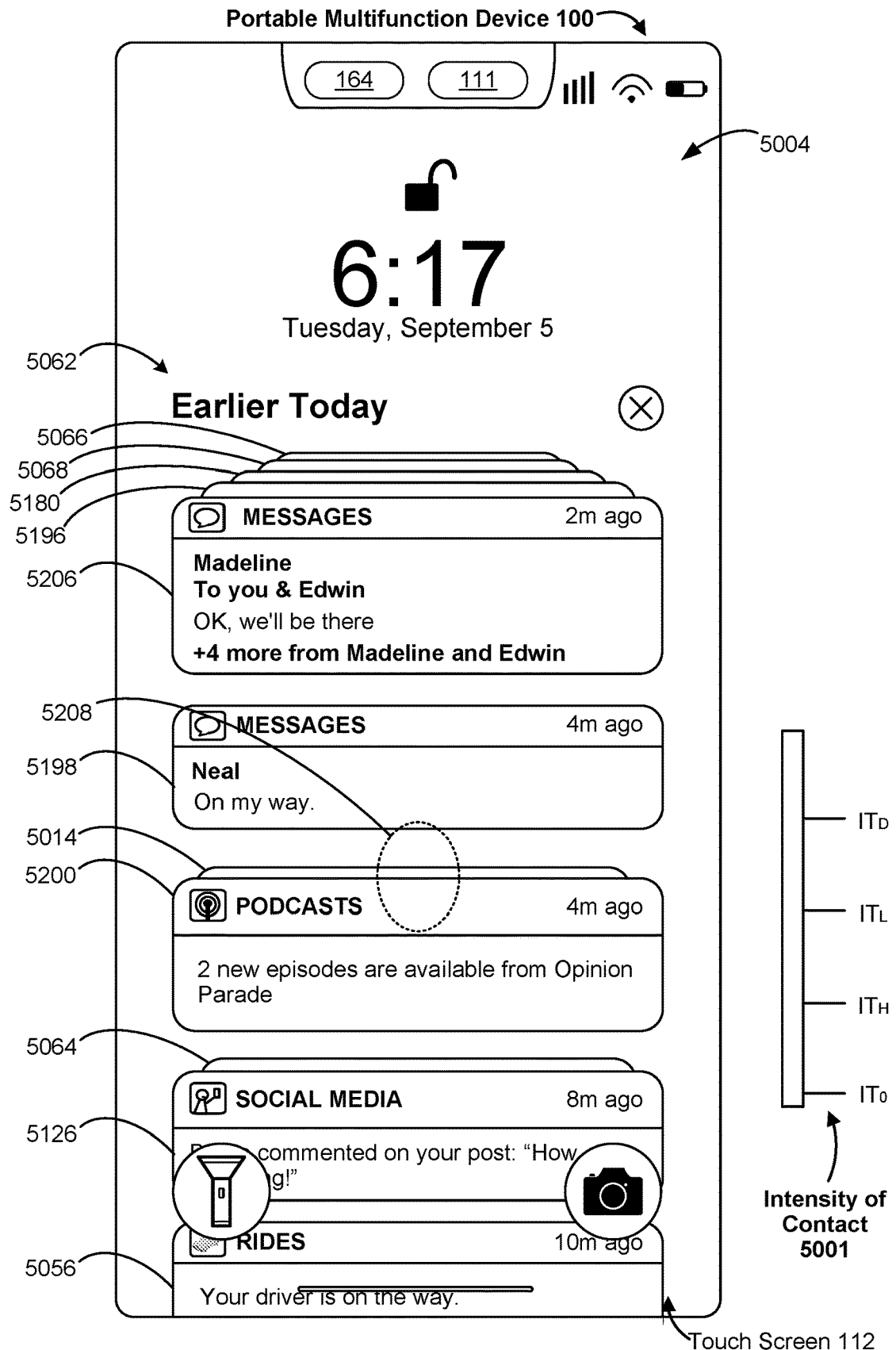
Figure 5B:
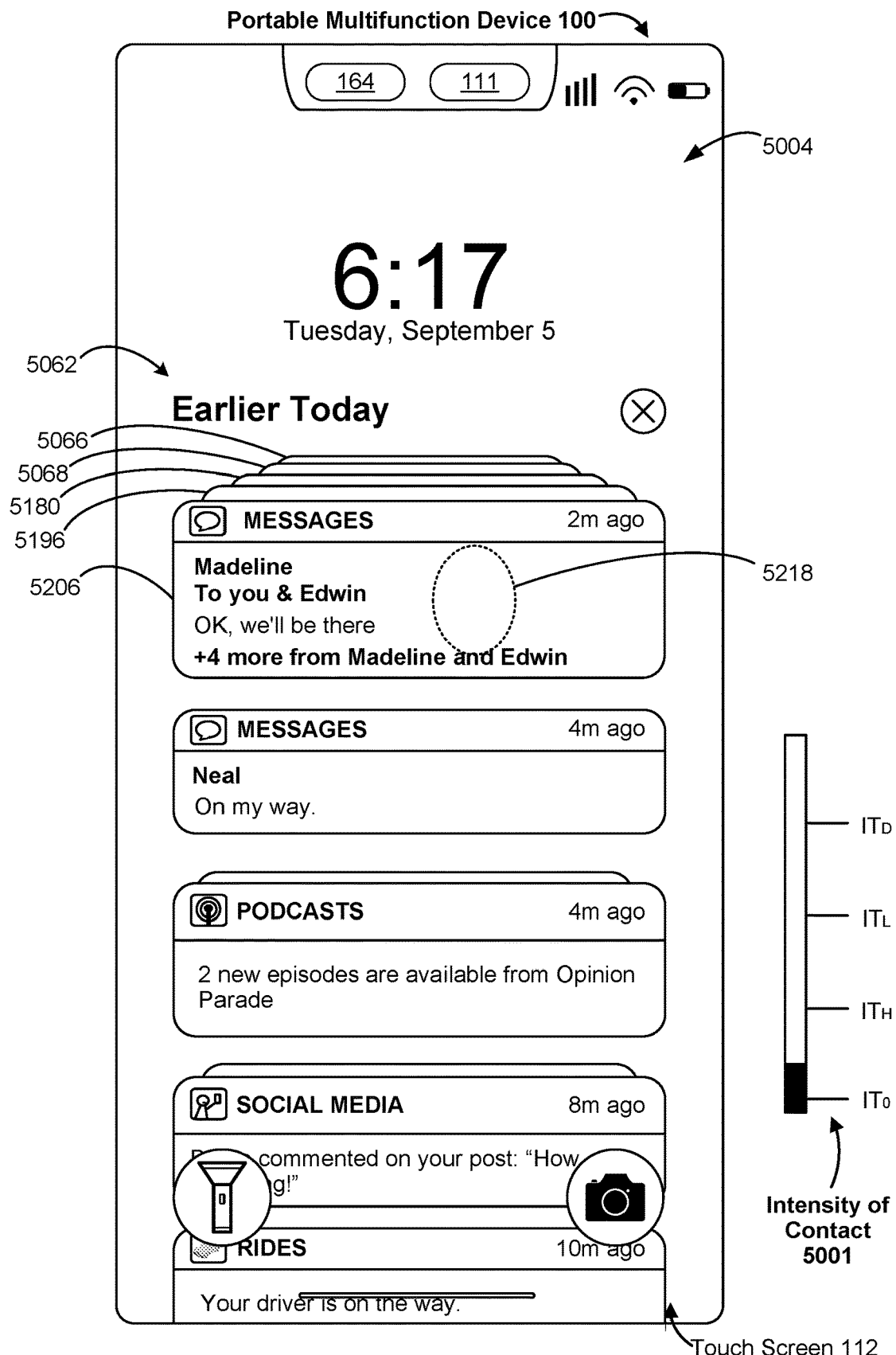
Figure 5B:
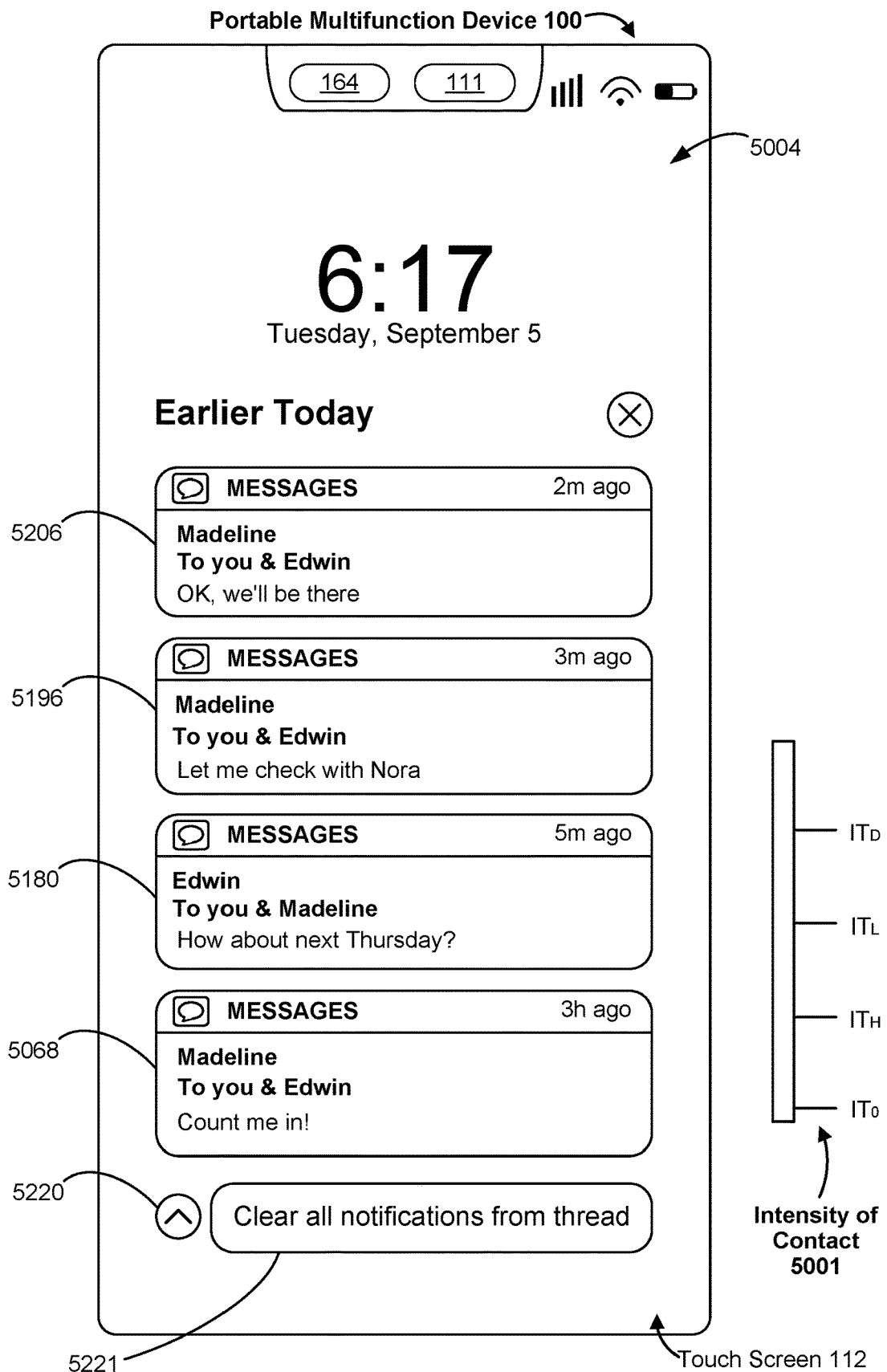
Figure 5B:
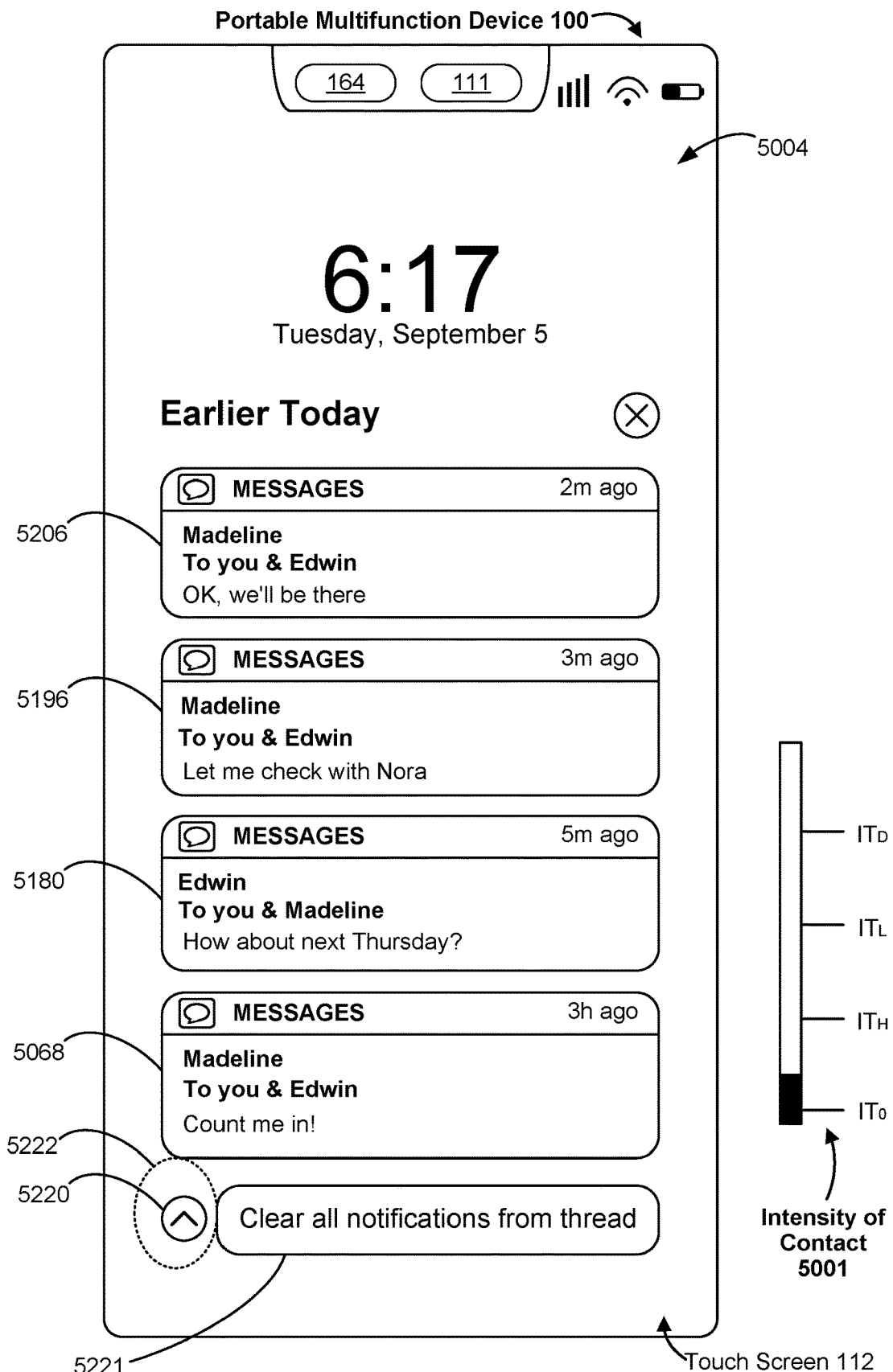
Figure 5B:
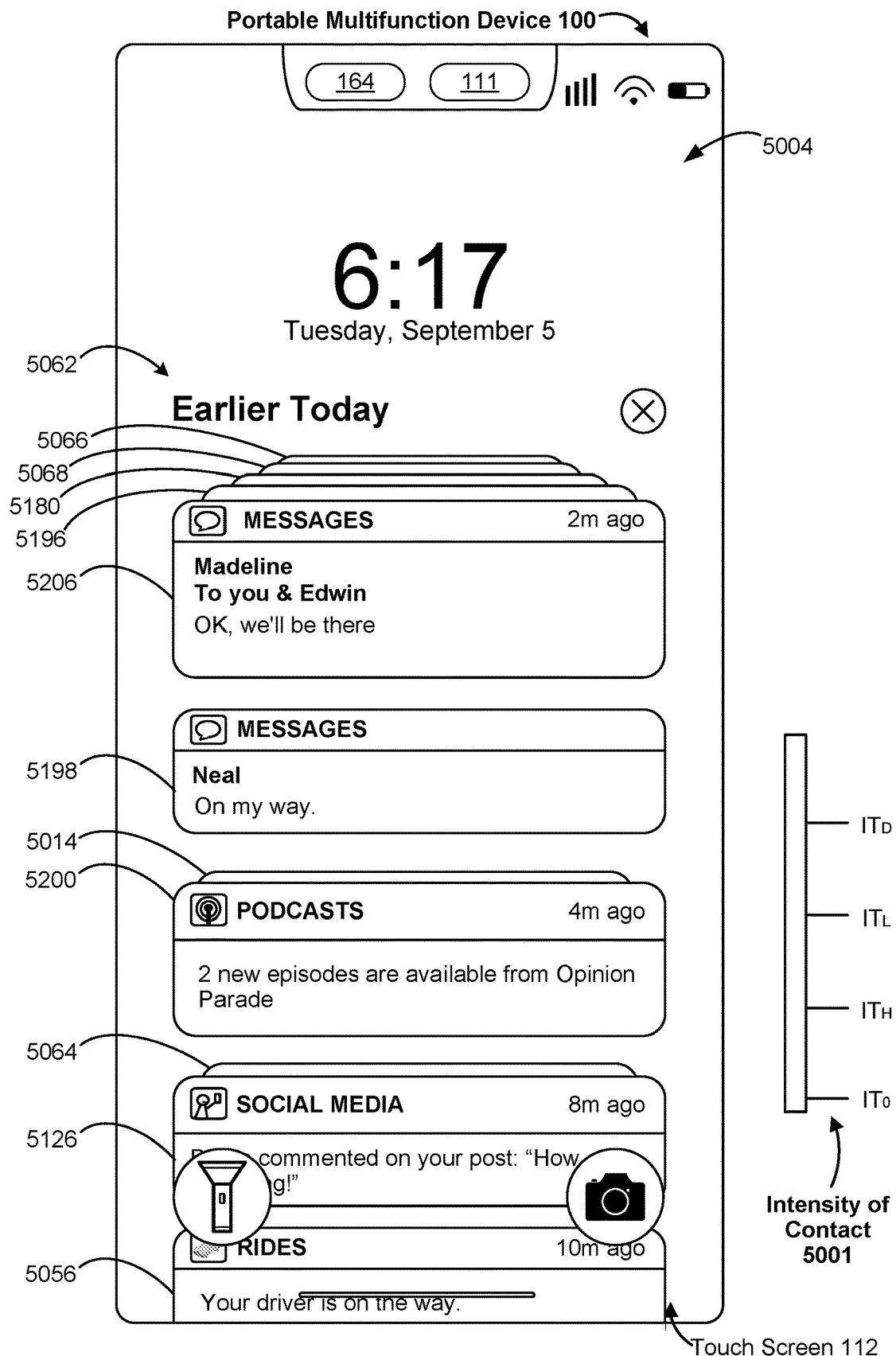
Figure 5B:
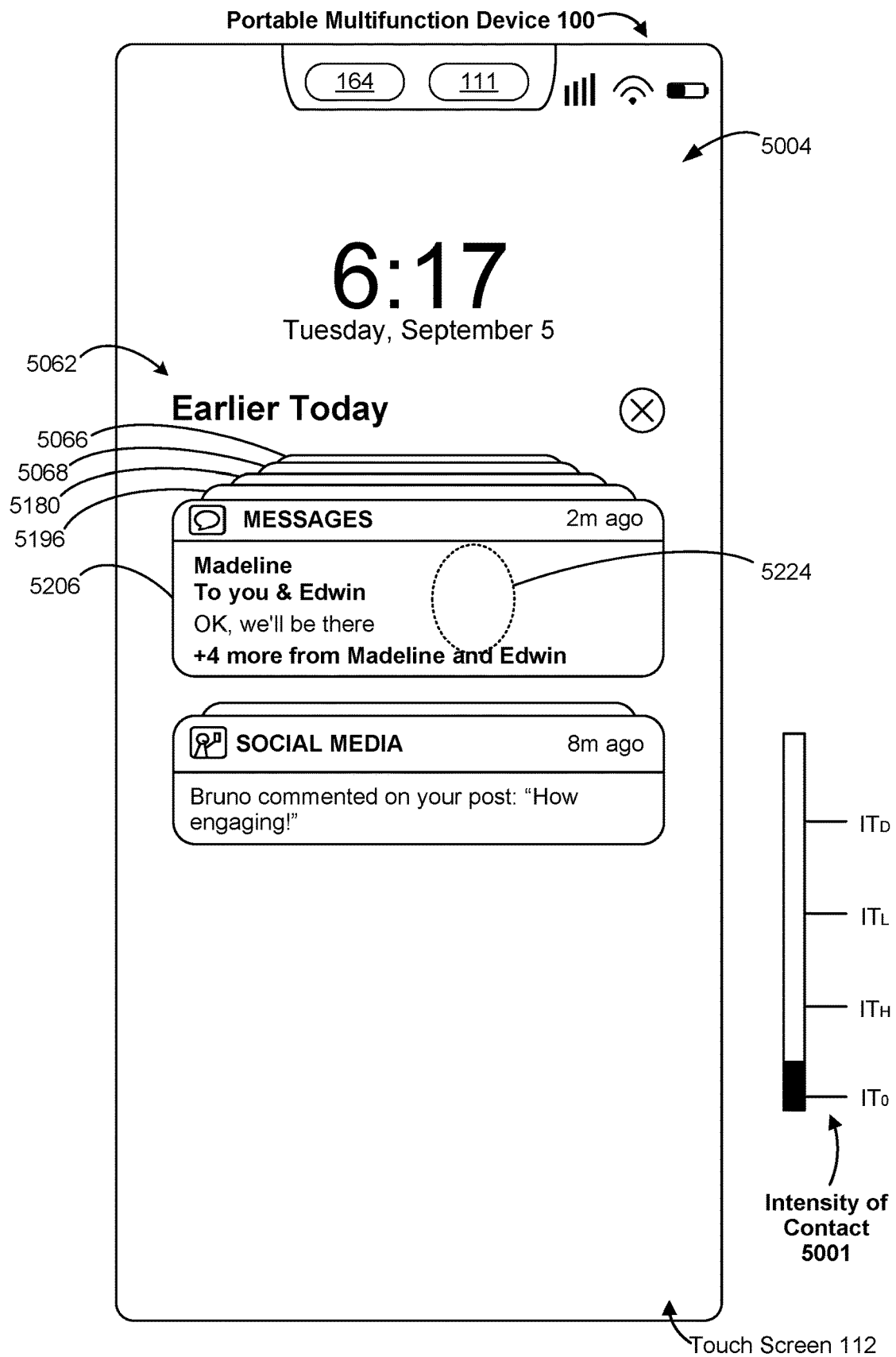
Figure 5B:
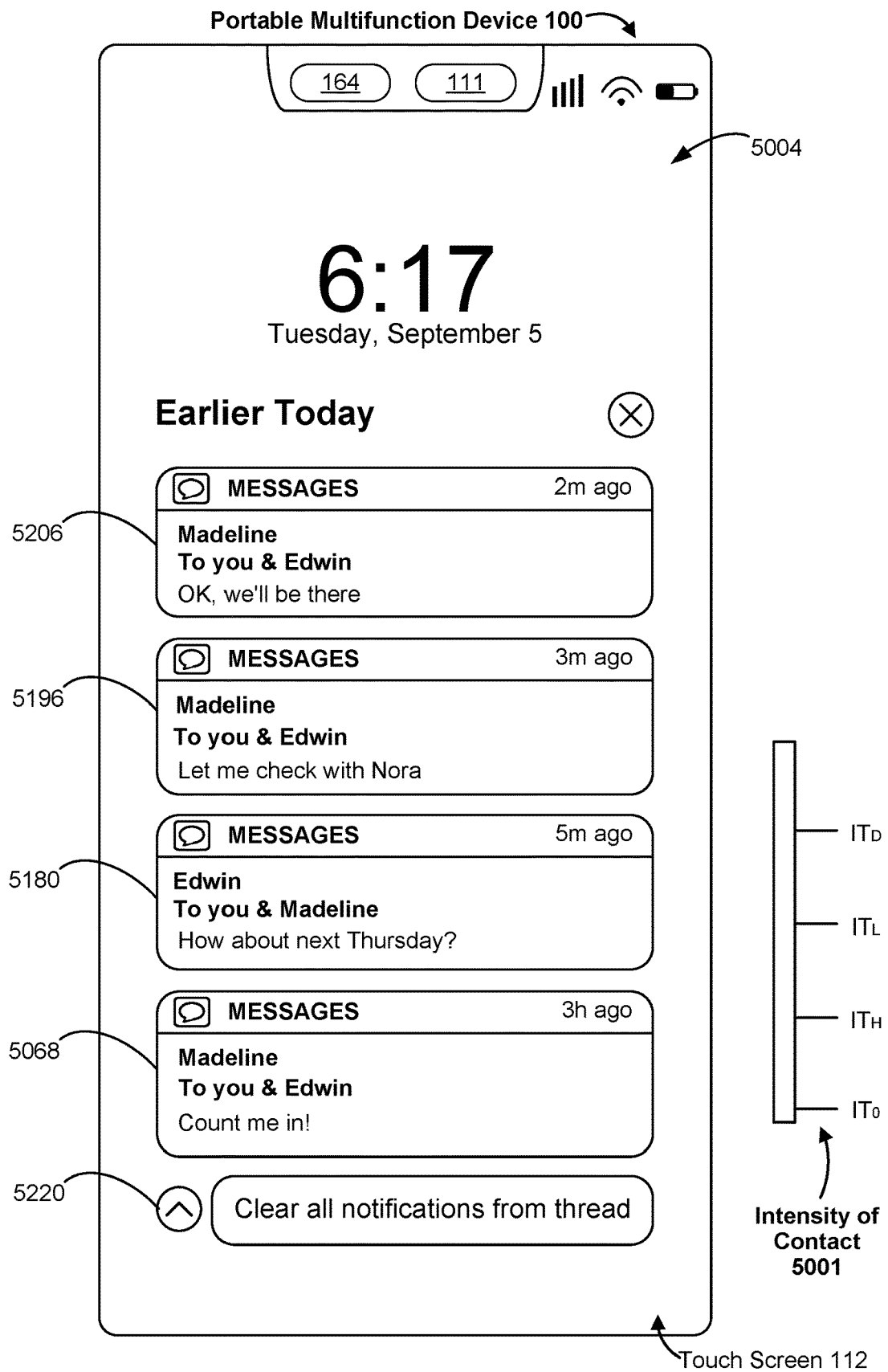
Figure 5B:
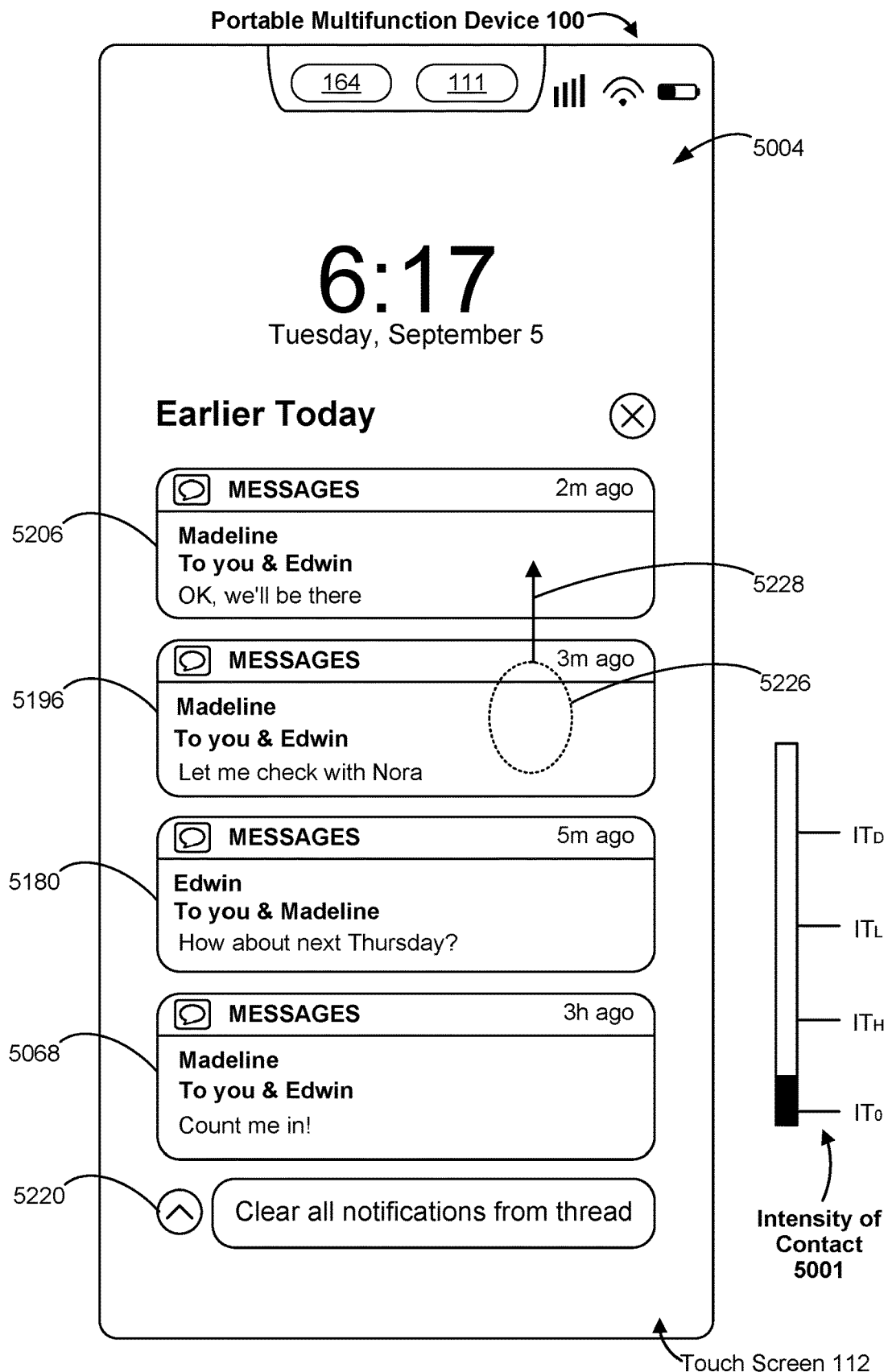
Figure 5B:
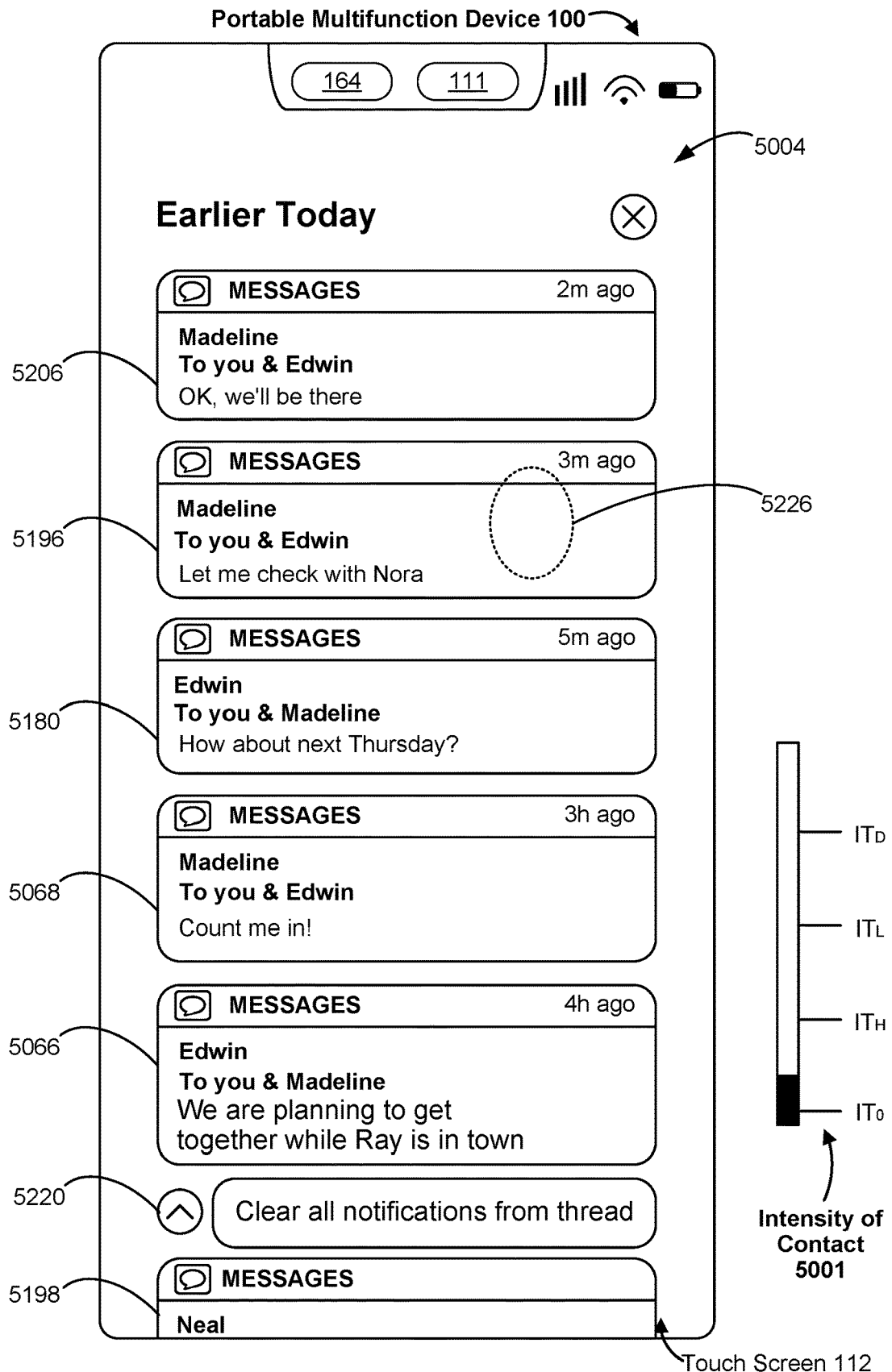
Figure 5B:
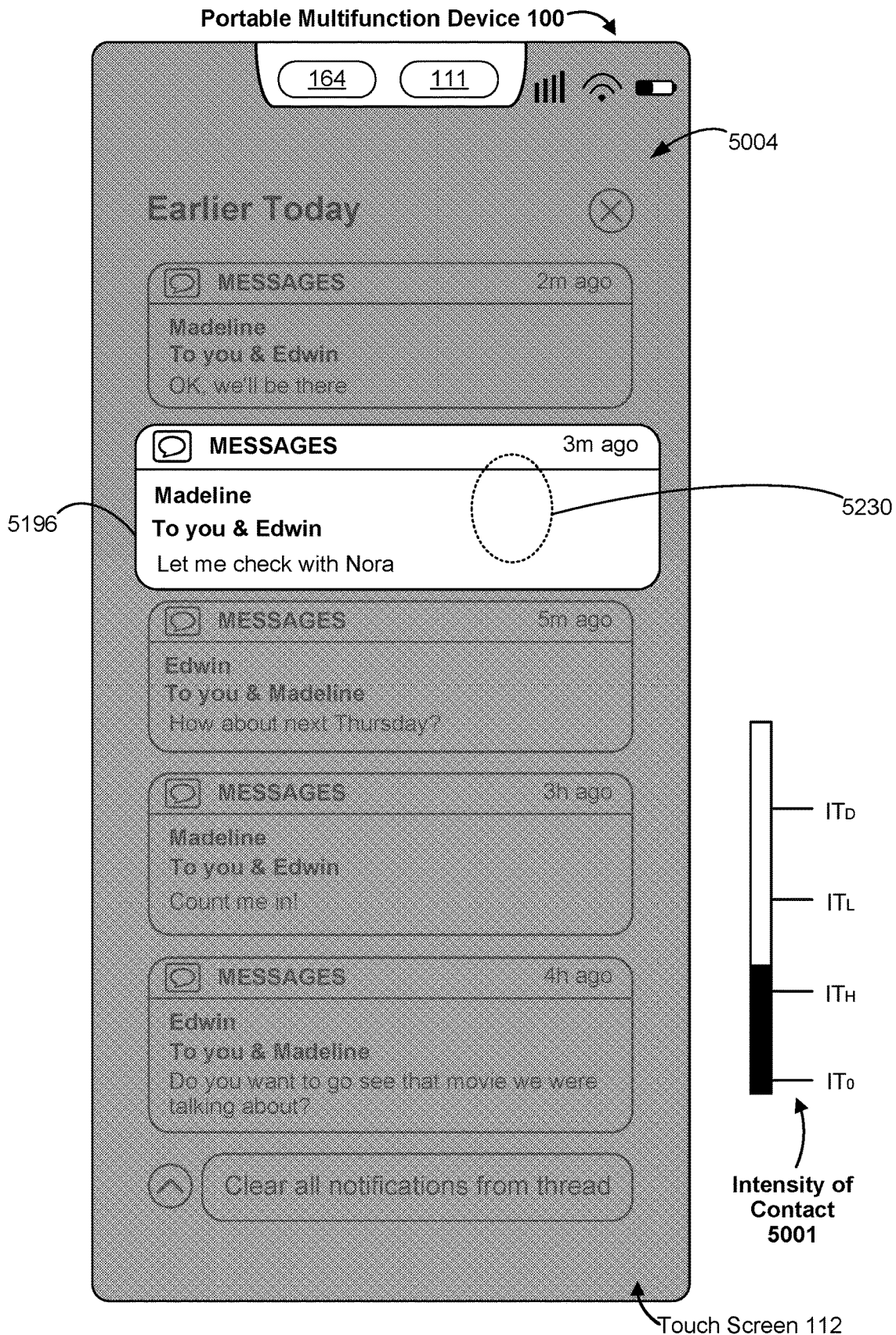
Figure 5B:
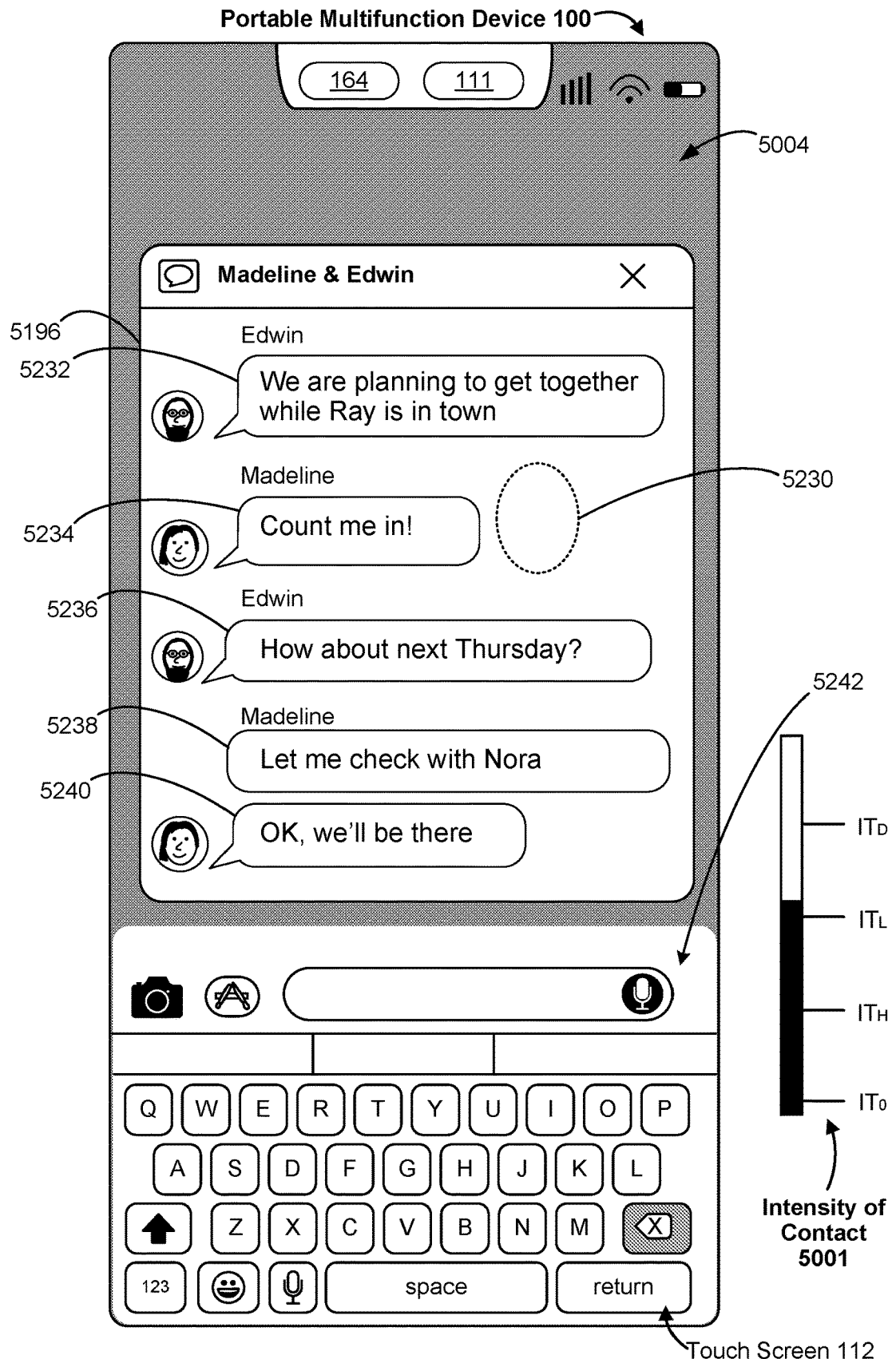

FIGS. 5A1 to 5A4 illustrate activation of a display (e.g., touch-sensitive display 112) in response to changing an orientation of device 100. When the display has been activated, notifications that were received while the device was in a screen-off state are displayed. In some embodiments, the device uses one or more sensors (e.g., accelerometer, gyro, audio sensor, heat sensor, and/or light sensor) to determine whether an orientation of the device has changed. For example, the device determines whether the device has been rotated by more than a threshold angle (e.g., rotated along an axis of the device, such as tilted from a position in which the device is substantially horizontal to a position in which the device is substantially vertical). In FIG. 5A1, the device is in a screen-off state while it is held flat in a user's hand 5002, such that the device display is substantially horizontal. In FIG. 5A2, the device is tilted such that the display is more vertical than in FIG. 5A1. Because a tilt angle of the device has not increased above a threshold tilt angle in FIG. 5A2, the display is not activated. In FIG. 5A3, the device is tilted such that the display is more vertical than in FIG. 5A2. Because a tilt angle of the device has increased above a threshold tilt angle in FIG. 5A3, the display has transitioned from a screen-off state to a screen-on state and wake screen user interface 5004 (e.g., an initial user interface that is displayed when the device transitions from a screen-off state to a screen-on state) is displayed by the display 112. In FIG. 5A4, the display 112 is substantially vertical.

In FIG. 5A4, locked icon 5005 is shown in wake screen user interface 5004 to indicate that the device is locked. In FIG. 5B, locked icon 5005 is replaced by unlocked icon 5007 to indicate that the device has been unlocked (e.g., in response to receiving user authentication information, such as biometric information for the user of the device or a passcode for the device). Wake screen user interface 5004 in the locked mode optionally displays less information (e.g., displays redacted versions of notifications) than wake screen user interface 5004 displayed in the unlocked mode.

FIG. 5B illustrates wake screen user interface 5004, in accordance with some embodiments. Wake screen user interface 5004 displays notifications 5006, 5008, 5010, 5012, 5014, and 5016 that correspond to events (e.g., events that occurred while device 100 was in a screen-off state). For example, notification 5006 corresponds to an event generated by an application with the application title "Social Media," as indicated by application identifying information 5018. Notification 5006 also includes an icon 5020 that corresponds to the Social Media application and a received time indication 5022.

FIGS. 5C-5J illustrate input for changing a delivery preference for future notifications of events from the Social Media application. The input for changing the delivery preference for future notifications includes a swipe input at Social Media notification 5006 to reveal a set of notification controls 5028, as illustrated at FIGS. 5C-5E; a tap input at an Option control 5030 from the set of notification controls 5028 to reveal a notification delivery preference control menu 5038, as illustrated at FIGS. 5G-5H; and a tap input at a control 5040 from the delivery preference control menu 5038, as illustrated in FIG. 5I. The input at control 5040 changes the delivery preference for future notifications of events from the Social Media application from a prominent-delivery mode (e.g., in which future notifications of events from the Social Media application are displayed on wake screen user interface 5004) to a quiet-delivery display mode (e.g., in which future notifications of events from the Social Media application are sent to a notification history without being displayed on wake screen user interface 5004 first, such that input to display a notification history is required to view the notifications).

FIGS. 5C-5E illustrate a leftward swipe input at notification 5006 that reveals a set of notification controls 5028 that correspond to notification 5006. In FIG. 5C, a contact 5024 is detected at a location on touch screen 112 that corresponds to notification 5006. In FIGS. 5C-5E, the contact 5024 moves along a path indicated by arrow 5026. As the contact 5024 moves leftward along the path indicated by the arrow 5026, notification 5006 also moves leftward (e.g., as if notification 5006 is "dragged" by the contact 5024 as it moves), revealing a set of notification controls 5028, as indicated in FIG. 5E. The set of notification controls 5028 includes Options control 5030 (e.g., for displaying a set of notification delivery preference controls for the Social Media application), View control 5032 (e.g., for displaying an expanded view of the notification 5006), and Clear control 5034 (e.g., for dismissing notification 5006).

FIG. 5G illustrates a tap input by a contact 5030 at a location on touch screen 112 that corresponds to Options control 5030. In response to the tap input, notifications 5008-5016 cease to be displayed and notification delivery preference control menu 5038 is displayed in wake screen user interface 5004, as indicated in FIG. 5H. Notification delivery preference control menu 5038 includes controls for adjusting delivery preferences for notifications from the Social Media application (because the notification delivery preference control menu 5038 was accessed via input at notification 5006 for the Social Media application). Notification delivery preference control menu 5038 includes a control 5040 for changing a delivery preference for future notifications of events of the Social Media application to a quiet-delivery mode (e.g., in which future notifications for events of the Social Media application will be sent to a notification history upon receipt), a control 5042 for turning off future notifications from the Social Media application, a control 5044 for displaying a notification settings user interface for the Social Media application, and a control 5046 for dismissing menu 5038. Notification delivery preference control menu 5038 also includes application identifying information 5048 and an application icon 5050 that correspond to the application identifying information 5018 and the application icon 5020 of notification 5006.

In FIG. 5I, a tap input by contact 5052 is detected at a location on touch screen 112 that corresponds to control 5040 for changing a delivery preference for future notifications of events of the Social Media application to a quiet-delivery mode. In FIG. 5J, in response to the input at control 5040, notification delivery preference control menu 5038 and notification 5006 cease to be displayed and notifications 5008-5016 are redisplayed.

As a result of the input for changing a delivery preference for future notifications of events from the Social Media application to a quiet-delivery display mode, as described with regard to FIGS. 5C-5J, a Social Media notification received after the change to the delivery preference is not displayed on wake screen user interface 5004 until input is provided to display a notification history, as described with regard to FIGS. 5J-5O.

From FIG. 5J to FIG. 5K, the current time 5054 has changed from 6:02 to 6:05. A new notification 5056 received at 6:04 is displayed in wake screen user interface 5004. As indicated in FIG. 5K, a new event for the Social Media application occurred at 6:05, but no notification corresponding to the event is displayed in wake screen user interface 5004 (because the delivery preference for notifications of events from the Social Media application was changed, as described with reference to FIGS. 5B-5I, to a reduced-prominence mode such that the notifications are sent directly to the notification history). From FIG. 5K to FIG. 5L, the current time 5054 has changed from 6:05 to 6:08.

FIGS. 5M-5O illustrate an upward swipe input on wake screen user interface 5004 to reveal a notification history. In FIGS. 5M-5N, a contact 5058 with touch screen 112 moves along a path indicated by arrow 5060. As the contact 5058 moves upward along the path indicated by arrow 5060, notifications 5008-5016 and 5056 also move upward (e.g., as if the notifications are "dragged" by the contact 5058 as it moves). In FIG. 5O, contact 5058 has continued to move along the path indicated by arrow 5060 such that notification history 5062 is revealed in wake screen 5004. Notification history 5062, as shown in FIGS. 5O and 5P, includes notification 5064 for the event for the Social Media application that occurred at 6:05. Notification history 5062 also includes notification 5068 for a received message in a message thread in the Messages application. Notification 5068 is coalesced with notification 5066, for another received message in the message thread in the Messages application, as explained in further detail below.

FIGS. 5Q-5Y illustrate input for changing a delivery preference for future notifications of events from the Social Media application. The input for changing the delivery preference for future notifications includes a press input at Social Media notification 5064 to reveal an expanded version of notification 5064, as illustrated at FIGS. 5Q-5S; an input at a control 5074 displayed in the expanded version of notification 5064, as illustrated at FIGS. 5T-5U; and an input at control 5080 of a delivery preference control menu 5078. The input at control changes the delivery preference for future notifications of events from the Social Media application from a quiet-delivery display mode to prominent-delivery mode.

FIGS. 5Q-5S illustrate a press input at notification 5064 that reveals an expanded version of notification 5064. In FIG. 5Q, a contact 5070 is detected at a location on touch screen 112 that corresponds to notification 5064. A characteristic intensity of the contact 5070 is above a contact detection intensity threshold level $IT_0$ (as indicated by intensity level meter 5001) and below a hint intensity threshold level $IT_H$ (as indicated by intensity level meter 5001). In FIG. 5R, a characteristic intensity of contact 5070 has increased above a hint intensity threshold level $IT_H$ (as indicated by intensity level meter 5001). As the characteristic intensity of contact 5070 increases above the hint intensity threshold level $IT_H$, the background of wake screen user interface 5004 becomes increasingly blurred, as indicated at FIGS. 5R-5S. In FIG. 5S, the characteristic intensity of contact 5070 has increased above a light press intensity threshold level $IT_L$ (as indicated by intensity level meter 5001). In response to detecting the increase in the characteristic intensity of contact 5070 above the light press intensity threshold level $IT_L$, an expanded version of notification 5064 is displayed. In some embodiments, when additional notification information is available for an event indicated by a notification, the additional information is displayed in an expanded version of the notification in response to input (e.g., a light press input) at a location that corresponds to the notification. In FIG. 5S, an expanded version of notification 5064 that includes an image 5072 is displayed, and notifications 5010-5016 and 5066-5068 cease to be displayed. A control 5074 (e.g., for displaying a set of notification delivery preference controls for the Social Media application) is displayed in the expanded version of notification 5064. In some embodiments, an input (e.g., a tap input) at a location of the expanded version of notification 5064 (e.g., away from control 5074), will cause display of the wake screen user interface 5004 and the expanded view of notification 5064 to be replaced by display of an application (e.g., the Social Media application) that corresponds to the notification 5064. In some embodiments, an input (e.g., a tap input) at a location outside of the expanded version of notification 5064 will cause display of the expanded view of notification 5064 to be replaced by notifications 5010-5016, the non-expanded version of notification 5064, and notifications 5066-5068 (e.g., returning to the prior view of wake screen user interface as shown in FIG. 5Q).

FIG. 5T illustrates a tap input by a contact 5076 at control 5074 of the expanded version of notification 5064. In response to the tap input, a notification delivery preference control menu 5078 is displayed in wake screen user interface 5004, as indicated in FIG. 5U. (Notification delivery preference control menu 5078 is an illustrative example of a delivery preference control menu with characteristics that differ from notification delivery preference control menu 5038 described with regard to FIG. 5H. In some embodiments, in response to the input described with regard to FIG. 5T, notification delivery preference control menu 5038 is displayed. It will be recognized that the notification delivery preference control menus described herein may include various combinations of the features and/or controls described with regard to menu 5038 or menu 5078).

Notification delivery preference control menu 5078, as shown in FIG. 5U, includes controls for adjusting delivery preferences for notifications from the Social Media application (because the notification delivery preference control menu 5078 was accessed via input at notification 5064 for the Social Media application). Notification delivery preference control menu 5078 includes a control 5080 for changing a delivery preference for future notifications of events of the Social Media application to a prominent-delivery mode (e.g., in which future notifications for events of the Social Media application will be displayed on wake screen user interface 5004 upon receipt), control 5040 for changing a delivery preference for future notifications of events of the Social Media application to a quiet-delivery mode (e.g., in which future notifications for events of the Social Media application will be sent to a notification history), a control 5042 for turning off future notifications from the Social Media application, a control 5044 for displaying a notification settings user interface for the Social Media application, and a control 5046 for dismissing menu 5038. Notification delivery preference control menu 5078 also includes a state marker 5082 to indicate a currently selected notification delivery preference and an animated icon 5084 to illustrate the currently selected notification delivery mode (which is the quiet-delivery mode in this example).

FIGS. 5U-5X illustrate frames of an animation sequence for animated icon 5084. Animated icon 5084 depicts a miniature version of device 100 and the animation sequence illustrates input (illustrated in the animation by animated contact representation 5086) to access notifications (illustrated in the animation by animated notification representation 5088) in a notification history.

In FIG. 5X, a tap input by contact 5090 is detected at a location on touch screen 112 that corresponds to control 5080 for changing the notification delivery preference to the prominent-delivery mode. In FIG. 5Y, in response to the input at control 5080, state marker 5082 is displayed at control 5080 to indicate that a currently selected notification delivery mode is the prominent-delivery mode in which notifications from the Social Media application are first displayed on the wake screen. Animated icon 5092 is displayed to illustrate a prominent-delivery mode. FIGS. 5Y-5Z illustrate frames of an animation sequence for animated icon 5092. The animation sequence illustrates a screen-off state (shown in FIG. 5Y) that transitions to a screen-on state (shown in FIG. 5Z) in which representations 5094 of notifications are shown on a wake screen user interface.

In some embodiments, animated icon 5084 is displayed only when a currently selected notification delivery preference is the quiet-delivery mode (as illustrated in FIGS. 5U-5X) and animated icon 5092 is displayed only when a currently selected notification delivery preference is the prominent-delivery mode (as illustrated in FIGS. 5Y-5Z). In some embodiments, animated icon 5084 is animated only when a currently selected notification delivery preference is the quiet-delivery mode and animated icon 5092 is animated only when a currently selected notification delivery preference is the prominent-delivery mode. In some embodiments, animated icon 5084 and 5092 are simultaneously displayed. In some embodiments, animated icon 5084 and 5092 are simultaneously animated. In some embodiments, animated icon 5084 is animated only when a currently selected notification delivery preference is the prominent-delivery mode and animated icon 5092 is animated only when a currently selected notification delivery preference is the quiet-delivery mode (e.g., to educate the user regarding the unselected delivery mode).

In FIG. 5Z, a tap input by contact 5096 is detected at a location on touch screen 112 that corresponds to control 5080 for changing the notification delivery preference to the quiet-delivery mode. In FIG. 5AA, a tap input by contact 5098 is detected at a location on touch screen 112 that corresponds to control 5044 for displaying a notification settings user interface for the Social Media application.

FIGS. 5AB-5AG illustrate changing a delivery preference for future notifications of events of an application using a notification settings user interface 5100 for the application.

In FIG. 5AB, in response to the input by contact 5098, display of wake screen user interface 5004, notification 5064, and notification delivery preference control menu 5078 is replaced by display of notification settings user interface 5100. Notification settings user interface 5100 includes an application identifier 5102 to indicate that the toggles displayed in notification settings user interface 5100 control settings for the Social Media application. Notification settings user interface 5100 includes a toggle 5104 for enabling/disabling notifications for the application, a toggle 5106 for enabling/disabling showing notifications for the application on the wake screen user interface 5004, a toggle 5108 for enabling/disabling showing notifications for the application in the notification history, and a toggle 5110 for enabling/disabling notification banners to be displayed while the device is in a screen-on state (e.g., while the user is operating the device).

Animated icons 5112, 5114, and 5116 illustrate a prominent-delivery mode, a quiet-delivery mode, and notification banner delivery mode, respectively. Active mode indicators 5118, 5120, and 5122 indicate an activation status of a prominent-delivery mode, a quiet-delivery mode, and notification banner delivery mode, respectively. Checkmarks in active mode indicators 5120 and 5122 indicate that a quiet-delivery mode and a notification banner delivery mode, respectively, are currently activated. FIGS. 5AB-5AD illustrate frames of respective animation sequences for animated icons 5114 and 5116.

In FIG. 5AD, a tap input by contact 5124 is detected at a location on touch screen 112 that corresponds to toggle 5106. The input by contact 5124 changes a delivery preference for future notifications of events. The delivery preference is changed from a mode in which showing notifications for the application on the wake screen user interface 5004 is disabled (as indicated by the state of toggle 5106 in FIG. 5AD) to a mode in which showing notifications for the application on the wake screen user interface 5004 is enabled (as indicated by the state of toggle 5106 and the checkmark in active mode indicator 5118 in FIG. 5AE). FIGS. 5AE-5AF illustrate frames of respective animation sequences for animated icons 5112, 5114, and 5116.

In some embodiments, animated icon 5112 is animated when toggle 5106 is in an enabled state and is not animated when corresponding toggle 5106 is in a disabled state, animated icon 5114 is animated when corresponding toggle 5108 is in an enabled state and is not animated when toggle 5108 is in a disabled state, and animated icon 5116 is animated when corresponding toggle 5110 is in an enabled state and is not animated when toggle 5110 is in a disabled state (e.g., as illustrated in FIGS. 5AB-5AF). In some embodiments, animated icons 5112, 5114, and 5116 are all animated while notification settings user interface 5100 is displayed without regard to the state of the toggles that correspond to the respective animated icons.

From FIG. 5AF to FIG. 5AG, the current time 5054 has changed from 6:08 to 6:10. In response to the input by contact 5124, as described with regard to FIG. 5AD, showing notifications for the application on the wake screen user interface 5004 is enabled. As a result, a new notification 5126 for an event of the Social Media application, received at 6:09, is displayed in wake screen user interface 5004 in FIG. 5AG.

FIGS. 5AH-5AR illustrate input for changing a delivery preference for future notifications of a subset of events from an application. For example, a news application may generate events from multiple news sources and a user may wish to set different notification delivery preferences for the various news sources. In some embodiments, events that correspond to a respective news source are a subset of events from a News application.

FIG. 5AH illustrates a leftward swipe input by contact 5128 (e.g., with leftward movement 5130) at notification 5010 that reveals a set of notification controls 5132 that correspond to notification 5010. FIG. 5AI illustrates a tap input by a contact 5138 at Options control 5134. In response to the tap input, notifications 5126, 5056, 5008, 5012, and 5014 cease to be displayed and notification delivery preference control menu 5138 and control 5140 for dismissing menu 5138 are displayed in wake screen user interface 5004, as indicated in FIG. 5AJ. Notification delivery preference control menu 5138 includes controls for adjusting delivery preferences for one or more news sources of the News application. Notification delivery preference control menu 5138 includes a currently selected source indication 5142 that indicates one or more news sources to which changes to delivery preferences will be applied. Chevron 5144 is used to indicate a control for displaying additional news sources. Notification delivery preference control menu 5138 includes a control 5146 for changing a delivery preference for future notifications of events from one or more news sources to a quiet-delivery mode (e.g., in which future notifications for events from the one or more news sources will be sent to a notification history), a control 5148 for turning off future notifications from the one or more news sources, and a control 5150 for displaying a notification settings user interface for one or more news sources. While the currently selected news source is "The Hapsburg Haps," as indicated by currently selected source indication 5142, selection of a control 5146 or 5148 will cause a notification delivery preference to be changed for events from "The Hapsburg Haps" news source, but not for other news sources that are not currently selected.

In FIG. 5AK, a tap input by contact 5154 is detected at a location on touch screen 112 that corresponds to chevron 5144 for displaying additional news sources. In FIG. 5AL, in response to the input at chevron 5144, notification delivery preference control menu 5138 replaces display of controls 5146, 5148, and 5150 with display of control 5156 for selecting a first additional news source ("Local Daily"), control 5158 for selecting a second additional news source ("The Urban Times"), and control 5160 for selecting all news sources (e.g., "The Hapsburg Haps," "Local Daily," and "The Urban Times,") that correspond to the News application. The orientation of chevron 5144 is altered (e.g., to indicate that a mode of notification delivery preference control menu 5138 has changed from displaying controls 5146, 5148, and 5150 for changing a delivery preference for future notifications for events from a news source to displaying controls 5156, 5158, and 5160 for selecting one or more news sources). In some embodiments, in response to an input at control 5141, the selected news source ("The Hapsburg Haps") continues to be selected and notification delivery preference control menu 5138 as shown in FIG. 5AK is redisplayed.

In FIG. 5AM, a tap input by contact 5162 is detected at a location on touch screen 112 that corresponds to control 5160 for selecting all news sources. In FIG. 5AN, in response to the input at control 5160, the currently selected source indication 5142 in notification delivery preference control menu 5138 is changed from indicating "The Hapsburg Haps," as shown in FIG. 5AK, to indicating "All news sources." The orientation of chevron 5144 is altered (e.g., to indicate that a mode of notification delivery preference control menu 5138 has changed from displaying controls 5156, 5158, and 5160 for selecting one or more news sources to re-displaying controls 5146, 5148, and 5150 for changing a delivery preference for future notifications for events from all news sources).

In FIG. 5AO, a tap input by contact 5164 is detected at a location on touch screen 112 that corresponds to control 5148 for turning off future notifications from the one or more news sources. While the currently selected news source is "All news sources," as indicated by currently selected source indication 5142, selection of a control 5146 or 5148 will cause a notification delivery preference to be changed for events from all news sources of the News application. In some embodiments, as a result of the input at control 5148 for turning off future notifications from all news sources, previously received notification 5010 from "The Hapsburg Haps" news source and notification 5012 for news from the "Local Daily" news source is not displayed when wake screen user interface 5004 is subsequently displayed, as shown in FIG. 5AP.

FIGS. 5AQ-5AS illustrate input for changing a delivery preference for notifications that correspond to a subset of events of a communication application. For example, a messaging application may generate events that corresponds to received messages from various contacts and/or groups of contacts and a user may wish to dismiss notifications for messages in a conversation thread with a first contact while continuing to receive notifications for messages in a conversation thread with a second contact. In some embodiments, events that correspond to a conversation thread are a subset of events from a Messages application.

In FIGS. 5AQ-5AR, a notification delivery preference control menu 5186 5AQ that corresponds to the Messages application is displayed in response to input at a message notification. For example, in FIG. 5AQ, an input (e.g., a leftward swipe input or a light press input) by contact 5166 is detected at a location on touch screen 112 that corresponds to notification 5008, causing a control for displaying a set of notification delivery preference controls to be displayed, and, in response to a subsequent input (e.g., a tap input) at the displayed control, notification delivery preference control menu 5168 is displayed (e.g., as described with regard to FIGS. 5B-5H or 5R-5U). Notification delivery preference control menu 5168 includes a control 5170 for changing a delivery preference for future notifications for messages in a conversation thread with Ursula to a quiet-delivery mode (e.g., in which future notifications for messages in the conversation thread with Ursula will be sent to a notification history), a control 5172 for turning off future notifications in the conversation thread with Ursula, a control 5044 for displaying a notification settings user interface for the Messages application, and a control 5176 for dismissing menu 5168. In some embodiments, changes to delivery preferences for one or more applications, such as the Messages application, are effective for a limited period of time (e.g., 1 hour, 1 day, 1 week, etc.).

FIG. 5AR illustrates a tap input by a contact 5178 at a location on touch screen 112 that corresponds to control 5172 for turning off future notifications in the conversation thread with Ursula. In response to the tap input, wake screen user interface 5004 is redisplayed. In some embodiments, in response to the input at the control 5172 for turning off future notifications in the conversation thread with a contact (or as a result of interaction with the notification), previously received notifications in the conversation thread with the contact cease to be displayed. For example, in FIG. 5AS, notifications 5126, 5056 and 5054 are displayed on wake screen user interface 5004 and previously received notification 5008 in the conversation thread with Ursula is not displayed on wake screen user interface 5004.

From FIG. 5AS to FIG. 5AT, the current time 5054 has changed from 6:10 to 6:12. A new notification from the Messages application indicating a message from contact Edwin is displayed. Because the input described with regard to FIG. 5AR turned off notifications in the conversation thread with Ursula, notifications for messages in other conversation threads (e.g., messages from other contacts, such as Edwin), continue to be displayed on wake screen user interface 5004.

FIGS. 5AU-5AY illustrate input for displaying a cover sheet user interface 5190 that includes a notification history 5062.

In FIG. 5AU, an input by contact 5184 (e.g., an upward swipe input from the lower edge of touch screen display 112) is detected for dismissing wake screen user interface 5004. As the contact 5184 moves along a path indicated by arrow 5185, home screen user interface 5182 is displayed, as shown in FIG. 5AV. In FIG. 5AW, an input by contact 5186 (e.g., a downward swipe input from the upper edge of touch screen display 112) is detected for displaying a cover sheet user interface 5190. As contact 5186 moves along a path indicated by arrow 5188, cover sheet user interface 5190 is displayed, as indicated in FIG. 5AX.

In FIG. 5AX, cover sheet user interface 5190 displays notifications 5180, 5126, 5056, and 5014 and a notification history 5062 that includes notifications 5064, 5066, and 5068. An input by contact 5192 (e.g., e.g., a vertical swipe input in which contact 5192 moves upward along a path indicated by arrow 5194) is detected for scrolling the notifications displayed in cover sheet user interface 5190. In response to the vertical swipe input, the notifications displayed in cover sheet user interface 5184 move in the direction of movement of the contact, as shown in FIGS. 5AX-5AY.

In some embodiments, notification history 5062 is not displayed when cover sheet user interface 5190 is initially displayed, and in response to an upward swipe input on the cover sheet user interface (as opposed to an upward swipe input that starts from the bottom edge of the screen), notification history 5062 is revealed on the cover sheet user interface.

FIGS. 5AY-5BU illustrate example user interfaces for displaying coalesced notifications.

In FIG. 5AY, cover sheet user interface 5190 displays notifications 5180, 5126, 5056, and 5014 and a notification history 5062 that includes notifications 5064, 5066, and 5068. In FIGS. 5AY-5AZ, device 100 transitions from a screen-on state, as shown in FIG. 5AY, to a screen-off state, as shown in FIG. 5AZ. For example, the transition occurs in response to an input to power off the device, such as an input at button 206, or in response to a determination that screen-off criteria are met (e.g., criteria that include a criterion that is satisfied in accordance with a determination that a time that has passed since an input was received exceeds a threshold amount of time). In FIGS. 5AZ-5BA, the device 100 transitions from a screen-off state, as shown in FIG. 5AZ, to a screen-on state, as shown in FIG. 5BA. For example, the transition occurs in response to an input to power on the device, such as an input at button 206, or in response to a determination that screen-on criteria are met (e.g., criteria that include a criterion that is satisfied in accordance with a determination that a new notification has been received, or the device has been picked up and tilted past a preset tilt angle).

From FIG. 5AY to FIG. 5BA, the current time 5054 has changed from 6:12 to 6:14. As a result of the activation of the device (e.g. dismissing the wake screen user interface 5004 to display the home screen user interface 5182, as shown in FIGS. 5AU-5AV), prior to the transition from the screen-off state to the screen-on state (FIGS. 5AZ-5BA), notifications 5180, 5126, 5056, and 5014 have been moved to a notification history and are not displayed on wake screen user interface 5004 in FIG. 5BA. Notifications 5196, 5198, and 5200, received at 6:14, 6:13, and 6:13, respectively, are displayed on wake screen user interface 5004.

In FIGS. 5BB-5BC, a contact 5202 with touch screen 112 moves along a path indicated by arrow 5204. As the contact 5202 moves upward along the path indicated by arrow 5060, notifications 5196-5200 also move upward (e.g., as if the notifications are "dragged" by the contact 5202 as it moves). In FIGS. 5BC-5BD, contact 5202 continues to move along the path indicated by arrow 5204 such that notification history 5062 is revealed in wake screen 5004.

In some embodiments, when the notification history 5062 includes multiple notifications for events from the same application (e.g., the Social Media application), the multiple notifications are coalesced. For example, as shown in FIG. 5BD, when notification 5126 has been moved to the notification history 5062, notification 5126 for the Social Media application is coalesced with notification 5064 that was previously in the notification history 5062 (see FIG. 5AY).

In some embodiments, when the notification history 5062 includes multiple notifications that correspond to a subtype of events from an application (e.g., events that correspond to a conversation thread in the Messages application), the multiple notifications are coalesced. For example, as shown in FIG. 5BD, when notification 5180 (for a message from contact Edwin in a conversation thread with Madeline and Edwin) has been moved to notification history 5062, notification 5180 is coalesced with notifications 5066 and 5068 (for messages from contacts Madeline and Edwin in the conversation thread with Madeline and Edwin) that were previously in the notification history 5062 (see FIG. 5AY). As shown in FIGS. 5BC-5BD, notification 5196 for a message from contact Madeline in the conversation thread with Madeline and Edwin is not coalesced with notifications 5066, 5068, and 5180 in the notification history 5062 (because the notification 5196 has not yet been moved to the notification history).

In FIGS. 5BD-5BE, device 100 transitions from a screen-on state, as shown in FIG. 5BD, to a screen-off state, as shown in FIG. 5BE. In FIGS. 5BE-5BF, the device 100 transitions from a screen-off state, as shown in FIG. 5BE, to a screen-on state, as shown in FIG. 5BF.

From FIG. 5BD to FIG. 5BF, the current time 5054 has changed from 6:14 to 6:17. In FIG. 5BF, new notification 5206 received at 6:15 is displayed on wake screen user interface 5004.

In some embodiments, when wake screen user interface 5004 includes multiple notifications that correspond to an event for an application or an event subtype for an application (e.g., prior to receiving input at wake screen user interface 5004 for displaying the notification history 5062), the multiple notifications are coalesced in wake screen user interface 5004. For example, as shown in FIG. 5BF, when wake screen user interface 5004 includes notification 5206 (for a message in the conversation thread with Madeline and Edwin), notification 5206 is coalesced with notification 5196 (also for a message in the conversation thread with Madeline and Edwin) that was previously displayed on wake screen user interface 5004 (see FIG. 5BC).

In FIG. 5BG, an input by contact 5208 (e.g., an upward swipe input from the lower edge of touch screen display 112) is detected for dismissing wake screen user interface 5004. As the contact 5208 moves along a path indicated by arrow 5210, home screen user interface 5182 is displayed, as shown in FIG. 5BH. In FIGS. 5BH-5BI, device 100 transitions from a screen-on state, as shown in FIG. 5BH, to a screen-off state, as shown in FIG. 5BI. In FIGS. 5BI-5BJ, the device 100 transitions from a screen-off state, as shown in FIG. 5BI, to a screen-on state, as shown in FIG. 5BJ.

In FIG. 5BJ, in response to the transition to the screen-on state, wake screen user interface 5004 is shown. As a result of the activation of the device (e.g. dismissing the wake screen user interface 5004 to display the home screen user interface 5182, as shown in FIGS. 5BG-5BH), prior to the transition from the screen-off state to the screen-on state (FIGS. 5BI-5BJ), notifications 5196, 5206, 5198, and 5200 have been moved to the notification history 5062 and are not displayed on wake screen user interface 5004 in FIG. 5BJ. An input by contact 5212 (e.g., e.g., a vertical swipe input in which contact 5212 moves upward along a path indicated by arrow 5214) causes notification history 5062 to be revealed on wake screen user interface 5004. In response to the vertical swipe input, notification history 5062 is displayed in FIG. 5BK. In FIG. 5BK, as a result of notifications 5196 and 5206 (for messages in the conversation thread with Madeline and Edwin) having been moved to the notification history 5062, notifications 5196 and 5206 are coalesced with notifications 5180, 5068, and 5066 (for messages in the conversation thread with Madeline and Edwin), which were previously displayed in the notification history 5062 (see FIG. 5BD). As a result of notification 5200 (from the Podcasts application) having been moved to the notification history 5062, notification 5200 is coalesced with notification 5014 (from the Podcasts application), which was previously displayed in the notification history 5062. As a result of notification 5126 (from the Social Media application) having been moved to the notification history 5062, notification 5126 is coalesced with notification 5064 (from the Social Media application), which was previously displayed in the notification history 5062.

FIGS. 5BL-5BO illustrate input to expand a set of notifications in a coalesced representation of notifications and to re-coalesce an expanded set of notifications.

In FIG. 5BL, a tap input by contact 5218 is detected at a location that corresponds to a coalesced representation of notifications that includes notifications 5066, 5068, 5180, 5196, and 5206. In response to the input by contact 5218, an expanded version of the coalesced representation of notifications is displayed, as shown in FIG. 5BM. In FIG. 5BM, notifications 5206, 5196, 5180, and 5068 coalesced representation of notifications are displayed separately. Notifications 5198, 5014, 5200, 5064, 5126, and 5056 have been "pushed" downward by the expansion of the coalesced representation and cease to be displayed in wake screen user interface 5004. A control 5220 for re-coalescing the expanded version of the set of notifications and a control 5221 for clearing all notifications in the set of notifications of the respective coalesced representation are displayed at locations that correspond to the expanded version of the set of notifications.

In FIG. 5BN, a tap input by contact 5222 is detected at a location that corresponds to control 5220 for re-coalescing the expanded version of the set of notifications. In response to the input, the coalesced representation of notifications that includes notifications 5066, 5068, 5180, 5196, and 5206 is redisplayed, as shown in FIG. 5BO. Notifications 5198, 5014, 5200, 5064, 5126, and 5056 are also redisplayed in wake screen user interface 5004 in FIG. 5BO.

FIGS. 5BP-5BU illustrate input to expand a set of notifications in a coalesced representation of notifications, input to scroll the expanded set of notifications to reveal additional notifications in the coalesced representation of notifications, and input on a notification of the expanded set of notifications to display an expanded view of the notification.

In FIG. 5BP, a tap input by contact 5224 is detected at a location that corresponds to a coalesced representation of notifications that includes notifications 5066, 5068, 5180, 5196, and 5206. In response to the input by contact 5224, an expanded version of the coalesced representation of notifications is displayed, as shown in FIG. 5BQ. In FIGS. 5BR-BS, contact 5226 moves along a path indicated by arrow 5228. As the contact 5226 moves upward along the path indicated by arrow 5228, notifications 5206, 5196, 5180, and 5068 also move upward (e.g., as if the notifications are "dragged" by the contact 5226 as it moves), revealing notification 5066 of the expanded set of notifications that correspond to the coalesced representation. As shown in FIG. 5BS, in some embodiments, the movement of the contact reveals one or more notifications, such as notification 5198, that were "pushed" downward by the expansion of the set of notifications.

In FIG. 5BS, a contact 5230 (e.g., the same contact as contact 5226 or a distinct contact detected after lift-off of contact 5226 from touch screen 112) is at a location on touch screen 112 that corresponds to notification 5196. In FIG. 5BT, a characteristic intensity of the contact 5230 has increased above a hint intensity threshold level $IT_H$ (as indicated by intensity level meter 5001). As the characteristic intensity of contact 5230 increases above the hint intensity threshold level $IT_H$, the background of wake screen user interface 5004 becomes increasingly blurred, as indicated at FIGS. 5BT-5BU. In FIG. 5BU, the characteristic intensity of contact 5230 has increased above a light press intensity threshold level $IT_L$ (as indicated by intensity level meter 5001). In response to detecting the increase in the characteristic intensity of contact 5230 above the light press intensity threshold level $IT_L$, an expanded version of notification 5196 is displayed. In FIG. 5BU, an expanded version of notification 5196 includes messages 5232, 5234, 5236, 5238, and 5240 that correspond to notifications 5066, 5068, 5180, 5196, and 5206, respectively. While the expanded version of notification 5196 is displayed, an input region 5242, including an input field, messaging controls, and a keyboard is displayed in wake screen user interface 5004.

FIGS. 6A-6E illustrate example user interfaces for displaying coalesced notifications, in accordance with some embodiments. The user interfaces in these figures are used to illustrate the processes described below, including the processes in FIGS. 7A-7G, 8A-8E, and 9A-9E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 6A-6D illustrate prompts to adjust notification settings, in accordance with some embodiments. For example, a prompt for adjusting a notification setting for future notifications of an application is displayed in accordance with a determination that user engagement with the application is below a threshold level of engagement. The various examples of prompts described with regard to FIGS. 6A-6D include different features. It will be recognized that various combinations of the features described with regard to FIGS. 6A-6D may be displayed in a prompt.

Figure 6A:
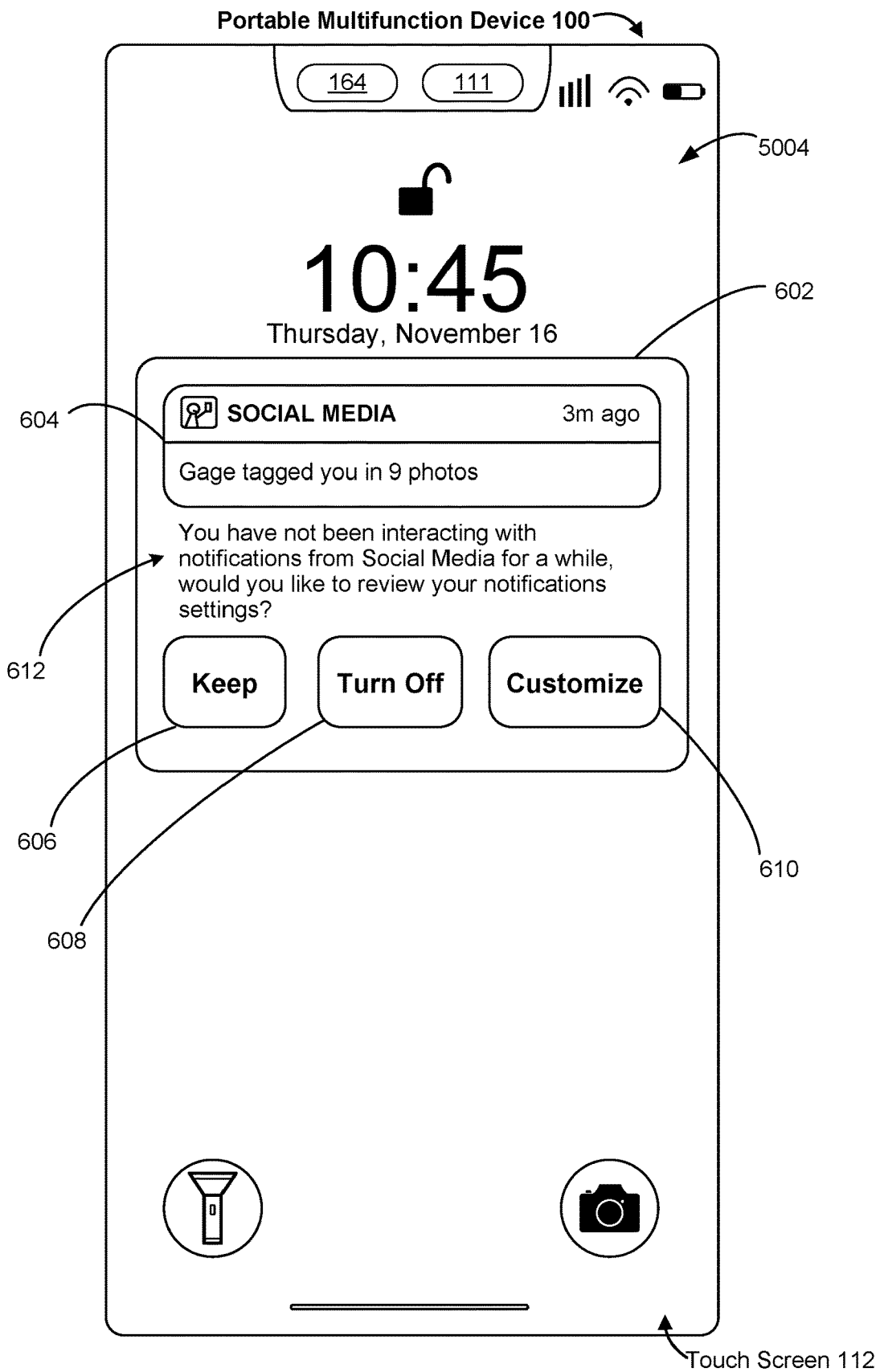
FIGS. 6A-6D illustrate example user interfaces with prompts to adjust notification settings, in accordance with some embodiments.

In FIG. 6A, prompt 602 is displayed on wake screen user interface 5004. Prompt 602 includes an indication of a notification 604 that corresponds to an event of a Social Media application. For example, notification 604 is a most recently received notification of the Social Media application and/or a notification that triggered display of prompt 602. Prompt 602 also includes a control 606 (e.g., a "Keep" button) for maintaining a current prominence setting for notifications of the Social Media application, a control 608 (e.g., a "Turn Off" button) for turning off notifications of the Social Media application, and a control 610 (e.g. a "Customize" button) for displaying a notification settings user interface for the Social Media application (e.g., notification settings user interface 5100 as shown at FIG. 5AB).

Figure 6B:
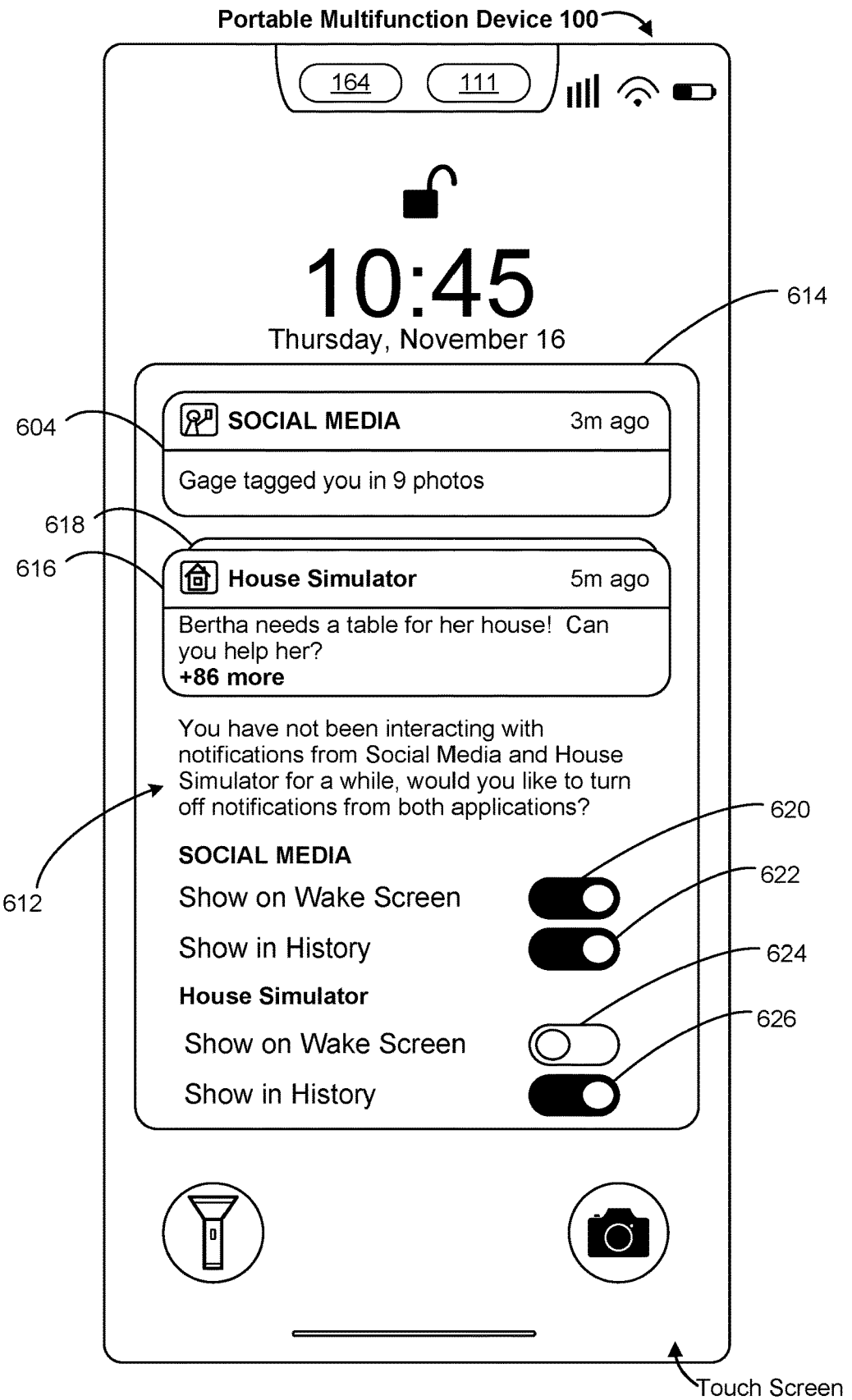

FIG. 6B shows a prompt 614 that includes indications of notification 604 that corresponds to an event of a Social Media application and coalesced notifications 616 and 618 that correspond to events of a House Simulator game application. Prompt 614 includes toggles 620 and 622 for the Social Media application. Input at toggle 620 is used to enable/disable showing future notifications that correspond to events from the Social Media application. Input at toggle 622 is used to enable/disable sending future notifications that correspond to events from the Social Media application to a notification history 5062. Prompt 614 also includes toggles 624 and 626 for the House Simulator game application. Input at toggle 624 is used to enable/disable showing future notifications that correspond to events from the House Simulator game. Input at toggle 626 is used to enable/disable sending future notifications that correspond to events from the House Simulator game to a notification history 5062.

Figure 6C:
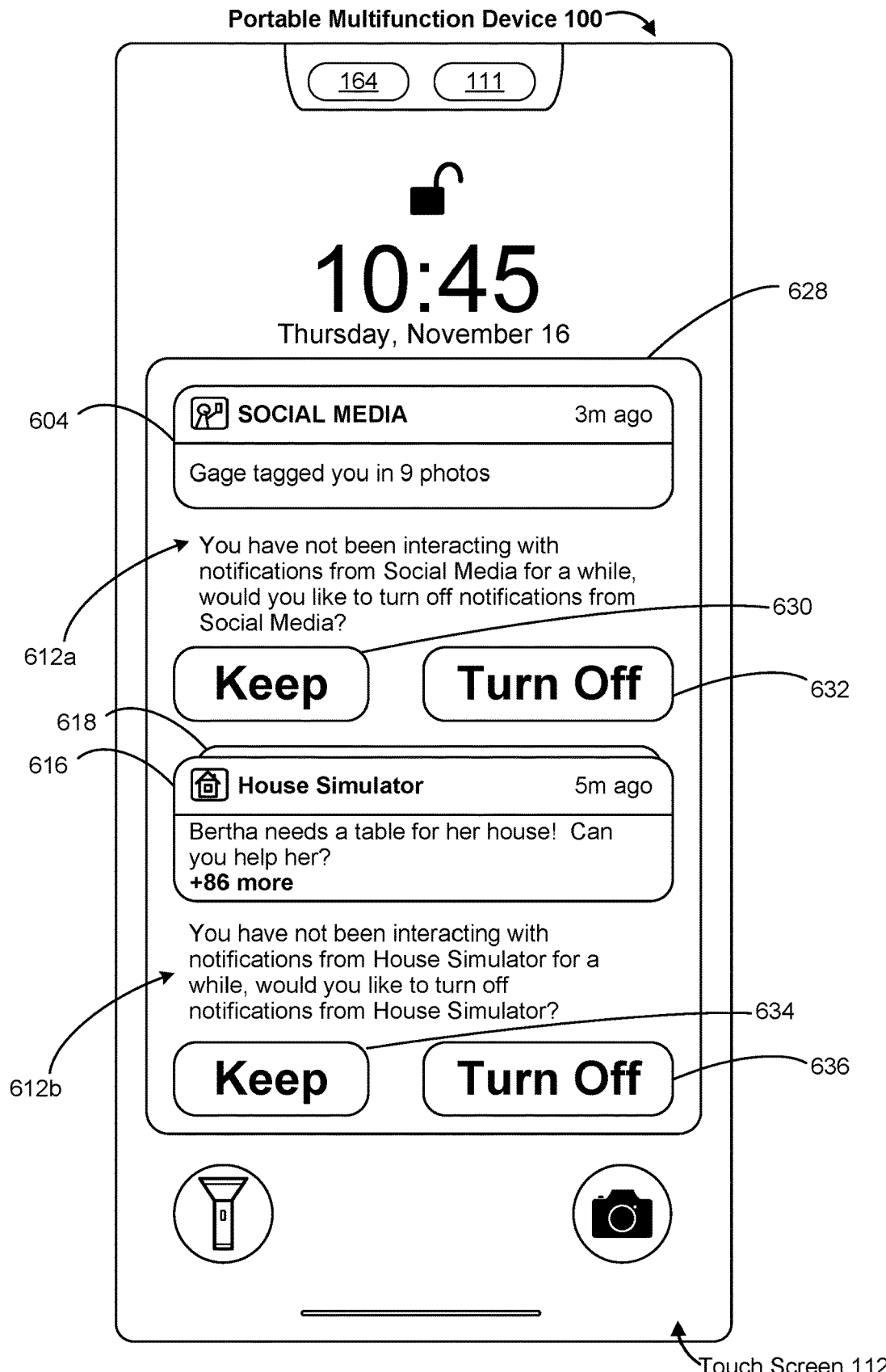

FIG. 6C shows a prompt 628 that includes indications of notification 604 of a Social Media application and coalesced notifications 616 and 618 of a House Simulator game application. Prompt 628 includes control 630 (e.g., a "Keep" button) for maintaining a current prominence setting for notifications of the Social Media application, control 632 (e.g., a "Turn Off" button) for turning off notifications of the Social Media application, control 634 (e.g., a "Keep" button) for maintaining a current prominence setting for notifications of the House Simulator game, and control 636 (e.g., a "Turn Off" button) for turning off notifications of the House Simulator game.

Figure 6D:
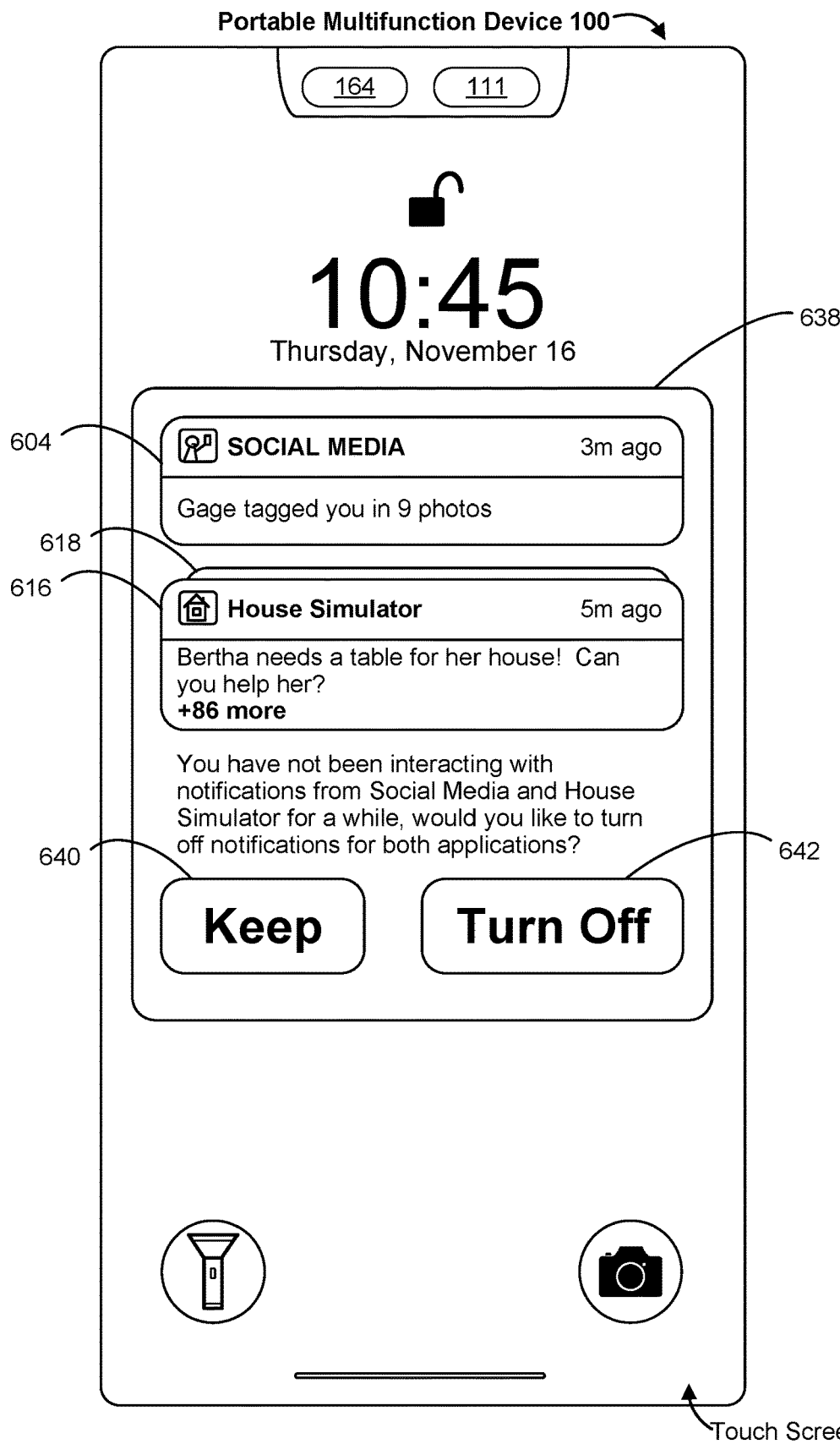
Figure 7A:
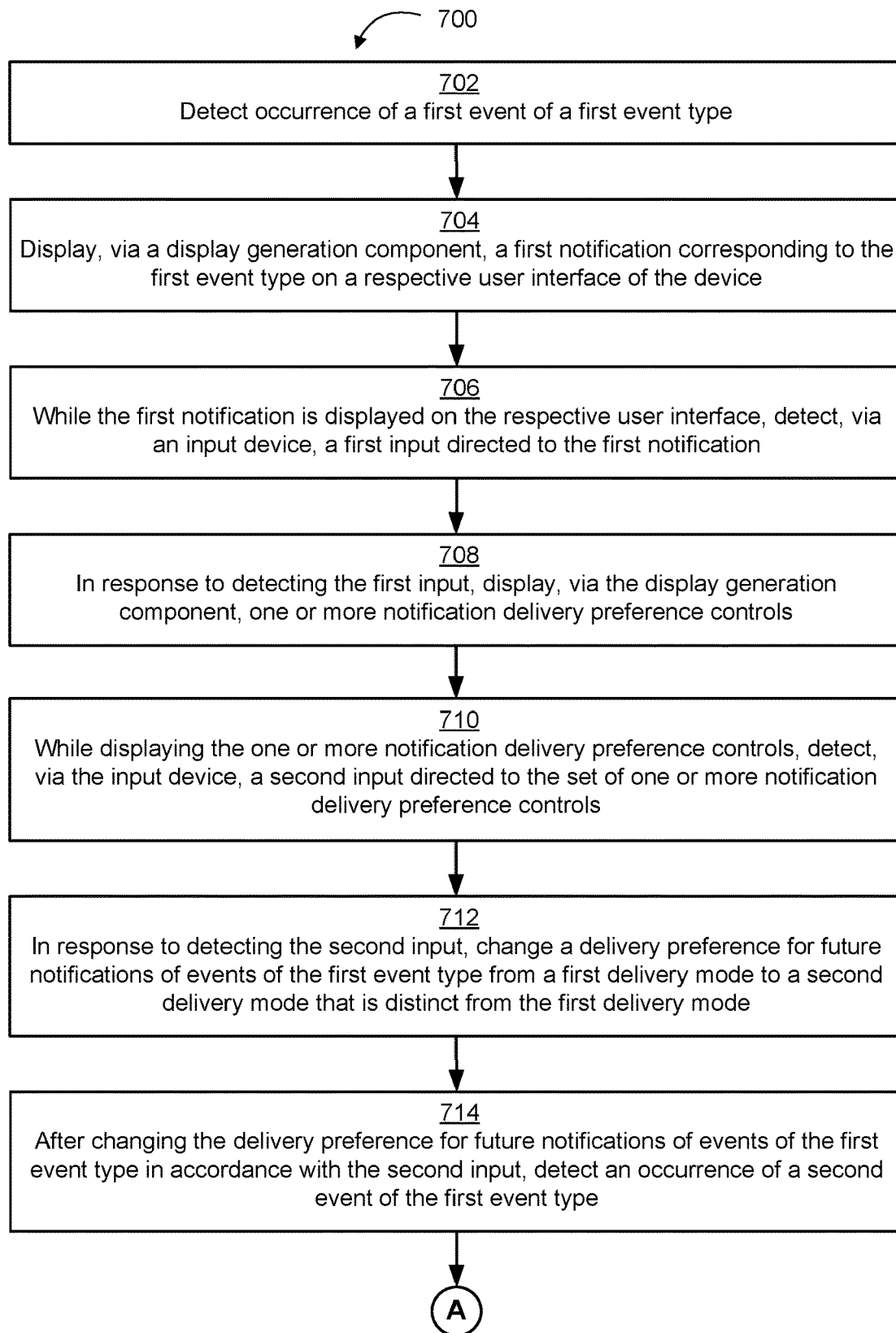
Figure 7C:
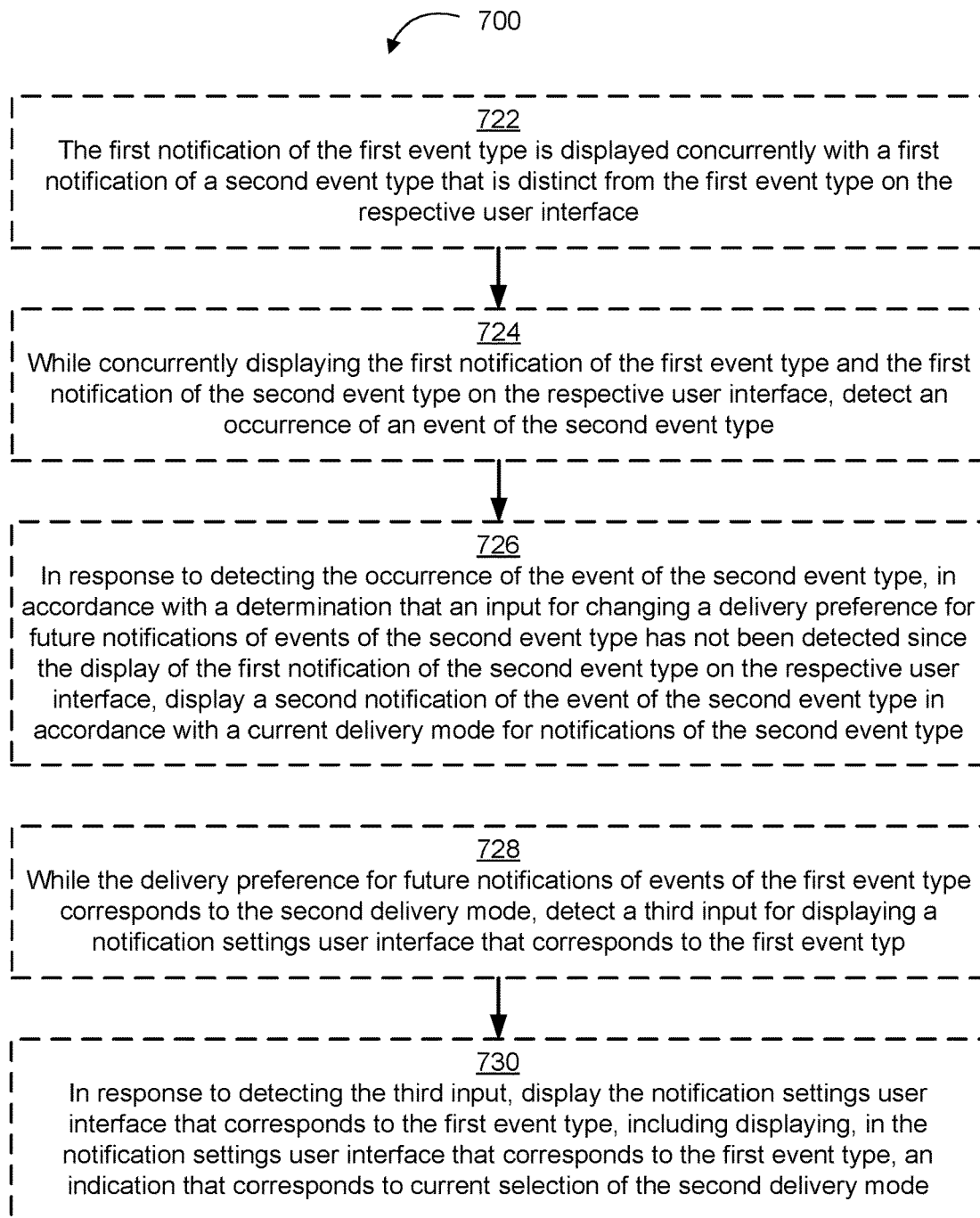
Figure 7E:
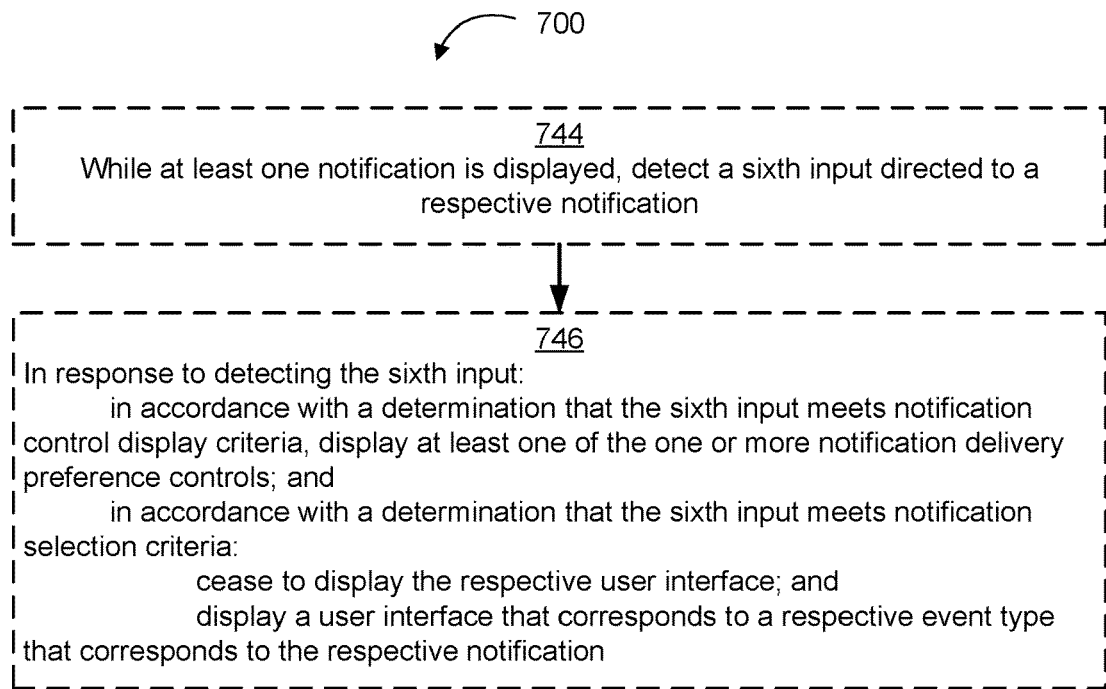
Figure 7F:
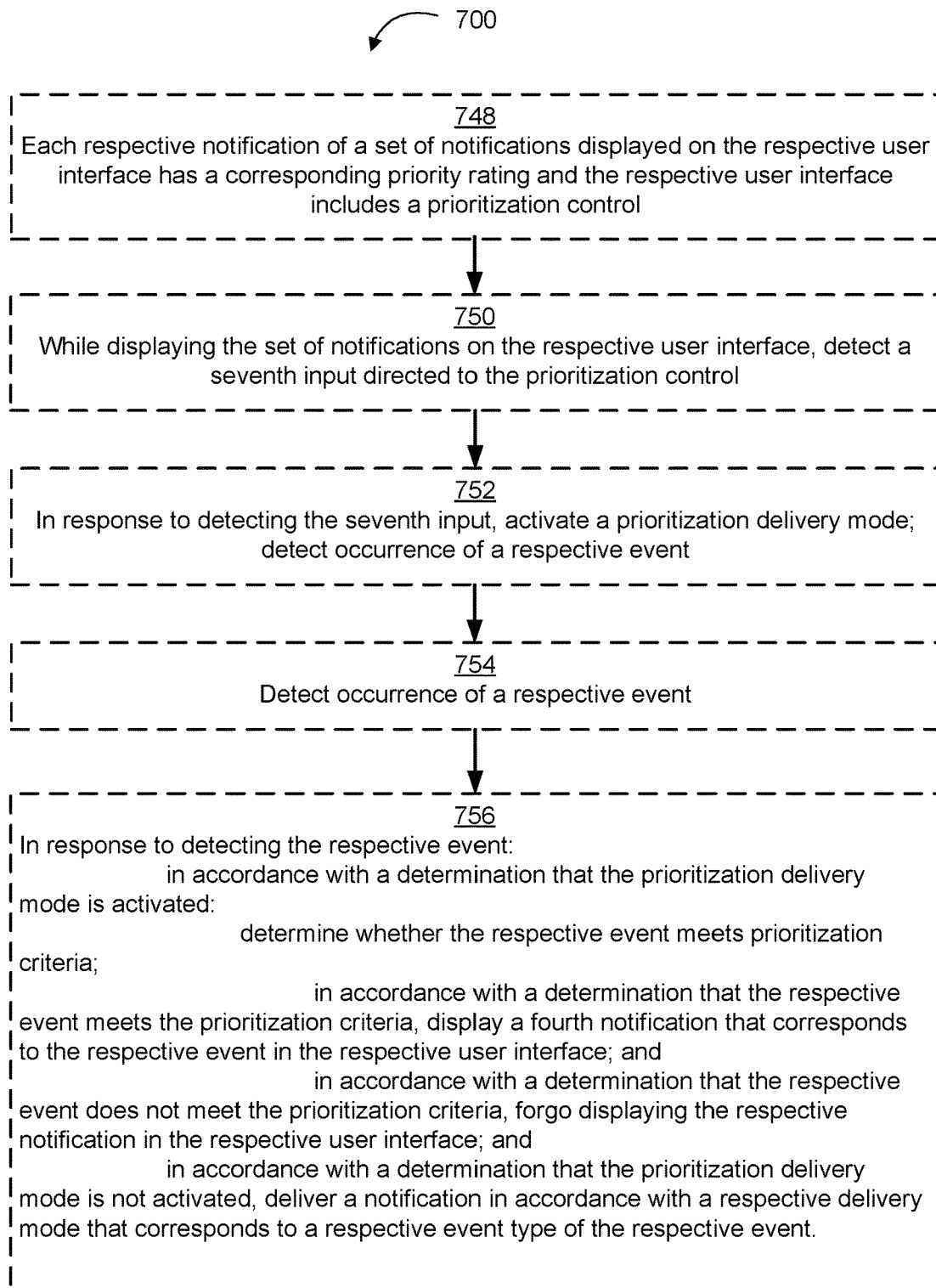
Figure 7G:
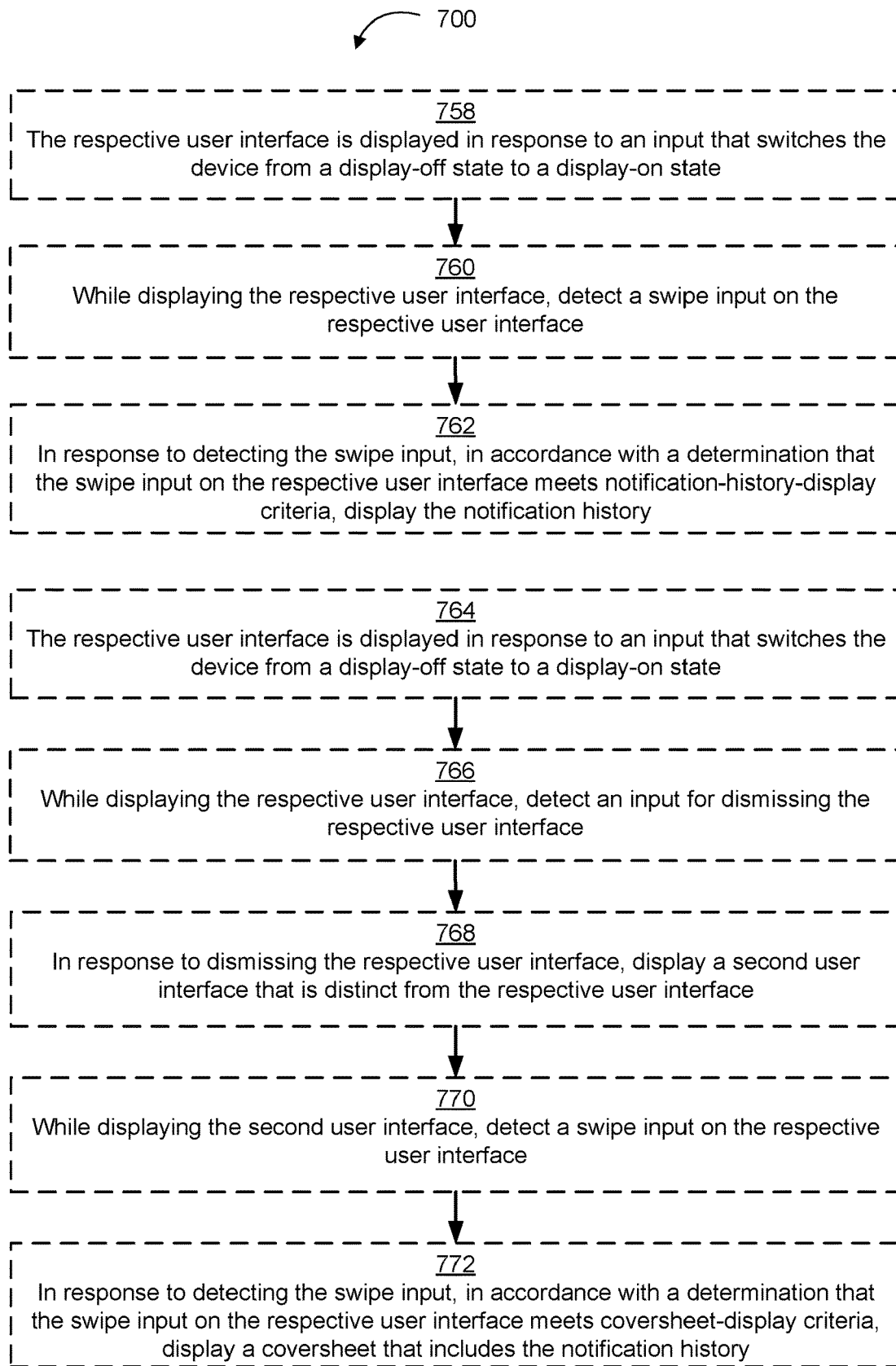
Figure 8A:
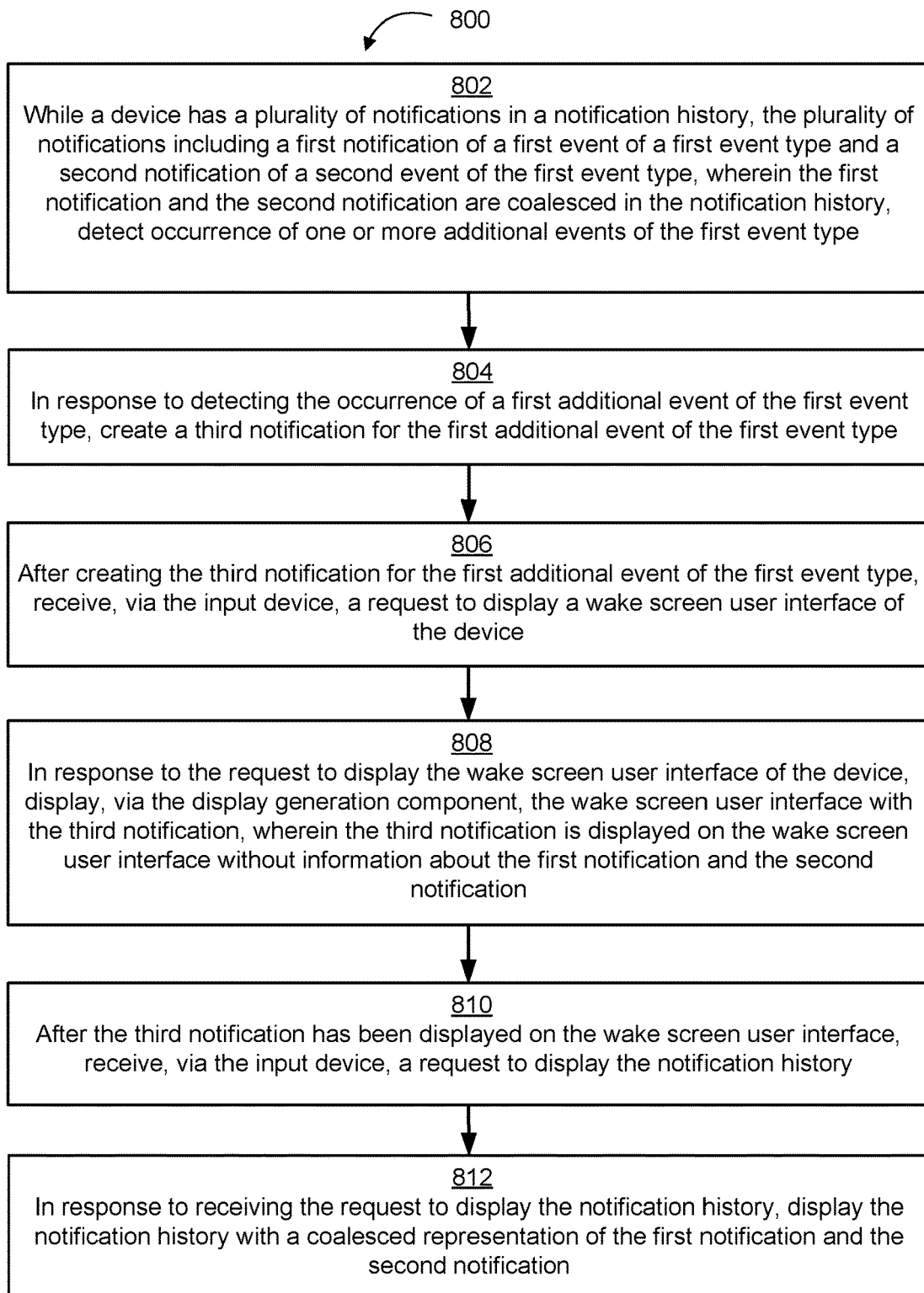
Figure 8B:
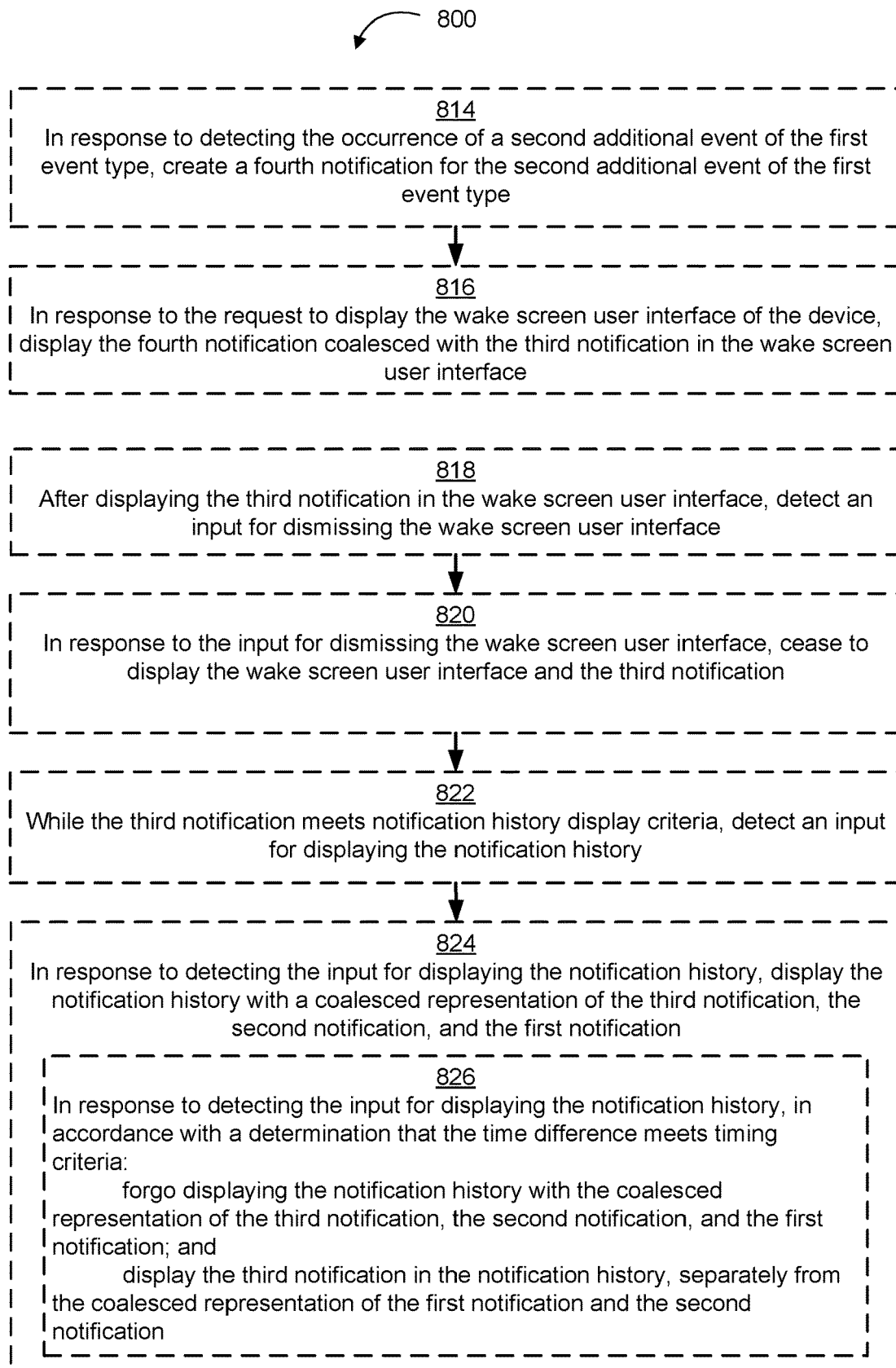
Figure 8D:
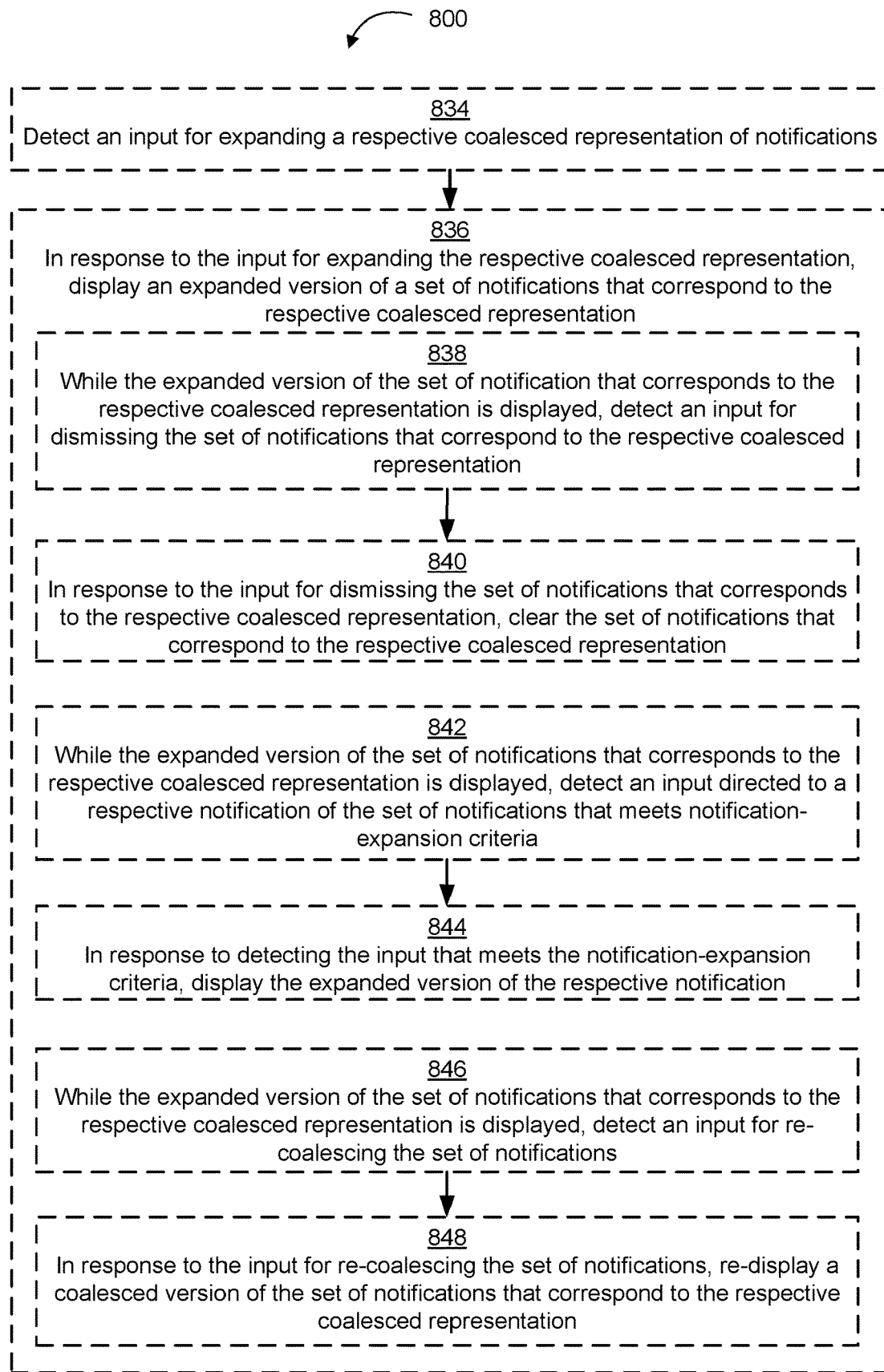
Figure 8E:
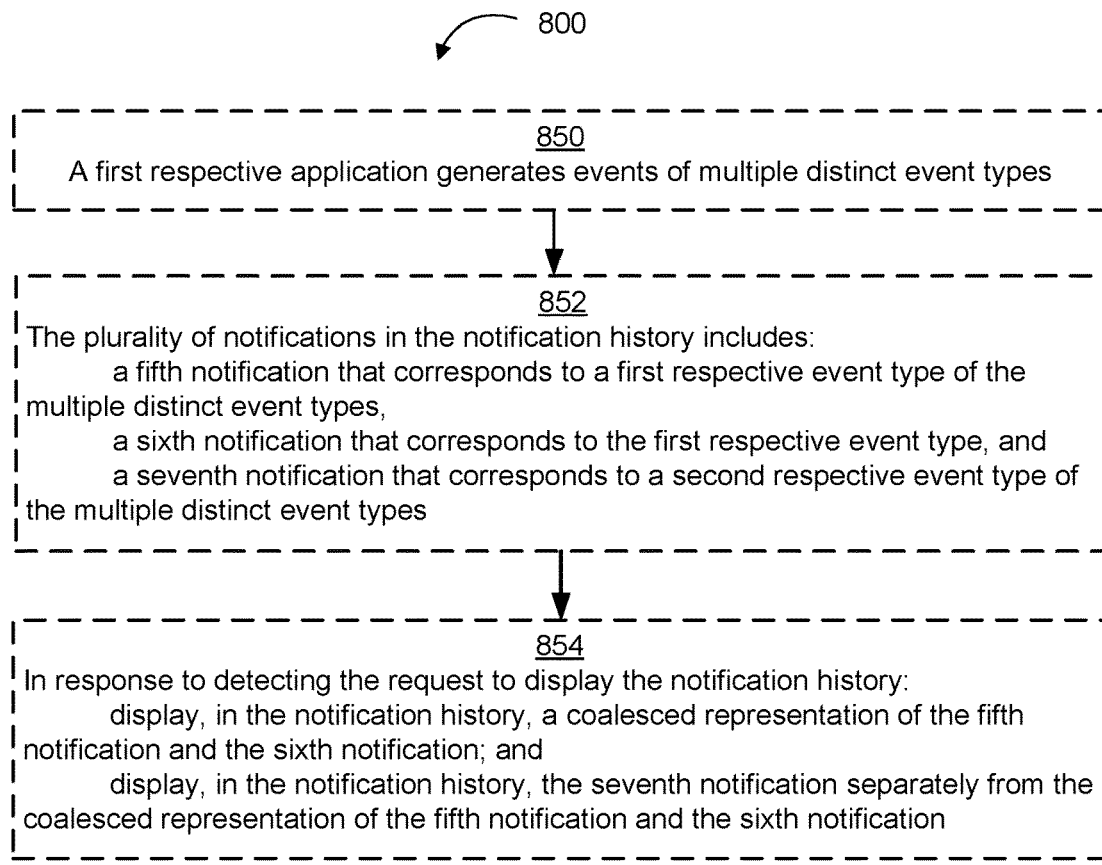
Figure 9A:
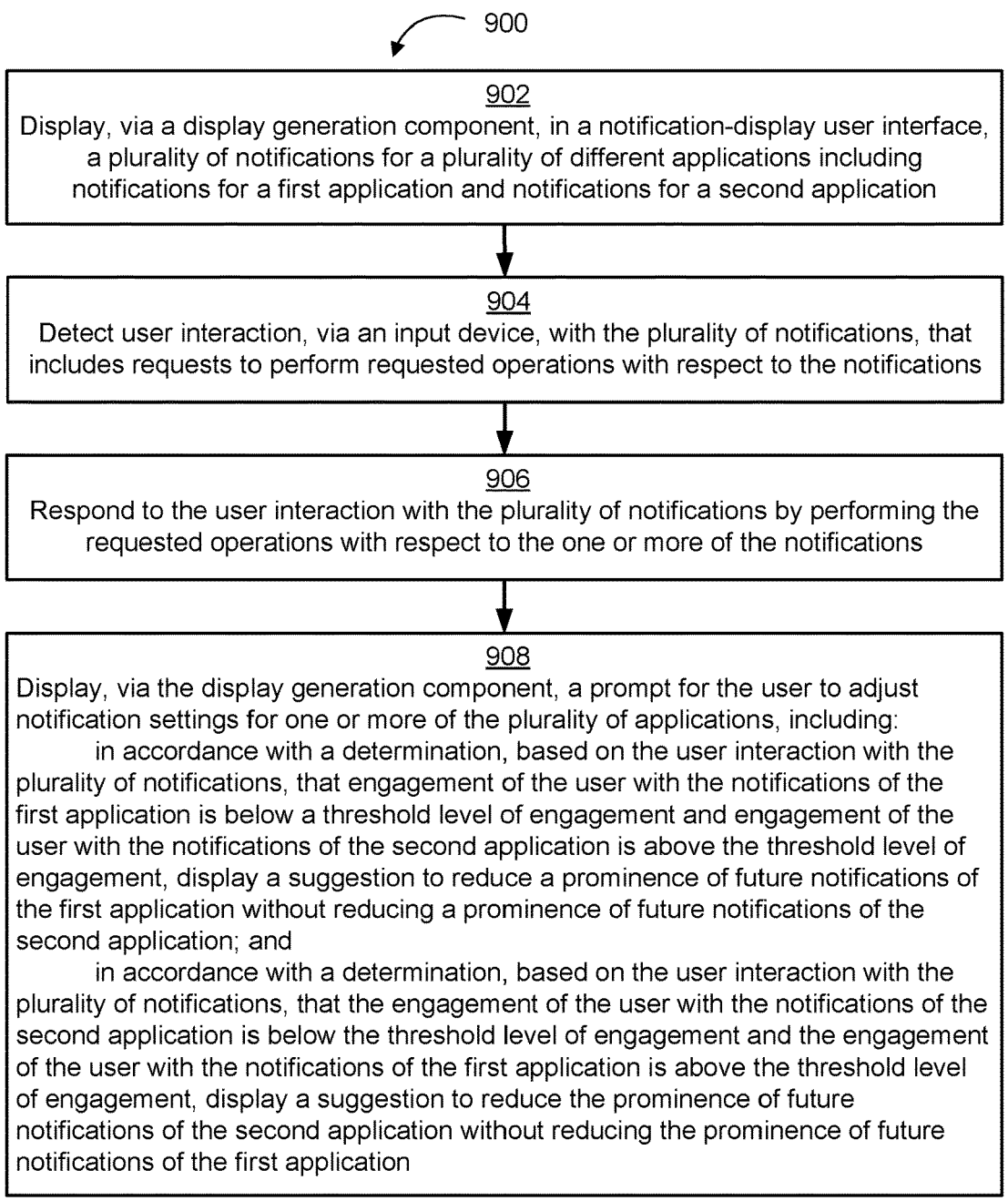
FIGS. 9A-9E are flow diagrams of a process for displaying prompts to adjust notification settings, in accordance with some embodiments.
Figure 9B:
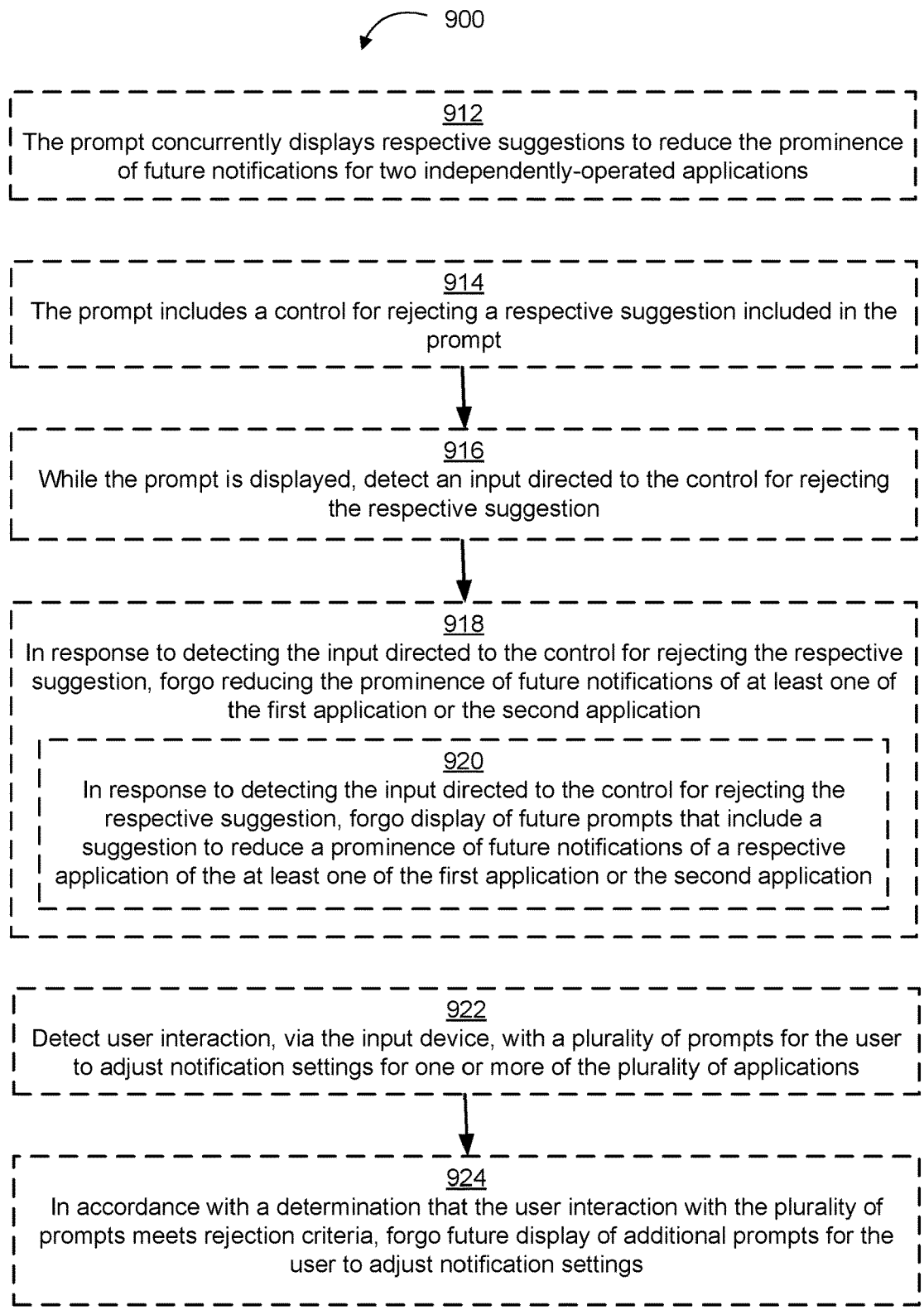
Figure 9C:
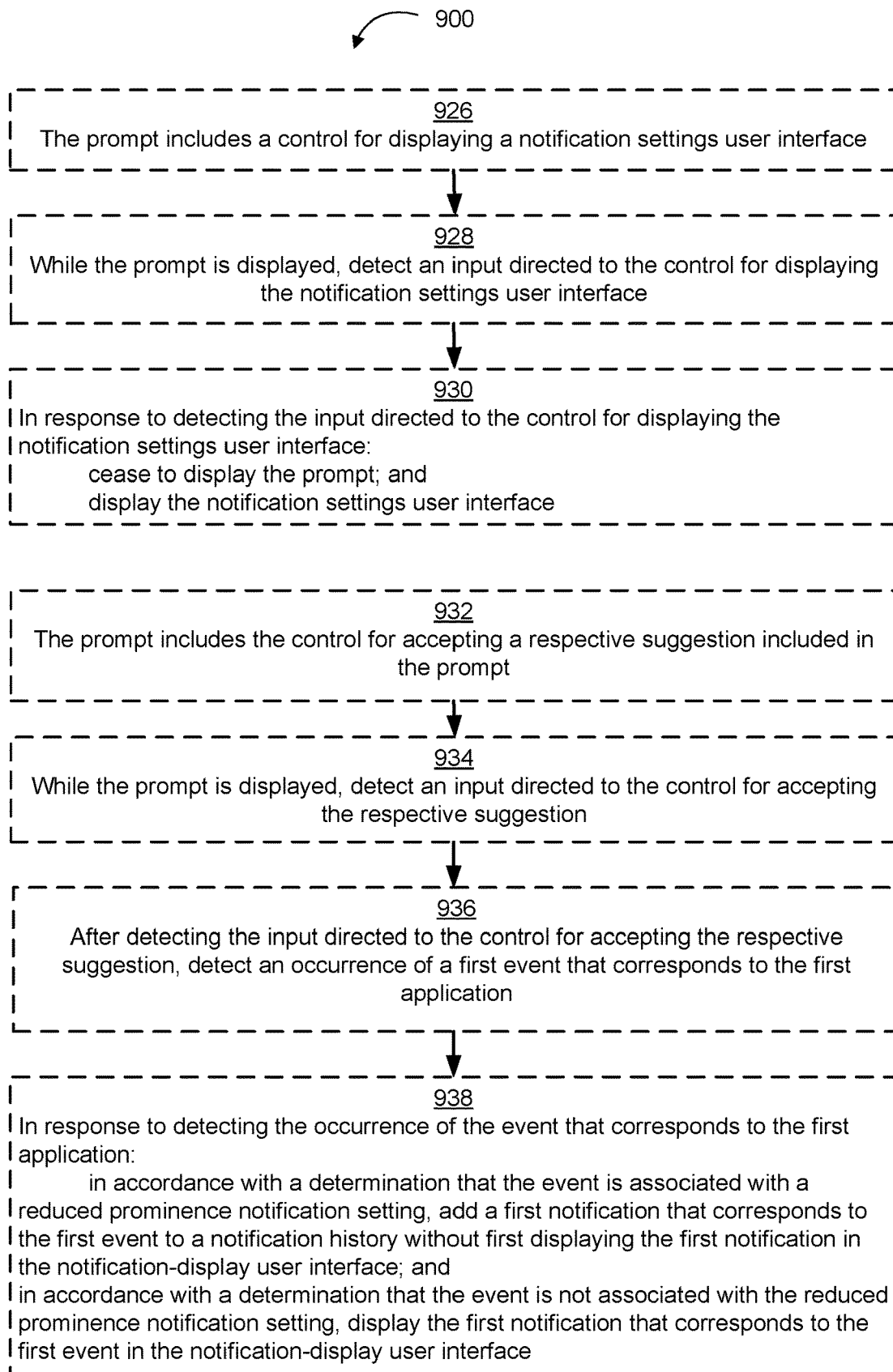
Figure 9D:
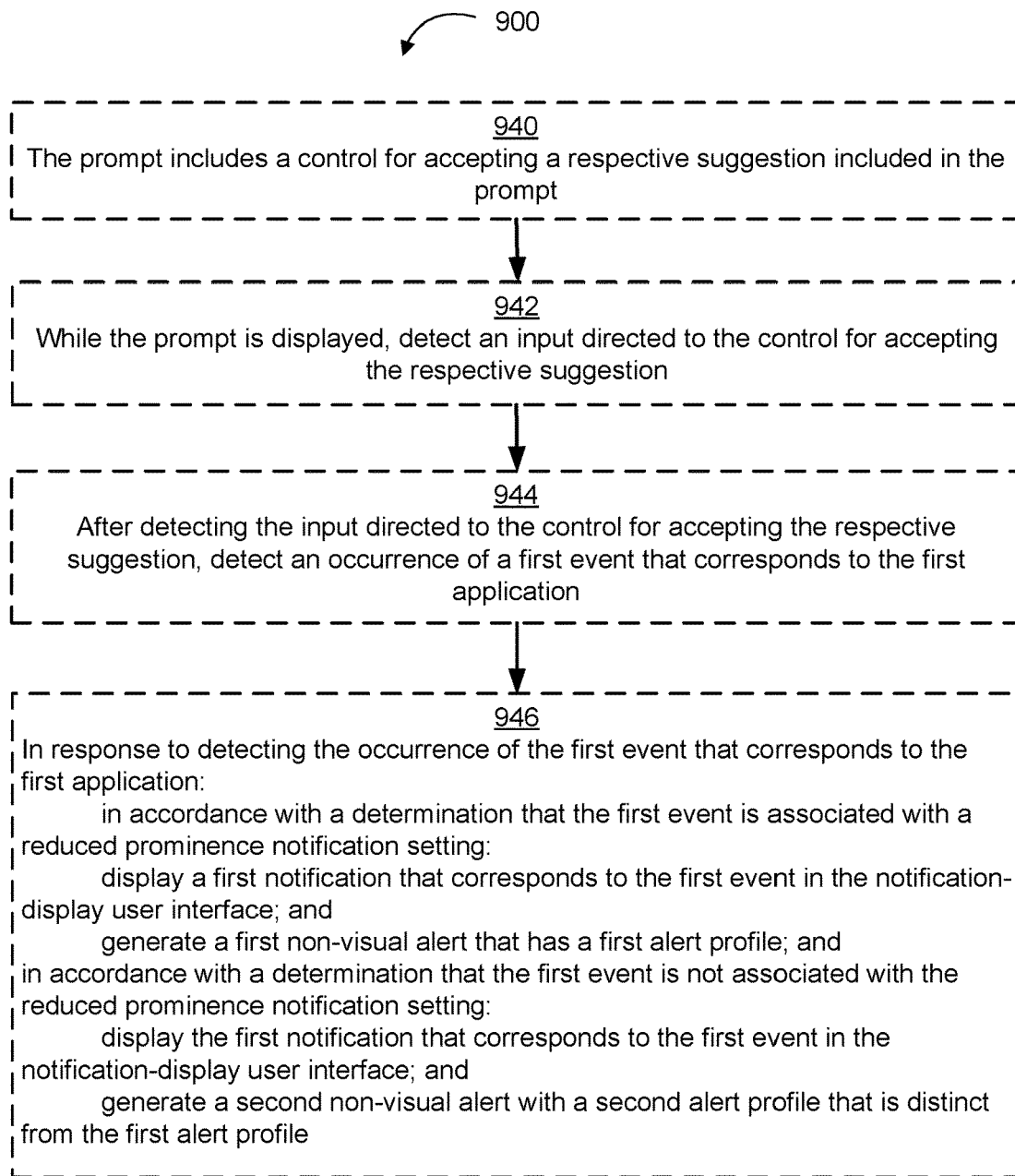
Figure 9E:
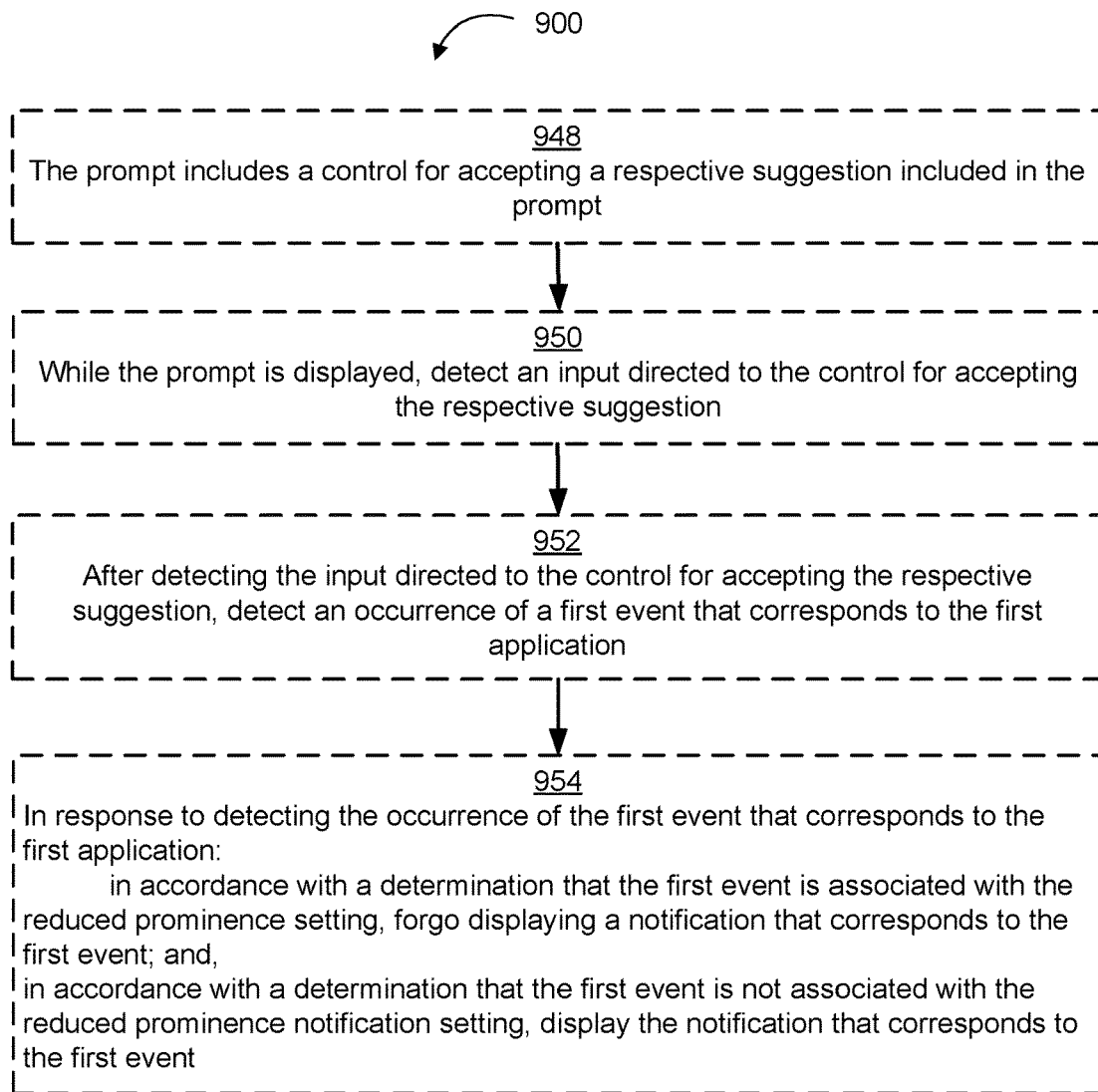

FIG. 6D shows a prompt 638 that includes indications of notification 604 that corresponds to an event of a Social Media application and coalesced notifications 616 and 618 that correspond to an events of a House Simulator game application. Prompt 638 includes control 640 (e.g., a "Keep" button) for maintaining a current prominence setting for notifications of the Social Media application and maintaining a current prominence setting for notifications of the House Simulator game, and control 642 (e.g., a "Turn Off" button) for turning off notifications of the Social Media application and turning off notifications of the House Simulator game.

FIGS. 7A-7G are flow diagrams illustrating method 700 for changing a delivery preference for future notifications of events of an event type, in accordance with some embodiments. Method 700 is performed at a device having a display generation component (e.g., a display, a projector, a heads up display or the like) and one or more input devices (e.g., a touch screen display 112 that serves both as the display and the touch-sensitive surface). In some embodiments, the display generation component is a touch screen display 112 and a touch-sensitive surface is on or integrated with the display. Some operations in method 700 are, optionally, combined and/or the order of some operations is, optionally, changed.

The device detects (702) (e.g., while the display is turned off, while displaying a wake screen user interface 5004, while displaying an application user interface, or while displaying a home screen user interface 5182) the occurrence of a first event of a first event type. In some embodiments, an event type corresponds to an application. In some embodiments, an event type corresponds to a subset or category of content (e.g., a group of messages by the same sender, a group of messages in the same thread, news from the same news source, etc.) in an application. In some embodiments, the first event is an operating system event or application event that is related to a change in device state, receipt of data or content from an external source, or completion of a task, etc., which is used by the operating system as a trigger and basis for generating and/or displaying a corresponding notification to the user outside of the application.

The device displays (704) (e.g., in response to detecting the occurrence of the first event of the first event type), via the display generation component, a first notification corresponding to the first event type on a respective user interface of the device. For example, in FIG. 5B, notification 5006 for a Social Media event is displayed (e.g., the event type of the event that corresponds to notification 5006 is events of the Social Media application). Notification 5008 is for a message event in a conversation thread with contact Ursula (e.g., the event type of the event that corresponds to notification 5008 includes message events for messages in a conversation thread with contact Ursula). In some embodiments, the notification is displayed as a banner or window overlaid on the respective user interface, or as an item within the respective user interface. In some embodiments, the respective user interface is a wake screen user interface 5004 that is displayed when the device switches from a display-off state to a display-on state (e.g., as described with regard to FIGS. 5A1-5A4), a lock screen user interface, an application user interface, a home screen user interface 5182 that includes a plurality of application launch icons (e.g., 416-446) corresponding to a plurality of applications, a cover sheet user interface 5190 (e.g., including a notification center) revealed by swiping down from the top edge of a home screen/application/widget user interface, or a notification history interface 5062 revealed by swiping up on a wake screen interface. In some embodiments, a cover sheet user interface 5190 and/or a notification center user interface have an appearance that is substantially similar to wake screen user interface 5004. For example, elements such as the current time 5054, current date, notifications, and/or other controls are displayed in similar locations and/or with similar appearances in cover sheet user interface 5190 and wake screen user interface 5004. In some embodiments, a control for displaying a set of notification preference controls (e.g., in a menu or in a standalone settings user interface) is also displayed concurrently with the first notification (e.g., the control is revealed in response to an input at a location that corresponds to the first notification, such as a leftward swipe input). For example, a leftward swipe input at notification reveals a set of notification controls 5028 that correspond to the notification, as shown in FIG. 5E, and a control 5074 for displaying a set of notification delivery preference controls is displayed in an expanded version of a notification, as indicated at FIG. 5T.

While the first notification is displayed on the respective user interface, the device detects (706), via the input device, a first input directed to the first notification (e.g., an input that includes a horizontal swipe input as described with regard to FIGS. 5C-5E and/or a tap input as described with regard to FIG. 5G, or an input that includes a light press input as described with regard to FIGS. 5R-5S and/or a tap input as described with regard to FIG. 5T). For example, the first input is an input that meets control-display criteria (e.g., including a criterion that is satisfied in accordance with a determination that a characteristic intensity of the contact increases above a threshold intensity level and/or a criterion that is satisfied in accordance with a determination that a duration of the contact exceeds a threshold duration, or an input that corresponds to a request to display a set of one or more notification delivery preference controls (e.g., including a tap or press input on a control (e.g., that is displayed adjacent to the notification).

In response to detecting the first input, the device displays (708), via the display generation component, one or more notification delivery preference controls (e.g., in a control panel overlaying the currently displayed user interface and/or at a location that corresponds to the first notification, such as within or adjacent to the first notification). For example, in response to input as described with regard to FIGS. 5C-5G, notification delivery preference controls, including a control 5040 for changing a delivery preference for future notifications of events of an event type to a quiet-delivery mode, a control 5042 for turning off future notifications from of events of an event type, a control 5044 for displaying a notification settings user interface for an application, and a control 5046 for dismissing menu 5038, are displayed in notification delivery preference control menu 5038.

While displaying the one or more notification delivery preference controls (e.g., concurrently with the first notification on the respective user interface), the device detects (710), via the input device, a second input (e.g., input by contact 5052 as described with regard to FIG. 5I, input by contact 5090 as described with regard to FIG. 5X, input by contact 5096 as described with regard to FIG. 5Z, input by contact 5164 as described with regard to FIG. 5AO, or input by contact 5178 as described with regard to FIG. 5AR) directed to the set of one or more notification delivery preference controls. For example, the second input (e.g., including a selection input, such as a tap input, that selects one of the one or more notification delivery preference controls) is an input that meets preference-modification criteria (e.g., including a criterion that is satisfied in accordance with a determination a duration between touch-down of the contact and lift-off of the contact that is less than or equal to than a tap time threshold).

In response to detecting the second input, the device changes (712) a delivery preference for future notifications of events of the first event type from a first delivery mode (e.g., a quiet-delivery mode or a prominent-delivery mode) to a second delivery mode (e.g., a mute mode, a prominent-delivery mode, or a quiet-delivery mode) that is distinct from the first delivery mode. For example, in response to the input by contact 5052, a delivery preference for future notifications of events from the Social Media application changes from a prominent-delivery mode to a quiet-delivery mode (e.g., in which notifications of events from the Social Media application are delivered to a notification history), as discussed with regard to FIGS. 5B-5O.

After changing the delivery preference for future notifications of events of the first event type in accordance with the second input, the device detects (714) an occurrence of a second event of the first event type (e.g., a new Social Media post, as indicated by the text, "notification received from social media application at 6:05 not displayed on wake screen" in FIG. 5K).

In response to detecting the occurrence of the second event of the first event type (716): in accordance with a determination that the second delivery mode corresponds to a quiet-delivery mode (e.g., the first notification was displayed on the wake screen user interface 5004 or lock screen user interface under the prominent-delivery mode, and the second input changed the delivery mode for the first notification type from the prominent-delivery mode to a quiet-delivery mode), the device adds a second notification that corresponds to the second event to a notification history without first displaying the second notification in the respective user interface, and, in accordance with a determination that the second delivery mode corresponds to turning off notifications for the first event type (e.g., the first notification was displayed in notification history 5062 under the quiet-delivery mode or was displayed on the wake screen user interface 5004 under the prominent-delivery mode, and the second input changed the delivery mode for the first notification type from the quiet-delivery mode or prominent-delivery mode to the mute mode), the device forgoes displaying the second notification in the respective user interface (e.g., forgoes displaying the second notification in notification history under the quiet-delivery mode, or forgoes displaying the second notification on wake screen under the prominent-delivery mode) and forgoes adding the second notification to the notification history (for example, in the mute mode under which notifications for the first event type are turned off, notifications of the first event type are neither displayed on the wake screen upon receipt nor stored by the device (e.g., in the notification history) for future access by the user). In some embodiments, in a quiet mode of the first event type, notifications of the first event type are sent directly to the notification history (without first displaying it on the wake screen or lock screen) and a user must provide a required input on the wake screen or bring down a cover sheet to view notifications in the notification history on the wake screen or cover sheet). For example, after a delivery preference for future notifications of events of the Social Media application is changed to a quiet-delivery mode, as described with regard to FIG. 5I, notification 5064 for a Social Media application event that occurred at 6:05 is not displayed on wake screen user interface 5004 until the notification history 5062 is accessed, as indicated in FIGS. 5K-5O.

In some embodiments, a respective event type is a topic (e.g., a news topic, a news source, a subject of a communication thread, a keyword in a subject of a communication thread), a source (e.g., a news source, such as a news website), a content type (e.g., a record/listing of shared content (e.g., photo stream)), a device-generated collage of related content (e.g., memories), or a folder). In some embodiments, a respective event type corresponds to a contact or a group of contacts (e.g., for communication content items such as a message, missed call, voicemail, or e-mail). In some embodiments, an application does not need to obtain permission of the user to deliver notifications (e.g., of one or more event types that correspond to the application) in accordance with a quiet-delivery mode (e.g., the quiet-delivery mode is the default mode in which notifications of one or more event types that correspond to an application are delivered until the application obtains user permission to change the delivery mode or the user changes a delivery mode using a notification delivery preference control). In some embodiments, notifications for one or more event types that correspond to an application are turned off until the application obtains user permission to change the notification mode.

Changing a delivery preference for future notifications of events of an event type in response to input received while a notification of the event type is displayed reduces a number of inputs required to change a delivery preference for future notifications of events of the event type. Reducing the number of inputs required to perform an operation enhances the operability of the device and makes the user-device interface more efficient (e.g., by allowing a user to change a delivery preference for notifications without requiring input to access a settings user interface), which, additionally, reduces power usage and improves battery life of the device by enabling the user to use the device more quickly and efficiently.

In some embodiments, in response to detecting the occurrence of the second event of the first event type, in accordance with a determination that the second delivery mode corresponds to a prominent-delivery mode, the device displays (718) the second notification of the first event type over a wake screen user interface (e.g., wake screen user interface 5004) that is distinct from the respective user interface. For example, the first notification was displayed in notification history 5062 (e.g., accessed from wake screen user interface 5004 or from cover sheet user interface 5190) under the quiet-delivery mode, and the second input changed the delivery mode for the first notification type from the quiet-delivery mode to the prominent-delivery mode. In some embodiments, the prominent-delivery mode is a mode in which a notification that corresponds to the first event type is displayed, upon occurrence of an event of the first event type, over a currently displayed user interface (e.g., while the device is in use) and/or the notification that corresponds to the first event type is displayed when a wake screen user interface 5004 or a lock screen is displayed after occurrence of the event of the first event type. In some embodiments, the first notification is not initially displayed on wake screen user interface 5004 and a user input is required to view the first notification in the respective user interface after the first event occurred. The user input to view the first notification is, for example: a swipe up on wake screen 5004 to bring up notification history user interface 5062 (e.g., as described with regard to FIGS. 5N-5O, to display notification history 5062) or a swipe down on a home screen user interface 5182 (e.g., as described with regard to FIGS. 5AW-5AZ), a desktop user interface, a widget user interface, or another user interface displayed by the device. In some embodiments, the second notification is displayed when wake screen user interface 5004 is initially displayed and no user input is necessary to view the second notification on wake screen user interface 5004. In some embodiments, an application must obtain permission from the user to display notifications in a prominent notification delivery mode. Changing a delivery preference for future notifications of events of an event type to a prominent-delivery mode in response to input received while a notification of the event type is displayed reduces a number of inputs required to increase the prominence of deliveries of future notifications. Reducing the number of inputs required to perform an operation enhances the operability of the device and makes the user-device interface more efficient (e.g., by allowing a user to increase the prominence of deliveries of future notifications of events of the event type without requiring input to access a settings user interface), which, additionally, reduces power usage and improves battery life of the device by enabling the user to use the device more quickly and efficiently.

In some embodiments, the respective user interface includes (720) the notification history (e.g., the respective user interface is the notification user interface 5062 that is displayed in response to an upward swipe on the wake screen user interface 5004, or the respective user interface is a cover sheet user interface 5190 that is displayed in response to a downward swipe from a top edge of the touch screen 112 that is detected while a home screen user interface 5182 or application user interface is displayed). Changing a delivery preference for future notifications of events of an event type to a prominent-delivery mode in response to input received while a notification history is displayed reduces a number of inputs required to change a delivery preference for future notifications of events of the event type. Reducing the number of inputs required to perform an operation enhances the operability of the device and makes the user-device interface more efficient (e.g., by allowing a user to change a delivery preference for future notifications of events of the event type without requiring input to access a settings user interface), which, additionally, reduces power usage and improves battery life of the device by enabling the user to use the device more quickly and efficiently.

In some embodiments, the device displays (722) the first notification of the first event type concurrently with a first notification of a second event type that is distinct from the first event type (e.g., the first notification of the second event type corresponds to occurrence of a first event of the second event type that is distinct from the first event type) on the respective user interface (e.g., the notification history user interface, wake screen, or cover sheet user interface, etc.). For example, the first notification of the first event type is notification 5006 of the Social Media application and the first notification of the second event type is notification 5014 of the Podcasts application. While concurrently displaying the first notification of the first event type and the first notification of the second event type on the respective user interface, the device detects (724) an occurrence of an event of the second event type (e.g., a second event of the second event type that occurred later than the first event of the second event type). In response to detecting the occurrence of the event of the second event type (e.g., the second event of the second event type), in accordance with a determination that an input for changing a delivery preference for future notifications of events of the second event type has not been detected since the display of the first notification of the second event type on the respective user interface, the device displays (726) a second notification of the event of the second event type in accordance with a current delivery mode (e.g., the quiet-delivery mode or the prominent-delivery mode) for notifications of the second event type. For example, notification 5014 of the Podcasts application was delivered in accordance with a prominent-delivery mode, as shown in FIG. 5B, and notification 5200 of the Podcasts application is also delivered in accordance with a prominent-delivery mode, as shown in FIG. 5BA. Allowing a user to change (or bypass changing) a delivery preference for notifications of events of an event type and delivering a notification in accordance with a delivery mode indicated by the changed (or unchanged) delivery preference makes the user-device interface more efficient and enhances the operability of the device (e.g., by displaying notifications in accordance with a user-indicated preference, which in turn reduces the amount of time and/or number of inputs required to display desired notifications among the prominently-displayed notifications, while retaining the user's ability to display reduced prominence notifications (e.g., in a notification history)). Enabling the user to use the device more quickly and efficiently reduces power usage and improves battery life of the device.

In some embodiments, while the delivery preference for future notifications of events of the first event type corresponds to the second delivery mode, the device detects (728) a third input for displaying a notification settings user interface (e.g., notification settings user interface 5100) that corresponds to the first event type. In some embodiments, the third input is an input directed to a notification delivery preference control (e.g., a control displayed in notification delivery preference control menu 5078). For example, the third input is an input at control 5044 for displaying a notification settings user interface for the Social Media application, as described with regard to FIG. 5AA. In some embodiments, the third input is an input (e.g., an input to display a notification settings user interface that corresponds to an application) that is detected while a general notification settings user interface is displayed. In some embodiments, a notification settings user interface (e.g., for an application) is displayed after a series of inputs that includes, for example, input to unlock the device, input to display a home screen user interface 5182, input to navigate to a home screen user interface page that includes a settings icon 446, input to display a general settings user interface, and/or input to display a general notification settings user interface). In response to detecting the third input, the device displays (730) the notification settings user interface 5100 that corresponds to the first event type, including displaying, in the notification settings user interface 5100 that corresponds to the first event type, an indication (including, e.g., text, an image, and/or an animated graphic, and/or a selectable control for selecting a preferred delivery mode) that corresponds to current selection of the second delivery mode. For example, in FIG. 5AB, active mode indicators 5118 and 5120 and toggles 5106 and 5108 indicate that a prominent-delivery mode is not activated and that a quiet-delivery mode is activated. In some embodiments, changes made in response to the second input are saved and reflected in the notification settings user interface 5100 without additional input from the user. For example, when a user navigates to a notification settings user interface after providing input to change the delivery preference for future notifications of events of the first event type from a first delivery mode to a second delivery mode, the notification settings user interface displays an indication of current selection of the second delivery mode when the notification settings user interface is presented to the user. Displaying an indication of a currently selected delivery mode in the notification settings user interface after changing the delivery preference to a second delivery mode provides improved feedback indicating the current state of the device. Providing improved feedback enhances the operability of the device and makes the user-device interface more efficient (e.g., by helping the user to understand the result of the input provided to change the delivery preference to the second delivery mode, thereby reducing user mistakes when interacting with the device), which, additionally reduces power usage and improves battery life of the device by enabling the user to use the device more quickly and efficiently.

In some embodiments, while a notification settings user interface that corresponds to the first event type is displayed (e.g., as a result of the third input for displaying the notification settings user interface that corresponds to the first event type), the device detects (732) an input directed to a delivery mode control that corresponds to a respective delivery mode of a plurality of delivery modes (e.g., the delivery mode control is a respective delivery mode control of a plurality of delivery mode controls that correspond to the plurality of delivery modes). For example, while notification settings user interface 5100, that corresponds to events of the Social Media application, is displayed, an input directed to a delivery mode control (e.g., toggle 5106 for enabling/disabling showing notifications for the application on the wake screen user interface 5004) is detected, as shown in FIG. 5AD. In response to detecting the input directed to the delivery mode control (734): the device changes the delivery mode preference for future notifications of events of the first event type from a currently selected delivery mode (e.g., the second delivery mode) to the respective delivery mode and the device displays a respective animation (e.g., of the control and/or of an image displayed at a location that corresponds to the control) that illustrates notification delivery under the respective delivery mode. In some embodiments, the animation illustrates the delivery mode by indicating (e.g., relative to a representation of the display generation component and/or an application window) a size of a representation of a notification, a path of movement of the representation of the notification, a duration of time during which the representation of the notification is displayed, and/or an indication of whether or not the representation of the notification is displayed on the wake screen, is displayed as a banner over a currently displayed user interface, and/or is sent directly into the notification history. For example, in response to the input by contact 5124, as described with regard to FIG. 5AD, the states of toggle 5106 and active mode indicator 5118 change from FIG. 5AD-5AE, and an animation sequence for animated icon 5116 is initiated, as illustrated at FIGS. 5AE-5AF. In some embodiments, the notification animation continues while the notification option is selected and stops if the notification option is not selected. In some embodiments, the notification animation continues whether or not the notification option is selected. Displaying an animation that illustrates notification delivery in accordance with a currently selected delivery mode provides improved feedback indicating the state of the device. Providing improved feedback enhances the operability of the device and makes the user-device interface more efficient (e.g., by helping the user to understand the result of the input provided to change the delivery preference to the delivery mode, thereby reducing user mistakes when interacting with the device), which, additionally reduces power usage and improves battery life of the device by enabling the user to use the device more quickly and efficiently.

In some embodiments, while a respective notification is displayed (e.g., in a wake screen interface, a lock screen interface, or in a notification history), the device detects (736) a fourth input (e.g., an input with a characteristic intensity of the contact that increases above a first intensity threshold (e.g., a light press intensity threshold $IT_L$) or a touch-and hold input) to invoke a corresponding expanded version of the respective notification (e.g., the expanded version includes content of the respective notification and additional content and/or control affordance(s) not present in the respective notification when the respective notification was not expanded). For example, the fourth input is a light press input by contact 5070 at a location on touch screen 112 that corresponds to notification 5064, as illustrated at FIGS. 5Q-5S. In response to detecting the fourth input, the device displays (738) the expanded version of the respective notification, wherein the expanded version of the respective notification includes a control for triggering display of at least one of the notification delivery preference controls. For example, in response to the fourth input as illustrated at FIGS. 5Q-5S, an expanded version of notification 5064 is displayed in FIG. 5S. In some embodiments, the device detects (740) a fifth input directed to the control for triggering display of the at least one of the notification delivery preference controls. For example, the fifth input is a tap input by contact 5076 at a location on touch screen 112 that corresponds to control 5074, as illustrated at FIG. 5T. In response to the fifth input, the device displays (742) (e.g., at a location that corresponds to the expanded version of the respective notification, such as within or adjacent to the expanded version of the respective notification) the at least one of one or more the notification delivery preference controls (e.g., including controls for selecting from two or more notification delivery modes). For example, in response to the fifth input as illustrated at FIG. 5T, the device displays notification delivery preference control menu 5078 that includes control 5080 for changing a delivery preference for future notifications for an event type a prominent-delivery mode, control 5040 for changing a delivery preference for future notifications for an event type to a quiet-delivery mode, and control 5042 for turning off future notifications for an event type. Displaying a delivery preference control for changing a delivery preference for future notifications of events of an event type in response to input detected while an expanded version of a notification of the event type is displayed reduces a number of inputs required to change a delivery preference for future notifications of events of the event type. Reducing the number of inputs required to perform an operation enhances the operability of the device and makes the user-device interface more efficient (e.g., by allowing a user to change a delivery preference for notifications without requiring user input to access a settings user interface), which, additionally, reduces power usage and improves battery life of the device by enabling the user to use the device more quickly and efficiently.

In some embodiments, while at least one notification is displayed (e.g., in a wake screen user interface 5004, a lock screen interface, or in a notification history 5062), the device detects (744) a sixth input directed to a respective notification. In response to detecting the sixth input (746): in accordance with a determination that the sixth input (e.g., a leftward swipe input) meets notification control display criteria (e.g., including criteria that are satisfied in accordance with a determination that the contact moves along a substantially horizontal path by a distance that exceeds a threshold distance (e.g., a leftward swipe) and/or that a characteristic intensity of the contact at a location that corresponds to respective notification increases above a first intensity threshold (e.g., a light press intensity threshold $IT_L$)), the device displays at least one of the one or more notification delivery preference controls (e.g., controls 5040, 5042, and/or 5080); and, in accordance with a determination that the sixth input meets notification selection criteria (e.g., including criteria that are satisfied in accordance with a determination that the sixth input is a tap input (e.g., the input has a duration between touch-down of the contact and lift-off of the contact that is less than or equal to than a tap time threshold and a characteristic intensity of the contact at a location that corresponds to respective notification does not increase above the first intensity threshold) or a long press input (e.g., the input has a duration between touch-down of the contact and lift-off of the contact that is greater than a tap time threshold and a characteristic intensity of the contact at a location that corresponds to respective notification does not increase above the first intensity threshold): the device ceases to display the respective user interface and displays a user interface that corresponds to a respective event type that corresponds to the respective notification. For example, in accordance with a determination that an input directed to notification 5006 for an event from the Social Media notification meets notification selection criteria, a user interface for the Social Media application is displayed. Determining whether to display a notification delivery preference control or display a user interface that corresponds to a respective event, depending on whether an input directed to a notification meets notification control display criteria, enables the performance of multiple different types of operations with an input directed to a notification. Enabling the performance of multiple different types of operations with the input directed to the notification enhances the operability of the device and makes the user-device interface more efficient, which, additionally, reduces power usage and improves battery life of the device by enabling the user to use the device more quickly and efficiently.

In some embodiments, each respective notification of a set of notifications displayed on the respective user interface has (748) a corresponding priority rating; and the respective user interface includes a prioritization control (e.g., a "prioritize" button) (e.g., the prioritization control, when selected, causes the device to: cease to display future notifications (e.g., cease to display on the wake screen, cease to display in the notification history, or cease all display) that do not meet prioritization criteria (e.g., they each have a respective priority rating that is below a priority threshold) and display future notifications that meet the prioritization criteria (e.g., they each have a respective priority rating that is equal or above the priority threshold)). In some embodiments, while displaying the set of notifications on the respective user interface, the device detects (750) a seventh input directed to the prioritization control (e.g., detecting a tap input on the prioritization control); In response to detecting the seventh input, the device activates (752) a prioritization delivery mode. The device detects (754) occurrence of a respective event. In response to detecting the respective event (756): in accordance with a determination that the prioritization delivery mode is activated (e.g., when the event is detected): the device determines whether the respective event meets prioritization criteria (e.g. a notification that corresponds to the event has a priority score equal to or above the priority threshold); and in accordance with a determination that the respective event meets the prioritization criteria, the device displays a fourth notification that corresponds to the respective event in the respective user interface (e.g., within a designated region of the user interface, such as at the top of a list of displayed notifications). In some embodiments, in accordance with a determination that the respective event does not meet the prioritization criteria, the respective notification is delivered to a notification history. In some embodiments, in accordance with a determination that the respective event does not meet the prioritization criteria, the device forgoes displaying the respective notification in the respective interface and forgoes adding the respective notification to the notification history. In some embodiments, in accordance with a determination that the respective event does not meet the prioritization criteria, the device forgoes displaying the respective notification in the respective user interface. In some embodiments, in accordance with a determination that the prioritization delivery mode is not activated, the device delivers a notification in accordance with a respective delivery mode that corresponds to a respective event type of the respective event. Activating a prioritization delivery mode and delivering a notification in accordance with the prioritization mode makes the user-device interface more efficient and enhances the operability of the device (e.g., by displaying notifications in accordance with a user-indicated preference for prioritization, which in turn reduces the number of inputs required to display desired notifications among the available notifications). Enabling the user to use the device more quickly and efficiently reduces power usage and improves battery life of the device.

In some embodiments, the device displays (758) the respective user interface in response to an input (e.g., a tap on the touch screen, movement of the device in a predetermined manner, movement of the device to a predetermined position, a press of a button, etc.) that switches the device from a display-off state to a display-on state (e.g., wakes the device). For example, the respective user interface is a wake screen user interface 5004 that is displayed after the device switches from a display-off state to a display-on state (e.g., as described with regard to FIGS. 5A2-5A3 or as described with regard to FIGS. 5AZ-5BA). While displaying the respective user interface (e.g., wake screen user interface 5004), the device detects (760) a swipe input on the respective user interface (e.g., an upward or downward swipe input). For example, the swipe input is an input as described with regard to FIGS. 5BB-5BD). In response to detecting the swipe input, in accordance with a determination that the swipe input on the respective user interface meets notification-history-display criteria, (e.g., the notification-history-display criteria require (1) that the movement of a contact is detected after an end (e.g., a bottom-most new notification) of a scrollable arrangement of new notifications in the respective user interface has been reached and/or (2) that the continued movement of the contact after the end of the scrollable arrangement is reached exceeds a threshold amount of movement in the current scroll direction) the device displays (762) the notification history (e.g., the notifications currently displayed on the respective user interface are not saved to or displayed in the notification history 5062 at this time). In some embodiments, in accordance with a determination that the swipe input does not meet notification-history-display criteria, the device scrolls the respective user interface without displaying the notification history. Displaying a notification history in response to a swipe input (that meets notification-history-display criteria) received while displaying a wake screen user interface, without requiring further input, enhances the operability of the device and makes the user-device interface more efficient (e.g., by allowing the user to access the notification history without requiring input for navigating away from the wake screen user interface), which, additionally reduces power usage and improves battery life of the device by enabling the user to use the device more quickly and efficiently.

In some embodiments, the device displays (764) the respective user interface in response to an input that switches the device from a display-off state to a display-on state (e.g., wakes the device). While displaying the respective user interface, the device detects (766) an input for dismissing the respective user interface (e.g., an input for dismissing a wake screen user interface 5004 and displaying a home screen 5182 (e.g., an upward swipe from the bottom edge of the screen, a press on the home button, etc.) and an authentication input (e.g., biometric input such as facial recognition input and/or finger print sensor input on the home button, or passcode input)). In response to dismissing the respective user interface, the device displays (768) a second user interface (e.g., a home screen user interface 5182 or an application user interface) that is distinct from the respective user interface. While displaying the second user interface, the device detects (770) a swipe input on the respective user interface (e.g., an upward or downward swipe gesture from the edge of the touch screen). In response to detecting the swipe input, in accordance with a determination that the swipe input on the respective user interface meets cover sheet-display criteria, the device displays (772) a cover sheet user interface (e.g., cover sheet user interface 5190) that includes the notification history (e.g., notification history 5062) (e.g., notifications previously displayed on the respective user interface are optionally already saved to and displayed in the notification history 5062 at this time). For example, the cover sheet user interface 5190 that includes the notification history 5062 is displayed in response to a swipe input detected while home screen user interface 5182 is displayed (after wake screen user interface 5004 is dismissed), as described with regard to FIGS. 5AU-5AX. Displaying the notification history on a cover sheet user interface that is accessible after a wake screen user interface is dismissed reduces a number of inputs required to display a notification history. Reducing the number of inputs required to perform an operation enhances the operability of the device and makes the user-device interface more efficient (e.g., by allowing a user to view a notification history without requiring input to redisplay the wake screen user interface), which, additionally, reduces power usage and improves battery life of the device by enabling the user to use the device more quickly and efficiently.

It should be understood that the particular order in which the operations in FIGS. 7A-7G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 700 described above with respect to FIGS. 7A-7G. For example, the contacts, inputs, controls, event types, delivery modes, intensity thresholds, and/or animations described above with reference to method 700 optionally have one or more of the characteristics of the contacts, inputs, controls, event types, delivery modes, intensity thresholds, and/or animations described herein with reference to other methods described herein (e.g., methods 800 and 900). For brevity, these details are not repeated here.

FIGS. 8A-8E are flow diagrams illustrating method 800 of displaying coalesced notifications, in accordance with some embodiments. Method 800 is performed at an electronic device (e.g., device 300, FIG. 3, or portable multifunction device 100, FIG. 1A) with a display generation component and one or more input devices. In some embodiments, the display generation component is a touch screen display 112 and a touch-sensitive surface is on or integrated with the display. Some operations in method 800 are, optionally, combined and/or the order of some operations is, optionally, changed.

While the device has a plurality of notifications in a notification history (e.g., notification history 5062), the plurality of notifications including a first notification of a first event of a first event type (e.g., notification 5066 of an event of a conversation thread with contacts Edwin and Madeline, as shown in FIG. 5AY) and a second notification of a second event of the first event type (e.g., notification 5068 of an event of the conversation thread with contacts Edwin and Madeline), wherein the first notification and the second notification are coalesced in the notification history (e.g., the first and second notifications will appear in a coalesced or condensed state (e.g., where content of only one of the two or neither of the two notifications is fully visible) when the notification history is displayed in a notification history user interface or a cover sheet user interface), the device detects (802) occurrence of one or more additional events of the first event type. For example, In FIG. 5BD, notification 5068 is coalesced with notification 5066 (e.g., as indicated by partial overlapping of notification 5066 by notification 5068).

In response to detecting the occurrence of a first additional event of the first event type, the device creates (804) a third notification for the first additional event of the first event type.

After creating the third notification for the first additional event of the first event type, the device receives (806), via the input device, a request (e.g., an input or device event to wake the device) to display a wake screen user interface of the device (e.g., the wake screen user interface is the initial user interface that is displayed when the device switches from a display-off state to a display-on state (e.g., in response to a gesture or input for waking the device, or in response to arrival of a new notification)).

In response to the request to display the wake screen user interface of the device, the device displays (808), via the display generation component, the wake screen user interface with the third notification, wherein the third notification is displayed on the wake screen user interface without information about the first notification and the second notification. For example, in FIGS. 5AZ-5BA, in response to a request to display wake screen user interface 5004, wake screen user interface 5004 is displayed with notification 5196 for an event in the conversation thread with contacts Edwin and Madeline.

After the third notification has been displayed on the wake screen user interface, the device receives (810), via the input device, a request to display the notification history (e.g., an upward swipe on the wake screen user interface to bring up the notification history user interface or a downward swipe from the top edge of the display that is detected when a home screen or application user interface is displayed). For example, in FIGS. 5BB-5BD, an upward swipe input by contact 5202 reveals notification history 5062.

In response to receiving the request to display the notification history (e.g., notification history 5062), the device displays (812) the notification history (e.g., notification history 5062) with a coalesced representation of the first notification and the second notification (e.g., the coalesced representation of notification 5066 and 5068 (also coalesced with notification 5180) in FIG. 5BD). In some embodiments, the coalesced representation includes content from only one of the first and second notifications, or partial content from both the first and second notifications, or a summary of the content from the first and second notifications (e.g., the coalesced representation is a stack of notifications of events of the first event type, with the most recent notification on top). Displaying, in a notification history user interface, a coalesced representation of notifications of an event type (e.g., after an additional notification of the event type has been displayed on the wake screen, such that notifications of the event type that have not yet been sent to the notification history are not coalesced with the notifications of the event type in the notification history) provides an indication of the notifications of the event type without cluttering the notification history user interface with separate display of each notification. Displaying notifications without cluttering the notification history user interface enhances the operability of the device and makes the user-device interface more efficient (e.g., by allowing the user to access, in the notification history user interface, notifications of a different event type from the event type of the coalesced notifications without requiring input to scroll past separate notifications of the event type), which, additionally reduces power usage and improves battery life of the device by enabling the user to use the device more quickly and efficiently.

In some embodiments, in response to detecting the occurrence of a second additional event of the first event type (e.g., after the third notification for the first additional event of the first event type has been created, and either before or after the third notification is displayed on the wake screen user interface), the device creates (814) a fourth notification for the second additional event of the first event type. For example, notification 5206 corresponds to a second additional event in the conversation thread with contacts Edwin and Madeline.

In response to the request to display the wake screen user interface of the device, the device displays (816) the fourth notification coalesced with the third notification in the wake screen user interface. For example, in FIG. 5BF, notification 5206 is coalesced with notification 5196 when wake screen user interface 5004 is displayed, as shown in FIG. 5BF following a screen-off state as shown in FIG. 5BE. Displaying, in a wake screen user interface, a coalesced representation of notifications of an event type (e.g., after one or more additional notification of the event type have been displayed on the wake screen, such that each notification of the event type is displayed individually prior to being coalesced with other notifications of the event type) provides an indication of the notifications of the event type without cluttering the wake screen user interface with simultaneous separate display of each notification. Displaying notifications without cluttering the wake screen user interface enhances the operability of the device and makes the user-device interface more efficient (e.g., by allowing the user to access, in the wake screen user interface, notifications of a different event type from the event type of the coalesced notifications without requiring input to scroll past separate notifications of the event type), which, additionally reduces power usage and improves battery life of the device by enabling the user to use the device more quickly and efficiently.

In some embodiments, after displaying the third notification in the wake screen user interface, the device detects (818) an input for dismissing the wake screen user interface. For example, dismissing the wake screen user interface occurs in response to input to display a home screen user interface or an application user interface, such as activation of a home button or a gesture on a touch-sensitive display of the device (e.g., an upward swipe input from the lower edge of touch screen 112 to display home screen user interface 5182, as shown in FIGS. 5BG-5BH). In response to the input for dismissing the wake screen user interface, the device ceases (820) to display the wake screen user interface (e.g., wake screen user interface 5004) and the third notification (e.g., notification 5196). While the third notification meets notification history display criteria (e.g., the third notification has not been explicitly cleared by the user on the wake screen), the device detects (822) an input for displaying the notification history (e.g., an upward swipe input on re-displayed wake screen user interface 5004, as illustrated in FIGS. 5BJ-5BK). In some embodiments, the input for displaying the notification history is, e.g., an input as described with regard to operations 758-762 or with regard to operations 764-772 of method 700 (FIGS. 7A-7G). In response to detecting the input for displaying the notification history, the device displays (824) the notification history with a coalesced representation of the third notification, the second notification, and the first notification (e.g., the third notification is added to the top of the stack including the first and second notifications). For example, in FIG. 5BK, notification history 5062 is displayed with a coalesced representation of third notification 5196, second notification 5068, and first notification 5066 (as well as notifications 5180 and 5206). Coalescing a notification that was previously displayed on the wake screen user interface with notifications of the same event type in a notification history user interface provides an indication of the notifications of the event type without cluttering the notification history user interface with separate display of each notification. Displaying notifications without cluttering the notification history user interface enhances the operability of the device and makes the user-device interface more efficient (e.g., by allowing the user to access, in the notification history user interface, notifications of a different event type from the event type of the coalesced notifications without requiring input to scroll past separate notifications of the event type), which, additionally reduces power usage and improves battery life of the device by enabling the user to use the device more quickly and efficiently.

In some embodiments, in response to detecting the input for displaying the notification history, in accordance with a determination that the time difference meets timing criteria (e.g., including a criterion that is satisfied in accordance with a determination that a time difference between a time that corresponds to occurrence of an event represented by the third notification and a time that corresponds to occurrence of an event represented by the second notification exceeds a threshold duration, and/or the events represented by the third notification and the second notification occurred on different days) (826): the device forgoes displaying the notification history with the coalesced representation of the third notification, the second notification, and the first notification; and the device displays the third notification in the notification history, separately from the coalesced representation of the first notification and the second notification. In some embodiments, in accordance with a determination that the time difference does not meet the timing criteria (e.g., the two events occurred on the same day or the difference between the occurrences of the two events is less than or equal to the threshold amount of time), the device displays the notification history with the coalesced representation of the third notification, the second notification and the first notification. Forgoing coalescing notifications in accordance with a determination that a time difference (e.g., between occurrence of a most recent event of an event type and a second most recent event of an event type) between events that correspond to the notifications meets timing criteria reduces a number of inputs required to view notifications for events that occurred during differentiated periods of time (e.g., on different days). Reducing the number of inputs required to view notifications for events that occurred during differentiated periods of time enhances the operability of the device and makes the user-device interface more efficient (e.g., by allowing a user to separately view notifications received on different days without requiring input to expand a coalesced representation of the notifications), which, additionally, reduces power usage and improves battery life of the device by enabling the user to use the device more quickly and efficiently.

In some embodiments, displaying a respective coalesced representation of notifications (e.g., a coalesced representation of notifications in the notification history 5062, such as the coalesced representation of the first notification and the second notification, or a coalesced representation of notifications on the wake screen user interface 5004, such as a coalesced representation of the third notification and the fourth notification) includes (828) displaying at least a portion of content that corresponds to a most recently created notification of the respective coalesced representation of notifications (e.g., while the coalesced representation of the first notification and the second notification is displayed, if the second notification was created more recently than the first notification, at least a portion of content that corresponds to the second notification is displayed). In some embodiments, the portion of content includes identifying information (e.g., a contact name, a contact image, a phone number, a news source, etc.) for a source of a communication (e.g., a phone call, a voicemail, a message, a social media post, a news article, a calendar invitation) and/or at least a portion of communicated information (e.g., message content, news article title, news article content, voicemail transcription, social media post content, social media comment content, calendar invitation information, calendar appointment information, etc.). For example, in the coalesced representation of notifications that includes notifications 5066 and 5068, as shown in FIG. 5AY, text of the message ("Count me in!"), sender information ("Madeline"), thread information ("To you & Edwin") and received time ("3 h ago") are displayed content that corresponds to most recently created notification 5068 of the coalesced representation of notifications. Displaying at least a portion of content that corresponds to a most recently created notification of a coalesced representation of notifications reduces a number of inputs required to view content of the most recently created notification. Reducing the number of inputs required to content of the most recently created notification (e.g., by allowing a user to view notification content without requiring input to access the content of the notification) enhances the operability of the device and makes the user-device interface more efficient, which, additionally, reduces power usage and improves battery life of the device by enabling the user to use the device more quickly and efficiently.

In some embodiments, a respective coalesced representation of notifications (e.g., a coalesced representation of notifications in the notification history 5062, such as the coalesced representation of the first notification and the second notification, or a coalesced representation of notifications on the wake screen user interface 5004, such as a coalesced representation of the third notification and the fourth notification) includes (830) summary information (e.g., contacts for a communication event type, source identification information, number of purchases, number of calendar invitations, number of likes/retweets/mentions) that includes a count of notifications represented by the respective coalesced representation. For example, the coalesced representation of notifications that includes notifications 5066 and 5068, as shown in FIG. 5AY, includes a count of notifications represented by the coalesced representation ("+1 more from Edwin"). Displaying summary information that includes a count of the notifications represented by a coalesced representation of notifications reduces a number of inputs required to obtain the count. Reducing the number of inputs required to obtain a count of notifications for the coalesced representation of notifications (e.g., by allowing a user to view summary information without requiring input to expand the coalesced representation of notifications to individually view data from each notification) enhances the operability of the device and makes the user-device interface more efficient, which, additionally, reduces power usage and improves battery life of the device by enabling the user to use the device more quickly and efficiently In some embodiments, a respective coalesced representation of notifications (e.g., a coalesced representation of notifications in the notification history 5062, such as the coalesced representation of the first notification and the second notification, or a coalesced representation of notifications on the wake screen user interface 5004, such as a coalesced representation of the third notification and the fourth notification) includes (832) a plurality of summary information indicators, wherein a respective summary information indicator of the plurality of summary information indicators corresponds to a respective category of counted items that correspond to content of the notifications represented by the respective coalesced representation (e.g., likes and retweets are summarized separately in a set of coalesced notifications). Displaying summary information that includes a plurality of summary information indicators for a coalesced representation of notifications reduces a number of inputs required to obtain the summary information. Reducing the number of inputs required to obtain the summary information for the coalesced representation of notifications (e.g., by allowing a user to view the plurality of summary information indicators without requiring input to expand the coalesced representation of notifications to individually view data from each notification) enhances the operability of the device and makes the user-device interface more efficient, which, additionally, reduces power usage and improves battery life of the device by enabling the user to use the device more quickly and efficiently In some embodiments, the device detects (834) an input (e.g., a tap input directed to the coalesced representation) for expanding a respective coalesced representation of notifications (e.g., a coalesced representation of notifications in the notification history 5062, such as the coalesced representation of the first notification and the second notification, or a coalesced representation of notifications on the wake screen user interface 5004, such as a coalesced representation of the third notification and the fourth notification). For example, a tap input by contact 5218 for expanding a coalesced representation of notifications that includes notifications 5066, 5068, 5180, 5196, and 5206 is illustrated in FIG. 5BL.

In response to the input for expanding the respective coalesced representation, the device displays (836) an expanded version of a set of notifications that correspond to the respective coalesced representation. For example, in FIG. 5BM, notifications 5206, 5196, 5180, and 5068 are displayed separately. In some embodiments, at least a portion of each of the notifications of the coalesced representation is displayed. In some embodiments, in response to the input for expanding the respective coalesced representation, one or more respective notifications that are not in the set of notifications that correspond to the respective coalesced representation move (e.g., are "pushed" out of the way by the expansion of the set of notifications) to a different location in the wake screen user interface. For example, at least one notification that is not the set of notifications moves toward the lower edge of the wake screen user interface. In some embodiments, in response to the input for expanding the respective coalesced representation, one or more respective notifications that are not in the set of notifications that correspond to the respective coalesced representation cease to be displayed on the wake screen user interface (e.g., notification 5198 is not displayed in FIG. 5BM because it has been pushed out of the way by the expansion of the expanded version of the set of notifications). In some embodiments, a control for clearing all notifications in the set of notifications of the respective coalesced representation (e.g., control 5221, as shown in FIG. 5BN) is displayed in response to the input for expanding the respective coalesced representation. Displaying an expanded version of a set of notifications that correspond to a coalesced representation of notifications in response to an input for expanding the coalesced representation provides the user with the ability to alternatively display the individual notifications of a coalesced set and display the notifications in a coalesced state that does not clutter the user interface. Providing the user with the ability to alternatively display the individual notifications of a coalesced set and display the notifications in a coalesced state that does not clutter the user interface enhances the operability of the device and makes the user-device interface more efficient, which, additionally, reduces power usage and improves battery life of the device by enabling the user to use the device more quickly and efficiently.

In some embodiments, while the expanded version of the set of notification that corresponds to the respective coalesced representation is displayed, the device detects (838) an input (e.g., an input directed to the control 5221 for clearing all notification of the set of notifications of the respective coalesced representation or an input (e.g., vertical swipe) on the user interface) for dismissing the set of notifications that correspond to the respective coalesced representation. In response to the input for dismissing the set of notifications that corresponds to the respective coalesced representation, the device clears (840) the set of notifications that correspond to the respective coalesced representation (e.g., deleting from the notification history if the respective coalesced representation is shown in notification history, or clearing the notifications without saving to the notification history if the respective coalesced representation is shown on the wake screen). For example, in response to an input directed to the control 5221, notifications 5066, 5068, 5180, 5196, and 5206 (that correspond to the coalesced representation of notifications) are cleared. Clearing a set of notifications that corresponds to a coalesced representation of the notifications in response to an input for dismissing the set of notifications representation reduces a number of inputs required to clear a set of notifications. Reducing the number of inputs required to perform an operation enhances the operability of the device and makes the user-device interface more efficient (e.g., by allowing a user to clear multiple notifications without requiring input to individually dismiss each notification), which, additionally, reduces power usage and improves battery life of the device by enabling the user to use the device more quickly and efficiently.

In some embodiments, while the expanded version of the set of notifications that corresponds to the respective coalesced representation is displayed, the device detects (842) an input directed to a respective notification of the set of notifications that meets notification-expansion criteria (e.g., the notification-expansion criteria are met by a press input (e.g., an input with a characteristic intensity of the contact that increases above a first intensity threshold (e.g., a light press intensity threshold $IT_L$)) or a touch-and hold input). In response to detecting the input that meets the notification-expansion criteria, the device displays (844) the expanded version of the respective notification. For example, as illustrated in FIGS. 5BS-5BU, in response to a light press input by contact 5230 directed to notification 5196, an expanded version of notification 5196 is displayed, as shown in FIG. 5BU. Displaying an expanded version of a notification in response to an input directed to the notification provides an option to view the expanded version of the notification without cluttering the user interface with an additional displayed controls for viewing the expanded version of the notification. Providing an option to view the expanded version of the notification without cluttering the user interface with an additional displayed controls for viewing the expanded version of the notification enhances the operability of the device and makes the user-device interface more efficient, which, additionally, reduces power usage and improves battery life of the device by enabling the user to use the device more quickly and efficiently.

In some embodiments, while the expanded version of the set of notifications that corresponds to the respective coalesced representation is displayed, the device detects (846) an input for re-coalescing the set of notifications (e.g., a tap input directed to a control for re-coalescing the set of notifications). In response to the input for re-coalescing the set of notifications, the device re-displays (848) a coalesced version of the set of notifications that correspond to the respective coalesced representation. For example, in FIGS. 5BN-5BO, in response to an input directed to control 5220, the expanded version of the set of notifications shown in FIG. 5BN are re-coalesced, as shown in FIG. 5BO. In some embodiments, after expanding the set notifications, other notifications that ceased to be displayed when the set of notifications was expanded are redisplayed.) For example, notification 5198 ceased to be displayed when the expanded set of notifications was displayed, as shown in FIG. 5BN. Notification 5198 is redisplayed in FIG. 5BO when the set of notifications are re-coalesced. Re-displaying a coalesced version of a set of notifications that correspond to a coalesced representation of notifications in response to an input for re-coalescing the set of notifications provides the user with the ability to alternatively display the individual notifications of a coalesced set and display the notifications in a coalesced state that does not clutter the user interface. Providing the user with the ability to alternatively display the individual notifications of a coalesced set and display the notifications in a coalesced state that does not clutter the user interface enhances the operability of the device and makes the user-device interface more efficient, which, additionally, reduces power usage and improves battery life of the device by enabling the user to use the device more quickly and efficiently.

In some embodiments, a first respective application (e.g., communication applications and/or news applications) generates (850) events of multiple distinct event types (e.g., a single event type corresponds to all communications or articles (e.g., message, telephone call, voicemail, and/or e-mail) from a contact, group of contacts, or a source). The plurality of notifications in the notification history includes (852): a fifth notification that corresponds to a first respective event type of the multiple distinct event types, a sixth notification that corresponds to the first respective event type, and a seventh notification that corresponds to a second respective event type of the multiple distinct event types. For example, the Messages application generates events of multiple distinct event types (e.g., each conversation thread is a distinct event type). In FIG. 5BO, notifications 5206, 5196, 5180, 5068, and 5066 are notifications for events of a first event type (events in a conversation thread with Madeline and Edwin) and notification 5198 is a notification for an event of a second event type (e.g., an event in a conversation thread with Neal). In response to detecting the request to display the notification history (854): the device displays, in the notification history, a coalesced representation of the fifth notification and the sixth notification; and the device displays, in the notification history, the seventh notification separately from the coalesced representation of the fifth notification and the sixth notification. For example, in notification history 5062 displayed in FIG. 5BO, a coalesced representation (for a first type of events generated by the Messages application) of notifications 5206, 5196, 5180, 5068, and 5066 is displayed, and notification 5198 (for a second type of events generated by the Messages application) is displayed separately from the coalesced representation of notifications 5206, 5196, 5180, 5068, and 5066. In some embodiments, a messaging application generates events of a first type (messages from a first contact) and events of a second type (messages from a second contact). In some embodiments, a news application generates events of a first type (e.g., articles from a first news source) and events of a second type (e.g., articles from a second news source). Providing different event types for a single application results in separately showing (in an un-coalesced state) communication notifications of different sub-categories from the same application). In some embodiments, a second respective application (e.g., a calendar application, a transportation service application, or a payment application.) generates events of a single event type. Displaying a notification for a first type of event generated by an application separately from a coalesced representation of notifications for a second type of event generated by the application provides separate indications of received notifications for different types of events generated by an application without cluttering the notification history user interface with separate display of each notification. Displaying notifications without cluttering the notification history user interface enhances the operability of the device and makes the user-device interface more efficient (e.g., by allowing the user to access notifications of the different types of events generated by the application without requiring input to scroll through each individual notification), which, additionally reduces power usage and improves battery life of the device by enabling the user to use the device more quickly and efficiently.

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 800 described above with respect to FIGS. 8A-8E. For example, contacts, inputs, controls, event types, and/or intensity thresholds described above with reference to method 800 optionally have one or more of the characteristics of the contacts, inputs, controls, event types, and/or intensity thresholds described herein with reference to other methods described herein (e.g., methods 700 and 900). For brevity, these details are not repeated here.

FIGS. 9A-9E are flow diagrams illustrating method 900 of displaying prompts to adjust notification settings, in accordance with some embodiments. Method 900 is performed at an electronic device (e.g., device 300, FIG. 3, or portable multifunction device 100, FIG. 1A) with a display generation component and one or more input devices. In some embodiments, the display generation component is a touch screen display 112 and a touch-sensitive surface is on or integrated with the display. Some operations in method 900 are, optionally, combined and/or the order of some operations is, optionally, changed.

The device displays (902), via the display generation component, in a notification-display user interface (e.g., a wake screen user interface 5004, a lock screen user interface, a cover sheet user interface 5190, or a notification history user interface), a plurality of notifications for a plurality of different applications including notifications for a first application (e.g., a Social Media application) and notifications for a second application (e.g., a Home Simulator game application). In some embodiments, at least some of the notifications are respectively displayed on the notification-display user interface at different moments in time.

The device detects (904) user interaction, via the input device, with the plurality of notifications, that includes requests to perform requested operations with respect to the notifications (e.g., opening corresponding applications, responding to the notifications without opening the corresponding application (e.g., using an input region 5242 displayed in an expanded version of a notification, as shown in FIG. 5BU) and/or dismissing the notifications).

The device responds (906) to the user interaction with the plurality of notifications by performing the requested operations with respect to the one or more of the notifications (e.g., the arrival of the notifications extends over a period of time during which the user operates the device normally (e.g., navigating to multiple different user interfaces and applications, turning the device on and off multiple times, etc.) and the user interaction with the plurality of notifications are monitored over an extended period of time).

In some embodiments, the displaying, detecting, and responding operations are performed over an extended period of time (e.g., multiple hours, multiple days, multiple weeks, multiple months and/or a time during which multiple notifications (e.g., for the first application and/or the second application) have been displayed. For example, the period of time includes a time from installation of the respective application or a time from initialization/reset of the operating system.

The device displays (908), via the display generation component, (e.g., after the extended period of time) a prompt (e.g., prompt 602 as shown in FIG. 6A, prompt 614 as shown in FIG. 6B, prompt 628 as shown in FIG. 6C, or prompt 638 as shown in FIG. 6D) for the user to adjust notification settings for one or more of the plurality of applications. In some embodiments, the prompt is displayed proactively by the device based on preset interaction criteria being met by the prior user interaction with the plurality of notifications, without requiring a specific user request calling for the prompt. In accordance with a determination, based on the user interaction with the plurality of notifications, that engagement of the user with the notifications of the first application is below a threshold level of engagement and engagement of the user with the notifications of the second application is above the threshold level of engagement, the device displays a suggestion to reduce a prominence of future notifications of the first application (e.g., changing the delivery mode for notifications of the first application from a prominent-delivery mode to a quiet-delivery mode, or from a quiet-delivery mode to a muted mode, or from a prominent-delivery mode to a muted mode) without reducing a prominence of future notifications of the second application (e.g., without changing the delivery mode for notifications of the second application from the prominent-delivery mode to the quiet-delivery mode, or from the quiet-delivery mode to the muted mode, or from the prominent-delivery mode to the muted mode). For example, in accordance with a determination that the engagement of the user with notifications of the Social Media application is below a threshold level of engagement (and engagement of the user with the notifications of the Home Simulator game application is above the threshold level of engagement), the device displays prompt 602, including text indicating a suggestion to review notifications settings and controls 606, 608, and 610 for changing notifications settings for the Social Media application. In accordance with a determination, based on the user interaction with the plurality of notifications, that the engagement of the user with the notifications of the second application is below the threshold level of engagement and the engagement of the user with the notifications of the first application is above the threshold level of engagement, the device displays a suggestion to reduce the prominence of future notifications of the second application without reducing the prominence of future notifications of the first application. For example, in accordance with a determination that the engagement of the user with notifications of the Home Simulator game application is below a threshold level of engagement (and engagement of the user with the notifications of the Social Media is above the threshold level of engagement), the device displays a prompt that is similar to 602, but pertaining to the Home Simulator game application instead of a Social Media application (e.g., including a notification 616 in lieu of notification 604). In some embodiments, the prompt includes an explanation (e.g., explanatory text 612) of the reason for the prompt. In some embodiments, in accordance with a determination that the engagement of the user with the notifications of the first application is above a threshold level of engagement and the engagement of the user with the notifications of the second application is below the threshold level of engagement, the prompt includes a suggestion to increase a prominence of future notifications of the first application (e.g., changing the delivery mode for notifications of the first application from a quiet-delivery mode to a prominent-delivery mode) without increasing a prominence of future notifications of the second application (e.g., without changing the delivery mode for notifications of the first application from the quiet-delivery mode to the prominent-delivery mode). In some embodiments, in accordance with a determination that the engagement of the user with the notifications of the second application is above a threshold level of engagement and the engagement of the user with notifications of the first application is below the threshold level of engagement, the prompt includes a suggestion to increase a prominence of future notifications of the second application without increasing a prominence of future notifications of the first application. Displaying, in response to user interaction with notifications, a prompt to adjust notification settings for one or more applications reduces the number of inputs required to adjust notification settings for an application. Reducing the number of inputs required to adjust notification settings for an application enhances the operability of the device and makes the user-device interface more efficient (e.g., by allowing a user to change the notification settings for an application without requiring input to access a settings user interface), which, additionally, reduces power usage and improves battery life of the device by enabling the user to use the device more quickly and efficiently.

In some embodiments, displaying the prompt includes (910): in accordance with a determination, based on the user interaction with the plurality of notifications, that the engagement of the user with the notifications of the first application is below the threshold level of engagement and the engagement of the user with the notifications of the second application is below the threshold level of engagement, concurrently displaying a suggestion to reduce the prominence of future notifications of the first application and a suggestion to reducing the prominence of future notifications of the second application. For example, prompts 614, 628, and 638 are for adjusting notifications for both a first application (Social Media) and a second application (House Simulator). In some embodiments, separate notification preference adjustment controls are displayed for each of the first and second applications (e.g., in prompt 614, toggles 620 and 622 for Social Media and toggles 624 and 626 for House Simulator allow preferences to be individually adjusted for the different applications). In some embodiments, notification preference adjustment controls displayed in a prompt allow simultaneous adjustment of preferences for multiple applications. For example, input at control 642 (a "Turn Off" button), displayed in prompt 638, adjusts notification delivery preferences for both the Social Media application and the House Simulator game application. In some embodiments, the prompt aggregates suggestions for adjusting notifications for related applications (e.g., a social network application and a game application that operates on the social network platform corresponding to the social network application). In some embodiments, the prompt aggregates suggestions for adjusting notifications for two entirely unrelated applications. Displaying, in response to user interaction with notifications, a prompt to adjust notification settings for one or more applications reduces the number of inputs required to adjust notification settings for an application. Reducing the number of inputs required to adjust notification settings for an application enhances the operability of the device and makes the user-device interface more efficient (e.g., by automatically prompting a user to change the notification settings for an application without requiring user input to access controls for adjusting notification settings), which, additionally, reduces power usage and improves battery life of the device by enabling the user to use the device more quickly and efficiently.

In some embodiments, the prompt concurrently displays (912) respective suggestions (e.g., 612*a* and 612*b* in FIG. 6C) to reduce the prominence of future notifications for two independently-operated applications (e.g., the first application is the mail application and the second application is the browser application, or the first application is the messages application and the second application is the maps application, etc.). In some embodiments, independently-operated applications refer to applications that do not share the same ownership, brand affiliation, or data/content sources. Displaying, in response to user interaction with notifications, a prompt to adjust notification settings, where the prompt concurrently displays suggestions to reduce the prominence of two independently-operated applications, reduces the number of inputs required to adjust notification settings for one or more applications. Reducing the number of inputs required to adjust notification settings for an application enhances the operability of the device and makes the user-device interface more efficient (e.g., by automatically prompting a user to change the notification settings for multiple distinct applications without requiring user input to access, separately for each application, controls for adjusting notification settings), which, additionally, reduces power usage and improves battery life of the device by enabling the user to use the device more quickly and efficiently.

In some embodiments, the prompt includes (914) a control (e.g., a "Keep" button 606, 630, 634 or 640) for rejecting a respective suggestion (e.g., suggestion 612) included in the prompt (e.g., the "keep" button is for rejecting a suggestion in the prompt to mute or reduce prominence of future notifications of the first application, of the second application, or of both applications). While the prompt is displayed, the device detects (916) an input directed to the control for rejecting the respective suggestion (e.g., the suggestion to reduce a prominence of future notifications of the first application, the second application, or both). In response to detecting the input directed to the control for rejecting the respective suggestion (e.g., in response to user selection of the "Keep" button displayed concurrently with the suggestion to mute or quiet future notifications of a respective application), the device forgoes (918) reducing the prominence of future notifications of at least one of the first application or the second application. Displaying, in response to user interaction with notifications, a prompt to adjust notification settings that includes a control for rejecting a suggestion included in the prompt (e.g., a "Keep" button) enhances the operability of the device and makes the user-device interface more efficient (e.g., by automatically prompting a user to choose between changing and retaining the notification settings for an application without requiring user input to access controls for reviewing notification settings), which, additionally, reduces power usage and improves battery life of the device by enabling the user to use the device more quickly and efficiently.

In some embodiments, in response to detecting the input directed to the control for rejecting the respective suggestion (e.g., for the first application, or the second application, or both), the device forgoes (920) display of future prompts that include a suggestion to reduce a prominence of future notifications of a respective application of the at least one of the first application or the second application (e.g., the first application, or the second application, or both). For example, if a user selects a "Keep" button for notifications that correspond to the first application, the current prompt for the first application is removed and automatic generation of future prompts related to changing the notification delivery mode for first application are also turned off. Forgoing displaying future prompts that include a suggestion to reduce a prominence of future notifications of an application in response to user interaction with notifications enhances the operability of the device and makes the user-device interface more efficient (e.g., by reducing the number of inputs required to manage delivery of future notifications after a "keep" control has been selected, because the prompts for the application are no longer displayed and thus the user does not need to provide input to respond to additional prompts for the application), which, additionally, reduces power usage and improves battery life of the device by enabling the user to use the device more quickly and efficiently.

In some embodiments, the device detects (922) user interaction, via the input device, with a plurality of prompts for the user to adjust notification settings for one or more of the plurality of application. In accordance with a determination that the user interaction with the plurality of prompts meets rejection criteria (e.g., the user consistently and/or repeatedly rejected a plurality of suggestions to change prominence of future notifications for some or all of the one or more applications, and/or the number of rejections is above a threshold number (and/or a rate over time) of rejections for the one or more of the plurality of applications), the device forgoes (924) future display of additional prompts for the user to adjust notification settings. For example, if a user selects a "keep" control three times (e.g., for unrelated notifications, for notifications that correspond to events of the same application, for notifications that correspond to events of the same event type, for notifications that correspond to events of different event types, etc.), the proactive prompts are turned off for all future notifications (e.g., of all applications, or a type of notifications, for a message thread, for multiple message thread, etc.). In some embodiments, if a user provides input for turning off notifications (e.g., for unrelated notifications, for notifications of the same application, for notifications in the same thread, for notifications in multiple threads, etc.) in excess of a threshold number of occurrences, the proactive prompts are turned off for all notifications (e.g., of all applications, or a type of notifications, for a message thread, for multiple message thread, etc.). In some embodiments, in accordance with a determination that the user interaction with the plurality of prompts does not meet rejection criteria, the device does not forgo future display of additional prompts for the user to adjust the notification settings. Determining, in response to user interaction with prompts to adjust notification settings, whether to forgo displaying future prompts for a user to adjust notification settings, enhances the operability of the device and makes the user-device interface more efficient (e.g., by reducing the number of inputs required to manage delivery of future notifications after rejections of prompts to adjust notification settings meets rejection criteria), which, additionally, reduces power usage and improves battery life of the device by enabling the user to use the device more quickly and efficiently.

In some embodiments, the prompt includes (926) a control (e.g., a "customize" button 610, FIG. 6A) for displaying a notification settings user interface (e.g., notification settings user interface 5100). While the prompt (e.g., prompt 602) is displayed, the device detects (728) an input directed to the control for displaying the notification settings user interface (e.g., a tap input activating the "customize" button). In response to detecting the input directed to the control for displaying the notification settings user interface, the device (730): ceases to display the prompt and displays the notification settings user interface. In some embodiments, the device replaces display of the notification-display user interface with display of the notification settings user interface. In some embodiments, (optionally, in accordance with the determination that the engagement of the user with notifications of the first application is below a threshold level of engagement and the engagement of the user with notifications of the second application is above the threshold level of engagement), the notification settings user interface that is displayed is a notification settings user interface that corresponds to the first application only and not to the second application (e.g., as shown in FIG. 6A). In some embodiments, (optionally, in accordance with the determination that the engagement of the user with notifications of the second application is below a threshold level of engagement and the engagement of the user with notifications of the first application is above the threshold level of engagement), the notification settings user interface that is displayed is a notification settings user interface that corresponds to the second application only and not to the first application. Including, in a prompt for the user to adjust notification settings for one or more applications, a control for displaying the notification settings interface, reduces a number of inputs required to access the notification settings user interface. Reducing the number of inputs required to access the notification settings user interface enhances the operability of the device and makes the user-device interface more efficient (e.g., by allowing a user to manage notification settings directly from an automatically displayed prompt, without requiring input to dismiss the notification-display user interface and navigate to the notification settings user interface), which, additionally, reduces power usage and improves battery life of the device by enabling the user to use the device more quickly and efficiently.

In some embodiments, the prompt includes (932) the control (e.g., "Turn Off" button 608, 632, 636 or 642) for accepting a respective suggestion (e.g., suggestion 612) included in the prompt. While the prompt is displayed, the device detects (934) an input directed to the control for accepting the respective suggestion (e.g., the suggestion to reduce a prominence of future notifications of the first application, the second application, or both). After detecting the input directed to the control for accepting the respective suggestion, the device detects (936) an occurrence of a first event (e.g., an event that normally triggers generation of a corresponding notification) that corresponds to the first application. In response to detecting the occurrence of the event that corresponds to the first application (938), in accordance with a determination that the event is associated with a reduced-prominence notification setting (e.g., the accepted respective suggestion was the suggestion to reduce the prominence of future notifications of the first application without reducing the prominence of future notifications of the second application), the device adds a first notification that corresponds to the first event to a notification history (e.g., a notification history user interface 5062 that is displayed by swiping upward or downward on the wake screen user interface 5004 (e.g., as discussed with regard to FIGS. 5N-5O) or swiping downward or upward from the top or bottom edge of the display over a home screen user interface 5182 (e.g., as described with regard to FIGS. 5AW-5AX) or application user interface) without first displaying the first notification in the notification-display user interface (e.g., the wake screen or the lock screen). In accordance with a determination that the event is not associated with the reduced prominence notification setting (e.g., the accepted respective suggestion was the suggestion to reduce the prominence of future notifications of the second application without reducing the prominence of future notifications of the first application), the device displays the first notification that corresponds to the first event in the notification-display user interface.

In some embodiments, the device detects occurrence of a second event that corresponds to the second application; and in response to detecting the occurrence of the second event that corresponds to the second application: in accordance with a determination that the event is associated with a reduced prominence notification setting (e.g., the accepted respective suggestion was a suggestion to reduce a prominence of future notifications of the first application without reducing a prominence of future notifications of the second application), the device displays the second notification that corresponds to the second event in the notification-display user interface (e.g., the wake screen or the lock screen); and in accordance with a determination that the event is not associated with the reduced prominence notification setting (e.g., the accepted respective suggestion was a suggestion to reduce a prominence of future notifications of the second application without reducing a prominence of future notifications of the first application), the device adds the second notification that corresponds to the second event to the notification history (e.g., a notification history user interface that is displayed by swiping upward or downward on the wake screen or swiping downward or upward from the top or bottom edge of the display over a home screen or application user interface) without first displaying the second notification in the notification-display user interface (e.g., the wake screen or the lock screen). In some embodiments, the method includes (e.g., in the case in which notification prominence is increased according to a suggestion) detecting an occurrence of a third event (e.g., an event that normally triggers generation of a corresponding notification) that corresponds to the first application; and in response to detecting the occurrence of the third event that corresponds to the first application: in accordance with a determination that the event is associated with the prominent notification setting (e.g., the accepted respective suggestion was a suggestion to increase a prominence of future notifications of the first application without increasing a prominence of future notifications of the second application), the device displays a third notification that corresponds to the third event on the wake screen or lock screen that is distinct from the notification-display user interface (e.g., a notification history user interface that is displayed by swiping upward or downward on the wake screen or swiping downward or upward from the top or bottom edge of the display over a home screen or application user interface); and in accordance with a determination that the event is not associated with the prominent notification setting (e.g., the accepted respective suggestion was a suggestion to increase a prominence of future notifications of the second application without increasing a prominence of future notifications of the first application), the device displays the third notification that corresponds to the third event in the notification-display user interface (e.g., the notification history user interface). Adding a notification to a notification history in response to input directed to a control for accepting a suggestion included in a prompt reduces the number of inputs required to adjust notification settings for an application. Reducing the number of inputs required to adjust notification settings for an application enhances the operability of the device and makes the user-device interface more efficient (e.g., by allowing a user to change the notification settings for an application without requiring input to access a settings user interface), which, additionally, reduces power usage and improves battery life of the device by enabling the user to use the device more quickly and efficiently.

In some embodiments, the prompt includes (940) a control (e.g., "Turn Off" button 608, 632, 636 or 642) for accepting a respective suggestion included in the prompt. While the prompt is displayed, the device detects (942) an input directed to the control for accepting the respective suggestion (e.g., the suggestion to reduce a prominence of future notifications of the first application, the second application, or both). After detecting the input directed to the control for accepting the respective suggestion, the device detects (944) an occurrence of a first event (e.g., an event that normally triggers generation of a corresponding notification) that corresponds to the first application. In response to detecting the occurrence of the first event that corresponds to the first application (946): in accordance with a determination that the first event is associated with a reduced prominence notification setting (e.g., the accepted respective suggestion was the suggestion to reduce the prominence of future notifications of the first application without reducing the prominence of future notifications of the second application), the device displays a first notification that corresponds to the first event in the notification-display user interface and the device generates a first non-visual alert (e.g., an audio alert and/or a haptic alert that includes tactile output) that has a first alert profile (e.g., a first amplitude and/or frequency); and, in accordance with the determination that the accepted respective suggestion was a suggestion to reduce a prominence of future notifications of the first application without reducing a prominence of future notifications of the second application, the device forgoes generating a non-visual alert for the respective notification but still displays the respective notification). In accordance with a determination that the first event is not associated with the reduced prominence notification setting (e.g., the accepted respective suggestion was the suggestion to reduce the prominence of future notifications of the second application without reducing the prominence of future notifications of the first application), the device displays the first notification that corresponds to the first event in the notification-display user interface and generates a second non-visual alert (e.g., an audio alert that includes audio output and/or a haptic alert that includes tactile output) with a second alert profile that is distinct from the first alert profile (e.g., a second amplitude that is distinct from the first amplitude and/or a second frequency that is distinct from the first frequency) (e.g., the second alert profile is designed to have characteristics that are more attention-provoking than the first alert profile). In some embodiments, the method includes detecting an occurrence of a second event that corresponds to the second application; and, in response to detecting the occurrence of the second event that corresponds to the second application: in accordance with a determination that the accepted respective suggestion was a suggestion to reduce a prominence of future notifications of the first application without reducing a prominence of future notifications of the second application, the device displays a second notification that corresponds to the second event in the notification-display user interface and generates a third alert that has a third alert profile (e.g., an alert profile that is the same as the second alert profile); and in accordance with a determination that the accepted respective suggestion was a suggestion to reduce a prominence of notifications of the second application without reducing a prominence of notifications of the first application: the device displays the second notification in the notification-display user interface and generates a fourth alert with a fourth alert profile (e.g., an alert profile that is the same as the first alert profile) or forgoes generating the fourth alert. Determining whether to generate a non-visual alert with a first alert profile or a second alert profile, depending on whether an event is associated with a reduced prominence notification setting, provides improved feedback indicating to the user whether a received notification corresponds to an event that is associated with a reduced prominence notification setting. Providing improved feedback enhances the operability of the device and makes the user-device interface more efficient (e.g., by helping the user to determine, without activating the display of the device, a prominence of a received notification), which, additionally reduces power usage and improves battery life of the device by enabling the user to use the device more quickly and efficiently.

In some embodiments, the prompt includes (948) a control (e.g., "Turn Off" button 608, 632, 636 or 642) for accepting a respective suggestion (e.g., suggestion 612) included in the prompt. While the prompt is displayed, the device detects (950) an input directed to the control for accepting the respective suggestion (e.g., the suggestion to reduce a prominence of future notifications of the first application, the second application, or both). After detecting the input directed to the control for accepting the respective suggestion, the device detects (952) an occurrence of a first event that corresponds to the first application. In response to detecting the occurrence of the first event that corresponds to the first application (954): in accordance with a determination that the first event is associated with the reduced prominence setting (e.g., the accepted respective suggestion was the suggestion to reduce the prominence of future notifications of the first application without reducing the prominence of future notifications of the second application), the device forgoes displaying a notification that corresponds to the first event; and, in accordance with a determination that the first event is not associated with the reduced prominence notification setting (e.g., the accepted respective suggestion was the suggestion to reduce the prominence of future notifications of the second application without reducing the prominence of future notifications of the first application), the device displays the notification that corresponds to the first event.

In some embodiments, the device detects an occurrence of a second event that corresponds to the second application; and in response to detecting the occurrence of the second event that corresponds to the second application: in accordance with a determination that the accepted respective suggestion was a suggestion to reduce a prominence of future notifications of the first application without reducing a prominence of future notifications of the second application, the device displays a second notification that corresponds to the second event in the notification-display user interface; and in accordance with a determination that the accepted respective suggestion was a suggestion to reduce a prominence of future notifications of the second application without reducing a prominence of future notifications of the first application, the device forgoes displaying the second notification that corresponds to the second event.

Adding a notification to a notification history in response to input directed to a control for accepting a suggestion included in a prompt reduces the number of inputs required to adjust notification settings for an application. Reducing the number of inputs required to adjust notification settings for an application enhances the operability of the device and makes the user-device interface more efficient (e.g., by allowing a user to change the notification settings for an application without requiring input to access a settings user interface), which, additionally, reduces power usage and improves battery life of the device by enabling the user to use the device more quickly and efficiently.

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 900 described above with respect to FIGS. 9A-9E. For example, the contacts, inputs, controls, and/or event types described above with reference to method 900 optionally have one or more of the characteristics of the contacts, inputs, controls, and/or event types described herein with reference to other methods described herein (e.g., methods 700 and 800). For brevity, these details are not repeated here.

The operations described above with reference to FIGS. 7A-7G, 8A-8E, and 9A-9E are, optionally, implemented by components depicted in FIGS. 1A-1B. For example, detection operations 702, 706, 710, 714, 802, and 904; display operations 704, 708, 808, 812, 902, and 908; changing operation 712; adding operation 716; creating operation 804; receiving operations 806 and 810; and responding operation 906 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a device having a display generation component and an input device:
while the device has a plurality of notifications in a notification history, the plurality of notifications including a first notification of a first event of a first event type and a second notification of a second event of the first event type, wherein the first notification and the second notification are coalesced in the notification history, detecting occurrence of one or more additional events of the first event type;
in response to detecting the occurrence of a first additional event of the first event type, creating a third notification for the first additional event of the first event type;
after creating the third notification for the first additional event of the first event type, receiving, via the input device, a request to display a wake screen user interface of the device;
in response to the request to display the wake screen user interface of the device, displaying, via the display generation component, the wake screen user interface with the third notification, wherein the third notification is displayed on the wake screen user interface without information about the first notification and the second notification;
after the third notification has been displayed on the wake screen user interface, receiving, via the input device, a request to display the notification history; and
in response to receiving the request to display the notification history, displaying the notification history with a coalesced representation of the first notification and the second notification;
wherein displaying a respective coalesced representation of notifications, which represents a plurality of notifications, includes concurrently displaying within the respective coalesced representation: content from only a most recently created notification of the plurality of notifications represented by the respective coalesced representation of notifications, and summary information that includes a count of notifications represented by the respective coalesced representation;
further including:
while the third notification meets notifications history display criteria, detecting an input for displaying the notification history; and
in response to detecting the input for displaying the notification history;
in accordance with a determination that a time difference between a time that corresponds to occurrence of the first additional event of the first event type represented by the third notification and a time that corresponds to occurrence of the second event of the first event type represented by the second notification does not meet timing criteria for displaying the third notification separately from a coalesced representation of the first notification and the second notification, displaying the notification history with a coalesced representation of the third notification, the second notification, and the first notification;
wherein displaying the coalesced representation of the third, second and first notifications includes concurrently displaying content from only a most recently created notification of the coalesced representation of third, second and first notifications and summary information that includes a count of notifications represented by the coalesced representation of the third, second and first notifications.

2. The method of claim 1, including:
in response to detecting the occurrence of a second additional event of the first event type, creating a fourth notification for the second additional event of the first event type; and
in response to the request to display the wake screen user interface of the device, displaying the fourth notification coalesced with the third notification in the wake screen user interface, wherein information about the first notification and the second notification is displayed in response to the request to display the notification history.

3. The method of claim 1, including:
in response to detecting the input for displaying the notification history, in accordance with a determination that the time difference between the time that corresponds to occurrence of the first additional event of the first event type represented by the third notification and the time that corresponds to occurrence of the second event of the first event type represented by the second notification meets the timing criteria:
displaying the third notification in the notification history, separately from the coalesced representation of the first notification and the second notification.

4. The method of claim 1, wherein the respective coalesced representation of notifications includes a plurality of summary information indicators, wherein first and second summary information indicators of the plurality of summary information indicators include a first count of items, in a first respective category of counted items, that correspond to content of the notifications represented by the respective coalesced representation and a second count of items, in a second respective category of counted items, that correspond to content of the notifications represented by the respective coalesced representation.

5. The method of claim 1, including:
detecting an input for expanding the respective coalesced representation of notifications; and
in response to the input for expanding the respective coalesced representation, displaying an expanded version of a set of notifications that correspond to the respective coalesced representation.

6. The method of claim 5, including:
while the expanded version of the set of notifications that corresponds to the respective coalesced representation is displayed, detecting an input for dismissing the set of notifications that correspond to the respective coalesced representation; and
in response to the input for dismissing the set of notifications that corresponds to the respective coalesced representation, clearing the set of notifications that correspond to the respective coalesced representation.

7. The method of claim 5, including:
while the expanded version of the set of notifications that corresponds to the respective coalesced representation is displayed, detecting an input directed to a respective notification of the set of notifications that meets notification-expansion criteria; and
in response to detecting the input that meets the notification-expansion criteria, displaying the expanded version of the respective notification.

8. The method of claim 5, including:
   while the expanded version of the set of notifications that corresponds to the respective coalesced representation is displayed, detecting an input for re-coalescing the set of notifications; and
   in response to the input for re-coalescing the set of notifications, re-displaying a coalesced version of the set of notifications that correspond to the respective coalesced representation.

9. The method of claim 1, wherein a first respective application generates events of multiple distinct event types; and
   the plurality of notifications in the notification history includes:
      a fifth notification that corresponds to a first respective event type of the multiple distinct event types,
      a sixth notification that corresponds to the first respective event type, and
      a seventh notification that corresponds to a second respective event type of the multiple distinct event types; and
   the method includes, in response to detecting the request to display the notification history:
      displaying, in the notification history, a coalesced representation of the fifth notification and the sixth notification; and
      displaying, in the notification history, the seventh notification separately from the coalesced representation of the fifth notification and the sixth notification.

10. The method of claim 1, wherein displaying the respective coalesced representation of notifications includes concurrently displaying within the respective coalesced representation of notifications:
   content from only a most recently created notification of the respective coalesced representation of notifications;
   a representation of one or more notifications other than the most recently created notification; and
   summary information that includes a count of notifications represented by the respective coalesced representation.

11. The method of claim 1, wherein the request to display a wake screen user interface of the device is received while the display is in a screen-off state, and the method includes, in response to the request to display the wake screen user interface of the device, transitioning the display to a screen-on state and displaying, via the display generation component, the wake screen user interface with the third notification.

12. The method of claim 1, wherein the summary information in the respective coalesced representation of notifications further includes source identification information, identifying a source of notifications represented by the respective coalesced representation, or contact information for communication events associated with notifications represented by the respective coalesced representation, or category information for a count of items that correspond to content of the notifications represented by the respective coalesced representation.

13. An electronic device, comprising:
   a display generation component;
   an input device;
   one or more processors;
   memory; and
   one or more programs, wherein the one or more programs are stored in the memory and configured to be executed by the one or more processors, the one or more programs including instructions for:
      while the electronic device has a plurality of notifications in a notification history, the plurality of notifications including a first notification of a first event of a first event type and a second notification of a second event of the first event type, wherein the first notification and the second notification are coalesced in the notification history, detecting occurrence of one or more additional events of the first event type;
      in response to detecting the occurrence of a first additional event of the first event type, creating a third notification for the first additional event of the first event type;
      after creating the third notification for the first additional event of the first event type, receiving, via the input device, a request to display a wake screen user interface of the electronic device;
      in response to the request to display the wake screen user interface of the electronic device, displaying, via the display generation component, the wake screen user interface with the third notification, wherein the third notification is displayed on the wake screen user interface without information about the first notification and the second notification;
      after the third notification has been displayed on the wake screen user interface, receiving, via the input device, a request to display the notification history; and
      in response to receiving the request to display the notification history, displaying the notification history with a coalesced representation of the first notification and the second notification;
   wherein displaying a respective coalesced representation of notifications includes concurrently displaying within the respective coalesced representation: content from only a most recently created notification of the respective coalesced representation of notifications, and summary information that includes a count of notifications represented by the respective coalesced representation; and
   wherein the one or more programs further include instructions for:
      while the third notification meets notifications history display criteria, detecting an input for displaying the notification history; and
      in response to detecting the input for displaying the notification history:
         in accordance with a determination that a time difference between a time that corresponds to occurrence of the first additional event of the first event type represented by the third notification and a time that corresponds to occurrence of the second event of the first event type represented by the second notification does not meet timing criteria for displaying the third notification separately from a coalesced representation of the first notification and the second notification, displaying the notification history with a coalesced representation of the third notification, the second notification, and the first notification; wherein displaying the coalesced representation of the third, second and first notifications includes concurrently displaying content from only a most recently created notification of the coalesced representation of third, second and first notifications and summary information that includes a count of notifications represented by the coalesced representation of the third, second and first notifications.

14. The electronic device of claim 13, the one or more programs including instructions for:
in response to detecting the occurrence of a second additional event of the first event type, creating a fourth notification for the second additional event of the first event type; and
in response to the request to display the wake screen user interface of the device, displaying the fourth notification coalesced with the third notification in the wake screen user interface, wherein information about the first notification and the second notification is displayed in response to the request to display the notification history.

15. The electronic device of claim 13, the one or more programs including instructions for:
in response to detecting the input for displaying the notification history, in accordance with a determination that the time difference between the time that corresponds to occurrence of the first additional event of the first event type represented by the third notification and the time that corresponds to occurrence of the second event of the first event type represented by the second notification meets the timing criteria:
displaying the third notification in the notification history, separately from the coalesced representation of the first notification and the second notification.

16. The electronic device of claim 13, wherein the respective coalesced representation of notifications includes a plurality of summary information indicators, wherein first and second summary information indicators of the plurality of summary information indicators include a first count of items, in a first respective category of counted items, that correspond to content of the notifications represented by the respective coalesced representation and a second count of items, in a second respective category of counted items, that correspond to content of the notifications represented by the respective coalesced representation.

17. The electronic device of claim 13, the one or more programs including instructions for:
detecting an input for expanding the respective coalesced representation of notifications; and
in response to the input for expanding the respective coalesced representation, displaying an expanded version of a set of notifications that correspond to the respective coalesced representation.

18. The electronic device of claim 17, the one or more programs including instructions for:
while the expanded version of the set of notifications that corresponds to the respective coalesced representation is displayed, detecting an input for dismissing the set of notifications that correspond to the respective coalesced representation; and
in response to the input for dismissing the set of notifications that corresponds to the respective coalesced representation, clearing the set of notifications that correspond to the respective coalesced representation.

19. The electronic device of claim 17, the one or more programs including instructions for:
while the expanded version of the set of notifications that corresponds to the respective coalesced representation is displayed, detecting an input directed to a respective notification of the set of notifications that meets notification-expansion criteria; and
in response to detecting the input that meets the notification-expansion criteria, displaying the expanded version of the respective notification.

20. The electronic device of claim 17, the one or more programs including instructions for:
while the expanded version of the set of notifications that corresponds to the respective coalesced representation is displayed, detecting an input for re-coalescing the set of notifications; and
in response to the input for re-coalescing the set of notifications, re-displaying a coalesced version of the set of notifications that correspond to the respective coalesced representation.

21. The electronic device of claim 13, wherein a first respective application generates events of multiple distinct event types; and
the plurality of notifications in the notification history includes:
a fifth notification that corresponds to a first respective event type of the multiple distinct event types,
a sixth notification that corresponds to the first respective event type, and
a seventh notification that corresponds to a second respective event type of the multiple distinct event types;
and the one or more programs include instructions for:
in response to detecting the request to display the notification history:
displaying, in the notification history, a coalesced representation of the fifth notification and the sixth notification; and
displaying, in the notification history, the seventh notification separately from the coalesced representation of the fifth notification and the sixth notification.

22. The electronic device of claim 13, wherein displaying the respective coalesced representation of notifications includes concurrently displaying within the respective coalesced representation of notifications:
content from only a most recently created notification of the respective coalesced representation of notifications;
a representation of one or more notifications other than the most recently created notification; and
summary information that includes a count of notifications represented by the respective coalesced representation.

23. The electronic device of claim 13, wherein the request to display a wake screen user interface of the device is received while the display is in a screen-off state;
and the one or more programs include instructions for:
in response to the request to display the wake screen user interface of the device, transitioning the display to a screen-on state and displaying, via the display generation component, the wake screen user interface with the third notification.

24. The electronic device of claim 13, wherein the summary information in the respective coalesced representation of notifications further includes source identification information, identifying a source of notifications represented by the respective coalesced representation, or contact information for communication events associated with notifications represented by the respective coalesced representation, or category information for a count of items that correspond to content of the notifications represented by the respective coalesced representation.

25. A non-transitory computer readable storage medium storing one or more programs, the one or more programs comprising instructions, which when executed by an electronic device with a display generation component and an input device, cause the electronic device to:
- while the electronic device has a plurality of notifications in a notification history, the plurality of notifications including a first notification of a first event of a first event type and a second notification of a second event of the first event type, wherein the first notification and the second notification are coalesced in the notification history, detect occurrence of one or more additional events of the first event type;
- in response to detecting the occurrence of a first additional event of the first event type, create a third notification for the first additional event of the first event type;
- after creating the third notification for the first additional event of the first event type, receive, via the input device, a request to display a wake screen user interface of the electronic device;
- in response to the request to display the wake screen user interface of the electronic device, display, via the display generation component, the wake screen user interface with the third notification, wherein the third notification is displayed on the wake screen user interface without information about the first notification and the second notification;
- after the third notification has been displayed on the wake screen user interface, receive, via the input device, a request to display the notification history; and
- in response to receiving the request to display the notification history, display the notification history with a coalesced representation of the first notification and the second notification;
- wherein displaying a respective coalesced representation of notifications includes concurrently displaying within the respective coalesced representation: content from only a most recently created notification of the respective coalesced representation of notifications, and summary information that includes a count of notifications represented by the respective coalesced representation; and
- wherein the one or more programs further include instructions, which when executed by the electronic device, cause the electronic device to:
  - while the third notification meets notifications history display criteria, detect an input for displaying the notification history; and
  - in response to detecting the input for displaying the notification history:
    - in accordance with a determination that a time difference between a time that corresponds to occurrence of the first additional event of the first event type represented by the third notification and a time that corresponds to occurrence of the second event of the first event type represented by the second notification does not meet timing criteria for displaying the third notification separately from a coalesced representation of the first notification and the second notification, display the notification history with a coalesced representation of the third notification, the second notification, and the first notification; wherein displaying the coalesced representation of the third, second and first notifications includes concurrently displaying content from only a most recently created notification of the coalesced representation of third, second and first notifications and summary information that includes a count of notifications represented by the coalesced representation of the third, second and first notifications.

26. The non-transitory computer readable storage medium of claim 25, wherein the one or more programs include instructions, which when executed by the electronic device, cause the electronic device to:
- in response to detecting the occurrence of a second additional event of the first event type, create a fourth notification for the second additional event of the first event type; and
- in response to the request to display the wake screen user interface of the device, display the fourth notification coalesced with the third notification in the wake screen user interface, wherein information about the first notification and the second notification is displayed in response to the request to display the notification history.

27. The non-transitory computer readable storage medium of claim 25, wherein the one or more programs include instructions, which when executed by the electronic device, cause the electronic device to:
- in response to detecting the input for displaying the notification history, in accordance with a determination that the time difference between the time that corresponds to occurrence of the first additional event of the first event type represented by the third notification and the time that corresponds to occurrence of the second event of the first event type represented by the second notification meets the timing criteria:
  - display the third notification in the notification history, separately from the coalesced representation of the first notification and the second notification.

28. The non-transitory computer readable storage medium of claim 25, wherein the respective coalesced representation of notifications includes a plurality of summary information indicators, wherein first and second summary information indicators of the plurality of summary information indicators include a first count of items, in a first respective category of counted items that correspond to content of the notifications represented by the respective coalesced representation and a second count of items, in a second respective category of counted items, that correspond to content of the notifications represented by the respective coalesced representation.

29. The non-transitory computer readable storage medium of claim 25, wherein the one or more programs include instructions, which when executed by the electronic device, cause the electronic device to:
- detect an input for expanding the respective coalesced representation of notifications; and
- in response to the input for expanding the respective coalesced representation, display an expanded version of a set of notifications that correspond to the respective coalesced representation.

30. The non-transitory computer readable storage medium of claim 29, wherein the one or more programs include instructions, which when executed by the electronic device, cause the electronic device to:
- while the expanded version of the set of notifications that corresponds to the respective coalesced representation is displayed, detect an input for dismissing the set of notifications that correspond to the respective coalesced representation; and
- in response to the input for dismissing the set of notifications that corresponds to the respective coalesced representation, clear the set of notifications that correspond to the respective coalesced representation.

31. The non-transitory computer readable storage medium of claim 29, wherein the one or more programs include instructions, which when executed by the electronic device, cause the electronic device to:
while the expanded version of the set of notifications that corresponds to the respective coalesced representation is displayed, detect an input directed to a respective notification of the set of notifications that meets notification-expansion criteria; and
in response to detecting the input that meets the notification-expansion criteria, display the expanded version of the respective notification.

32. The non-transitory computer readable storage medium of claim 29, wherein the one or more programs include instructions, which when executed by the electronic device, cause the electronic device to:
while the expanded version of the set of notifications that corresponds to the respective coalesced representation is displayed, detect an input for re-coalescing the set of notifications; and
in response to the input for re-coalescing the set of notifications, re-display a coalesced version of the set of notifications that correspond to the respective coalesced representation.

33. The non-transitory computer readable storage medium of claim 25, wherein a first respective application generates events of multiple distinct event types; and
the plurality of notifications in the notification history includes:
a fifth notification that corresponds to a first respective event type of the multiple distinct event types,
a sixth notification that corresponds to the first respective event type, and
a seventh notification that corresponds to a second respective event type of the multiple distinct event types;
and wherein the one or more programs include instructions, which when executed by the electronic device, cause the electronic device to:
in response to detecting the request to display the notification history:
display, in the notification history, a coalesced representation of the fifth notification and the sixth notification; and
display, in the notification history, the seventh notification separately from the coalesced representation of the fifth notification and the sixth notification.

34. The non-transitory computer readable storage medium of claim 25, wherein displaying the respective coalesced representation of notifications includes concurrently displaying within the respective coalesced representation of notifications:
content from only a most recently created notification of the respective coalesced representation of notifications;
a representation of one or more notifications other than the most recently created notification; and
summary information that includes a count of notifications represented by the respective coalesced representation.

35. The non-transitory computer readable storage medium of claim 25, wherein the request to display a wake screen user interface of the device is received while the display is in a screen-off state;
and wherein the one or more programs include instructions, which when executed by the electronic device, cause the electronic device to:
in response to the request to display the wake screen user interface of the device, transition the display to a screen-on state and display, via the display generation component, the wake screen user interface with the third notification.

36. The non-transitory computer readable storage medium of claim 25, wherein the summary information in the respective coalesced representation of notifications further includes source identification information, identifying a source of notifications represented by the respective coalesced representation, or contact information for communication events associated with notifications represented by the respective coalesced representation, or category information for a count of items that correspond to content of the notifications represented by the respective coalesced representation.

* * * * *